US012537927B2

(12) United States Patent
Atwell et al.

(10) Patent No.: US 12,537,927 B2
(45) Date of Patent: Jan. 27, 2026

(54) HANDHELD SCANNER FOR MEASURING THREE-DIMENSIONAL COORDINATES

(71) Applicant: FARO Technologies, Inc., Lake Mary, FL (US)

(72) Inventors: Paul C. Atwell, Lake Mary, FL (US); Matthew Mogensen, Lake Mary, FL (US); Nitesh Dhasmana, Lake Mary, FL (US); Christopher M. Riehl, Lake Mary, FL (US)

(73) Assignee: FARO Technologies, Inc., Lake Mary, FL (US)

( * ) Notice: Subject to any disclaimer, the term of this patent is extended or adjusted under 35 U.S.C. 154(b) by 50 days.

(21) Appl. No.: 18/428,638

(22) Filed: Jan. 31, 2024

(65) Prior Publication Data

US 2025/0008071 A1 Jan. 2, 2025

Related U.S. Application Data

(63) Continuation of application No. 17/556,120, filed on Dec. 20, 2021, now Pat. No. 11,930,155.

(Continued)

(51) Int. Cl.

| | |
|---|---|
| ***H04N 13/254*** | (2018.01) |
| ***G01B 11/25*** | (2006.01) |
| ***H04N 13/239*** | (2018.01) |

(52) U.S. Cl.

CPC ....... *H04N 13/254* (2018.05); *G01B 11/2513* (2013.01); *H04N 13/239* (2018.05)

(58) Field of Classification Search

CPC ............... H04N 13/254; H04N 13/239; G01B 11/2513; G01B 11/005; G01B 11/2509; G01B 11/2545

(Continued)

(56) References Cited

U.S. PATENT DOCUMENTS

| | | |
|---|---|---|
| 7,009,717 B2 | 3/2006 | Van Coppenolle et al. |
| 7,231,069 B2 | 6/2007 | Nahata |

(Continued)

FOREIGN PATENT DOCUMENTS

| | | |
|---|---|---|
| CN | 109900221 A | 6/2019 |
| WO | 2015/118467 A1 | 8/2015 |

OTHER PUBLICATIONS

Flir, Vertical-Cavity Surface-Emitting Laser (VCSEL) Diode Array. FLIR Vcsel Laser Array. Catalog, 2 pages, (2021).

(Continued)

*Primary Examiner* — Susan E. Hodges

(74) *Attorney, Agent, or Firm* — McCarter & English, LLP; Dave S. Christensen

(57) ABSTRACT

A 3D measuring system includes a first projector that projects a first line onto an object at a first wavelength, a second projector that projects a second line onto the object at a second wavelength, a first illuminator that emits a third light onto some markers, a second illuminator that emits a fourth light onto some markers, a first camera having a first lens and a first image sensor, a second camera having a second lens and a second image sensor, the first lens operable to pass the first wavelength, block the second wavelength, and pass the third light to a first image sensor, the second lens operable to pass the second wavelength, block the first wavelength, and pass the fourth light. The system further includes one or more processors operable to determine 3D coordinates based on images captured by the first image sensor and the second image sensor.

16 Claims, 97 Drawing Sheets

Related U.S. Application Data

(60) Provisional application No. 63/130,006, filed on Dec. 23, 2020.

(58) Field of Classification Search
USPC ........................................................... 348/47
See application file for complete search history.

(56) References Cited

U.S. PATENT DOCUMENTS

| | | | |
|---|---|---|---|
| 7,428,061 | B2 | 9/2008 | Coppenolle et al. |
| 8,970,823 | B2 | 3/2015 | Heidemann et al. |
| 9,041,914 | B2 | 5/2015 | Tohme et al. |
| 9,217,637 | B2 | 12/2015 | Heidemann et al. |
| 9,325,883 | B2 | 4/2016 | Bowler et al. |
| 9,482,528 | B2 | 11/2016 | Baker et al. |
| 9,599,455 | B2 | 3/2017 | Heidemann et al. |
| 9,628,775 | B2 | 4/2017 | Bridges et al. |
| 9,671,221 | B2 | 6/2017 | Ruhland et al. |
| 9,909,856 | B2 | 3/2018 | Bridges |
| 10,070,116 | B2 | 9/2018 | Hillebrand et al. |
| 10,088,296 | B2 | 10/2018 | Hillebrand et al. |
| 10,089,415 | B2 | 10/2018 | Grau |
| 10,444,009 | B2 | 10/2019 | Tohme et al. |
| 11,022,692 | B2 | 6/2021 | Heidemann et al. |
| 2014/0192187 | A1 | 7/2014 | Atwell et al. |
| 2015/0015898 | A1 | 1/2015 | Atwell et al. |
| 2016/0073104 | A1 | 3/2016 | Hillebrand et al. |
| 2016/0084633 | A1 | 3/2016 | Ferrari et al. |
| 2017/0251192 | A1 | 8/2017 | Bridges |
| 2017/0332069 | A1 | 11/2017 | Hillebrand et al. |
| 2019/0113334 | A1 | 4/2019 | Wolke et al. |
| 2019/0242697 | A1 | 8/2019 | Zheng et al. |
| 2020/0049477 | A1 | 2/2020 | Lankalapalli et al. |
| 2020/0050727 | A1 * | 2/2020 | Zweigle ................ G06F 30/392 |
| 2022/0198704 | A1 | 6/2022 | Atwell et al. |
| 2022/0201269 | A1 | 6/2022 | Atwell et al. |

OTHER PUBLICATIONS

Krischke et al., Components and tools for polarization-maintaining fiber optics. Laser Technik Journal. Jan. 2012;9(1):30-34.

Reich et al., 3-D shape measurement of complex objects by combining photogrammetry and fringe projection. Opt Eng. Jan. 2000;39(1):224-231.

RP Photonics Encyclopedia, Focal Plane Arrays. Retrieved on line at: https://www.rp-photonics.com/focal_plane_arrays.html. 4 pages, retrieved Oct. 12, 2023.

European Office Action for Application No. 21216565.8, dated Jul. 26, 2022, 13 pages.

European Office Action for Application No. 21216565.8, dated Apr. 20, 2022, 14 pages.

* cited by examiner

FIG. 7B
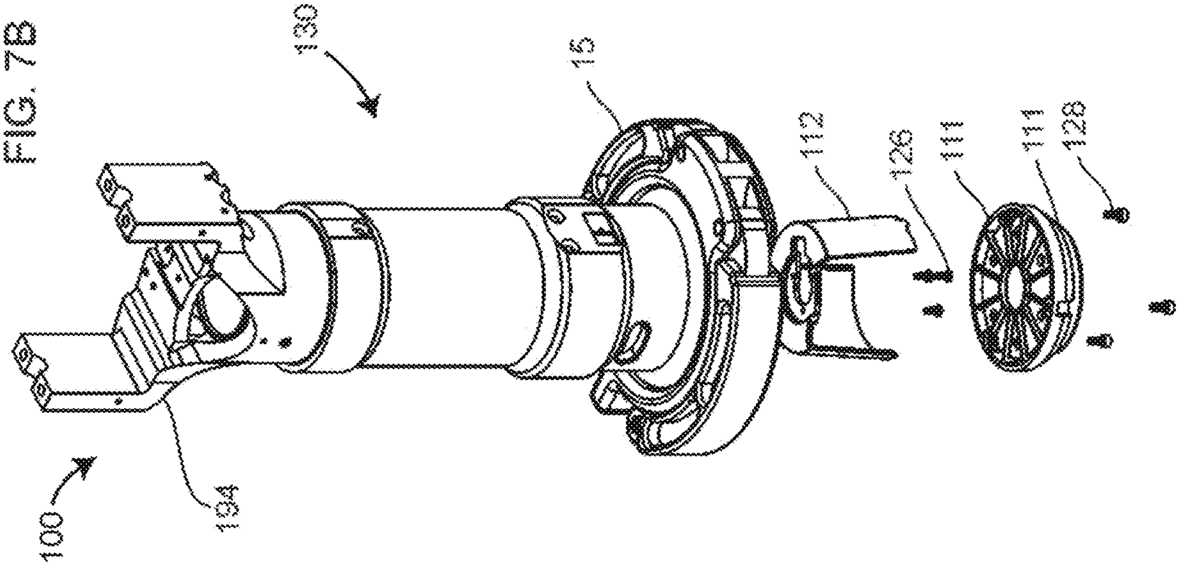
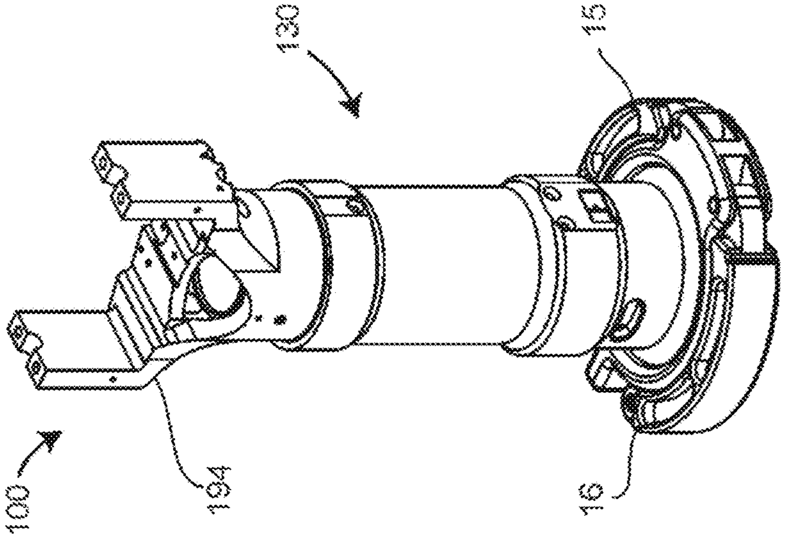
FIG. 7A

HANDHELD SCANNER FOR MEASURING THREE-DIMENSIONAL COORDINATES

CROSS-REFERENCE TO RELATED APPLICATIONS

This application is a continuation of U.S. patent application Ser. No. 17/556,120, filed Dec. 20, 2021 which is a nonprovisional application of U.S. Provisional Application Ser. No. 63/130,006 filed on Dec. 23, 2020, the contents of which are incorporated by reference herein.

BACKGROUND

The present disclosure relates to a triangulation scanner that is used in combination with a portable articulated arm coordinate measuring machine (AACMM) or alternatively detached from the AACMM for use in a handheld or mechanized mode.

Portable articulated arm coordinate measuring machines (AACMMs) have found widespread use in the manufacturing or production of parts where there is a need to verify the dimensions of the part rapidly and accurately during various stages of the manufacturing or production (e.g., machining) of the part. In one mode of operation, a tactile probe attached to the AACMM is brought in contact with an object-under-test and in response the AACMM reports the 3D coordinates of the probed point. In another mode of operation, a scanning accessory attached to the AACMM projects a pattern of light onto the object-under-test and in response the AACMM reports the 3D coordinates of the light that intersects the object. Examples of scanning accessories in common use with AACMMs are usually referred to as laser line probes (LLPs) or laser line scanners.

Handheld 3D measuring devices available today project relatively large patterns of light, resulting in relatively the acquisition of relatively low-resolution 3D coordinates. The data is sent to an external computer, where relatively lengthy computations prevents it from being acquired and displayed in real time. In many cases, the external computer meshes the data, further filtering the data, thereby further reducing resolution. Data is usually sent to the external computer over a wired communication channel, tethering the handheld measuring device to the external computer, limiting the mobility of a hand-held measuring device. Handheld 3D measuring devices usually can register multiple 3D data sets based on images of reflective markers or natural features, but not both.

Accordingly, while existing AACMMs are suitable for their intended purposes, there remains a need for improvements in handheld 3D measuring devices.

BRIEF DESCRIPTION

According to an embodiment, a system comprises: a first projector for projecting a first line of light at a first wavelength on an object; a second projector for simultaneously projecting a second line of light at a second wavelength on the object; a first camera having a first lens for passing the first wavelength and blocking the second wavelength, and a first image sensor for capturing a first image of the first line of light through the first lens; a second camera having a second lens for passing the second wavelength and blocking the first wavelength, and a second image sensor for capturing a second image of the second line of light through the lens; and a processor for determining three-dimensional (3D) coordinates of reflected points on the object based on the first image and the second image.

According to an embodiment, a system comprises: a first enclosure configured for handheld use that includes: a projector that projects a first line of light on an object; an illuminator that illuminates a marker disposed within a same field of view as the object; and a camera that captures a first image of the object at a first time and a second image of the object at a second time, each of the first image and the second image including the first line of light and the marker; and a wearable unit including a second enclosure that is physically separate from the first enclosure, the second enclosure enclosing a processor in communication with the camera by at least one of a wired connection and a wireless connection, the processor for determining three-dimensional (3D) coordinates of points on the object based at least in part on the first image and the second image.

In a further embodiment, a system comprises: a projector that projects on an object a line of light having a wavelength; an illuminator that illuminates the object and markers disposed at least one of on and near the object with light comprising a range of wavelengths separate from the wavelength; a first lens that passes the wavelength and block the range of wavelengths; a second lens that passes the range of wavelengths and blocks the wavelength; an image sensor that receives reflected light from the object through the first lens and the second lens; a processor that determines a plurality of three-dimensional (3D) coordinates on the object based at least in part on an image generated by the image sensor from the reflected light.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIG. 7A and FIG. 7B are isometric and unassembled views, respectively, of a first-axis assembly and a mounting device according to an embodiment;

FIGS. 39A, 39B, 39C, 39D, 39E, and FIG. 39F are isometric views of a kinematic nest, a kinematic nest holding a spherically mounted retroreflector (SMR), a first kinematic nest holding a first kinematic reflector, a second kinematic nest holding a second kinematic reflector, a kinematic nest holding a kinematic adapter that includes a spherical seat, respectively, according to an embodiment;

The detailed description explains embodiments of the invention, together with advantages and features, by way of example with reference to the drawings.

DETAILED DESCRIPTION

Embodiments disclosed herein provide for a scanner that is attached to an articulated arm coordinate measurement machine (AACMM) or used without attachment to an AACMM. Embodiments herein provide advantages in providing high resolution images. Furthermore, when removed from the AACMM, electronics within the handheld 3D scanner determine 3D coordinates within the frame of reference of the handheld scanner directly, that is without requiring electronics in an external computer. Additional processing within an external processor places the resulting 3D points measured on an object to be displayed directly on a monitor or mobile display, thereby eliminating delay in obtaining results. In some embodiments, Scheimpflug geometry is applied to the one or more narrow-angle cameras, enabling fine features to be measured to high accuracy.

Embodiments disclosed herein provide the ability to register multiple 3D data sets based either on images of reflective markers or of natural features or of a combination of the two.

Further embodiments disclosed herein enable a handheld 3D scanner in wireless mode, especially when used in combination with a mobile personal computer (PC), which is carried on a belt as a belt computer. A mobile display is magnetically mounted on the handheld 3D scanner, providing a convenient display of captured 3D images, and providing a convenient user interface. Full resolution data is output, or if preferred data is meshed before display. Because the mobile PC is conveniently carried, with wireless communication provided to the mobile display, the operator is not tethered by a necessary wired communication link.

When measuring large objects, handheld scanners need a method for determining 3D coordinates and then registering those 3D coordinates within a common frame of reference. A common method for providing such registration is to place markers and reference lengths on an object. These markers and reference lengths are measured at many poses with a camera having a flash. A bundle-adjust calculation is performed to determine 3D coordinates between the imaged markers. The present invention provides a more convenient method for determining a network of 3D coordinates of markers by using the stereo cameras on the handheld 3D measuring device of the present invention to capture the markers and reference positions. A further significant advantage of the present invention is to establish a large, highly accurate network of 3D coordinates by attaching kinematic nests to an object. A laser tracker measures the 3D coordinates of a spherically mounted retroreflector (SMR) moved to each of the kinematic nests. The laser tracker quickly and accurately establishes a 3D network of reference points of arbitrary largeness.

Figure 1A:
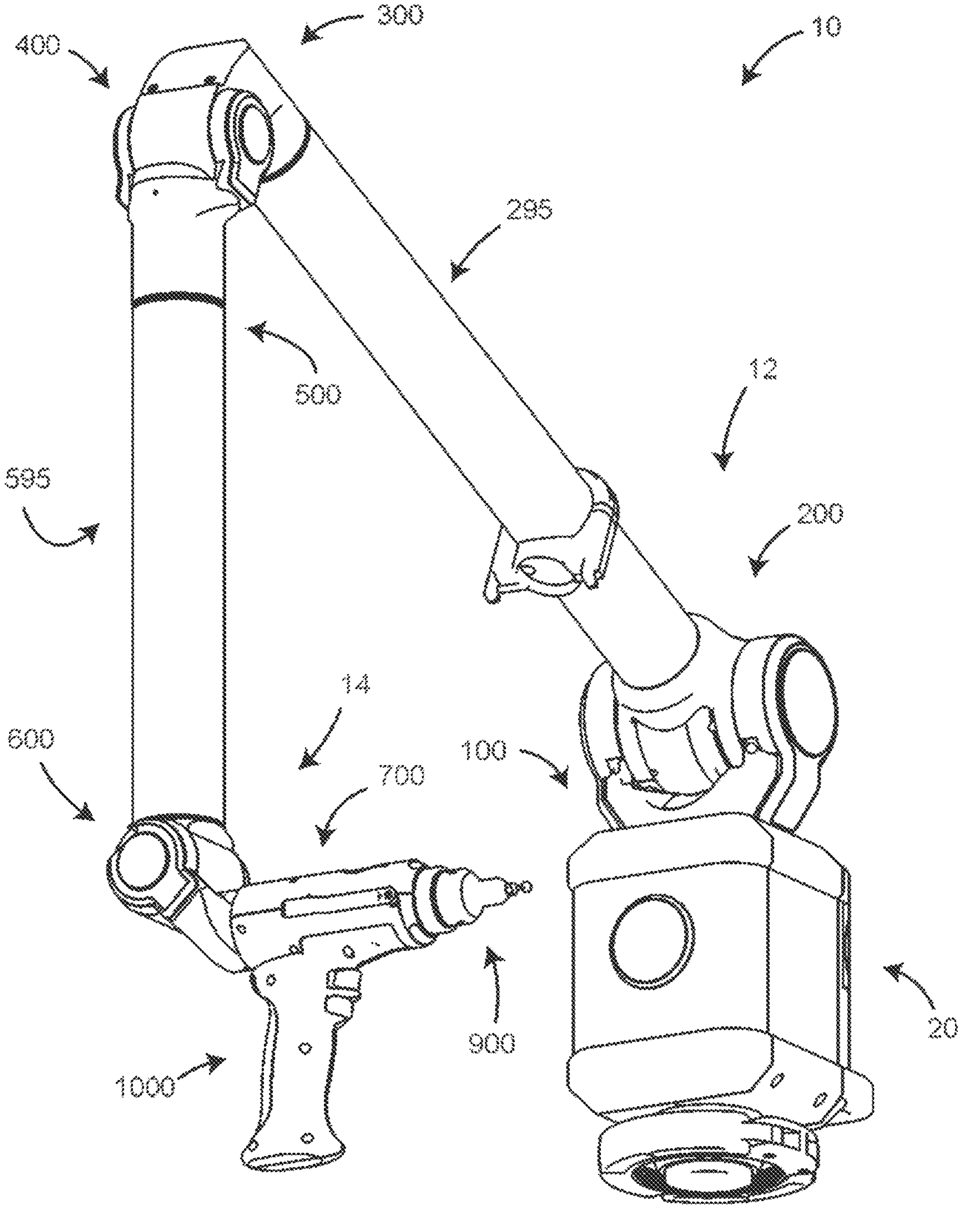
FIG. 1A and FIG. 1B are two isometric views of a portable articulated AACMM according to an embodiment.
Figure 1B:
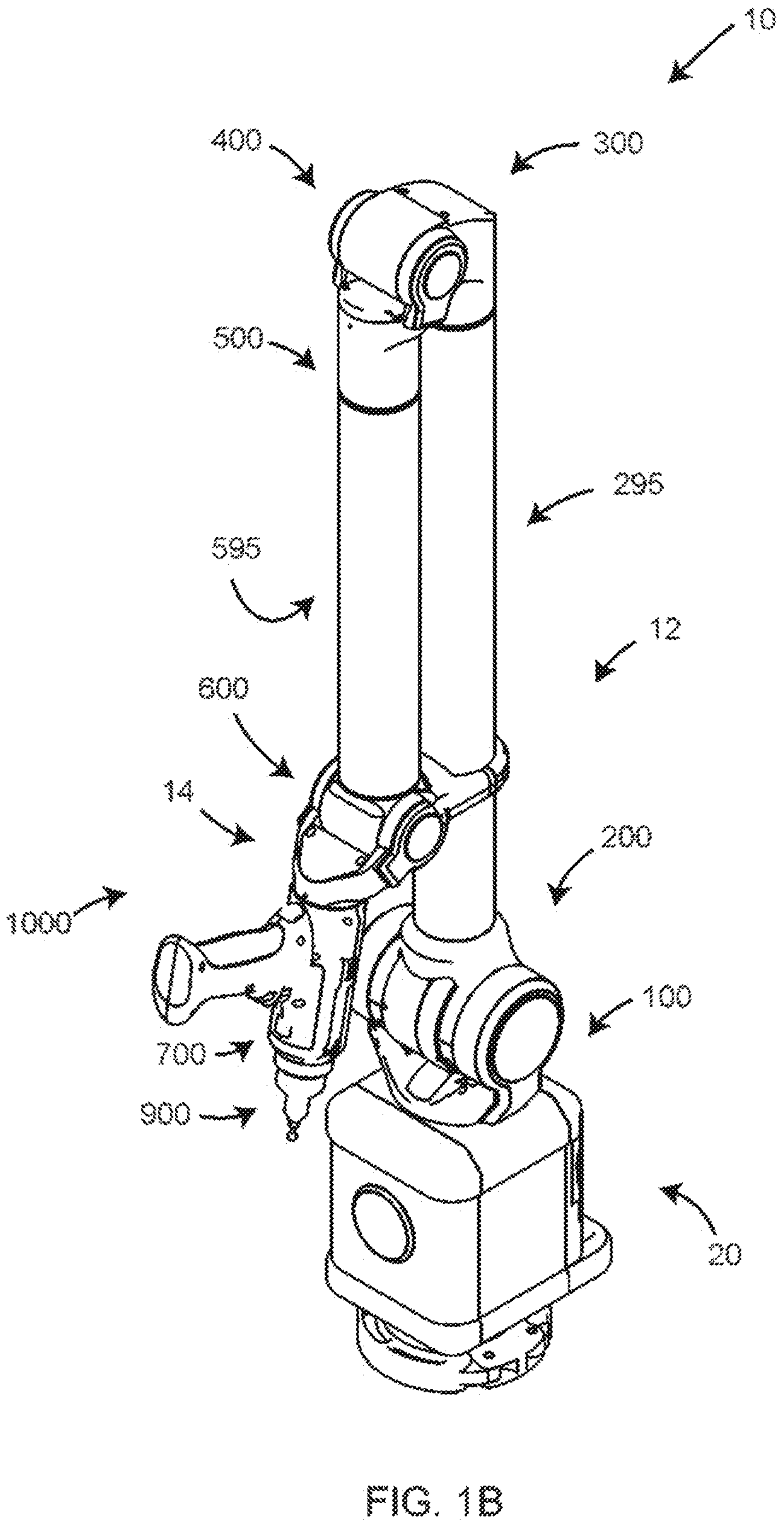

FIGS. 1A, 1B illustrate, in isometric view, an AACMM 10 according to various embodiments of the present invention, the AACMM being one type of coordinate measuring machine. In an embodiment, a first segment 295 and a second segment 595 are connected to a base 20 on one end and a measurement device on the other end. In an embodiment, the measurement device is a tactile-probe assembly 900.

In an embodiment illustrated in FIGS. 1A, 1B, the AACMM 10 includes seven rotational elements; hence the AACMM 10 is referred to as a seven-axis AACMM. The seven-axis AACMM 10 of FIGS. 1A, 1B includes first-axis assembly 100, second-axis assembly 200, third-axis assembly 300, fourth-axis assembly 400, fifth-axis assembly 500, sixth-axis assembly 600, and seventh-axis assembly 700. In an embodiment, a tactile probe assembly 900 and a handle 1000 are attached to the seventh-axis assembly. Each of the axis assemblies provides either a swivel rotation or a hinge rotation. In the embodiment illustrated in FIGS. 1A, 1B, the first-axis assembly 100 provides a swivel rotation about an axis aligned to a mounting direction of the base 20. In an embodiment, the second axis assembly 200 provides a hinge rotation about an axis perpendicular to the first segment 295. The combination of the first-axis assembly 100 and the second-axis assembly 200 is sometimes colloquially referred to as a shoulder 12 since in some embodiments the possible motions of the shoulder 12 of the AACMM 10 resemble the motions possible with a human shoulder.

In the embodiment illustrated in FIGS. 1A, 1B, the third-axis assembly 300 provides a swivel rotation about an axis aligned to the first segment 295. The fourth-axis assembly 400 provides a hinge rotation about an axis perpendicular to second segment 595. The fifth-axis assembly 500 provides a swivel rotation about an axis aligned to the second segment 595. The combination of the third-axis assembly 300, the fourth-axis assembly 400, and the fifth-axis assembly 500 is sometimes colloquially referred to as an elbow 13 since in some embodiments the possible motions of the elbow 13 of the AACMM 10 resemble the motions possible with a human elbow.

In the embodiment illustrated in FIGS. 1A, 1B, the sixth-axis assembly provides a hinge rotation about an axis perpendicular to the second segment 595. In an embodiment, the AACMM 10 further comprises a seventh-axis assembly 700, which provides a swivel rotation of probe assemblies (e.g., tactile-probe assembly 900) attached to the seventh axis. The sixth-axis assembly 600, or the combination of the sixth-axis assembly 600 and the seventh-axis assembly 700, is sometimes colloquially referred to as a wrist 14 of the AACMM 10. The wrist 14 is so named because in some embodiments it provides motions similar to those possible with a human wrist. The combination of the shoulder 12, first segment 295, elbow 13, second segment 595, and wrist 14 resembles in many ways a human arm from human shoulder to human wrist. In some embodiments, the number of axis assemblies associated with each of the shoulder, elbow, and wrist differ from the number shown in FIGS. 1A, 1B. It is possible, for example, to move the third-axis assembly 300 from the elbow 13 to the shoulder 12, thereby increasing the number of axis assemblies in the shoulder to three and reducing the number of axis assemblies in the wrist to two. Other axis combinations are also possible.

Figure 2A:
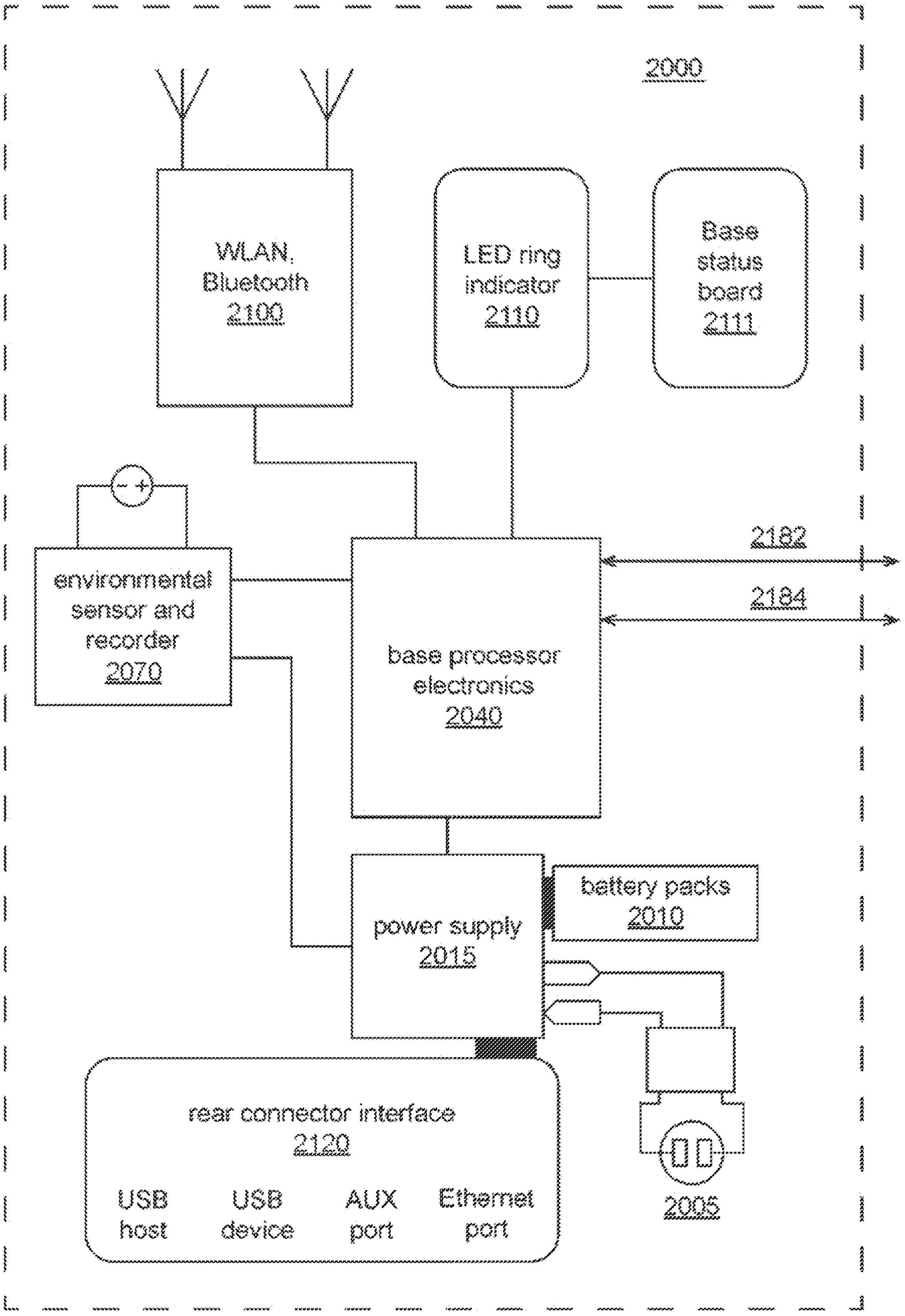
FIG. 2A is a block diagram of base electronics of the AACMM of FIGS. 1A, 1B according to an embodiment.

FIG. 2A is a block diagram of base electronics 2000. FIG. 2A includes modular power supply 2005, battery packs

Figure 2B:
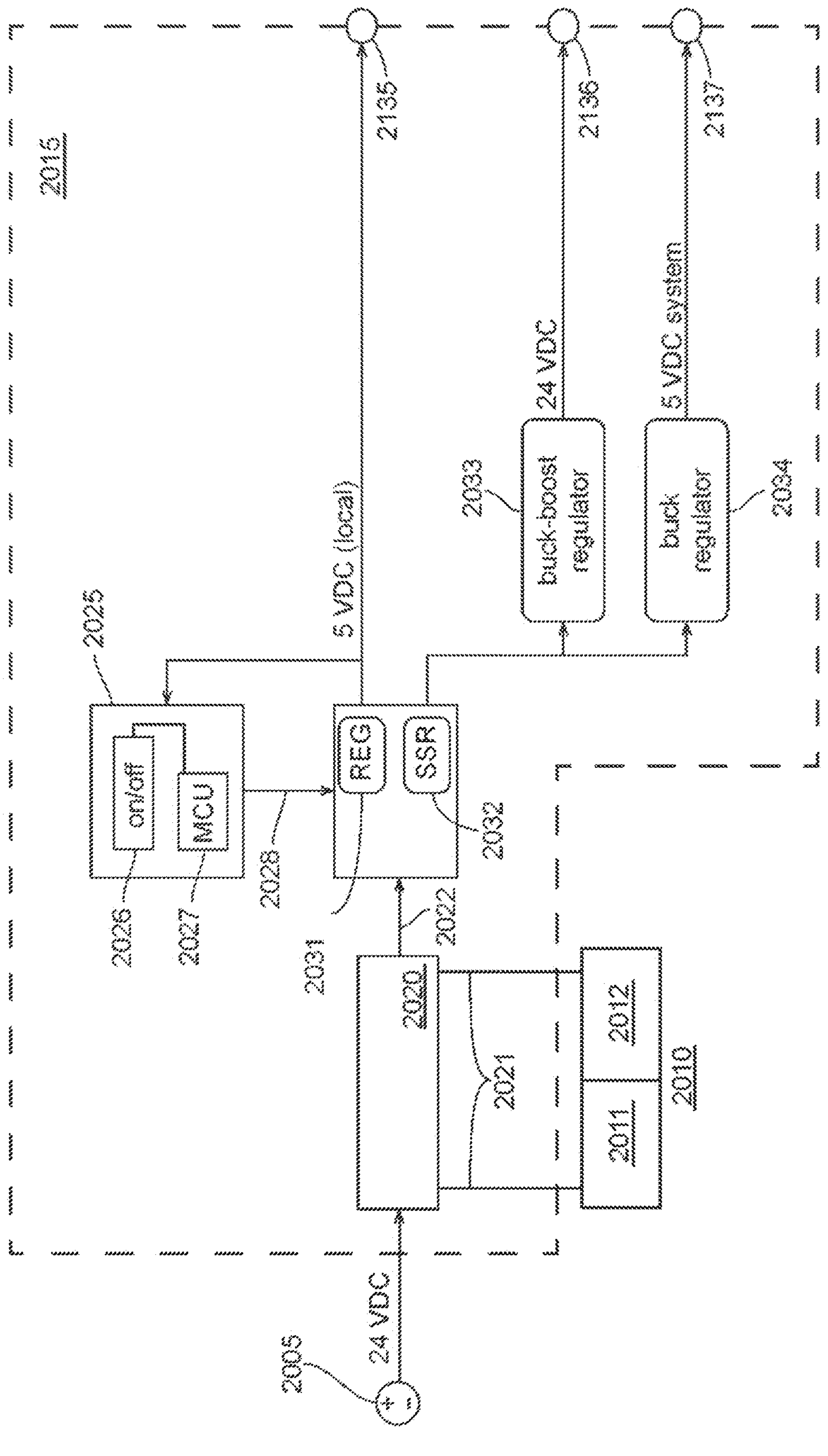
FIGS. 2B, 2C, and FIG. 2D are block diagrams providing further detail of elements within the block diagram of FIG. 2A according to an embodiment.

2010, and a power supply 2015. These elements are shown in greater detail in a block diagram of FIG. 2B. In an embodiment, the modular power supply 2005 is located external to the power supply 2015 and is plugged into AC power mains to provide a dual battery smart charger 2020 with a voltage of 24 VDC. In an embodiment, the dual battery smart charger 2020 provides a portion of the voltage from the modular power supply 2005 to charge one or both of smart battery packs. In an embodiment, a System Management Bus (SMBUS) 2021, which is a single-ended simple two-wire bus for the purpose of lightweight communication, provides communication among the dual battery smart charger 2020 and smart battery packs 2010. In an embodiment, the smart battery packs 2010 include a first battery pack 2011 and a second battery pack 2012 (FIG. 2B). In an embodiment, one battery pack provides electrical power to the AACMM 10 while the other battery pack is being charged. In an embodiment, either or both battery packs 2011, 2012 are removed while power from the modular power supply 2005 is being applied. In other words, the battery packs are "hot swapped." In an embodiment, each battery pack 2011, 2012 includes a 14.4 VDC lithium-ion battery.

Part of the electrical power passing through the line 2022 arrives at the regulator 2031, which provides a 5 VDC local voltage through a point 2135 to the environmental sensor and recorder battery charger and regulator 2076 (FIG. 2D) and to a user interface (IF) 2025, which includes an electrical on/off switch 2026 and a microcontroller (MCU) 2027. The electrical on/off switch 2026 is activated in response to pressing of a mechanical on-off button 32 shown in FIG. 6A. When the on/off switch 2026 is in the on state, the MCU 2027 produces a signal 2028 that causes a solid-state relay (SSR) 2032 to close, passing the voltage on the line 2022 to a buck-boost regular 2033 and a buck regulator 2034. The buck regulator 2034 provides a 5 VDC system voltage, which from a point 2137 is stepped down to secondary voltages 3.3 VDC, 1.8 VDC, 1.5 VDC, and 1.2 VDC for use by processors and memory. The buck-boost regulator 2033 provides a 24 VDC signal from a point 2136 to electronics in the arm segments, the arm end, and accessories attached to the arm probe end.

Figure 2C:
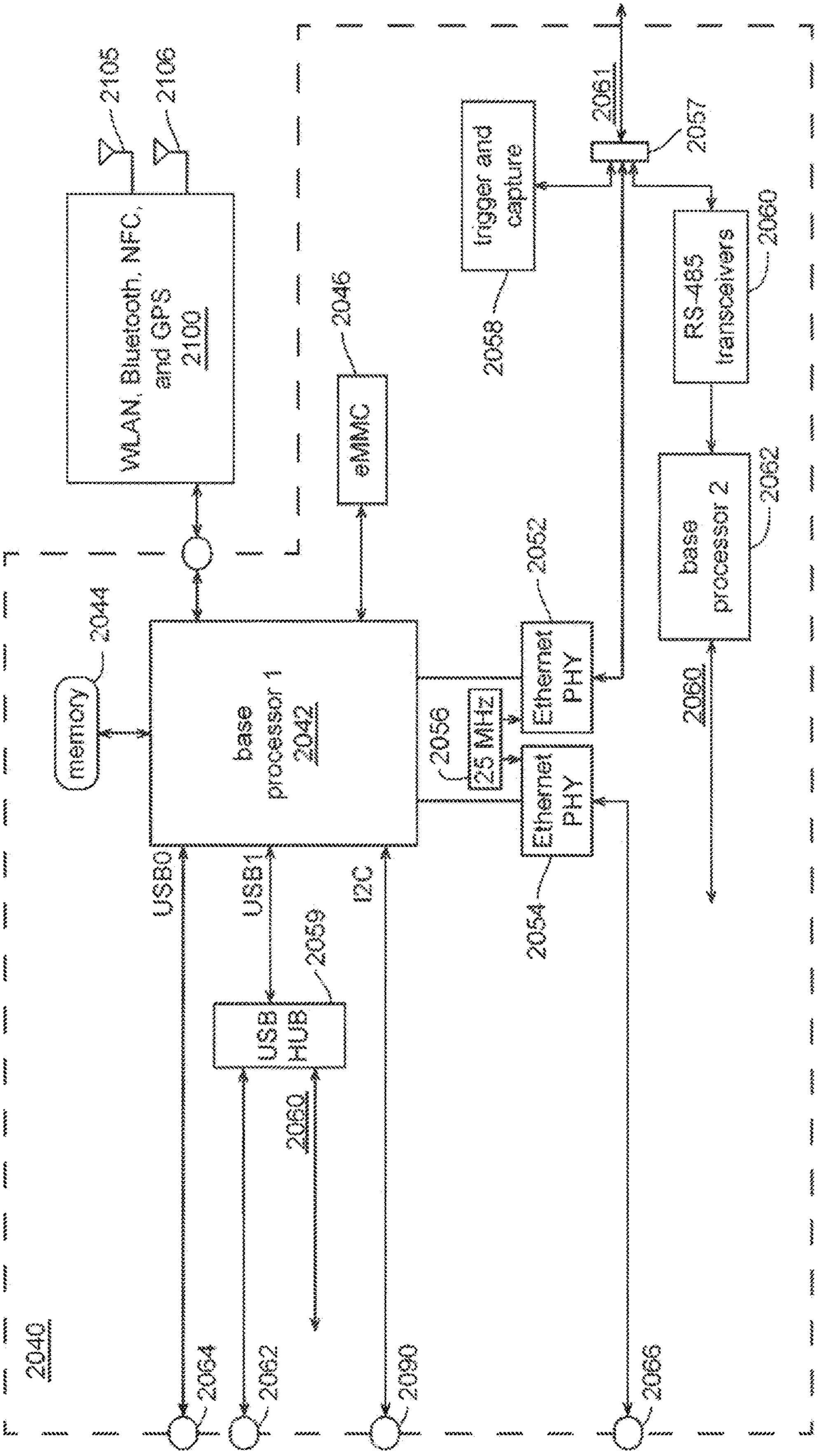
Figure 2D:
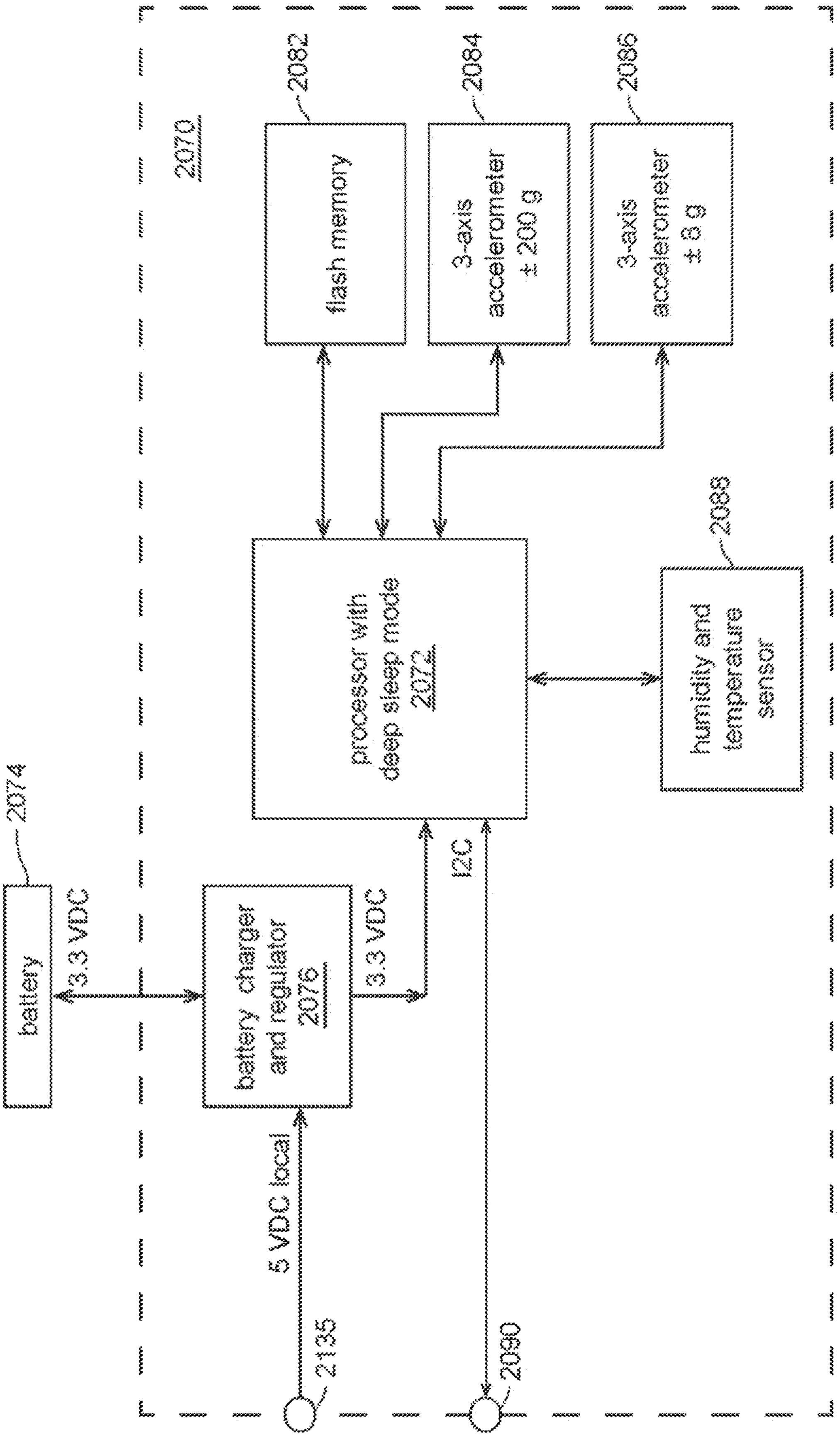

A block diagram of the environmental sensor and recorder 2070 is shown in FIG. 2D. If the voltage on the line 2022 is zero, then the 5 VDC local voltage is not present at the point 2135 in the environmental sensor and recorder 2070. In this case, a battery 2074 provides a 3.3 VDC signal to the components of the environmental sensor and recorder 2070. The 3.3 VDC signal passes through a battery charger and regulator 2076 to provide the 3.3 VDC signal to a processor with deep-sleep mode 2072. The processor 2072 receives readings from a humidity-and-temperature sensor 2088, a three-axis accelerometer 2084 that measures to ±200 g, and a three-axis accelerometer 2086 that measures to ±8 g. In operation, the processor stores readings every 15 minutes on a flash memory 2082. In an embodiment, the processor also saves on the flash memory 2082 large acceleration events observed by the three-axis accelerometers 2084, 2086. If the 5 VDC local voltage is present at the point 2135, then the battery charger 2076 uses the 5 VDC local voltage to charge the battery 2074.

Figure 6A:
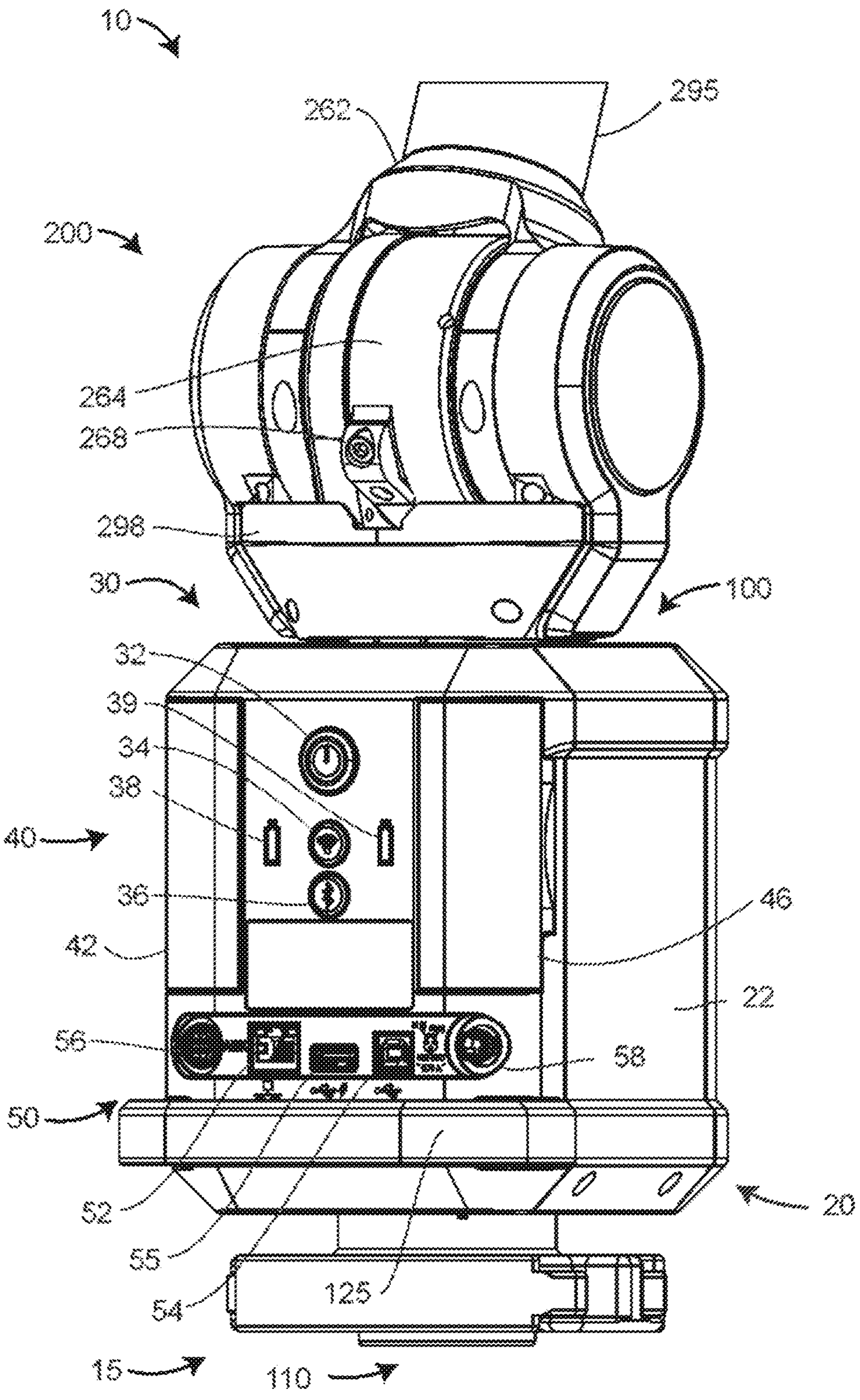
FIG. 6A is an isometric view describing some elements in a lower portion of the AACMM according to an embodiment.

FIG. 2C is a block diagram of the base processor electronics 2040, which includes a first base processor 2042 and a second base processor 2062. In an embodiment, the second base processor 2062 is a real-time processor. In an embodiment, the processor with deep sleep mode 2072 (FIG. 2C) communicates with the first base processor 2042 over an Inter-Integrated Circuit (I2C) bus through the point 2090. In an embodiment, whenever electrical power is being provided to the AACMM 10 by the modular power supply 2005 rather than a battery pack, the first base processor 2042 provides a 5 VDC, 2.5 Amp signal through a Universal Serial Bus (USB) external device port 2064 for use by any external device. This voltage is provided to a USB charging port 55 shown in FIG. 6A. A user attaches any compatible device to obtain power from the USB charging port 55 (FIG. 6A). Currently USB standards are ratified by a USB Implementers Forum (USB-IF).

In an embodiment, the first base processor 2042 exchanges data through a point with external USB host devices, such as external computing devices, over a USB data transfer port 54 shown in FIG. 6A. In an embodiment, electrical signals pass to and from the USB host device through a point 2062 to a USB hub 2059 and on to the first base processor 2042.

In an embodiment, an Ethernet signal is provided over an Ethernet port 52 as shown in FIG. 6A. Ethernet is a computer networking technology based on IEEE 802.3 standards. The Ethernet signal arrives at a point 2066 in FIG. 2C, travels to an Ethernet PHY 2054, which is clocked at 25 MHz, before arriving at the first base processor 2042. The Ethernet PHY 2054 provides analog signals physical access to a link layer.

A second Ethernet path enables bidirectional communication with electrical components internal to the AACMM 10. The second Ethernet path, which includes an Ethernet PHY 2052, passes through a connector 2057 to join a collection of busses 2061. In an embodiment, the Ethernet is gigabit Ethernet, which means that data is transferred at a rate of one gigabit per second. In an embodiment, the second Ethernet path mainly transfers data obtained by AACMM accessory devices such as laser line scanner or laser line probes (LLPs).

Figure 22C:
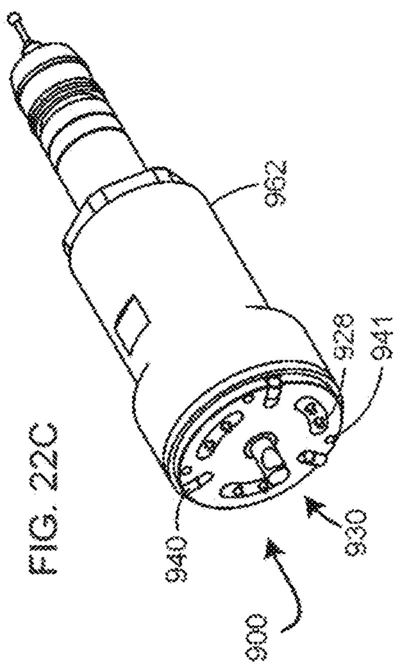
FIGS. 22A, 22B, 22C, 22D, and FIG. 22E are front, bottom, isometric, section, and exploded views, respectively, of a touch-trigger probe assembly according to an embodiment.
Figure 22D:
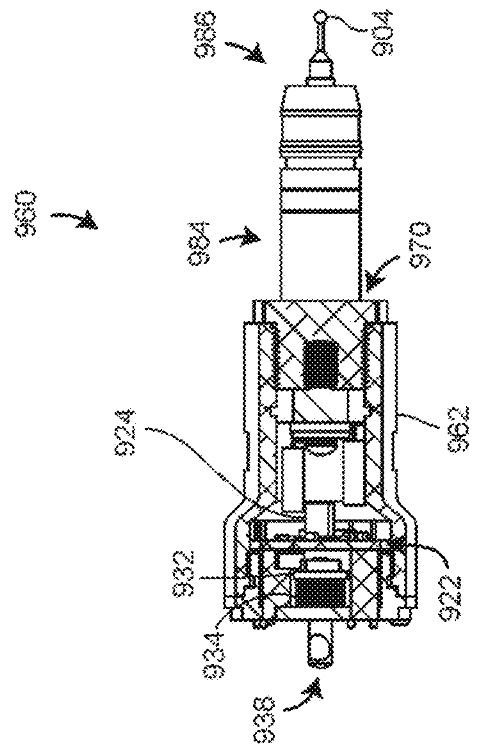
Figure 22A:
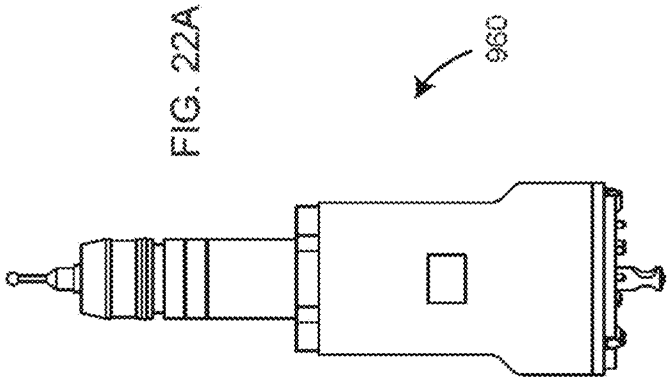
Figure 22B:
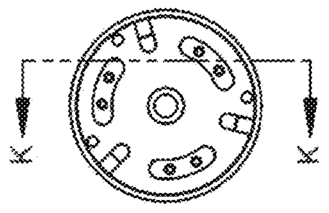

In an embodiment, electrical signals obtained from a tactile-probe assembly (e.g. probe 900) pass through an RS-485 transceiver 2060 before arriving at the second base processor 2062. Examples of a tactile-probe assembly are a hard-probe assembly 900 shown in FIGS. 1A, 1B and a touch-trigger probe assembly 960 in FIG. 22A. When directed by an operator, a hard-probe assembly 900 returns encoder readings to the base processor electronics 2040 at regular intervals set by a capture signal sent from the base processor electronics 2040. At each capture interval, angular readings are returned to the base processor electronics 2040, thereby enabling calculation of a position of a probe tip 904 (FIG. 19A) on the probe assembly 900. In contrast, a touch-trigger probe assembly 960 (FIG. 22A) triggers a reading when a designated force is applied to the probe tip 904. Hence angular readings are taken in response to the trigger signal sent from the touch-trigger probe assembly 960. A signaling unit 2058 broadcasts capture signals and receives trigger signals. In an embodiment, the capture signals and trigger signals travel along a first bus 2182, shown in FIGS. 2, 4A, 4B. The second base processor 2062 communicates with the first base processor 2042 through a USB slave line 2060 that passes through the USB hub 2058 coupled to the first base processor 2042.

In an embodiment, the first base processor 2042 further connects to an embedded Multi-Media Controller (eMMC) 2046, which includes both flash memory and a flash memory controller integrated on the same silicon die. In an embodiment, the first base processor 2042 further connects to a memory 2044, which in an embodiment is a double data rate type-three synchronous dynamic random-access memory (DDR3 SDRAM).

In an embodiment, the base processor electronics 2040 further interfaces with a board 2100 having accessory communication and sensor devices. In an embodiment, the board 2100 includes a wireless local area network (WLAN). In an embodiment, the WLAN is an IEEE 802.11 Wi-Fi network enabled by pressing a Wi-Fi button 34 shown in FIG. 6A. Wi-Fi enables wireless communication between the AACMM 10 and an external device such as a stationary or mobile computing device/unit.

In an embodiment, the board 2100 further includes a Bluetooth™ Low Energy (BLE) device capable of wirelessly exchanging data with external devices such as computing devices. BLE is a wireless personal area network technology designed and marketed by the Bluetooth Special Interest Group. The BLE device is enabled by pressing a Bluetooth™ button 36 shown in FIG. 6A. In an embodiment, the on-off button 32, the Wi-Fi button 34, and the Bluetooth™ button 36 are all part of a larger membrane switch and user interface (IF).

In an embodiment, the board 2100 further includes near-field communication (NFC) hardware. In an embodiment, the NFC hardware includes a dual-interface memory/tag device that communicates with an external NFC reader and a wired port that communicates with the first base processor 2042. In another embodiment, the NFC hardware includes a single-port NFC tag that communicates with an external NFC reader but does not include a wired port for communicating with the first base processor 2042. The single-port NFC tag stores and transmit device data such as serial number, configuration, revision data, or encoder identification data. Descriptions of NFC use in AACMMs are given in commonly owned United States Published Patent Applications 2015/0330761, 2015/0330762, 2015/0330763, 2015/0330764, 2015/0330765, 2015/0330766, the contents all of which are incorporated by reference herein.

In an embodiment, the board 2100 further includes a global positioning system (GPS) receiver. In an embodiment, the GPS receiver is used to track the location of the AACMM 10, for example, to determine the location of the AACMM 10 when leased. In another embodiment, the GPS receiver is used to synchronize multiple instruments, which includes AACMMs, laser trackers, scanners, or other devices. Descriptions of GPS used with AACMMs are given in United States Published Patent Application 2015/0355310, the contents of which is incorporated by reference herein. In an embodiment, WLAN, Bluetooth™, NFC, and GPS are used in conjunction with antennas, which includes antennas 2105, 2106.

In an embodiment, the rear connector interface includes a USB host 54, a USB device (powered) 55, an Ethernet port 52 and an auxiliary port 56. The auxiliary port 56 allows for a direct RS485/422 connection and 24V isolated power to external encoders or other devices. This includes direct power and communication to devices such as a rotary table.

Figure 3:
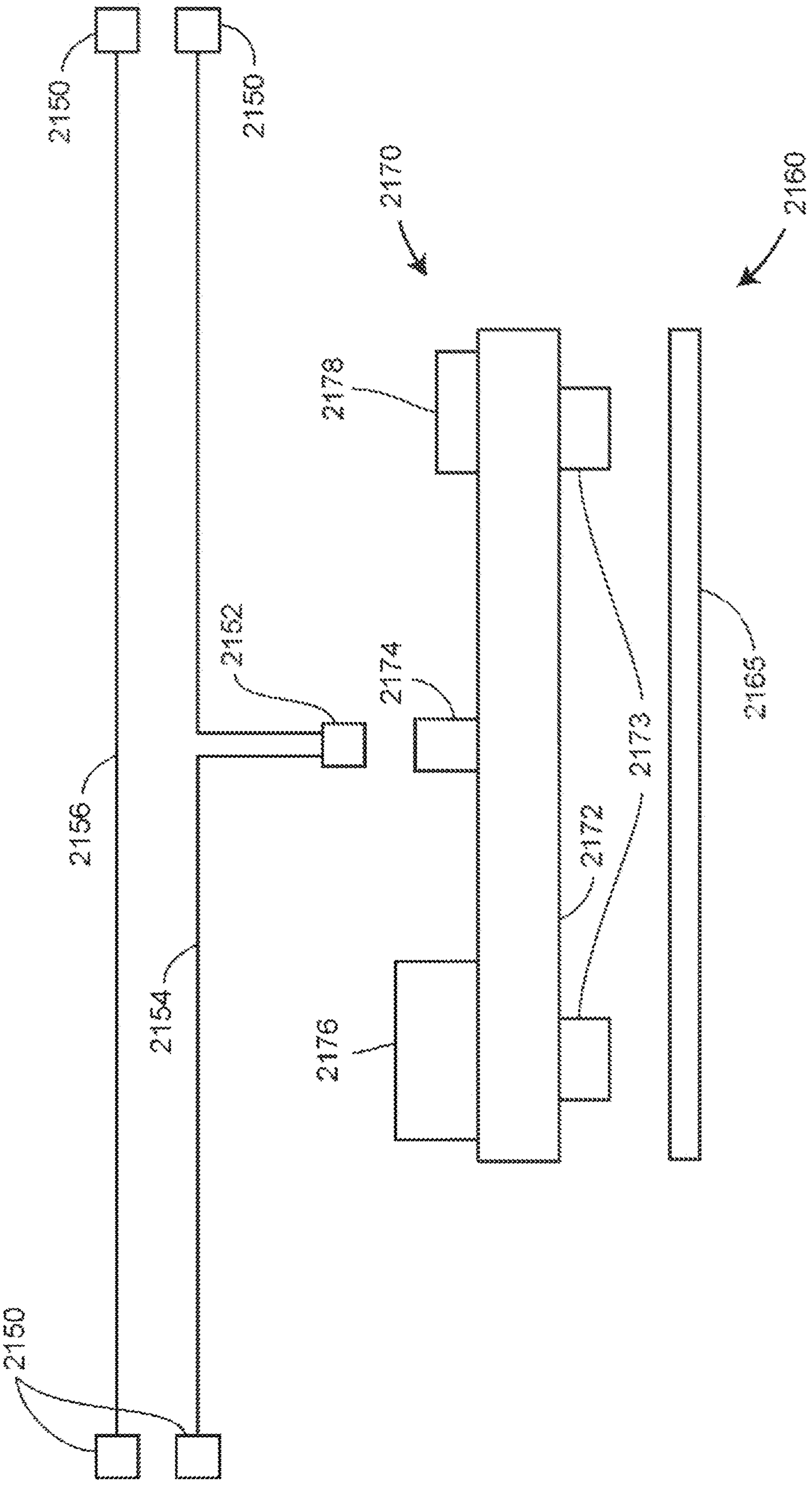
FIG. 3 is a block diagram of bus cables and their relation to encoder components according to an embodiment.

In an embodiment illustrated in FIG. 3, angles of rotation of the axis assemblies 100, 200, 300, 400, 500, 600, 700 of the AACMM 10 are measured with angular transducers. In an embodiment, the angular transducers are angular encoders 2160, elements of which are illustrated schematically in FIG. 3. In an embodiment, an angular encoder 2160 includes an encoder disk 2165 and encoder electronics 2170. In an embodiment, encoder electronics 2170 includes an encoder printed circuit board (PCB) 2172, one or more read heads 2173, processor and support electronics 2176, temperature sensor connector 2178, and board connector 2174. In an embodiment, the encoder disk 2165 includes a collection of radially directed lines, the positions of which are sensed by the one or more read heads 2173 and the sensed positions processed with processor and support electronics 2176, to determine an angle of rotation of the encoder disk 2165 in relation to the read heads 2173. In an embodiment, each board connector 2174 is attached to a T-connector 2152 of a T-cable 2154 within the first bus 2182 (FIG. 2). Each encoder PCB 2172 connects to a corresponding T-cable 2154 of the first bus 2182. Cable connectors 2150 on each end of the T-cable 2154 attach to cable connectors 2154 on adjacent T-cables 2154 in the AACMM 10. In this way, angle information is transferred from each angular encoder 2160 through the first bus 2182 (FIG. 2A) to the main processor electronics 2040 for further processing. The transmitted angles are synchronized to the capture signal, which in an embodiment has a rate of around one kilohertz. By connecting a single T-connector 2152 to a corresponding single board connector 2174, the angular encoders 2160 continue to send their angle readings to the base processor electronics 2040 even if one or more of the encoder electronics 2170 are disconnected from the first bus 2182. In an embodiment, cable connectors 2150 are provided on each end of an interconnect cable 2156 of the second bus 2184 (FIG. 2A). Cable connectors 2150 of adjacent interconnect cables 2156 are connected together to provide a continuous electrical path for the second bus 2184.

Figure 4A:
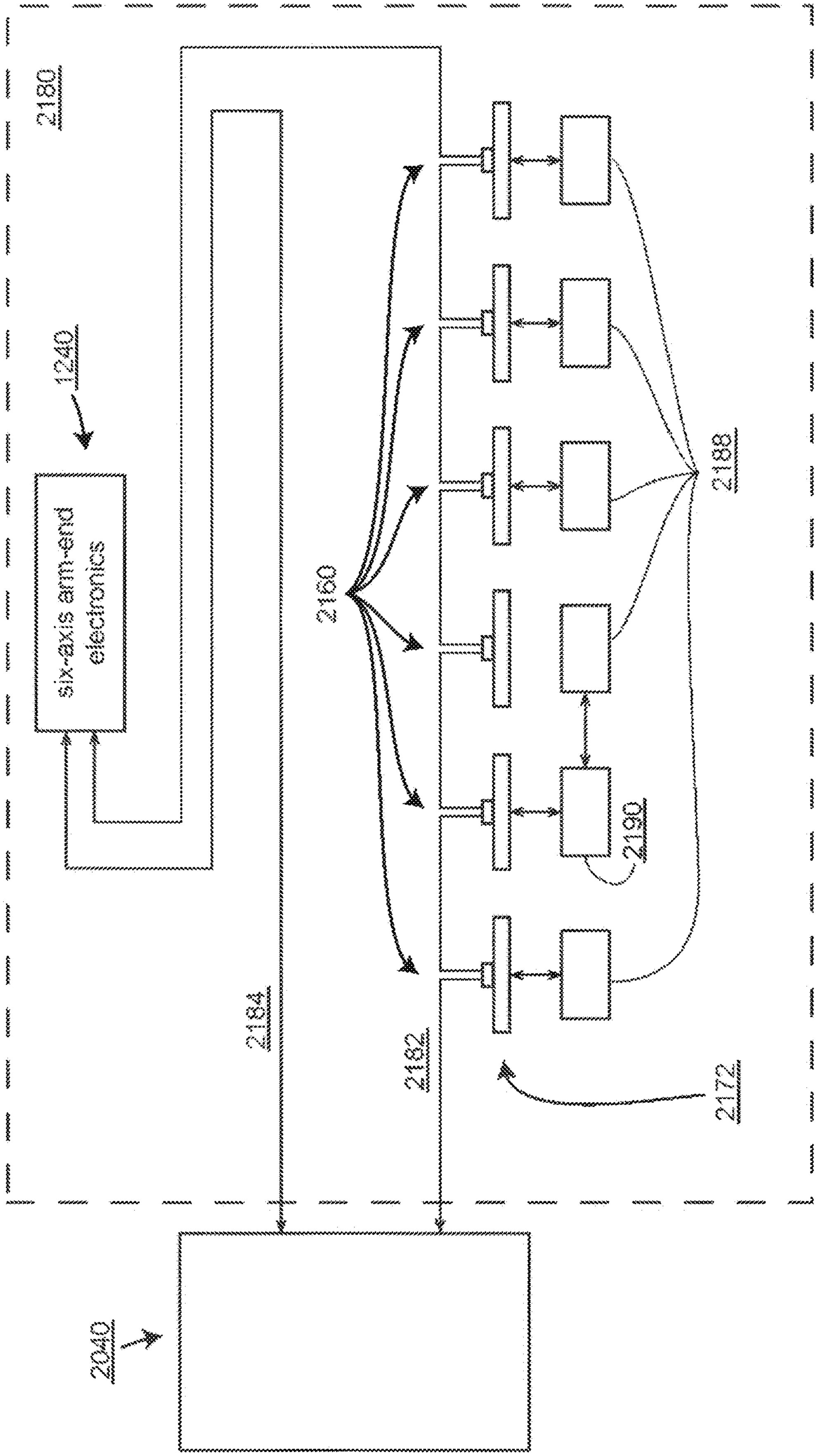
FIGS. 4A, 4B are block diagrams of interconnecting elements in six-axis electronics and seven-axis electronics according to an embodiment.

FIG. 4A shows electrical elements 2180 in a six-axis AACMM. The electrical elements 2180 include six angular encoders 2160 attached by the first bus 2182 to the base processor electronics 2040 on one end, and to six-axis arm-end electronics 1240 on the other end. In an embodiment, one or more of the encoder PCBs 2172 are attached to an expandable temperature sensor 2190. When an expandable temperature sensor 2190 is attached to the temperature sensor connector 2178 (FIG. 3), a further temperature sensor 2188 is attached to the expandable temperature sensor 2190. In an embodiment, some temperature sensors 2188 are not expandable. In an embodiment, at least one temperature sensor, either 2188 or 2190, is placed in the vicinity of each angular encoder to provide for the compensating of angular readings to account for thermal expansion. In an embodiment, further temperature sensors, either 2188 or 2190, are placed in the vicinity of the first segment 295 (FIG. 1A) and the second segment 595 (FIG. 1A) to allow for the compensation of the segment lengths to account for thermal expansion of the segments. In an embodiment, the compensated segment lengths are used by the base processor electronics 2040 or by associated computing devices to more accurately determine 3D coordinates measured by the AACMM 10. In an embodiment, a second bus 2184 electrically attaches base processor electronics 2040 to six-axis arm-end electronics 1240.

Figure 4B:
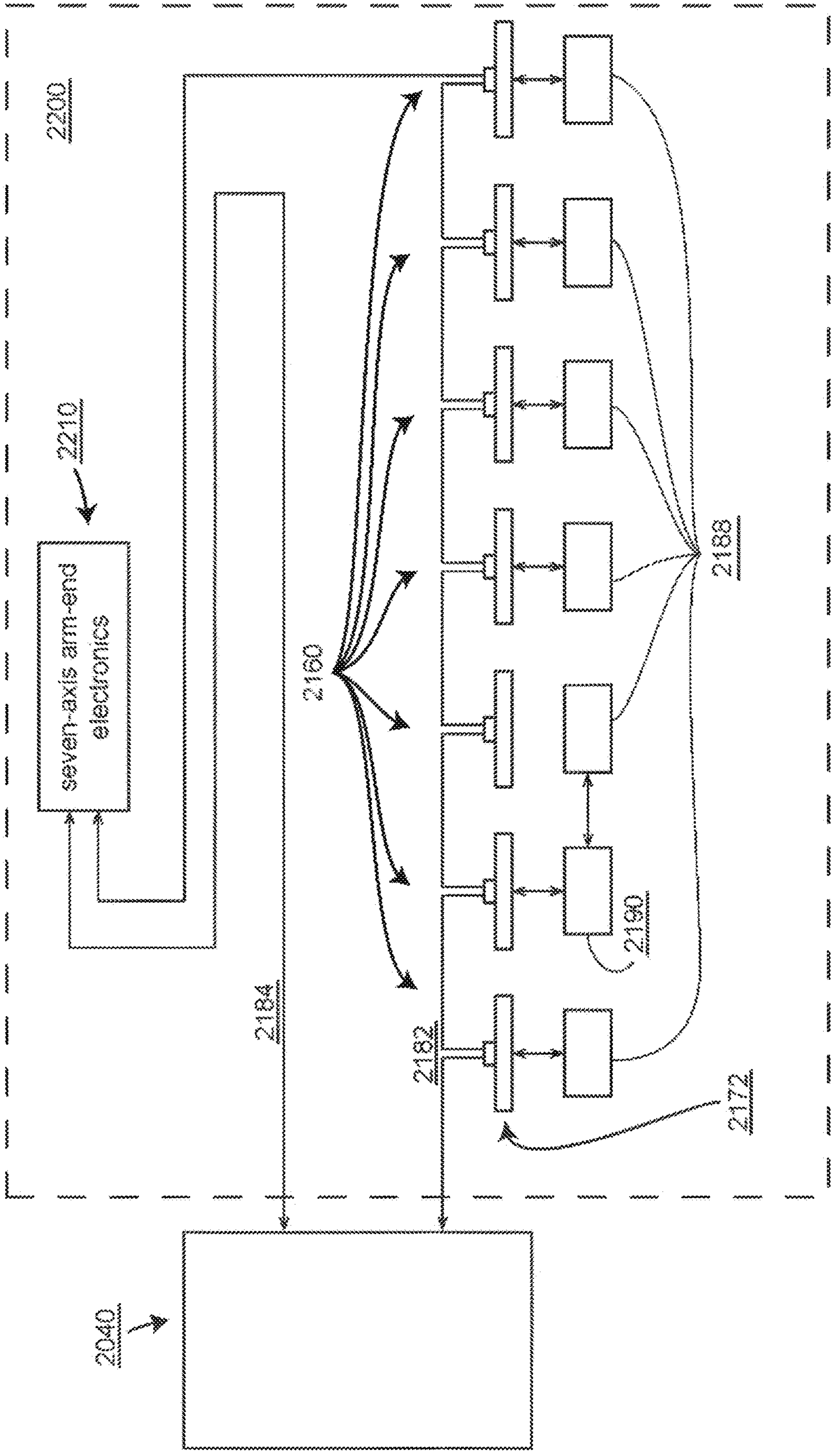

FIG. 4B shows electrical elements 2200 in a seven-axis AACMM. The electrical elements 2200 include seven angular encoders 2160 attached by the first bus 2182 to the base processor electronics 2040 on one end and to seven-axis arm-end electronics 2210 on the other end. In an embodiment, one or more of the encoder PCBs 2172 are attached to an expandable temperature sensor 2190. When an expandable temperature sensor 2190 is attached to the temperature sensor connector 2178, a further temperature sensor 2188 is attached to the expandable temperature sensor 2190. In an embodiment, some temperature sensors 2188 are not expandable. In an embodiment, at least one temperature sensor, either 2188 or 2190, is placed in a vicinity of the angular encoders to allow for the compensation of angular readings to account for thermal expansion. In an embodiment, further temperature sensors, either 2188 or 2190, are placed in the vicinity of the first segment 295 (FIG. 1A) and the second segment 595 (FIG. 1A) to allow for the compensation of the segment lengths to account for thermal expansion of the segments. In an embodiment, the compensated segment lengths are used by the base processor electronics 2040 or by associated computing devices to more accurately determine 3D coordinates measured by the AACMM 10. In an embodiment, a second bus 2184 electrically attaches base processor electronics 2040 to seven-axis arm-end electronics 2210.

Figure 5:
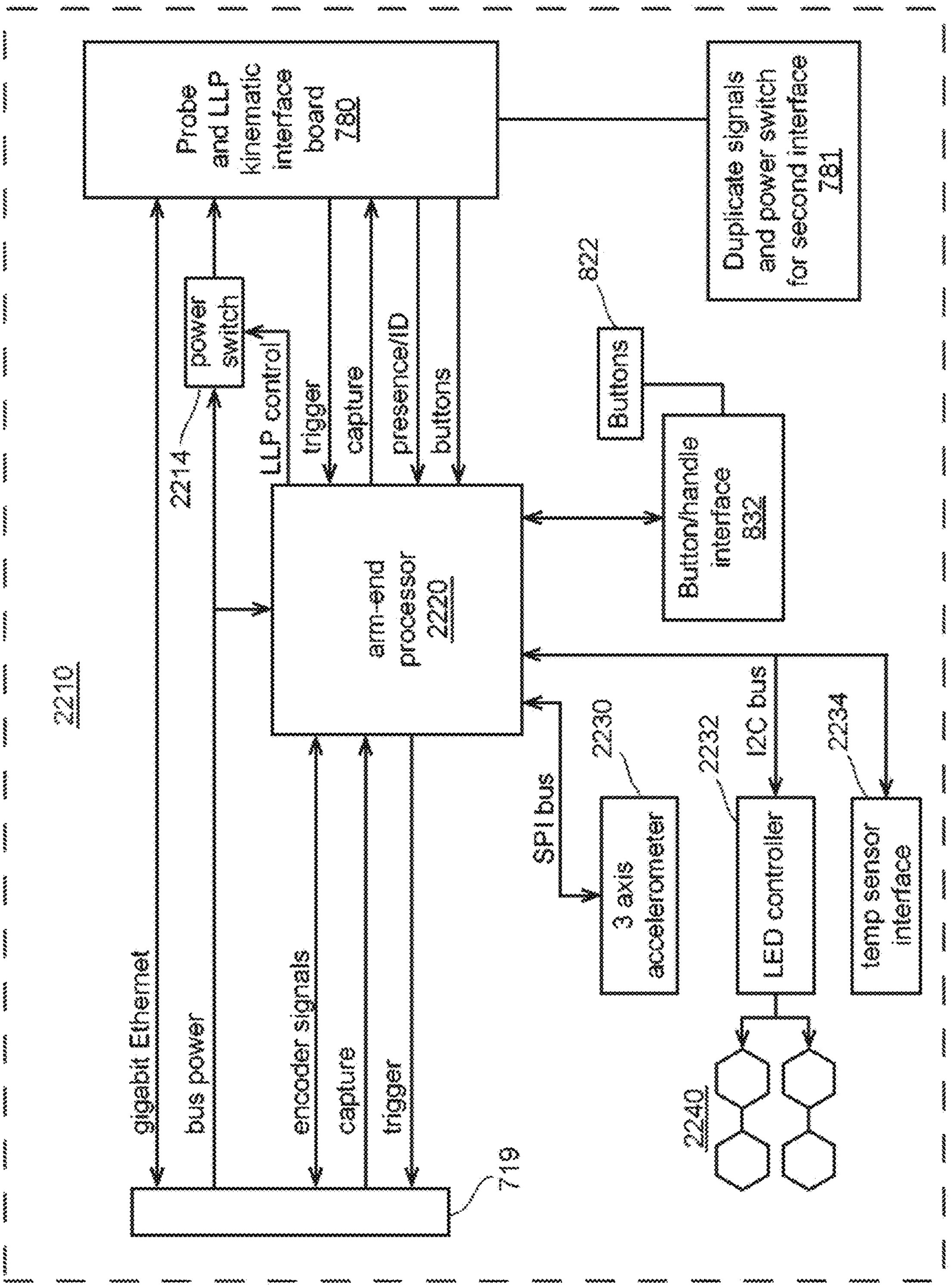
FIG. 5 is a block diagram of seven-axis arm-end electronics according to an embodiment.

FIG. 5 is a block diagram of elements of the seven-axis arm-end electronics 2210. Bus connectors 719, also shown in FIG. 19F, include two electrical connectors that attach to cable connectors 2150 (FIG. 3) of the first bus 2182 (FIG. 2A) and the second bus 2184 of the sixth-axis assembly 600. An arm-to-handle/button-plate connector 832 in FIG. 5 also connects to a handle-to-arm connector 1022 (FIG. 18D, FIG. 18E) of an interchangeable device such as a handle 1000 as shown in in FIGS. 18A, 18C, 18D, 18E or a button-plate 2400 shown in FIG. 18B, and FIGS. 24A-24F. FIG. 5 includes an accessory interface board 780. The accessory interface board 780 is configured to make electrical contact with removable accessories, such as tactile probes laser-line-scanners/laser-line-probes, as discussed further herein below. The accessory interface board 780 communicates bidirectionally with the arm-end processor 2220 through an I2C bus. When a touch-trigger probe assembly 960 (FIG. 22D) is attached, the accessory interface board 780 further sends trigger signals from the accessory interface board 780 to the arm-end processor 2220.

The button plate interface 832 connects buttons 833 to the arm-end processor 2220. The buttons 822 function as actuators for switches that cause a signal to be transmitted or other control function to be performed.

Figure 23A:
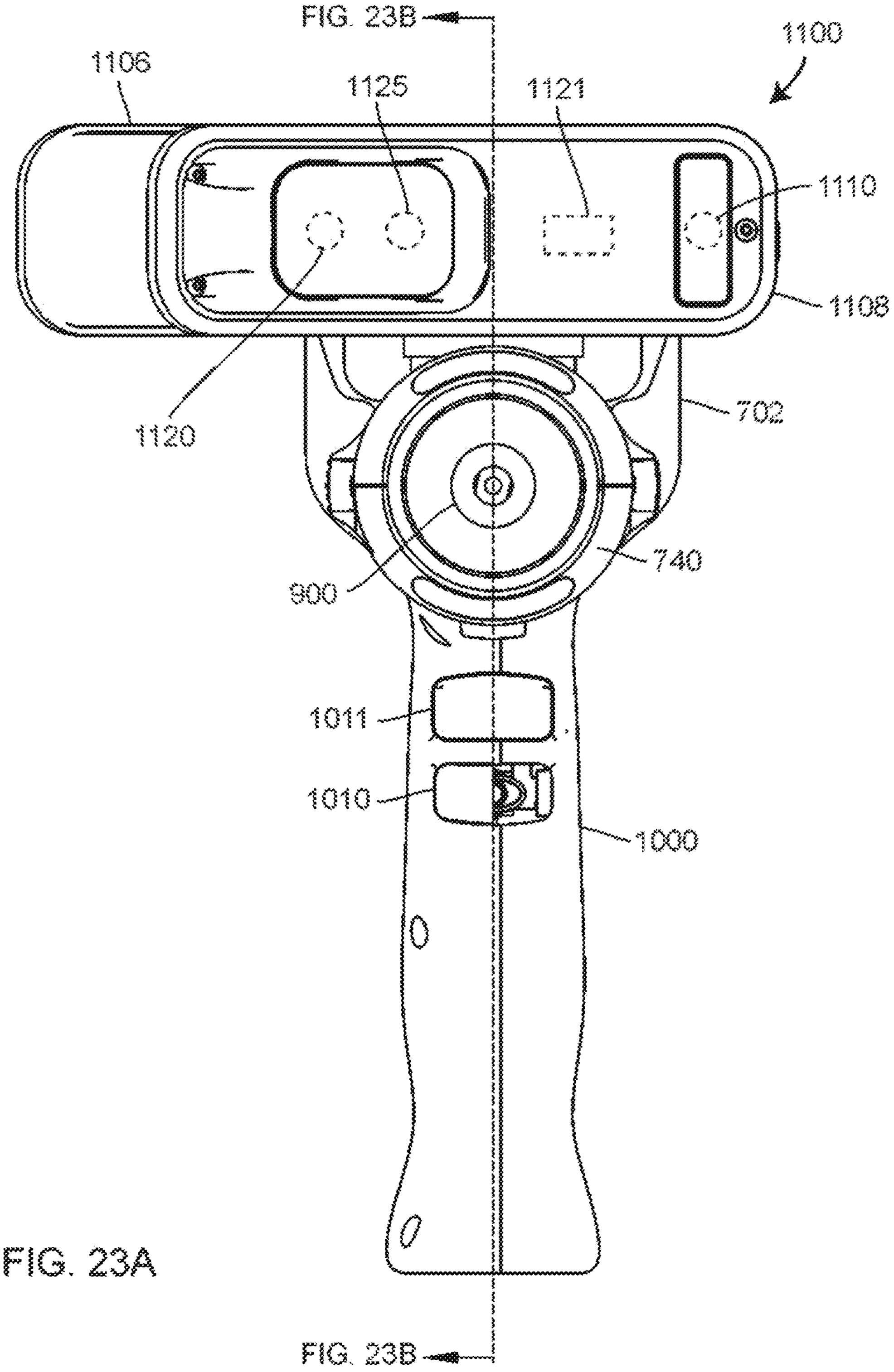
FIG. 23A and FIG. 23B are front and section views, respectively, of a laser line probe coupled to a seventh-axis assembly according to an embodiment.
Figure 23B:
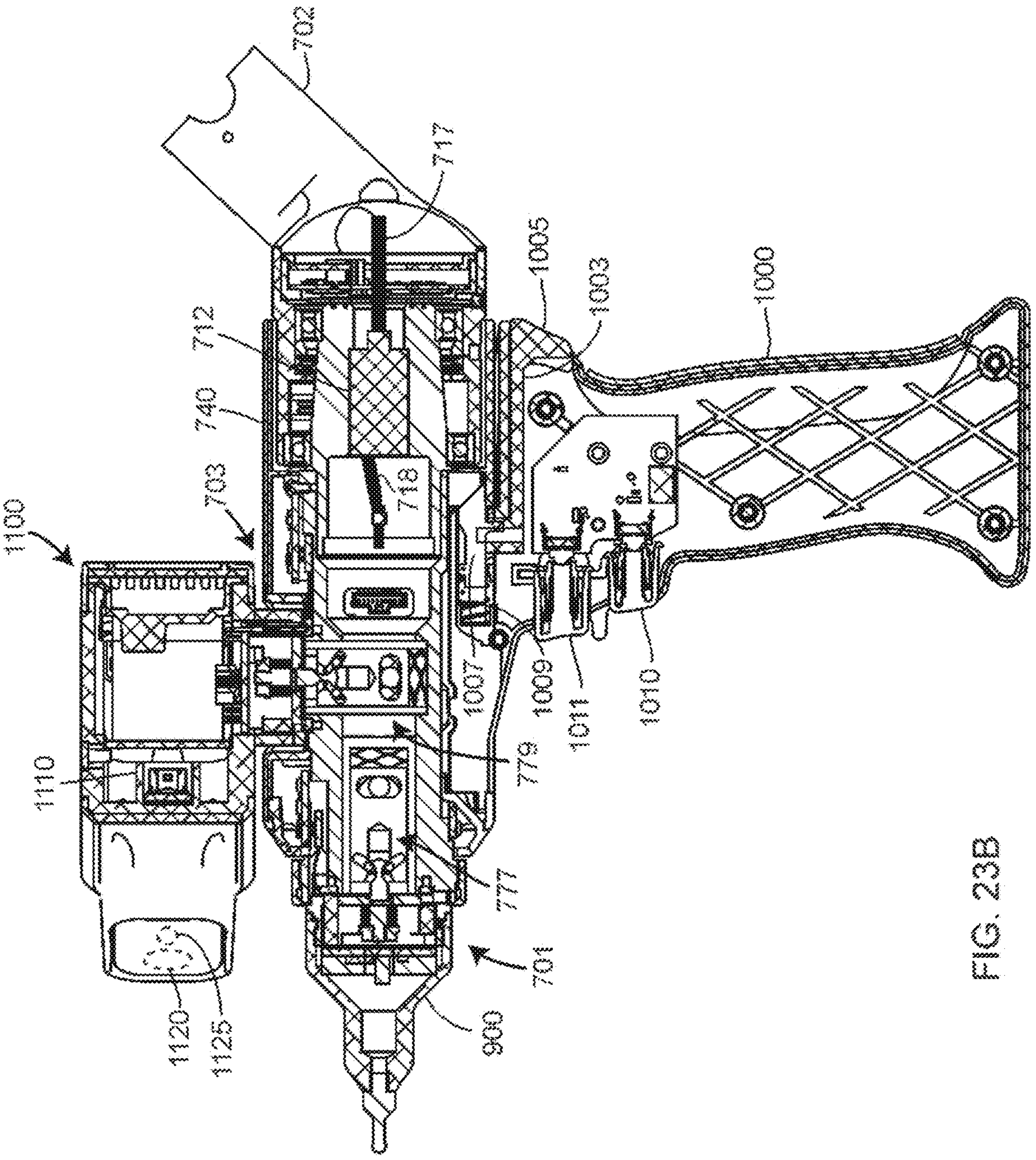
Figure 23C:
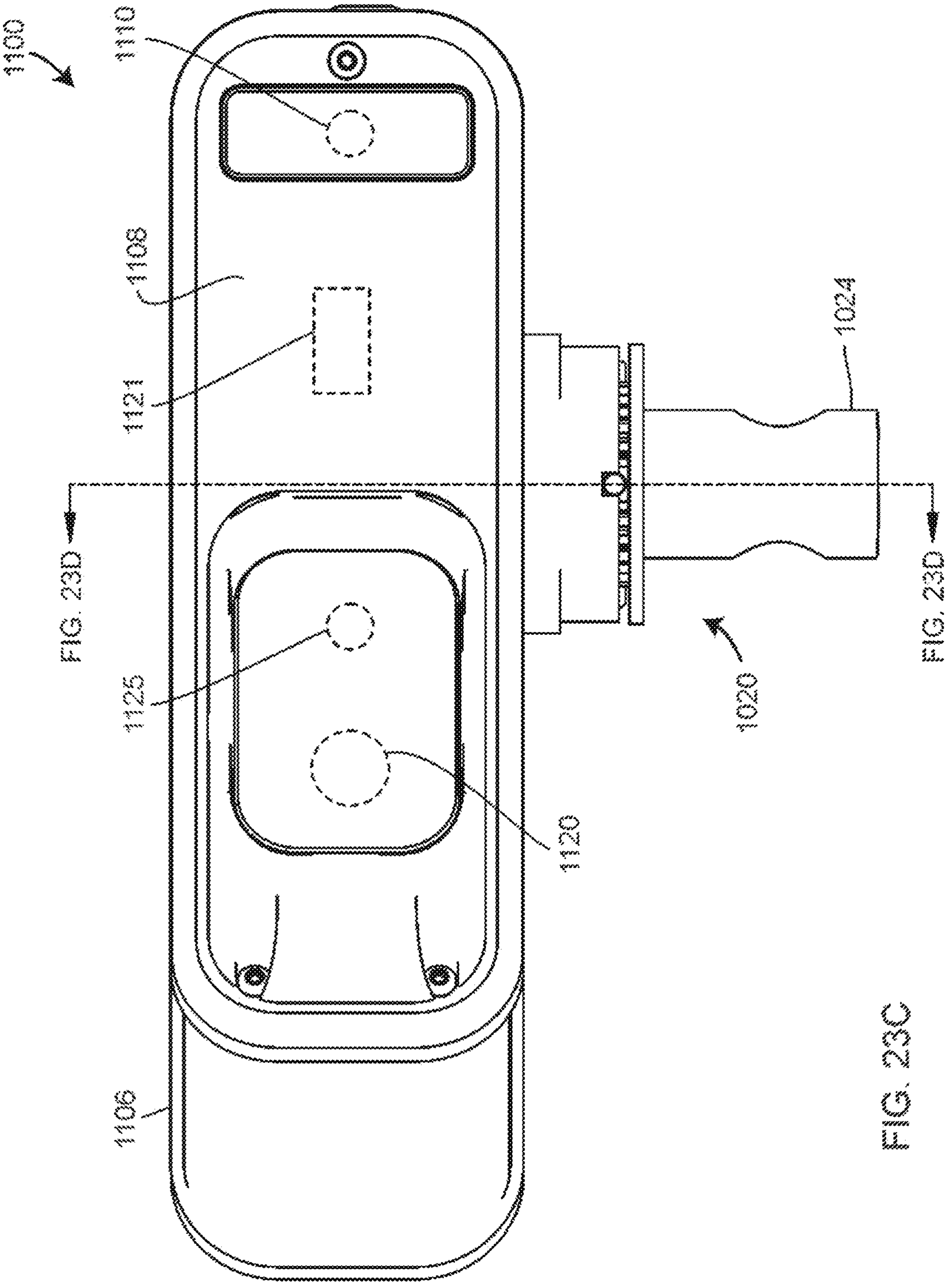
FIG. 23C and FIG. 23D are front and section views, respectively, of a laser line probe according to an embodiment.
Figure 23D:
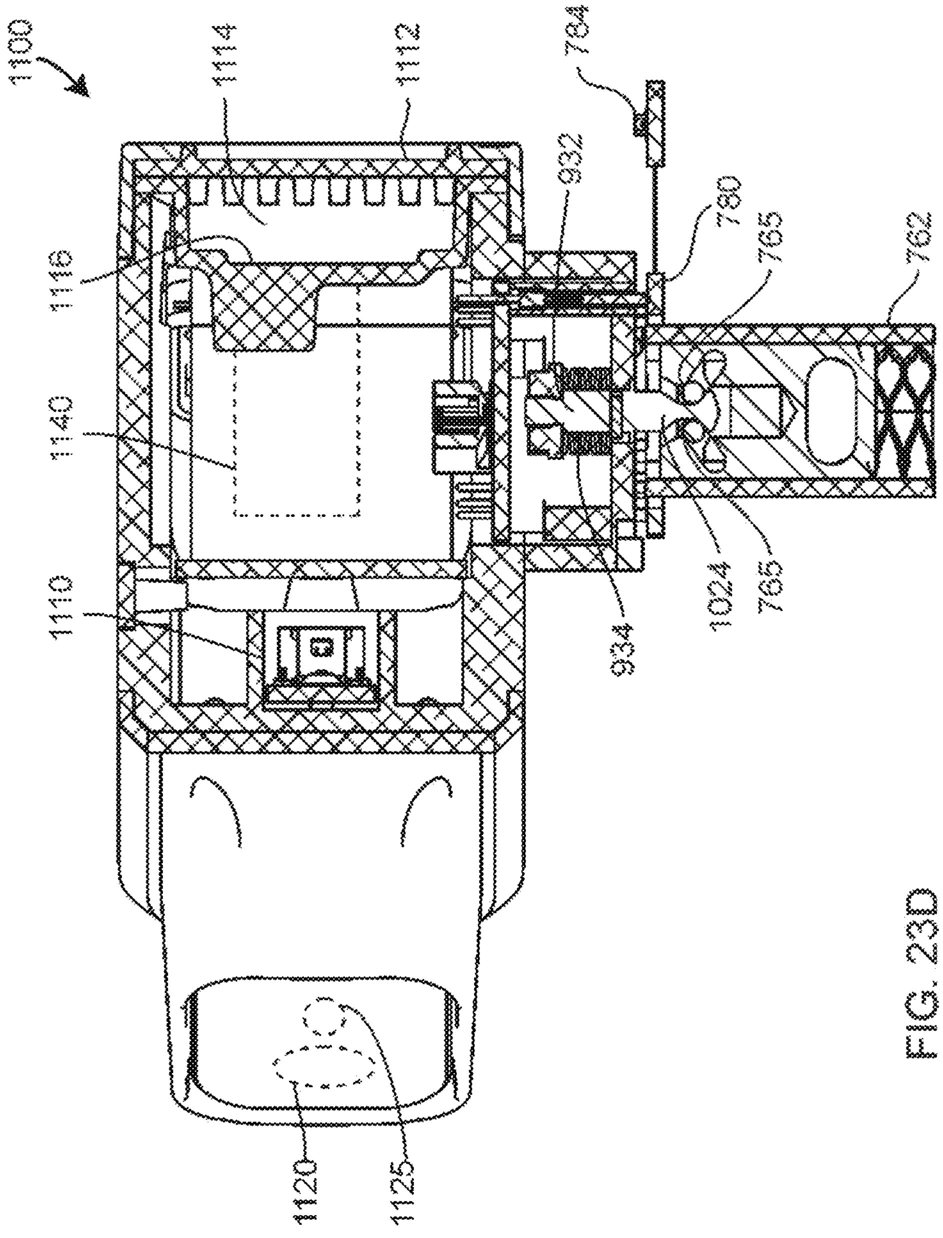
Figure 23F:
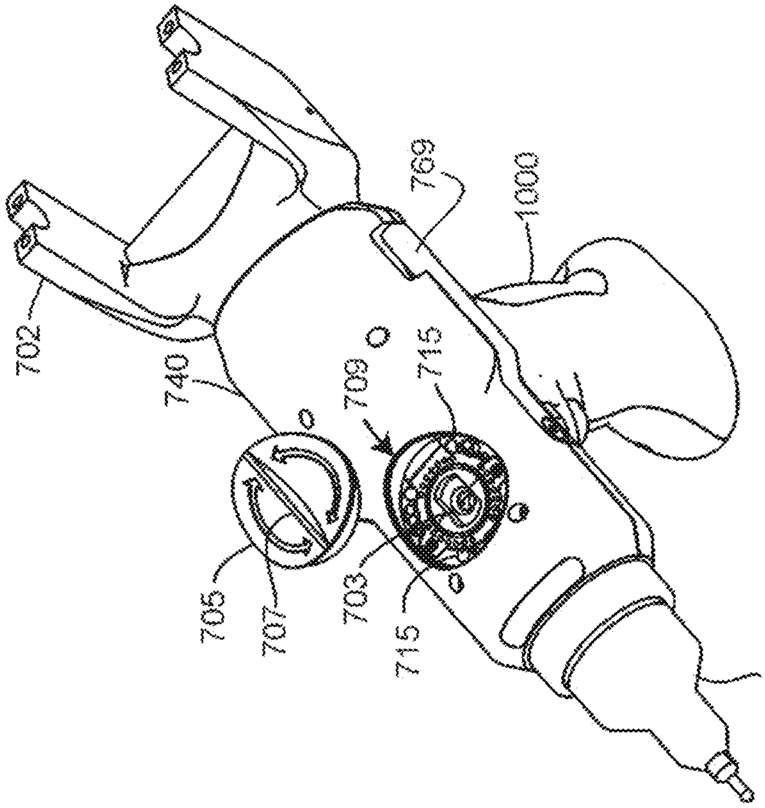
FIGS. 23E, 23F, 23G, and FIG. 23H are various views of the seventh-axis assembly of a seventh-axis assembly with the second accessory interface being coupled or uncoupled, in accordance with an embodiment.
Figure 23E:
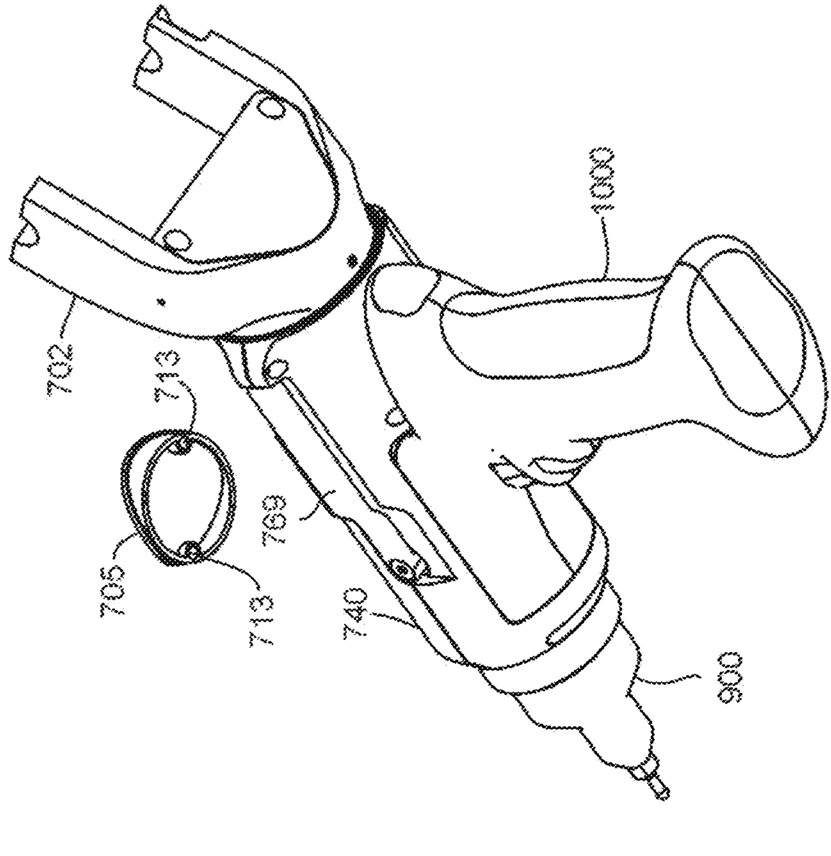
Figure 23G:
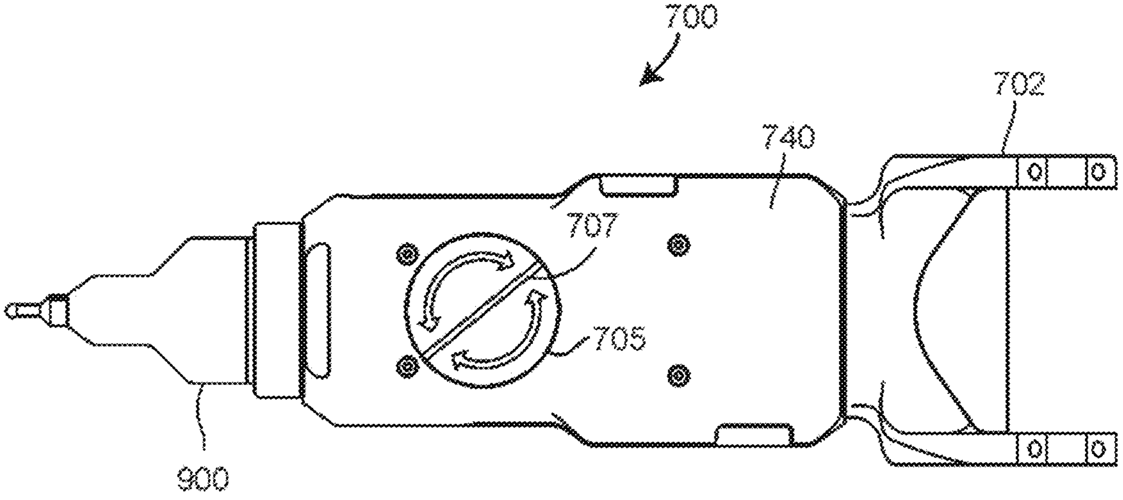
Figure 23H:
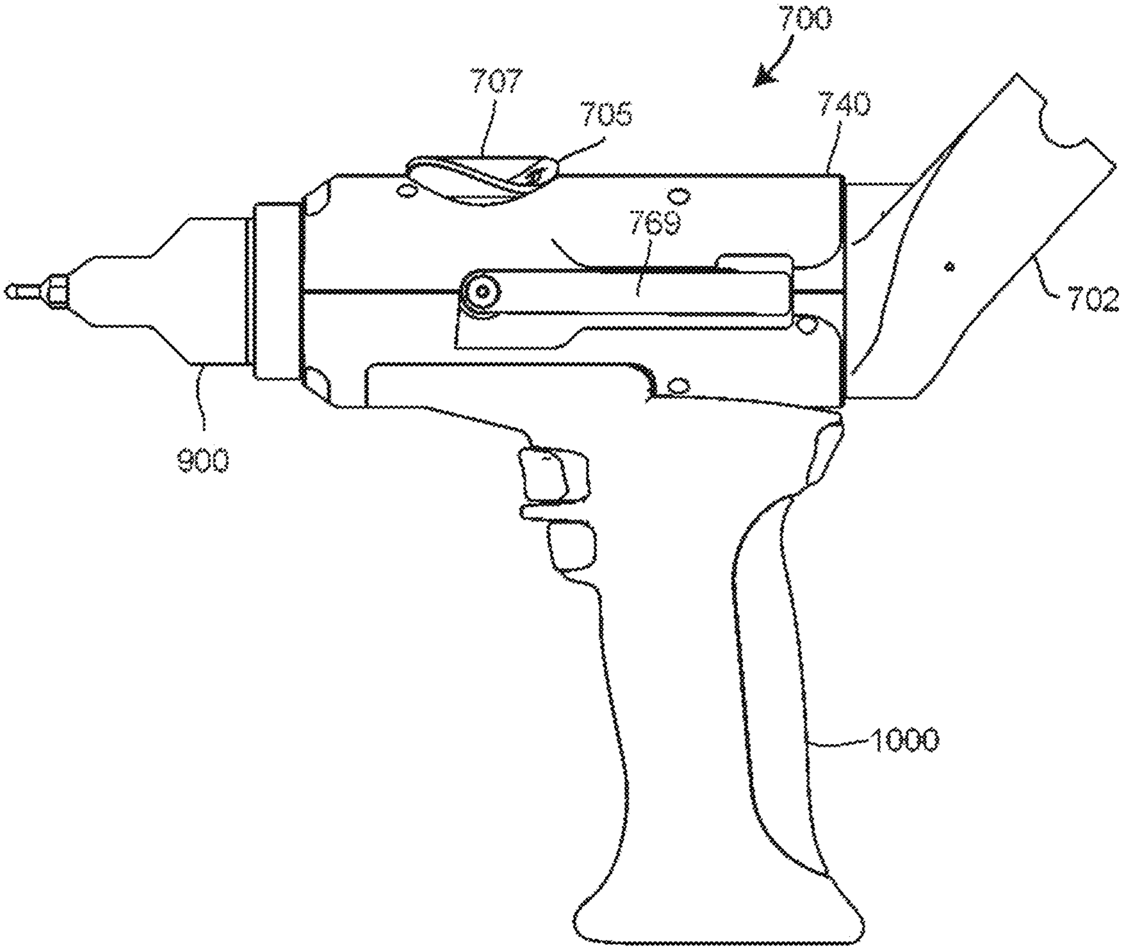
Figure 23I:
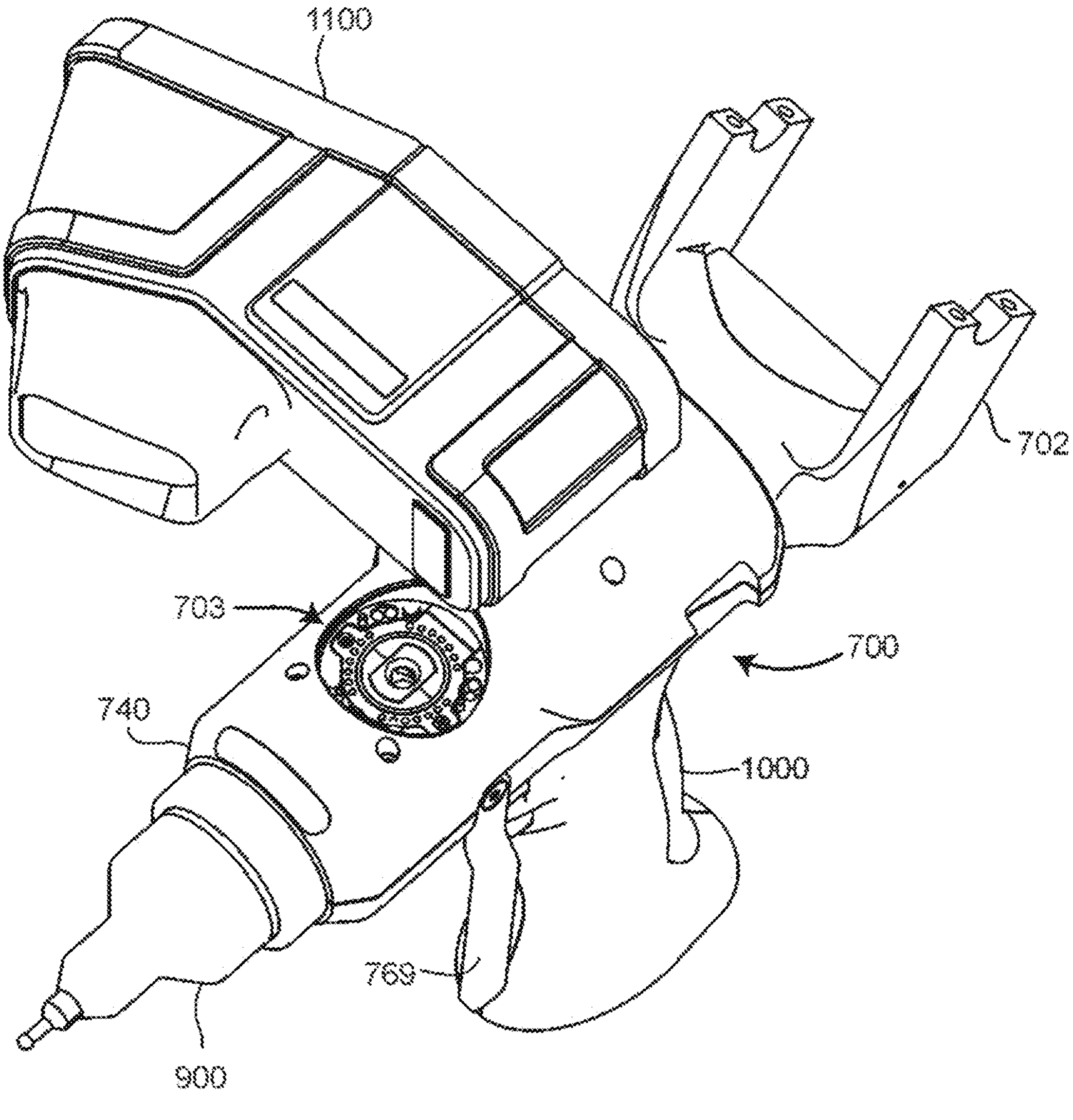
FIG. 23I, 23J, and FIG. 23K are various views of the seventh-axis assembly with the laser line probe being coupled to the second accessory interface in accordance with an embodiment.
Figure 23J:
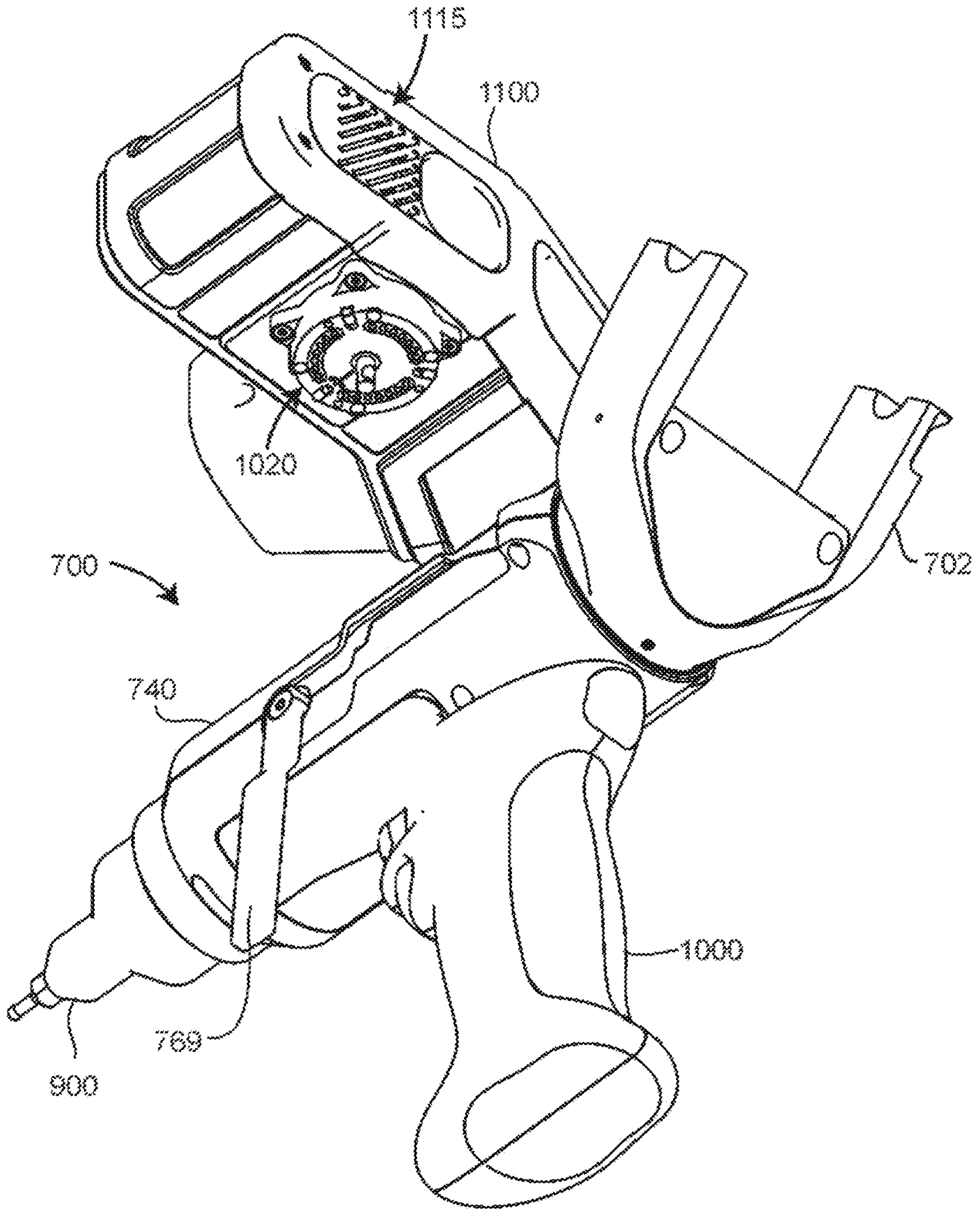
Figure 23K:
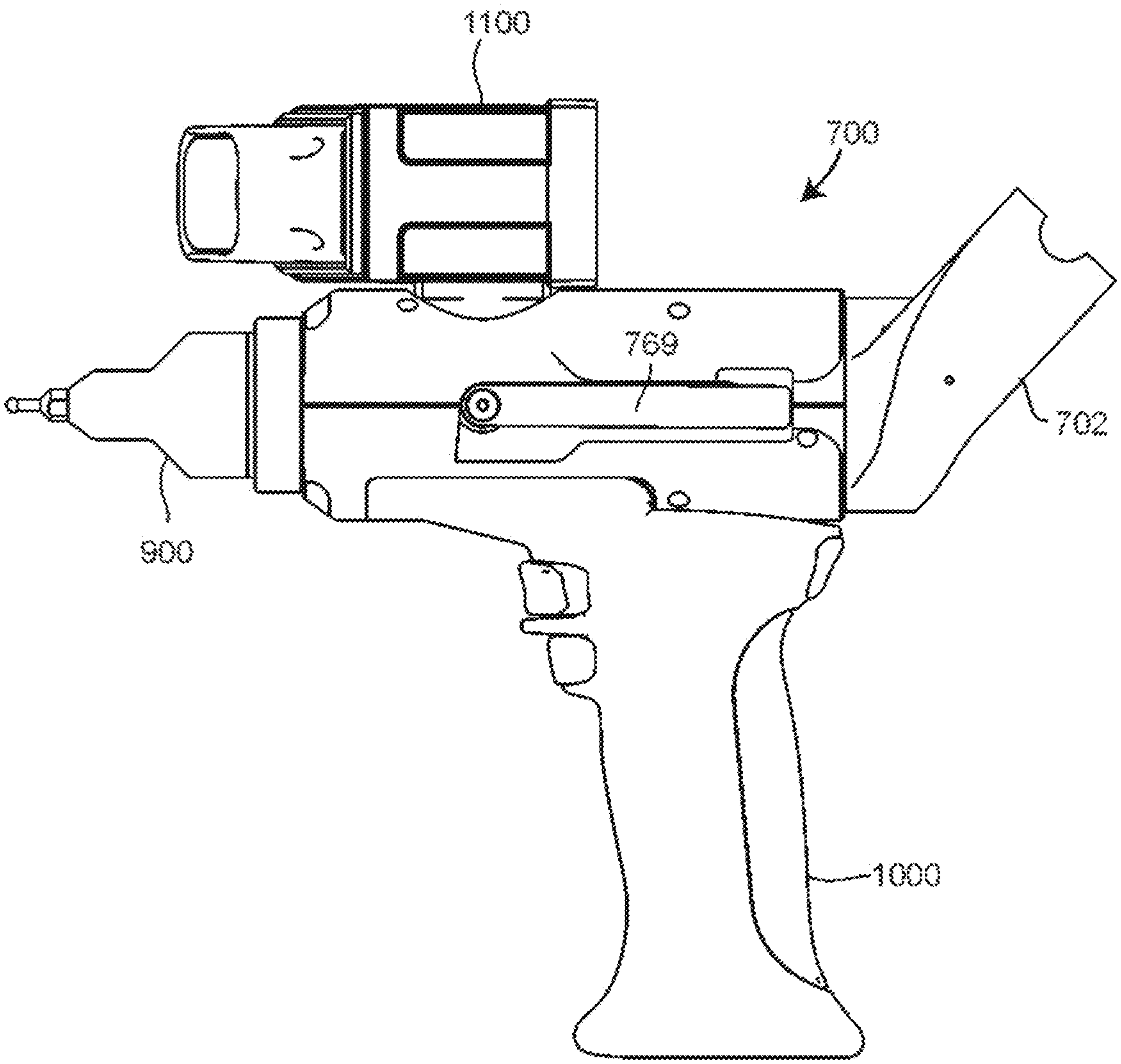

As discussed in more detail herein, the accessory interface board 780 is configured to connect with two separate accessory interfaces on the arm probe end, such as a combination of multiple probes or a probe and laser line probe (FIGS. 23I-23K) for example. It should be appreciated that the combinations of accessories shown in in FIGS. 23I-23K are for example purposes and not intended to be limiting. In other embodiments, other accessories or other combinations of accessories are coupled to the accessory interface board 780, such as but not limited to cameras, area scanners, triangulation scanners, and lights for example. In an embodiment, each of the accessory interfaces have a pinned interface, such as a 21-pin interface for example.

In an embodiment, the accessory interface board 780 includes or cooperate with a switch 781, that provides for duplicating signals and switching power between the two accessory interfaces. In one embodiment, the switch 781 is configured to allow accessories to be used on both accessory interfaces simultaneously. In another embodiment, the accessory interface board 780 only allows power to one of the accessory interfaces at a time.

In an embodiment, the seven-axis arm-end electronics 2210 includes an arm-end processor 2220 as shown in FIG. 5. In an embodiment, the arm-end processor 2220 is electrically connected to a three-axis accelerometer 2230 through a serial peripheral interface (SPI) bus. The three-axis accelerometer 2230 provides a record of severe impacts to the arm end. A record of such impacts provides a clue to an origin of problems observed in service. In an embodiment, the three-axis accelerometer 2230 is included on a seven-axis arm-end board.

In an embodiment, the arm-end processor 2220 is further connected to a light-emitting diode (LED) controller 2232 through an I2C bus. In an embodiment, the LEDs 2240 are red-blue-green (RGB) LEDs that provide any of a plurality of colors within the visible spectrum. The LED controller 2232 provides control signals to the LEDs 2240 to control aspects such as emitted colors and light levels from the LEDs 2240. In an embodiment, the color emitted by the LEDs 2240 is duplicated on the light ring 2110. It should be appreciated that the light ring 2110 provides a technical effect of alerting the operator of a status of the system even if the LED's 2240 are not visible, such as due to the connection of an accessory for example. Information on the status of the system is provided to the LED ring indicators 2110 by a base status board 2111.

In an embodiment, the arm-end processor 2220 also communicates with a temperature sensor interface 2234 over an I2C bus. The temperature sensor interface provides a measured temperature that is used to compensate for thermal expansion of elements/accessories attached to the end of the arm.

The arm-end processor 2220 receives a variety of electrical signals from the bus connectors 719 including bus power signals, encoder signals, capture signals, and trigger signals. The bus connector further provides bus power to the arm-to-handle connector 832 if a power switch 2214 is activated by an LLP 1100 control signal from the arm-end processor 2220. The LLP 1100 control signal is a signal provided by the LLP 1100 or other accessory indicating that it is connected to the AACMM 10 and should receive electrical power from the bus. It should be appreciated that in some embodiments, the power switch 2214 cooperates with, or is integrated with the switch 781 to provide power to an accessory coupled to one of the accessory interfaces. Besides sending bus power to the LLP 1100 or other accessory device, the accessory interface board 780 also transfers high-speed data from accessories such as the LLP 1100 over the second bus 2184 (FIG. 4A, 4B) to the first base processor 2042. In an embodiment, the pressing of an actuator or button results in signals being transmitted the arm-to-handle connector 832 to the arm-end processor 2220 in response to pressing of a handle button 1010, 1011 shown in FIG. 18A or buttons 2401, 2402 shown in FIG. 18B. The capture signals are sent from the arm-end processor 2220 to the arm-to-handle connector 832 to synchronize measured values obtained from accessories such as the LLP 1100 with the angular readings obtained by the angular encoders in the arm-axis assemblies 100, 200, 300, 400, 500, 600, 700. In some cases an accessory sends a trigger signal to the arm-end processor 2220. An accessory device also sends a presence/ID signal indicating its presence and identity in the system.

Figure 6B:
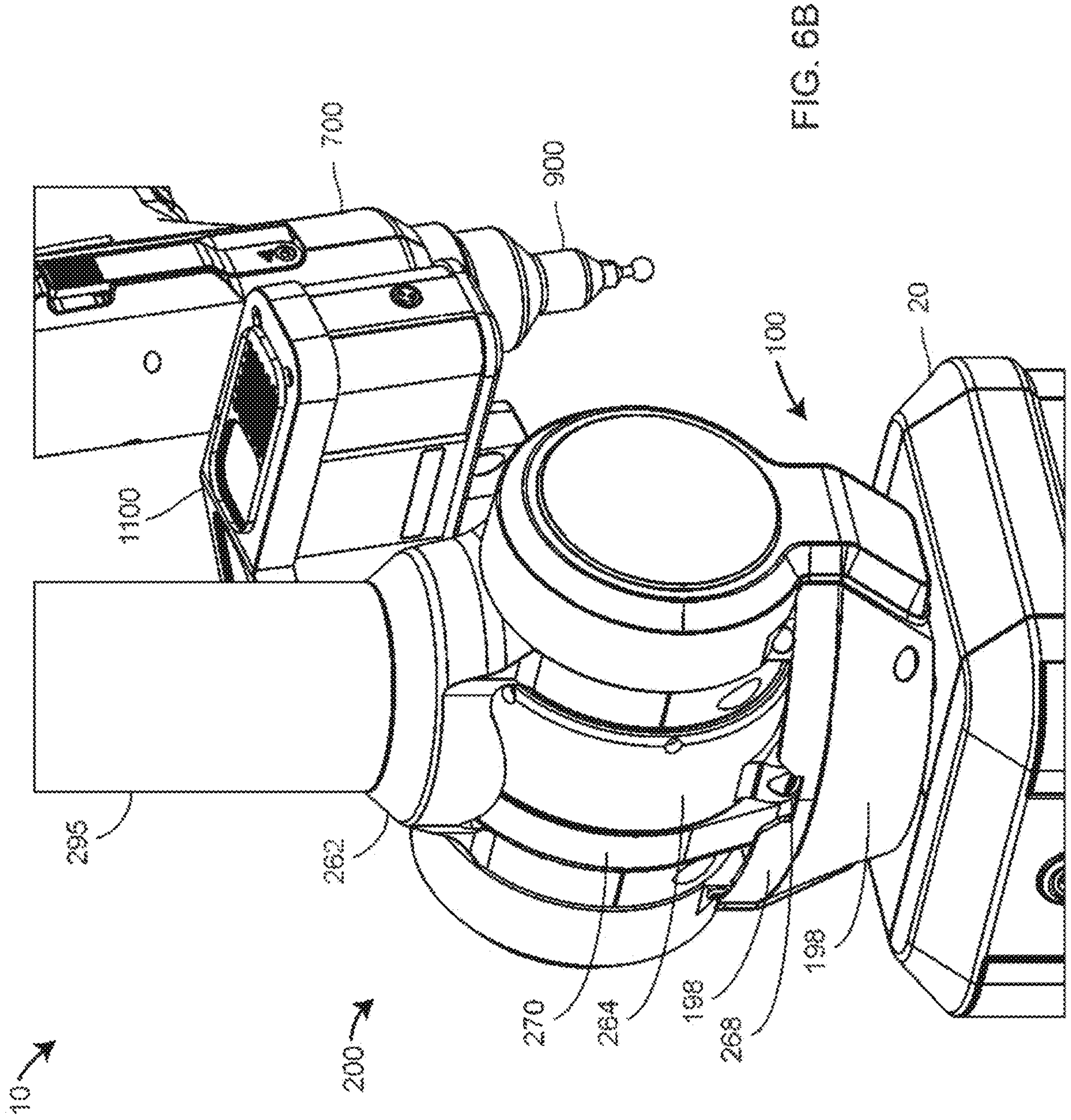
FIG. 6B is an isometric view showing relative positions of some elements of the AACMM when connected arm segments are held in a vertical orientation according to an embodiment.
Figure 6C:
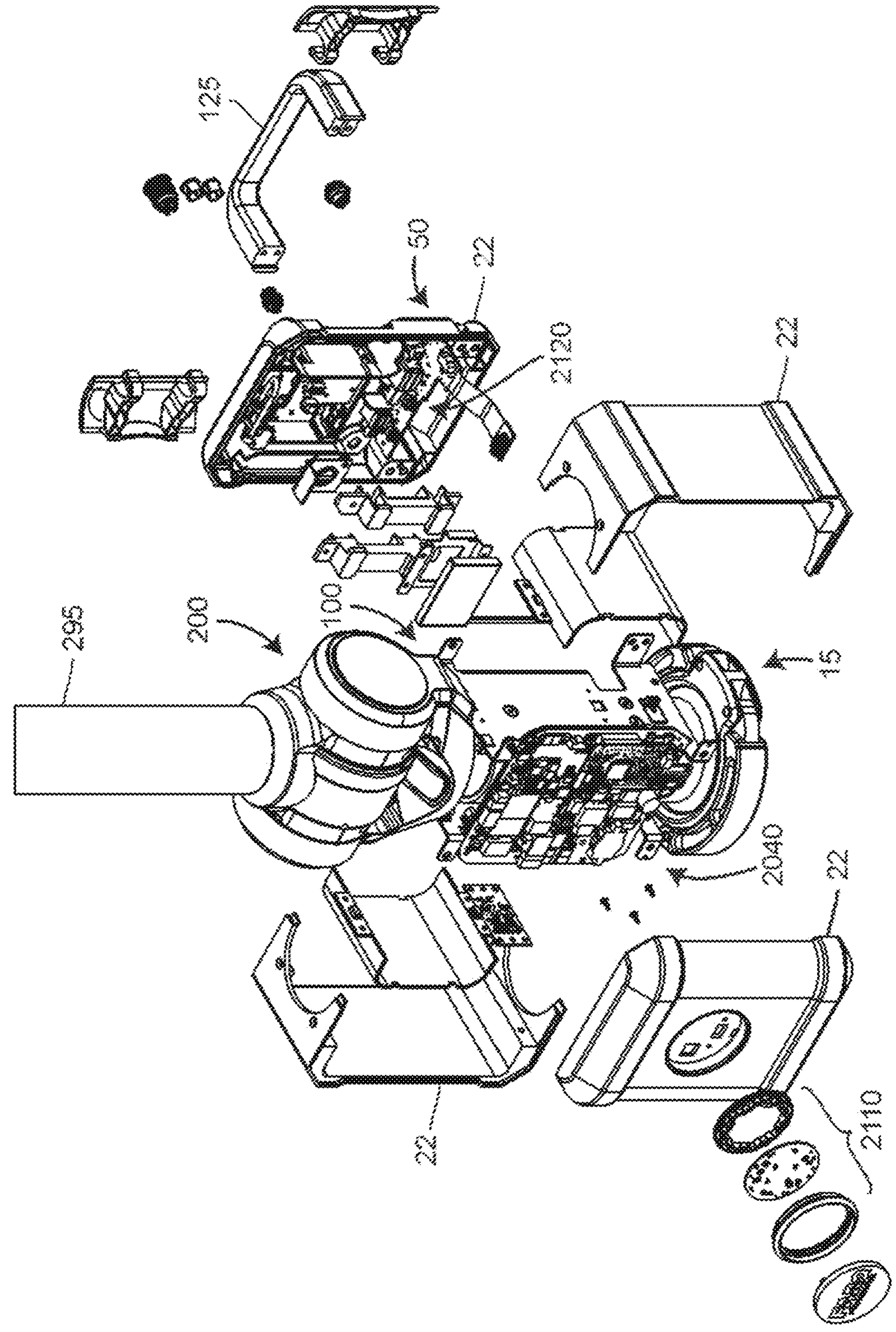
FIG. 6C is a partial unassembled isometric view of the lower portion of the AACMM according to an embodiment.

FIGS. 6A, 6B show some elements of the lower arm. The mounting device 15 provides a way of a attaching the AACMM 10 to a mounting ring. The shock-absorber bumper 110 provides a way to cushion a potential drop of the AACMM 10 when affixing the arm to a mounting ring, as discussed in more detail herein. The base 20 includes elements shown in FIGS. 6A, 6B such as a control panel 30, a battery access 40, and a port panel 50. The control panel 30 includes the on-off button 32, the Wi-Fi button 34, the Bluetooth™ button 36, the first-battery indicator light 38, and the second-battery indicator light 39. The battery access 40 includes the first battery door 42 and the second battery door 46. The port panel 50 includes an Ethernet jack 52, a USB data-transfer port 54, a USB charging port 55, an auxiliary port 56, and a power supply port 58.

Figure 8C:
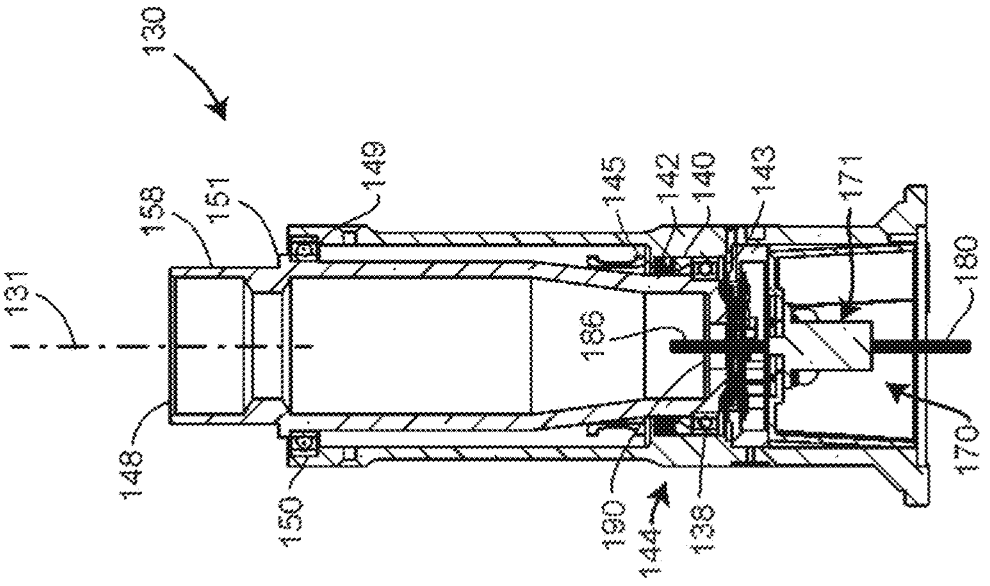
FIGS. 8A, 8B, 8C, and FIG. 8D are front, side, cross-sectional, and unassembled views, respectively, of a first-axis cartridge according to an embodiment.
Figure 8B:
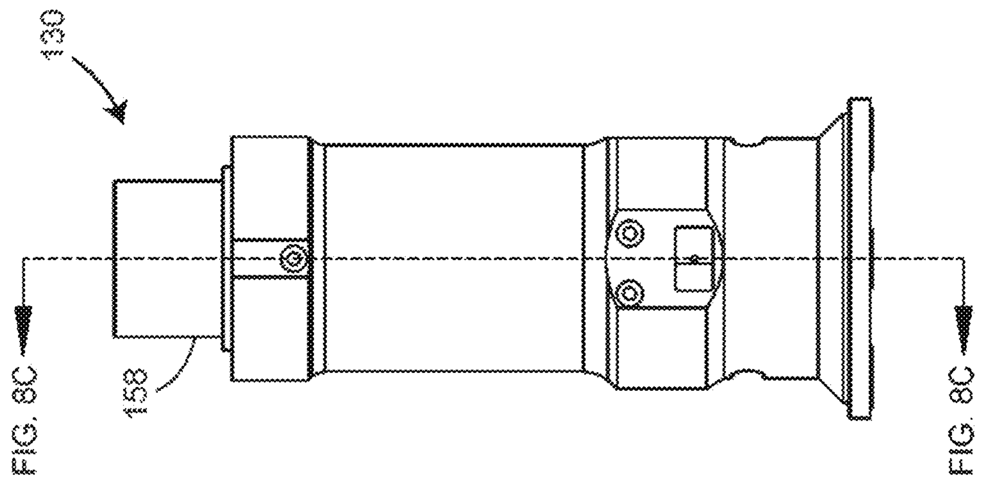
Figure 8A:
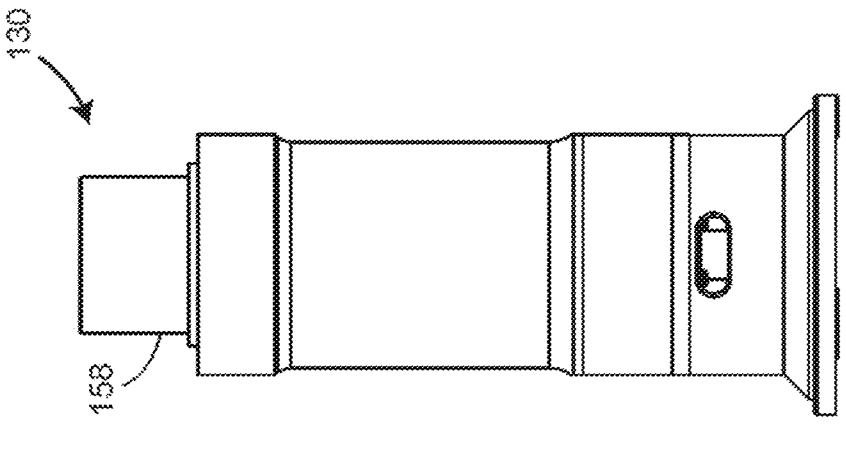
Figure 8D:
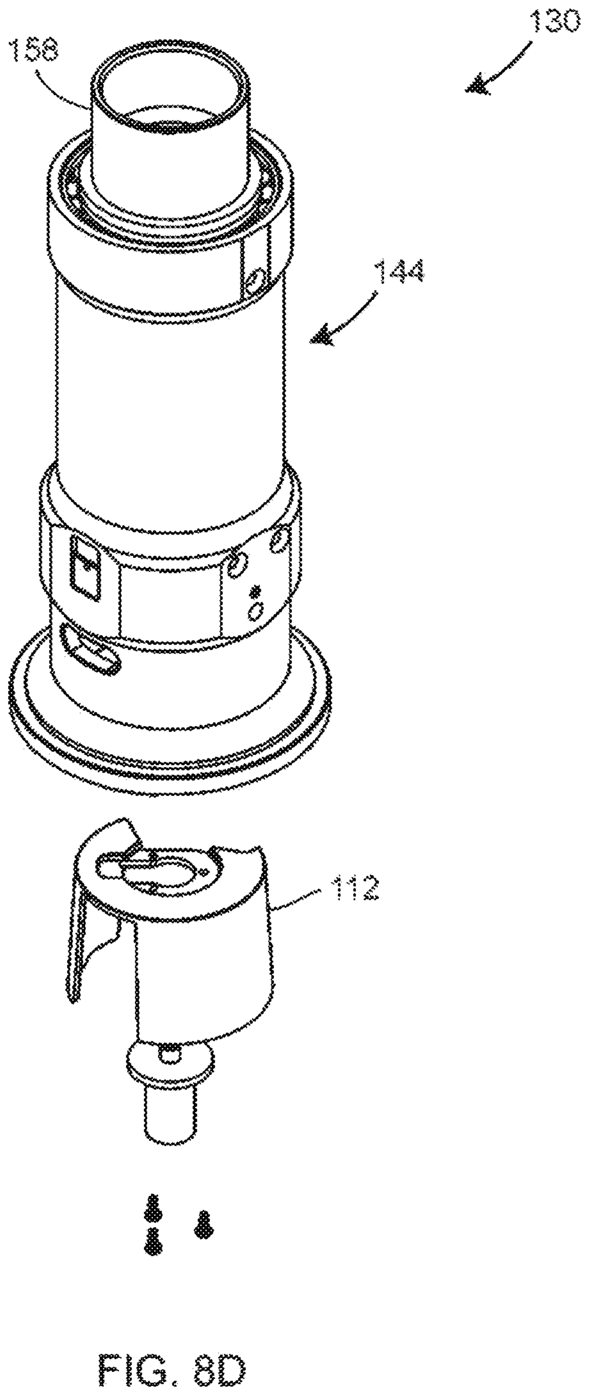
Figure 9A:
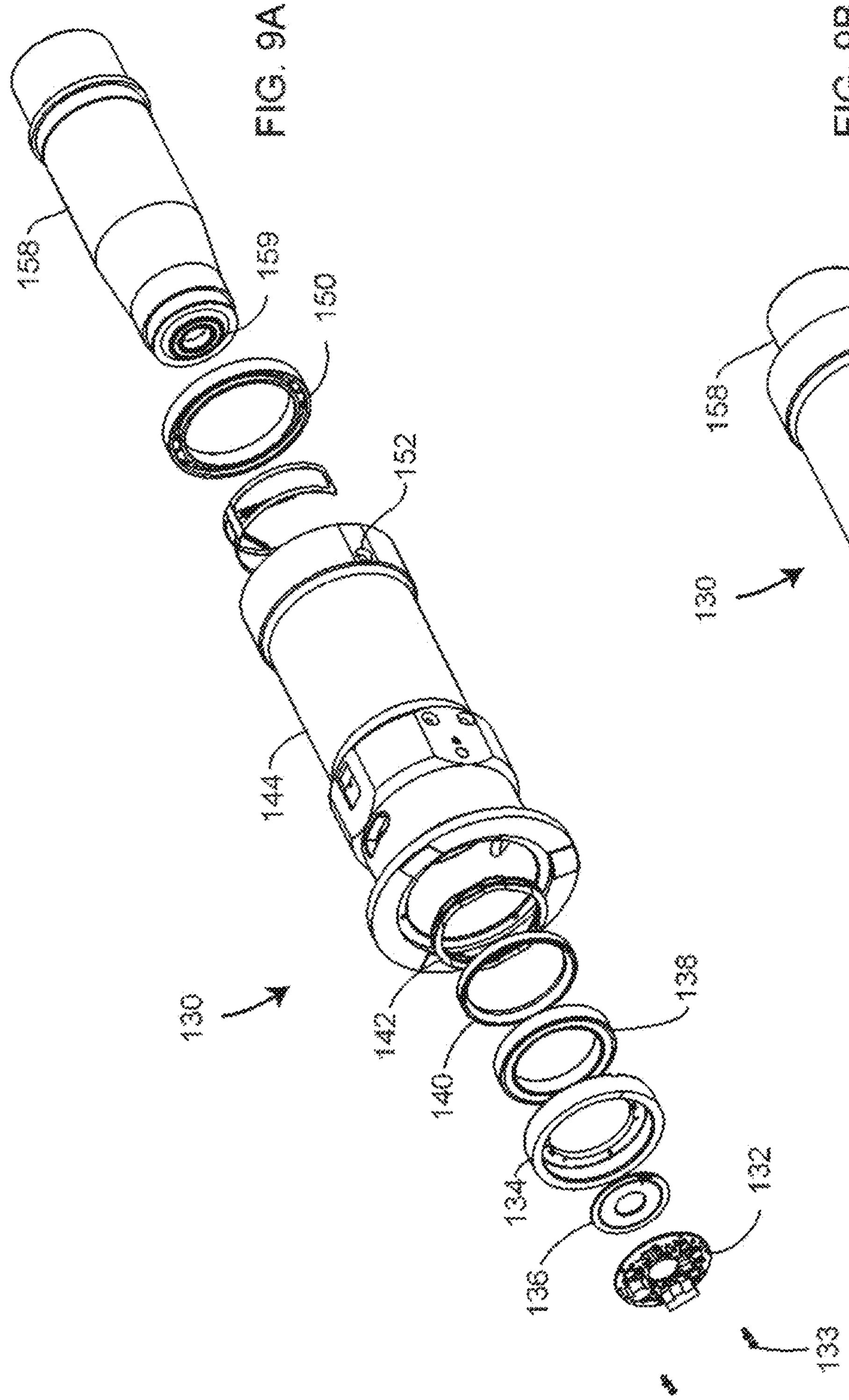
FIG. 9A and FIG. 9B are unassembled and isometric views of the first-axis cartridge according to an embodiment.
Figure 9B:
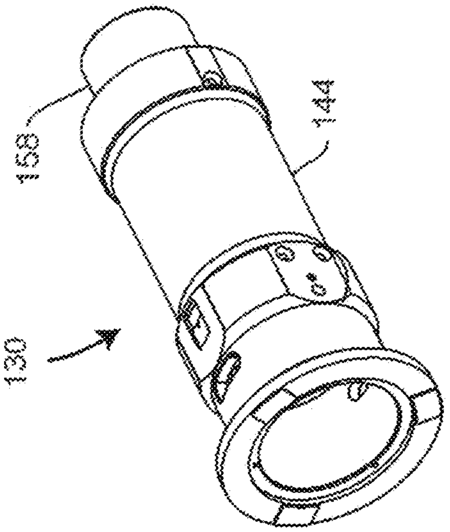

The first-axis assembly 100 is shown in FIGS. 6A, 6B, 6C, 7A, 7B. The first-axis assembly 100 includes a first-axis cartridge 130 and a first-axis yoke structure 194. In an embodiment, the handle 125 and the shock-absorber bumper 110 are coupled to the first axis assembly 100. As shown in FIGS. 8A, 8B, 8C, in the first-axis cartridge 130, a first-axis shaft 158 rotates about a first axis 131 relative to a first axis housing 144. As shown in FIGS. 9A, 9B, with continuing reference to FIG. 8C, the first-axis cartridge 130 includes an encoder board with read heads 132, a read-head plate 134, an encoder disk 136, a lower bearing 138, a preload bearing spacer 140, a wave washer 142, a first-axis housing 144, an upper bearing 150, and a first-axis shaft 158. The first-axis housing 144 includes a lower lip 145 against which the wave washer 142 is placed.

In an embodiment, in a first manufacturing step the upper bearing 150 is held in place between a fifth lip 151 of the first-axis shaft 158 and a fourth lip 149 of the first-axis housing 144. The wave washer 142 is benched against the third lip 145 and brought into contact with the preload bearing spacer 140, which is brought into contact with an outer race of the lower bearing 138. In an embodiment, in a second manufacturing step, the first-axis shaft 158 is press fit against the lower bearing 138 until a bottom of the lower bearing lies on a plane of the second lip 143. A press fit, also known as an interference fit or a friction fit, is a fastening between two parts obtained by pressing the parts together under conditions in which there is a slight interference between the parts, resulting in friction that holds the parts tightly in place. The wave washer 142 and preload bearing spacer 140 press downward on the outer race of the lower bearing 138, which in turn presses down on the ball in the lower bearing. In response, the inner race presses upward on the ball in the lower bearing 138. The lower bearing 138 when subjected to such forces is said to be preloaded, a condition that improves the performance of the bearing. Advantages obtained by preloading a bearing include increased bearing rigidity and better consistency in angular movements.

In an embodiment, the spring force from the wave washer 142 further presses or applies a force on the third lip 145 upward (e.g. in a direction towards an end 148), causing the fourth lip 149 to press upward (e.g. in a direction towards the end 148) on an outer race of the upper bearing 150 and, in reaction, causing the fifth lip 151 to press downward (e.g. away from end 148) on the inner race of the upper bearing 150. Hence preload is also applied to the upper bearing 150. In an embodiment, the lower bearing 138 and the upper bearing 150 are deep groove ball bearings. In another embodiment, the lower bearing 138 and the upper bearing 150 are angular contact ball bearings. It should be appreciated that while the illustrated embodiment describes angular contact ball bearings or deep groove ball bearings, this is for example purposes and in other embodiments, other suitable types of bearings are used.

In an embodiment, with the first-axis shaft 158 press fit in place, an adhesive or glue is applied to the glue grooves 159 of the first-axis shaft 158 and the encoder disk 136 is adjusted in place and allowed to cure. Screws 133 attach the encoder board with read heads 132 to the read-head plate 134, which is benched/engaged against the first lip 141 of the first-axis housing 144.

In an embodiment, a brush assembly 152 includes a carbon brush, a brush spring, and a set screw. The brush assembly is inserted through the first-axis housing 144, enabling the carbon brush to electrically ground the upper bearing, which can otherwise generate static electricity during rotation. Hence, use of the brush assembly 152 provides the technical effect of improving electrical reliability.

In an embodiment, the first-axis cartridge 130 further includes an electrical transfer assembly 170. The electrical transfer assembly 170 includes a first-axis slip ring 171, a slip-ring adapter 190, and cable elements. Cable elements include bus connectors, first cable wires 180, and a cable jacket. The first-axis slip ring 171 includes a slip-ring housing, a slip-ring flange, slip-ring holes, and slip-ring screws. In an embodiment, the slip-ring adapter 190 screws onto the first-axis shaft 158 in a threaded portion. First-axis slip-ring screws extend through slip-ring holes of the slip-ring flange to attach the first-axis slip ring 171 to the slip-ring adapter 190. The slip-ring flange and the slip-ring housing turn together, but the slip-ring shaft turns independently of the slip-ring housing. Furthermore, first cable wires 180, which enter the slip-ring housing, turn with the slip-ring housing, while the second cable wires 186, which enter the slip-ring shaft, turn with the slip-ring shaft. In an embodiment, electrically contacting brushes keep electrical continuity among first cable wires 180 and second cable wires 186 even as the slip-ring shaft rotates relative to the slip-ring housing. In an embodiment, the slip-ring shaft does not rotate relative to the slip-ring housing until the second cable wires 186 become twisted enough to apply a restoring torque to the slip-ring shaft. In an embodiment, the electrical transfer assembly 170 is similar to that described in commonly owned U.S. Pat. No. 10,663,274, the contents of which are incorporated by reference herein.

Figure 7D:
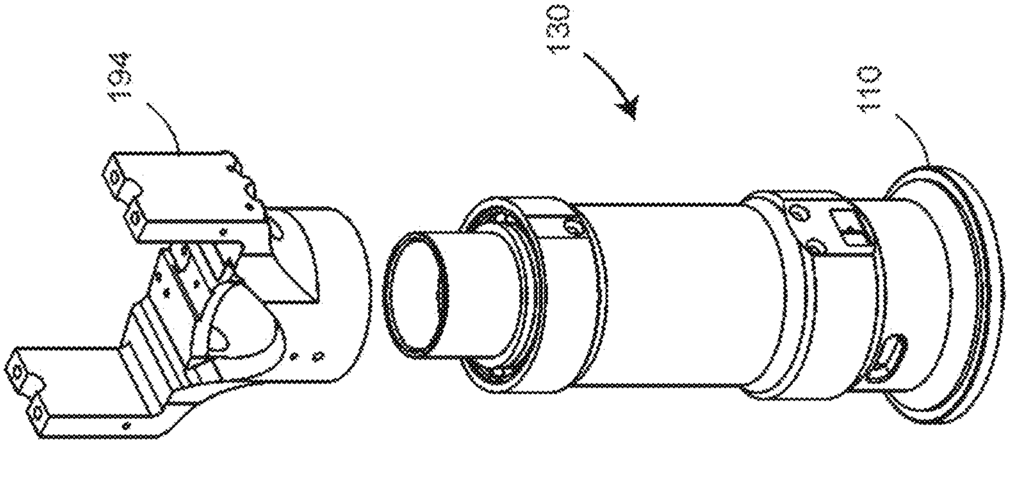
FIG. 7C and FIG. 7D are isometric and unassembled views, respectively, of a first-axis cartridge and a first-axis yoke structure according to an embodiment.
Figure 7C:
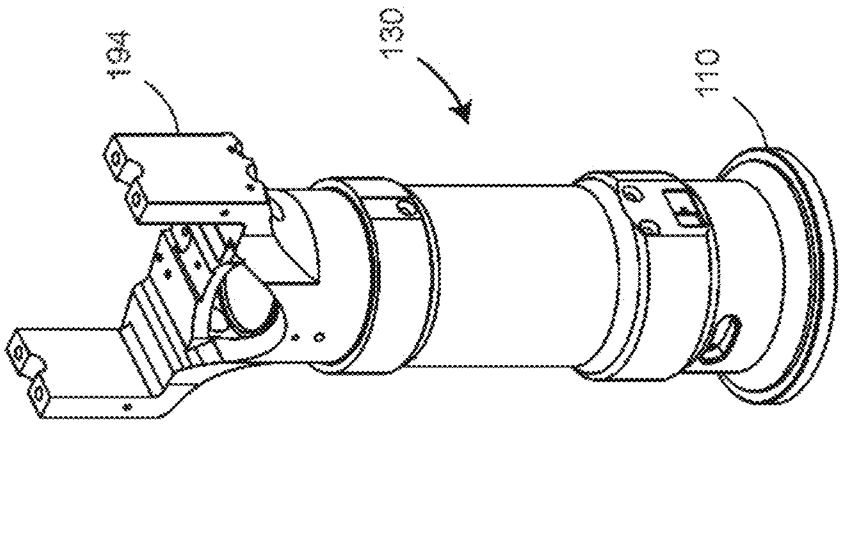

In an embodiment illustrated in FIGS. 7A, 7B, the first-axis assembly 100 includes the first-axis cartridge 130, the first-axis yoke structure 194, the shock-absorber bumper 110, and screws 126, 128. Optionally, the first-axis assembly 100 is used in conjunction with the mounting device 15. In an embodiment, the three short base screws 128 attach one side of the shock-absorber bumper 110 to a bottom of the first-axis housing 144, while the three long base screws 126 attach the shock-absorber bumper 110 to the bottom of the first-axis housing 144. In an embodiment, the mounting device 15 sits loosely on the shock-absorber bumper 110 until it is tightened onto a mounting ring.

Figure 7E:
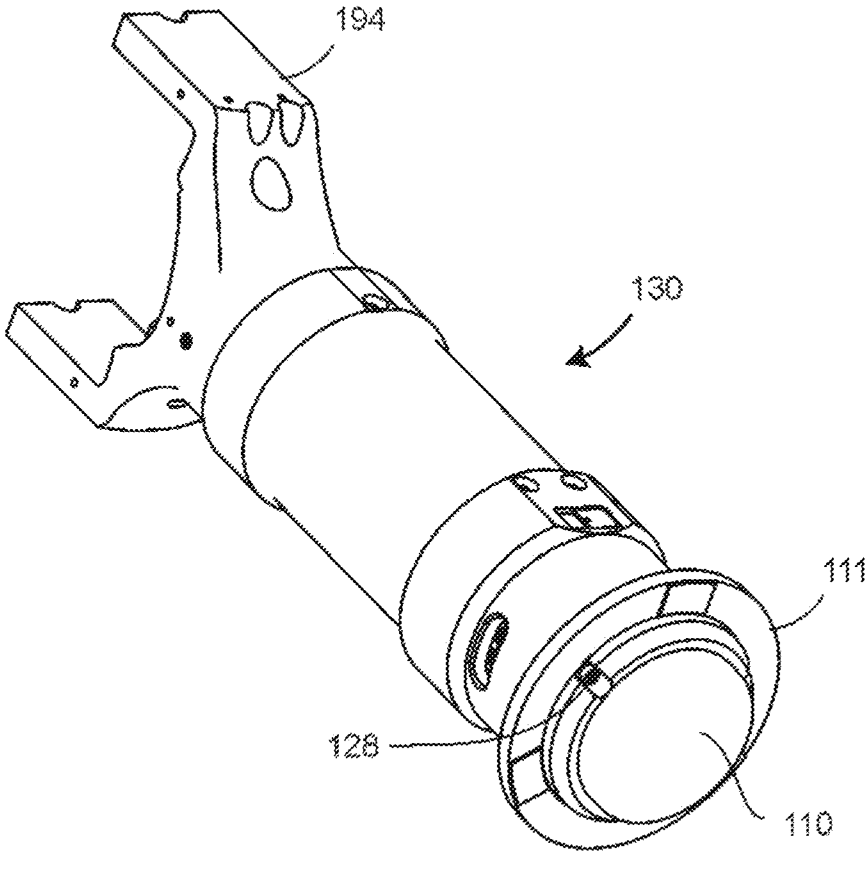
FIG. 7E, is an isometric of a shock-absorber bumper according to an embodiment.

FIGS. 7B, 7E illustrate the shock-absorber bumper 110, which includes lower screws 128, a guiding retainer ring 111, and a bell 112. In some embodiments, this assembly includes a damper, a preload spacer, a base-nut retainer, a tilt board, and fasteners as was described in the aforementioned U.S. Pat. No. 10,663,274. The damper is made of compressible material so that the bell 112 deflects or compresses upward when a force is applied to a bottom of the bell 112. The purpose of the shock-absorber bumper 110 is to reduce mechanical shock to the AACMM 10 that occurs if the AACMM 10 drops when being mounted to a table, stand, or similar structure.

Disposed about the shock absorber bumper 110 is the mounting device 15. The mounting device 15 is the same as that described in commonly owned U.S. Pat. No. 8,028,432, the contents of which are incorporated by reference herein.

In an embodiment, an externally threaded mounting ring (not shown) is attached to a mounting surface such as an instrument stand, tripod, or table. In an embodiment, internal screw threads of the mounting device 15 engage the external screw threads of the mounting ring. As the screw threads are tightened, a mounting device lip is drawn into firm contact with a base-nut retainer shelf of the mounting device 15. In this way, the AACMM 10 is locked firmly in place. Advantageously, the screw threads on the mounting device is temporarily loosened to allow the base 20 of the AACMM 10 to be turned to different direction before being retightened.

Initially, when the base 20 of the AACMM 10 is being positioned by the user on the mounting ring, the bottom of the AACMM 10 is not centered on the mounting ring. As a result, when the AACMM 10 is centered on the ring, the AACMM 10 drops suddenly, shocking the mechanical elements within the AACMM 10. The shock-absorber bumper 110 reduces or minimizes the risk of damage to the AACMM 10 by catching the mounting surface with the bottom of the bell 112 and slowing the descent of the AACMM 10 as the damper compresses. In other embodiments, the mounting device 15 is attached to threads not included on a mounting ring. In still other embodiments, the AACMM 10 is attached to a mounting without use of the mounting device 15. In this embodiment, the shock-absorber bumper provides protection against rapid falls of and shocks to the AACMM 10.

Figure 10:
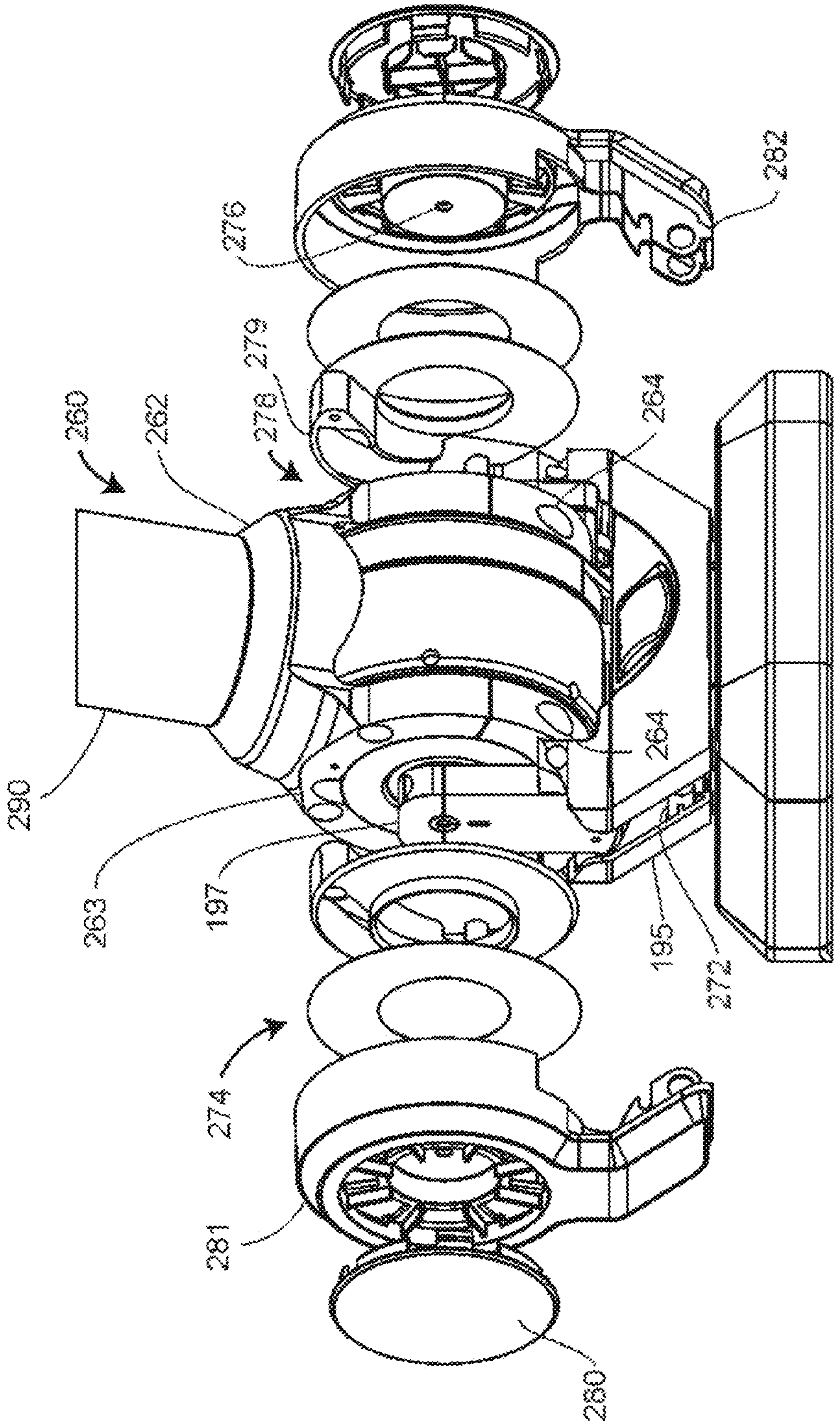
FIG. 10 is an unassembled view of a lower portion of the AACMM according to an embodiment of the present invention.
Figure 11:
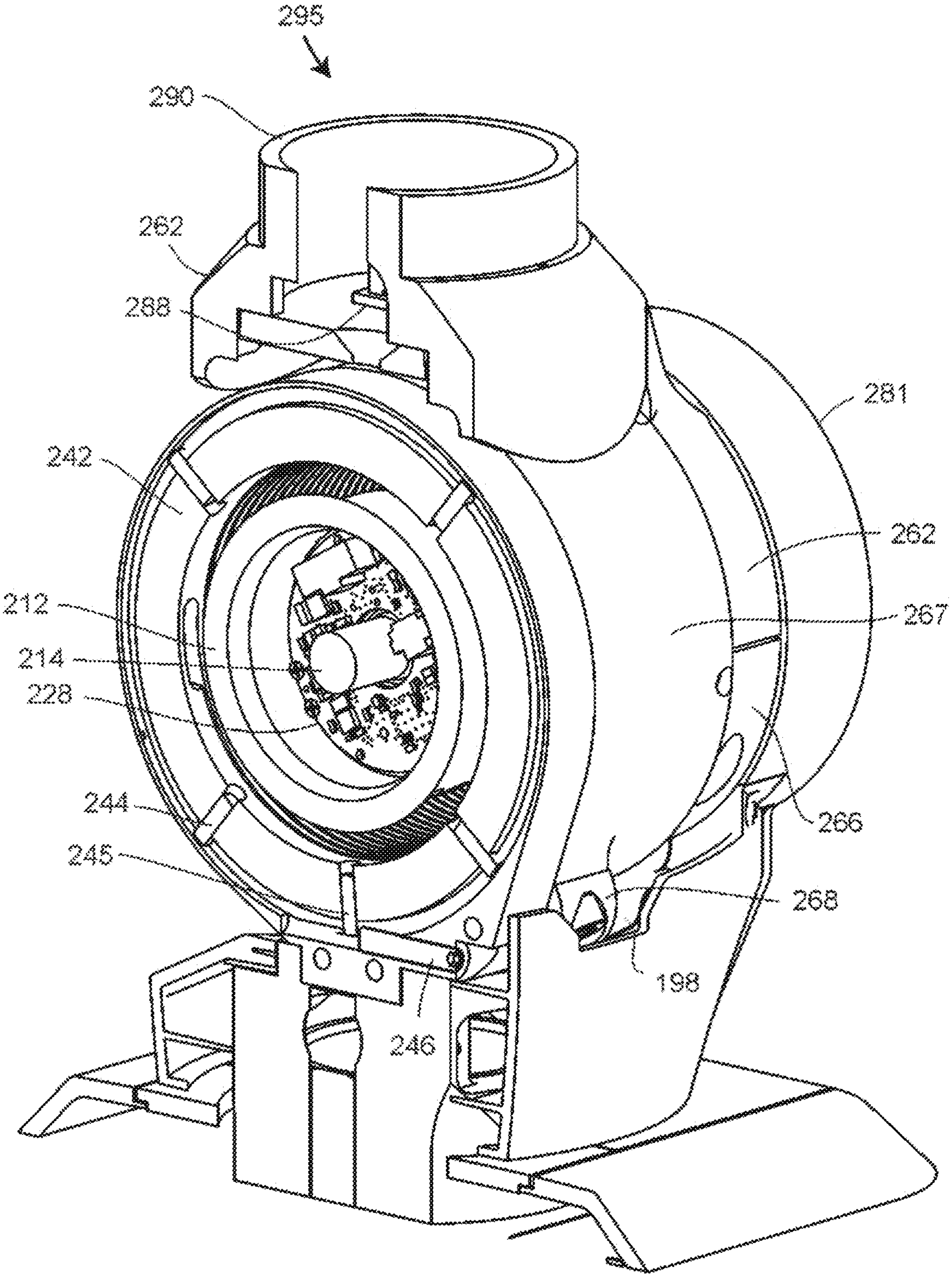
FIG. 11 is a partial isometric view of a second-axis/counterbalance assembly and surrounding components according to an embodiment.
Figure 12:
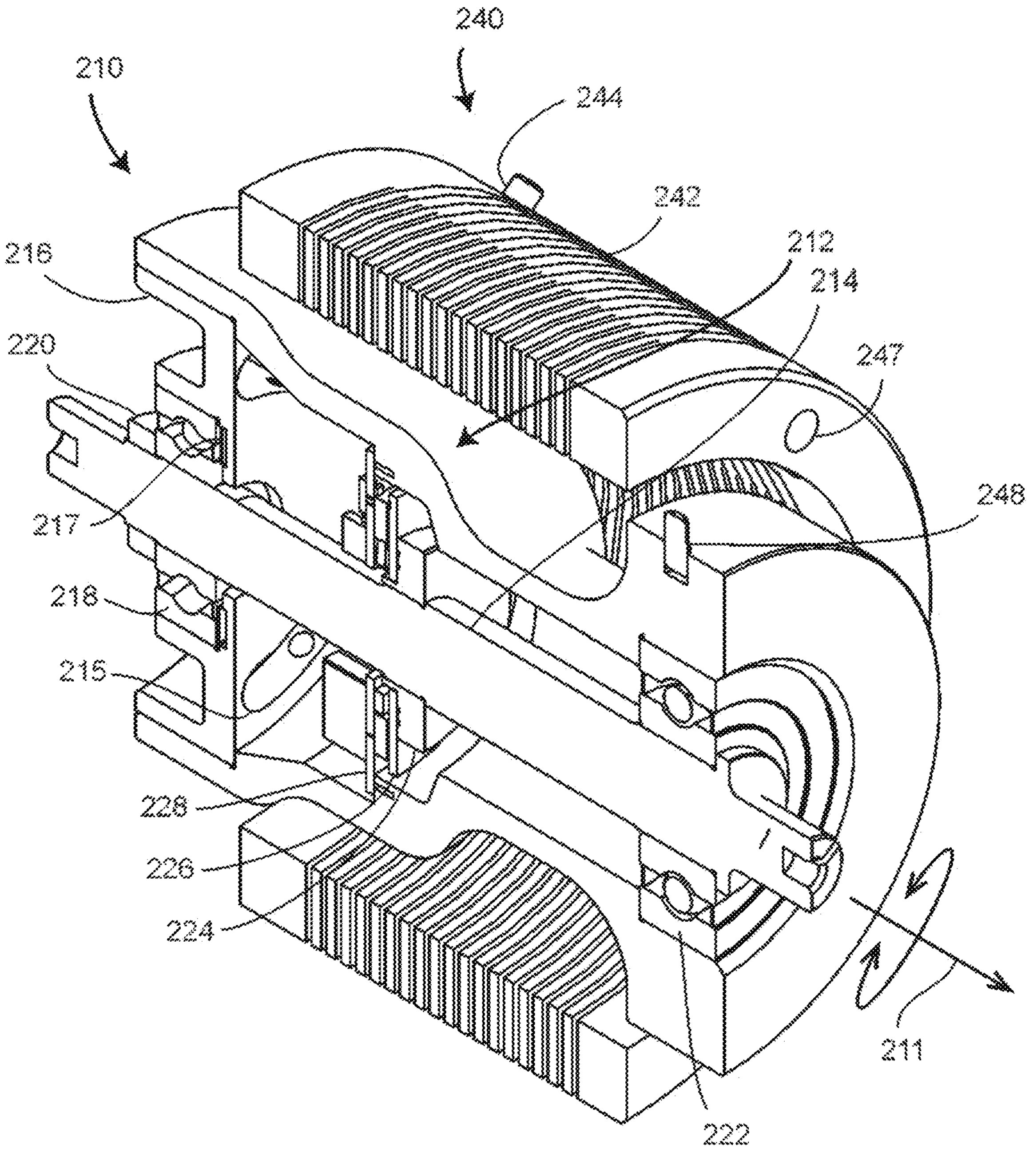
FIG. 12 is a partial section view of a second axis cartridge and counterbalance ring according to an embodiment.
Figure 13:
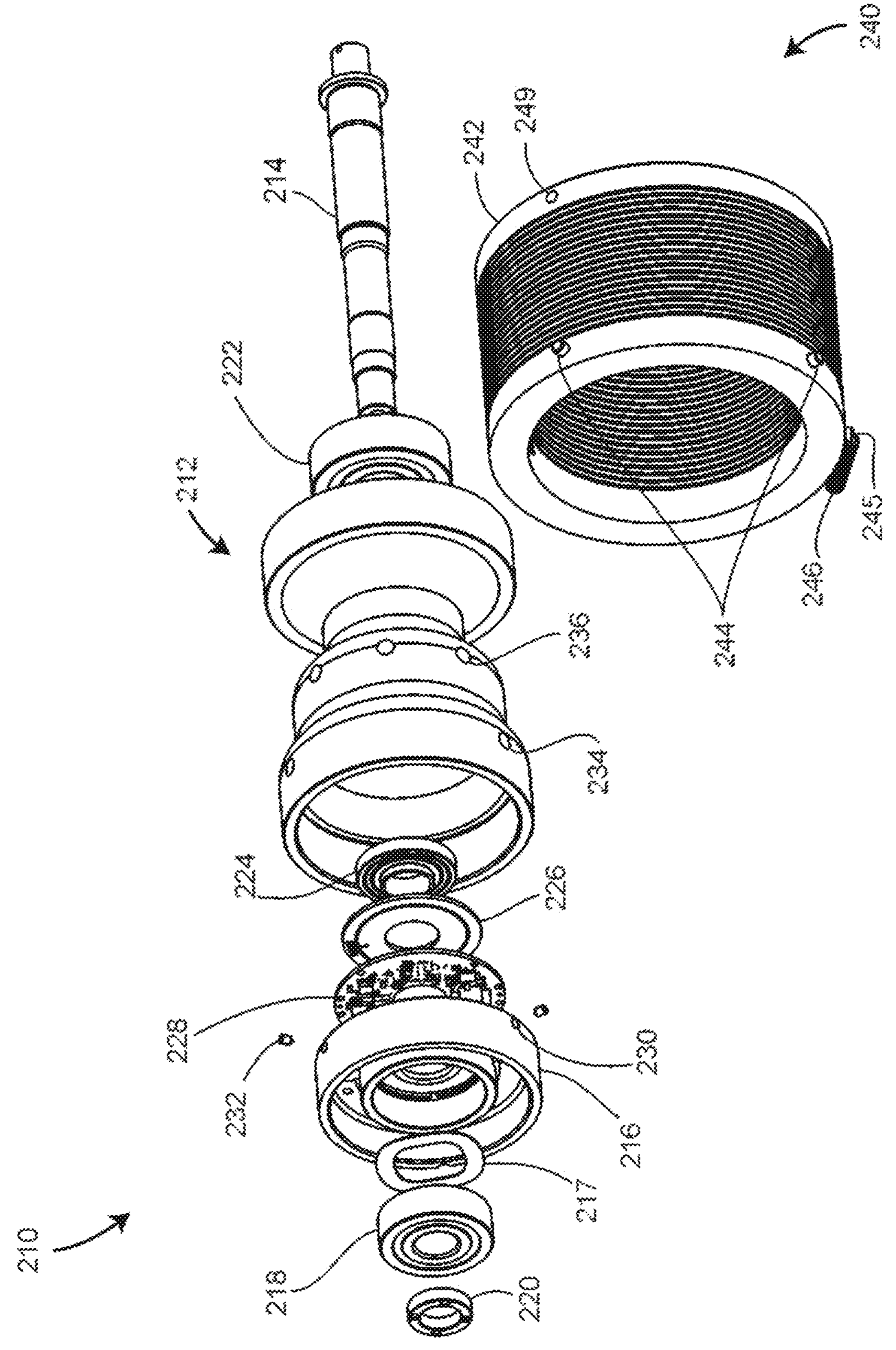
FIG. 13 is an unassembled view of the second-axis cartridge and counterbalance ring according to an embodiment.

FIGS. 6A, 6B, 10, 11 show some external elements of the second-axis assembly 200, including first-segment yoke 260, second-axis cap 280, cable cover 274, and cable-track 278. The first-segment yoke 260 includes first-segment yoke beam 262, first-segment yoke right bow 264, and first-segment yoke left bow 266. FIGS. 12, 13 show some internal elements of the second-axis assembly 200, including the second-axis cartridge 210 and the counterbalance ring 240. In an embodiment, the second-axis assembly 200 provides a hinge-type rotation about a second axis 211. In an embodiment, the second-axis assembly 200 also includes the counterbalance ring 240 that provides a torque that lightens the downward force on arm segments held by an operator, thereby making it easier for an operator to support and maneuver the AACMM 10 in making measurements.

In an embodiment, the second-axis cartridge 210 includes a second-axis shaft 214, a left second axis bearing 222, a second-axis housing 212, a second-axis disk mount 224, an encoder disk 226, an encoder board with read heads 228, a cartridge inner plate 216, a wave washer 217, a right second-axis bearing 218, and a lock nut 220. In an embodiment, the left second axis bearing 222 is press fit onto both the second-axis shaft 214 and the second-axis housing 212. In an embodiment, the cartridge inner plate 216 is press fit to the second axis housing, and the inner race of the right second-axis bearing 218 is press fit onto the second-axis shaft 214. The wave washer 217 applies force to the outer race of the right second-axis bearing 218 but not to the inner race. The inner race of the right second-axis bearing is held in place with the lock nut 220. In an embodiment, the force applied by the wave washer 217 pushes the outer race of the right second-axis bearing 218 against a ball in the bearing 218, with a corresponding and oppositely directed force between applied to the ball by the inner race. The distance between the inner race of the bearing 218 and the inner race of the bearing 222 is set so that upon tightening the lock nut 220 into position, the inner race of bearing 222 pulls inward on the shaft, with an oppositely directed force applied to the ball by the outer race. The result of the application of these forces is a preloading similar to preloading of the bearings in the first-axis cartridge 130. Bearing lock set screws 232 are passed through outer access holes 234 and inner access holes 230, where the inner access holes 230 penetrate both cylindrical portions of the cartridge inner plate 216, enabling the bearing lock set screws 232 to hold rigidly fix the position of the outer race of the right second-axis bearing

218. Although the wave washer 217 applies a force to the outer race that establishes preload of the bearings in the second-axis cartridge 210, the wave washer 217 is subject to vibration when the AACMM 10 is in use. Hence the bearing lock set screws provides an additional stable locking into position of the outer race of the right second-axis bearing 218. In an embodiment, an adhesive such as epoxy is further applied to the outer race to hold it in place.

In an embodiment, the second-axis disk mount 224 is press fit onto the second-axis shaft 214. The encoder disk 226 is bonded/glued and centered on the second axis 211 and allowed to cure. The encoder board with read heads 228 is centered on the encoder disk and affixed to the second-axis housing 212. In an embodiment, disk centering holes 236 in the second-axis housing 212 are used to assist in centering the encoder disk on the rotating shaft 214. A tool inserted through the disk centering holes 236 is used to move or nudge the encoder disk 226 in a direction to center it on the shaft. In an embodiment, the centering procedure is performed while slowly rotating the second-axis shaft 214 on a rotation fixture used in a manufacturing process. As the encoder disk 226 is slowly rotated, electrical signals generated by the rotation fixture indicate a direction in which the encoder disk 226 should be moved or nudged to center the encoder disk 226 on the second-axis shaft 214.

A wire-routing slot 215 (FIG. 12) is cut into the cartridge inner plate 216 to pass the busses 2182, 2184 through the second-axis cartridge 210. An anti-rotation pin 248 that is pressed into the second-axis housing 212 mates with first-segment yoke beam 262 shown in FIGS. 10, 11. The first-segment yoke beam 262 attaches to the first-segment tube 290 of the first segment 295 as further shown in FIGS. 11, 14A, 14B, 14C, 14D, 14E. Hence the second-axis housing 212 rotates together with the first segment 295. The first-segment yoke beam 262 further attaches to first-segment yoke right bow 264 and first-segment yoke left bow 266 as shown in FIG. 10. In an embodiment, a temperature sensor 288 is included adjacent to the first-segment yoke beam 262.

As shown in FIG. 12 and FIG. 13, the counterbalance ring 240 includes a torsion spring 242, spring retaining pins 244, threaded holes 247 to accept yoke locking screws, an anti-rotation threaded hole 249 to accept an anti-rotation set screw 249, and a tensioning set screw 246. Threaded holes 247 in the counterbalance ring 240 attach with yoke locking screws to holes 265 in first-segment yoke beam 262 shown in FIG. 14D. Likewise, the anti-rotation threaded hole 249 receives an anti-rotation set screw 269 to fix one side of the torsion spring 242 to a counterbalance ring cylinder 267 as shown in FIG. 11. Hence, the side of the torsion spring that includes the threaded hole 247 and the anti-rotation threaded hole 249 turns along with the first segment yoke beam and the first segment 295.

In contrast, the other side of the torsion spring is fixed to a spring tension plate 270 attached rigidly to the base 20, as shown in FIG. 11. A tensioning set screw 246 in FIGS. 11, 13 is brought into contact with a spring tension pin 245. A counterbalance ring bump 268 (FIG. 6A) contacts a first-axis yoke bumper 198 when the first segment 295 is rotated as far as possible about the second axis 211 (FIG. 12) in one direction. At this position, the amount of force exerted by one side of the torsion spring 242 relative to the other side is determined by an adjustment of the tensioning set screw 246. As the first segment 295 is rotated to bring the counterbalance ring bump 268 farther from the first-axis yoke bumper 198, the amount of force exerted by the torsion spring 242 increases. The effect of the increase in the force as the first segment 295 is moved away from a vertical orientation is to apply an increasing force to the first segment 295, with the force directed opposite the direction of gravity. In this way, the arm segments are made to feel lighter and easier to handle to the user. Spring retaining pins 244 shown in FIGS. 11, 13 keep the torsion spring 242 centered within the spring tension plate 270.

As illustrated in FIG. 10 and FIG. 11, the second-axis shaft 214 is clamped between upper prongs of the first-axis yoke structure 194 and first-axis yoke caps 197. Hence the second-axis shaft 214 is fixed in relation to the base 20. A first-axis yoke cover 195 is placed over a lower portion of the yoke structure 194 and is locked into place with screws applied to first-axis yoke-cover screw holes (not shown). Placed about each side of the first-axis yoke structure 194 (FIG. 7B) are a cable-track 278, a cable cover 274, and a second-axis cap 280. The second-axis cap 280 includes a cap body 281 and a cap snap connector 282, the cap snap connector 282 attaching to a cap snap receptacle 272 of the first-axis yoke cover 195. In an embodiment, the assembly includes two opposing second-axis caps 280, each having a cap snap connector 282 that couples with a respective cap snap receptacle 272. Wires routed from the base 20 pass through an opening in the cap snap receptacle 272. The wires are channeled by a cable-track plate 280 and through a cable-track window of the cable track 279. The wires pass through a first-segment yoke cable hole 263 (FIG. 14D). The wires that pass through the first-segment yoke cable hole passes directly into the first-segment tube 290 or through the wire-routing slot 215 (FIG. 12) to the encoder board connector 2174 (FIG. 3) before passing back through the wire-routing slot 215 into the first-segment tube, as shown in FIGS. 10, 14E. In an embodiment, wires of the first bus 2182 (FIG. 4A) pass through the first-segment yoke-cable hole 263 on one side of the first-segment yoke beam 262 while the wires of the second bus 2184 pass through the first-segment yoke cable hole 263 on the other side. In an embodiment, the cable-track 278 and the cable cover 274 are attached to the second-axis shaft 214 with a screw that passes through a cable-cover screw hole 276. In an embodiment, each second-axis cap 280 is snapped onto a corresponding cable cover 274.

Figure 14B:
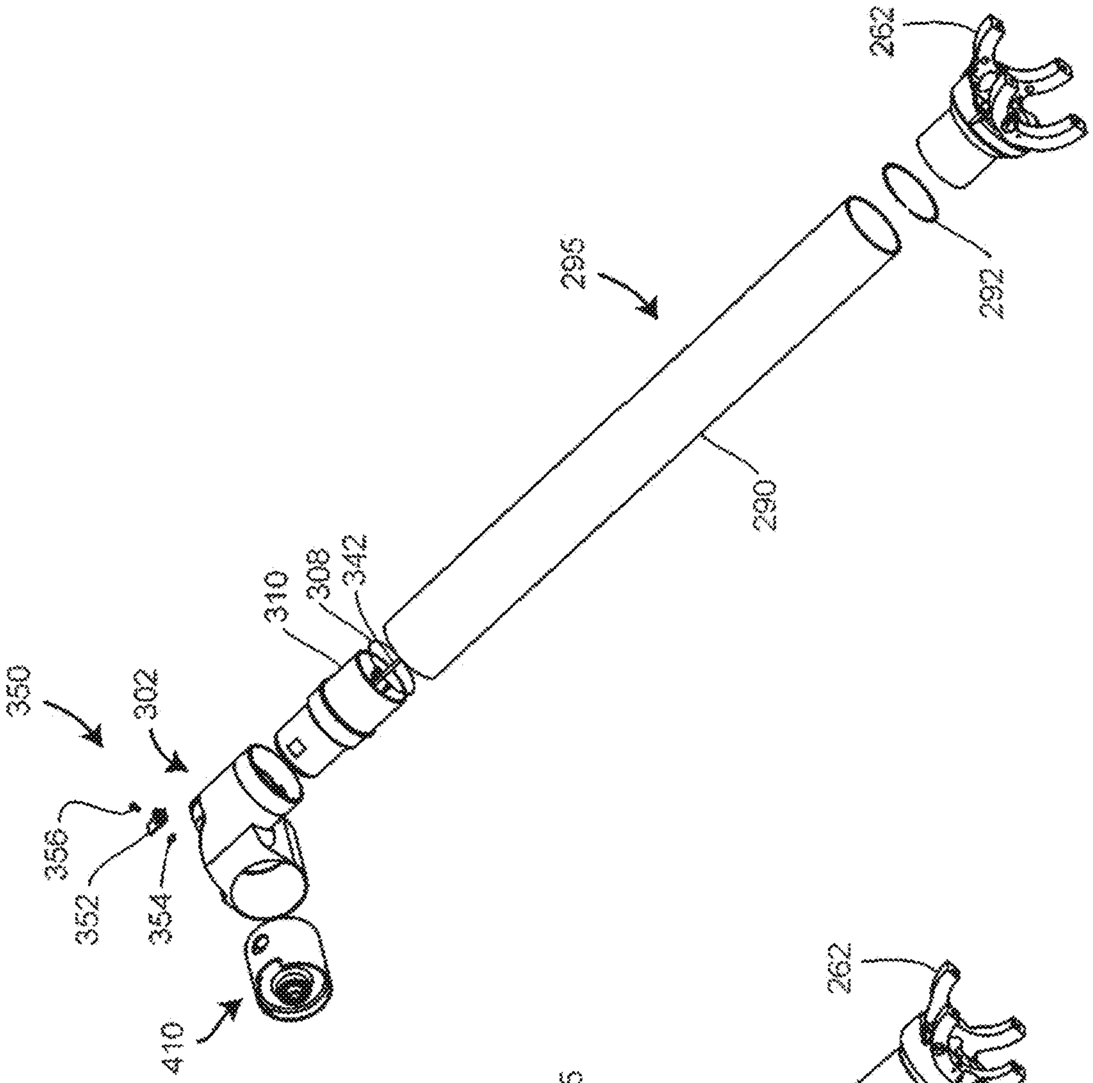
FIGS. 14A, 14B, 14C, 14D, and FIG. 14E are isometric, unassembled, front, side, and section views, respectively, of a third-axis assembly, a fourth-axis assembly, and a first segment according to an embodiment.
Figure 14A:
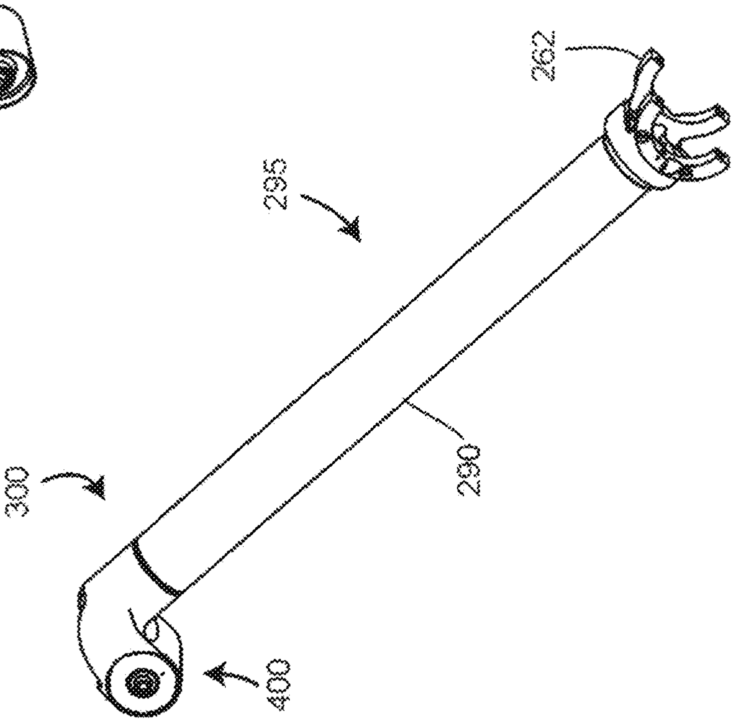
Figures 14C, 14D, 14E:
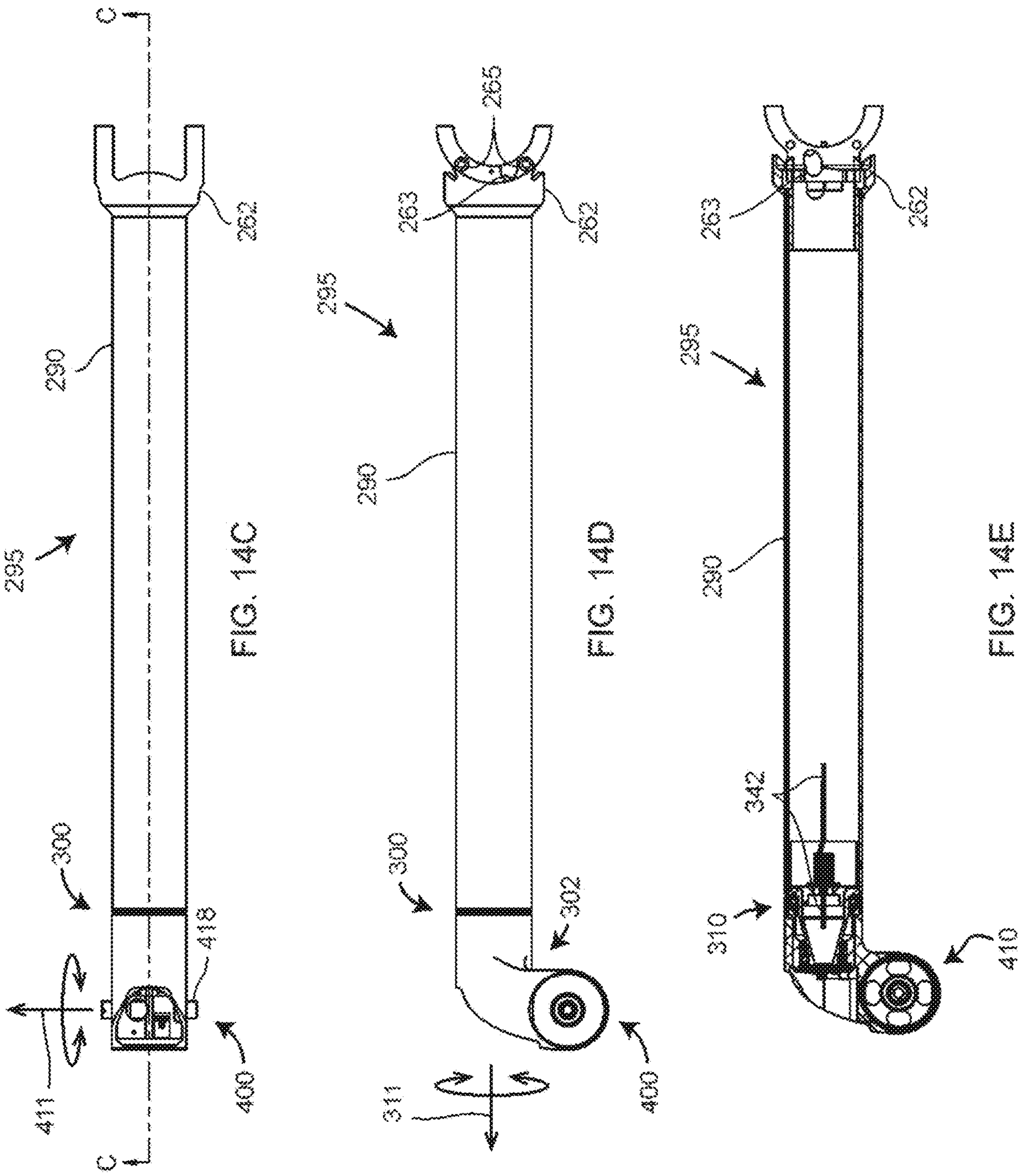

FIGS. 14A, 14B, 14C, 14D, 14E illustrate the first-segment yoke beam 262, the first segment 295, the third-axis assembly 300, and the fourth-axis assembly 400. The section view of FIG. 14E shows that the first-segment yoke beam 262 attaches inside the first-segment tube 290. FIG. 14B shows a conductive grounding ring 292 that provides grounding between the first-segment yoke beam 262 and the first segment tube 290, thereby improving electrical reliability and performance of the AACMM 10. Likewise, a conductive grounding ring 308 provides grounding between the cartridge adapter 302 and the first-segment tube 290. In an embodiment, the first-segment tube 290 is made of a carbon-fiber composite material.

The wires of the first bus 2182 and the second bus 2184 (FIG. 4A) are routed through the first-segment yoke cable hole 263 as described herein above. The bus wires 2182, 2184 continue as cables 342 to pass through the third/fifth-axis slip ring, which is a part of the third/fifth cartridge 310. The term third/fifth-axis slip ring indicates that the same slip-ring assembly is used in both the third-axis assembly 300 and in the fifth-axis assembly 500 (FIG. 1). The term third/fifth cartridge indicates that the same cartridge assembly 310 is used in both the third-axis assembly 300 and the fifth-axis assembly 500. The cartridge adapter 302 is a common component of the third-axis assembly 300 and the fourth-axis assembly 400 since these axis assemblies house the third/fifth-axis cartridge 310 and the fourth/sixth-axis cartridge 410, respectively. The third-axis assembly 300 provides rotation of the cartridge adapter 302 about a third axis 311 shown in FIG. 14D. The fourth-axis assembly 400 provides rotation of fourth/sixth-axis shaft 418 about a fourth axis 411 shown in FIG. 14C.

Figure 15A:
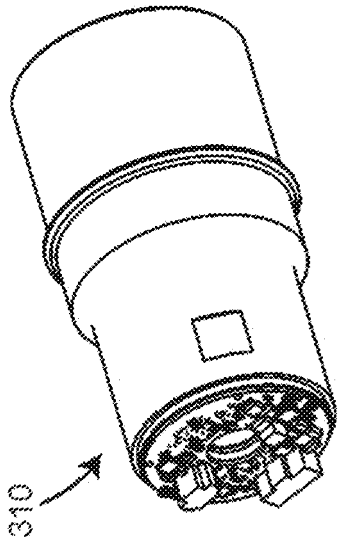
FIG. 15A and FIG. 15B are isometric and unassembled views of a third/fifth axis cartridge according to an embodiment.
Figure 15B:
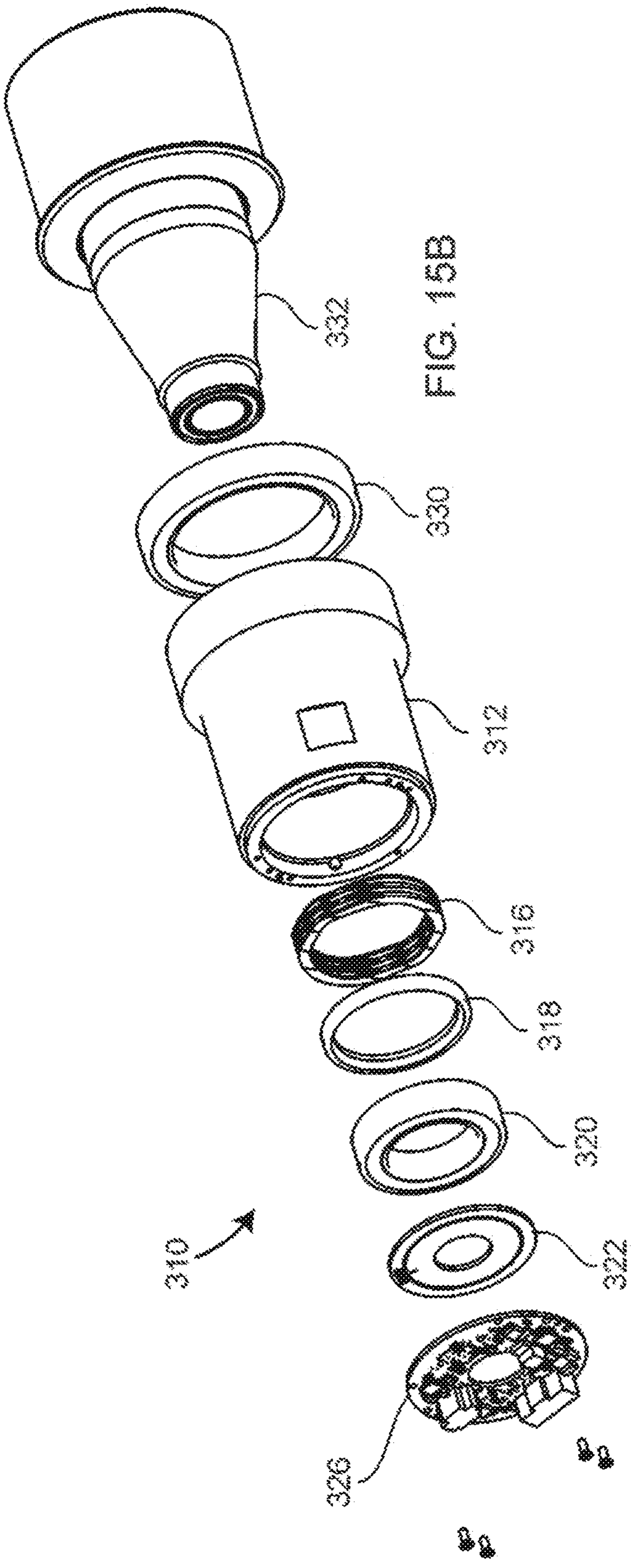

The third/fifth-axis cartridge 310 illustrated in FIGS. 14E, 15A, 15B includes an encoder board with read heads 326, an encoder disk 322, an upper bearing 320, a preload bearing spacer 318, a wave washer 316, a third/fifth-axis housing 312, a lower bearing 330, a third/fifth-axis shaft 332, and the third/fifth-axis slip ring 340 with cables 342. The third/fifth-axis shaft 332 rotates relative to the third/fifth-axis housing 312.

In an embodiment, the third/fifth-axis shaft 332 is press fit against an inner race of the upper bearing 320. The wave washer 316 is placed against a housing upper ledge 314. The preload bearing spacer 318 sits between the wave washer 316 and an outer race of the upper bearing 320. The spring action of the wave washer 316 acts to push the outer race of the upper bearing 320 against a ball in the upper bearing 320. In reaction, the inner race of the upper bearing 320 pushes oppositely against the ball in the upper bearing 320. The wave washer 316 also pushes downward (e.g. in the direction of end 333) on the housing lower ledge 314, thereby pushing the outer race of the lower bearing 330 against the ball in the lower bearing 330. In response, the inner bearing presses oppositely against a ball in the lower bearing 330. In this way, a preload is applied to the bearings 320, 330 in the third/fifth axis cartridge 310. In an embodiment, the encoder disk 322 is glued to the third/fifth-axis shaft 332, centered on the shaft 332, and cured in place. The encoder board with read heads 326 is pinned in place with the pin 324.

The fourth/sixth-axis cartridge 410 illustrated in FIGS. 16A, 16B, 16C, 16D includes a fourth/sixth axis bearing 416 located on the encoder side, a fourth/sixth-axis housing 412, a fourth/sixth-axis shaft 418, an encoder disk 422, an encoder board with read heads 426, a drum flexure 428, a wave washer 430, a preload bearing spacer 432, a fourth/sixth axis bearing 434 located on the spring side, and a protective cover 436. The fourth/sixth-axis shaft 418 rotates relative to the fourth/sixth-axis housing 412. In an embodiment, the fourth/sixth-axis cartridge 410 does not include a slip ring but rather provides routing for the wires through as described herein below with respect to FIGS. 16E, 16F, 16G, 16H. In an embodiment a slip ring is not used on those second-axis assembly 200, the third-axis assembly 400, or the sixth-axis assembly 600 because the total amount of rotation is limited by the hinge movement of these assemblies.

In an embodiment, with the wave washer 430 and the preload bearing spacer 432 are held in place by the drum flexure 428, the inner race of the fourth/sixth axis bearing 434 is press fit to the fourth/sixth-axis shaft 418, while the inner race of the fourth/sixth axis bearing 416 is press fit against the shaft 418 and benched against the shaft first ledge 417. The force applied by the wave washer 430 and preload bearing spacer 432 pushes the outer race of the bearing 434 against a ball in the bearing 434, and a counter force presses the inner race of the bearing 434 in an opposing direction against the ball in the bearing 434. At the same time, the forces on the bearing 434 pull the outer race of the bearing 416 against a housing first ledge 414. This combination of actions provides preloads for the bearings 416, 434. In an embodiment, the encoder disk 422 is glued to the housing second ledge 420, after which it is centered on the fourth/sixth-axis shaft 418 and cured in place. In an embodiment, the encoder board with read heads 426 is attached to the fourth/sixth-axis housing 412 at first ledge 424. In an embodiment, centering of the encoder disk 422 about the fourth/sixth-axis shaft 418 is facility by moving or nudging the encoder disk with a tool placed through one or more encoder-adjustment holes 423 in the fourth/sixth-axis housing 412.

Figure 16A:
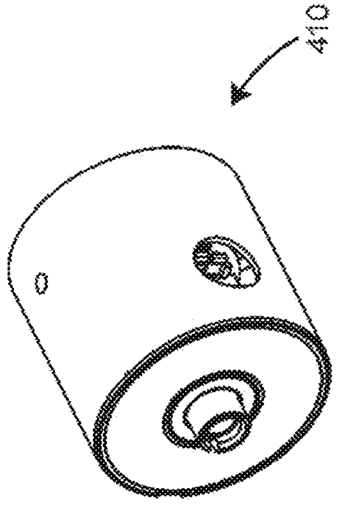
FIGS. 16A, 16B, 16C, and FIG. 16D are isometric, unassembled, front, and section views of a fourth/sixth axis cartridge according to an embodiment.
Figure 16B:
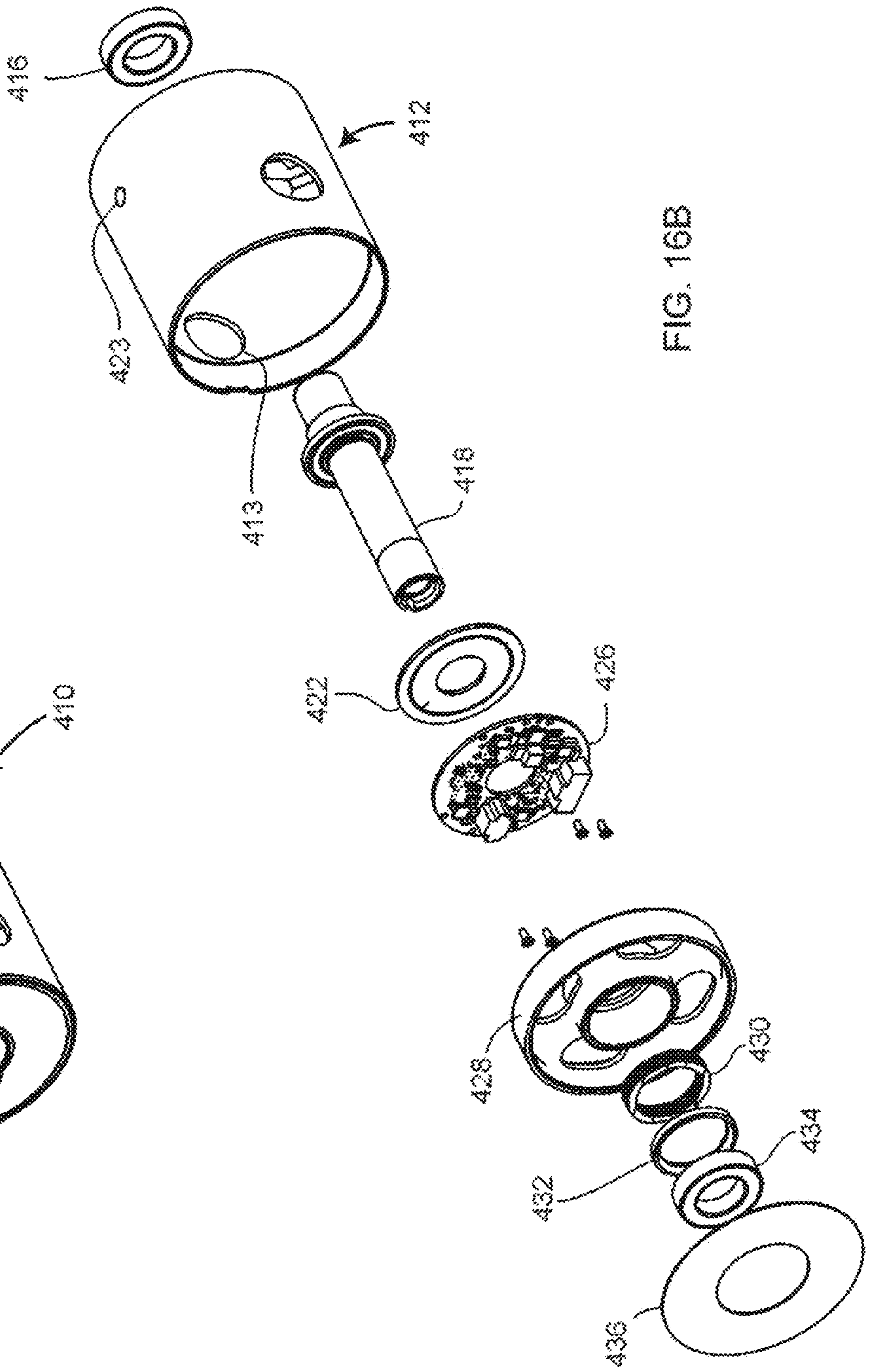
Figure 16C:
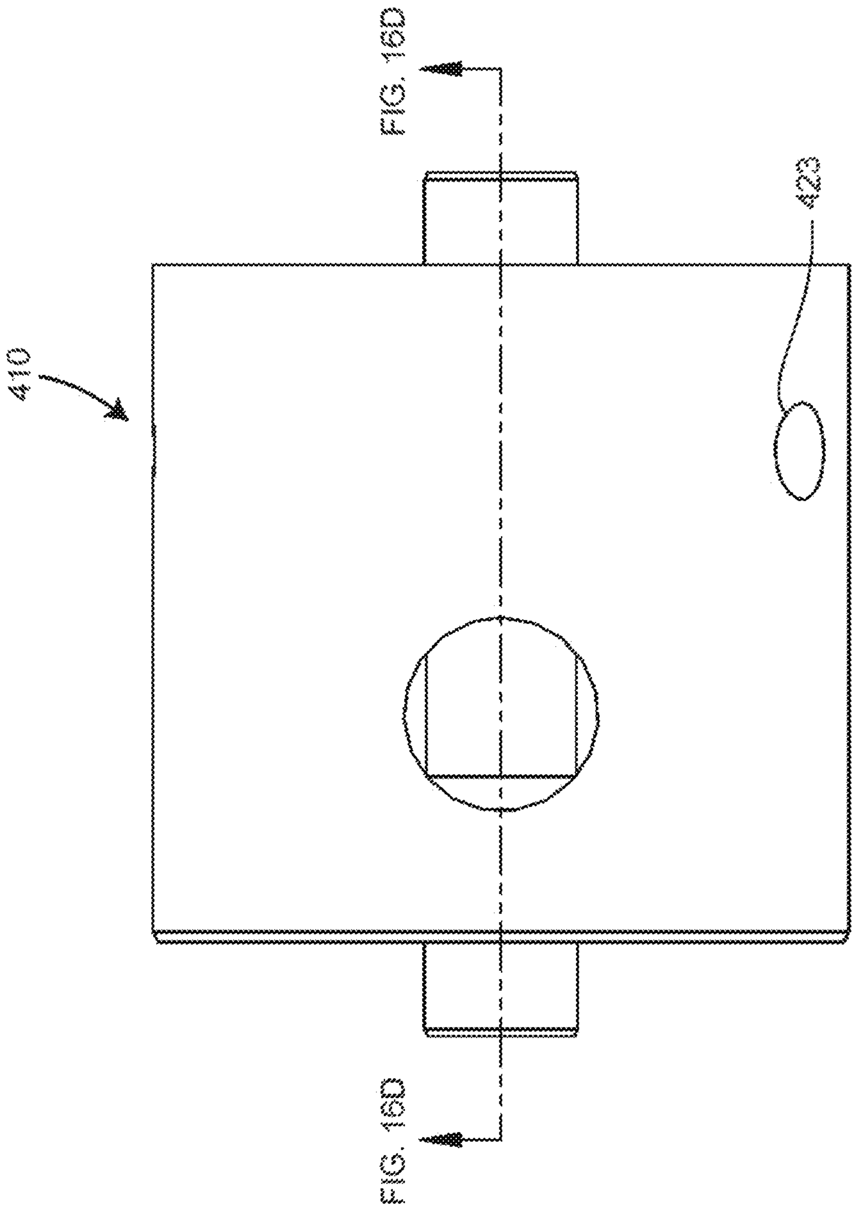
Figure 16D:
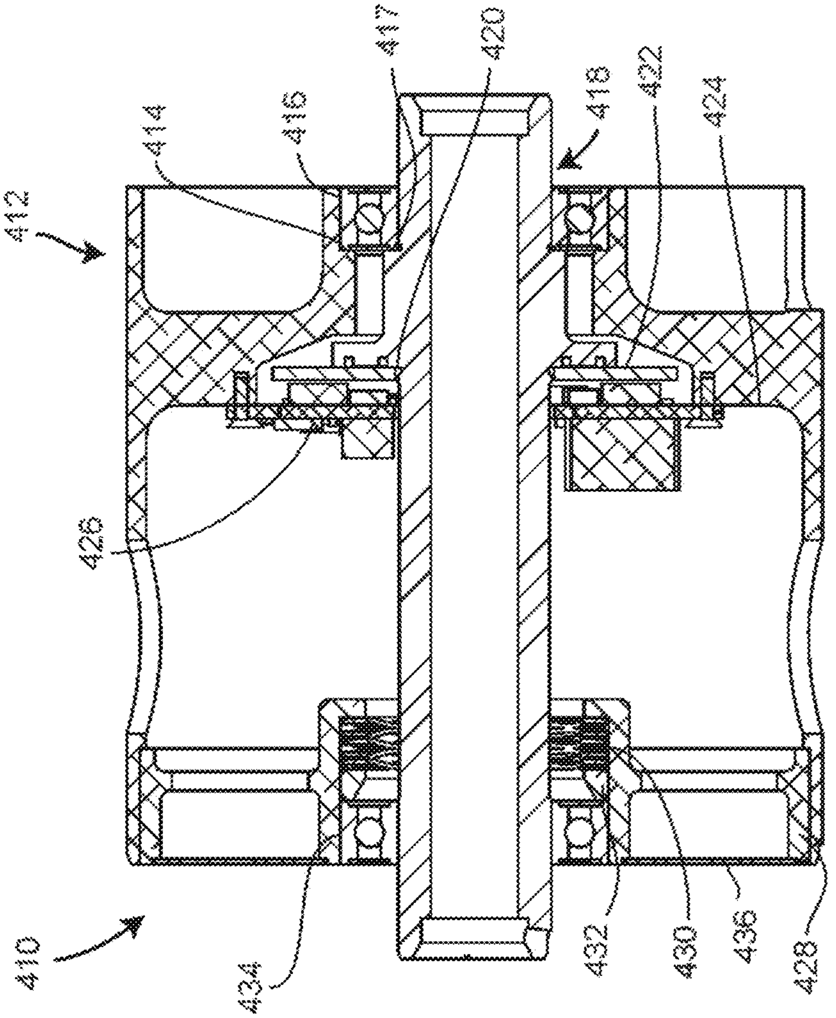
Figure 16F:
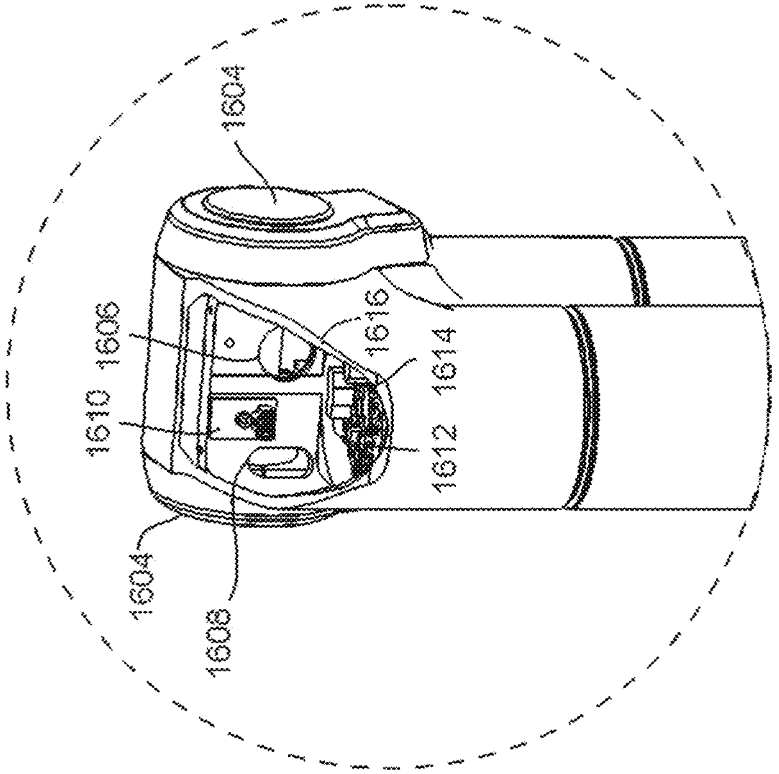
FIGS. 16E, 16F, 16G, and FIG. 16H are isometric, partially exposed views of elements of third-, fourth-, and fifth-axis assemblies according to an embodiment.
Figure 16E:
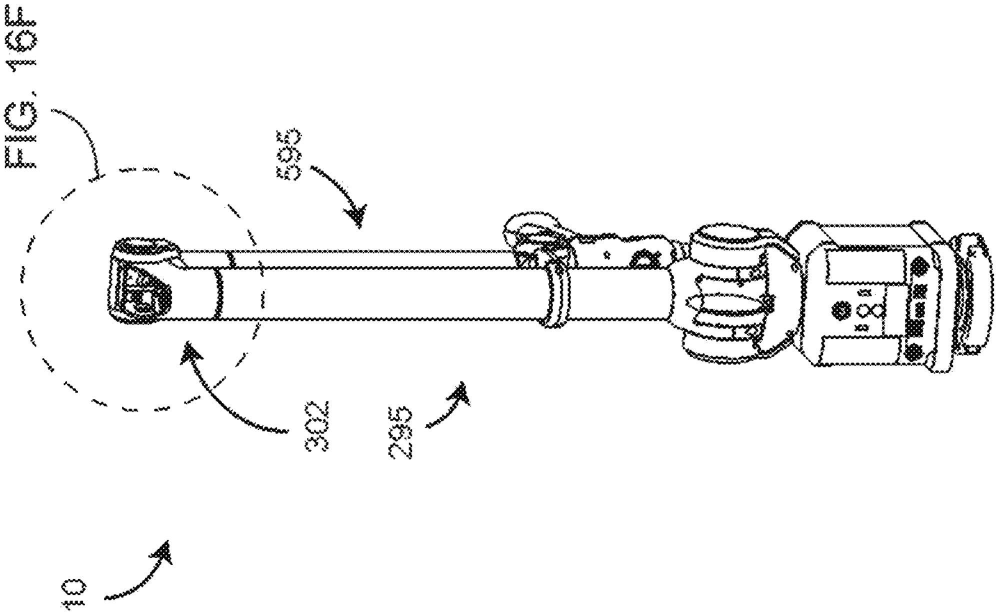
Figure 16H:
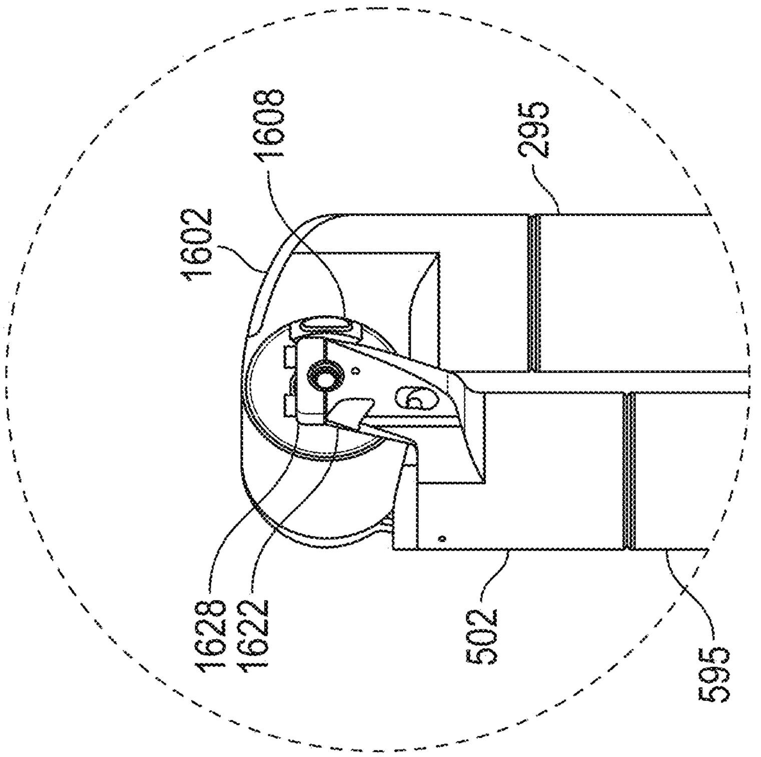
Figure 16G:
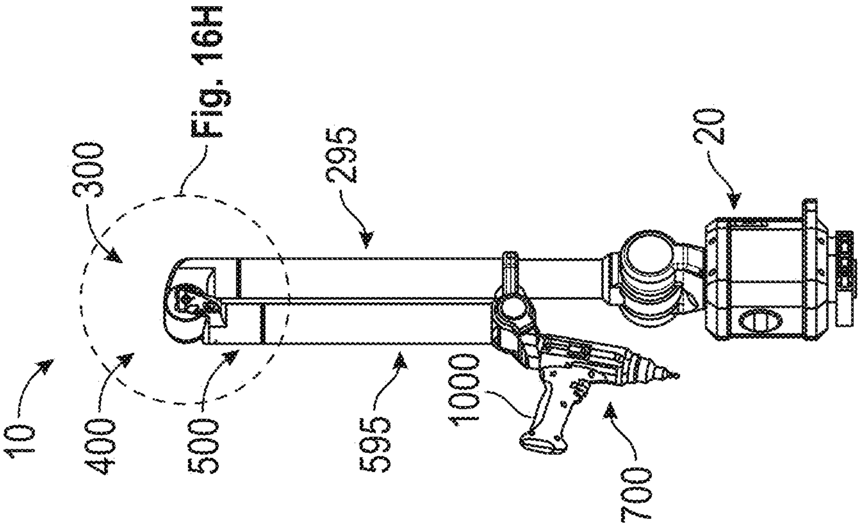

FIGS. 16E, 16F show the AACMM 10 including the first segment 295, second segment 595, and cartridge adapter 302. The cartridge adapter 302 includes a top-bumper opening 1616 that accommodates a top bumper 1602 as shown in FIGS. 16G, 16H. The encoder board with read heads 326 (FIG. 15B) is visible through the top-bumper opening 1616. An encoder connector 1612 and a temperature-sensor connector 1614 are attached to the encoder board 326. A cable (not shown) attaches the temperature-sensor assembly 350 and temperature sensor connector 1610 to the temperature sensor connector 1614. The temperature-sensor assembly 350 shown in FIG. 14B includes a temperature sensor 352, thermal putty 354, and screw 356. Readings from the temperature sensor are sent through the encoder board 326 (FIG. 15B) to the encoder connector 1612 where they are transferred to the first bus 2154 (FIG. 3). The cables 342 (FIG. 14B), which include the first bus 2154 and the second bus 2156, pass from the third/fifth-axis slip ring through a hole in the encoder board 326. The cable wires in the first bus 2154 attach to the encoder connector 1612, which in an embodiment is a T-connector, and continue on through the encoder-access hole 1606. The first housing hole 413 in the fourth/sixth-axis housing of FIG. 16B is aligned with the encoder-access hole 1606, thereby enabling the cable wires in the first bus 2154 to pass through the holes 1606 and 413 before attaching to a connector on the encoder board with read heads 426. The wires of the first bus 2154 pass back through the encoder-access hole 1606. The wires of the first bus 2154 and the second bus 2156 travel through the exit hole 1608, as is seen from a different perspective in FIG. 16H.

FIGS. 16G, 16H show that the fifth-axis yoke/receptacle 502 and the first-axis yoke cap 1628 clamp to the fourth/sixth-axis shaft 418 (FIG. 16B). Cable wires passing through the exit hole 1608 make one-and-a-half-turn cable loop 1618 traveling through a loop hole 1622 to enter the fifth-axis assembly 500. Side bumpers 1604 (FIG. 16F) are placed over some elements as shown in FIG. 16H.

Figure 17A:
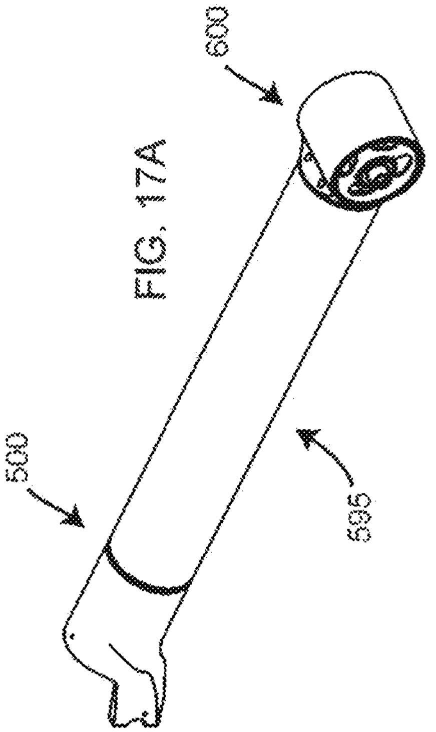
FIGS. 17A, 17B, 17C, 17D, and FIG. 17E are isometric, unassembled, front, side, and section views, respectively, of a fifth-axis assembly, a sixth-axis assembly, and a second segment according to an embodiment.
Figure 17B:
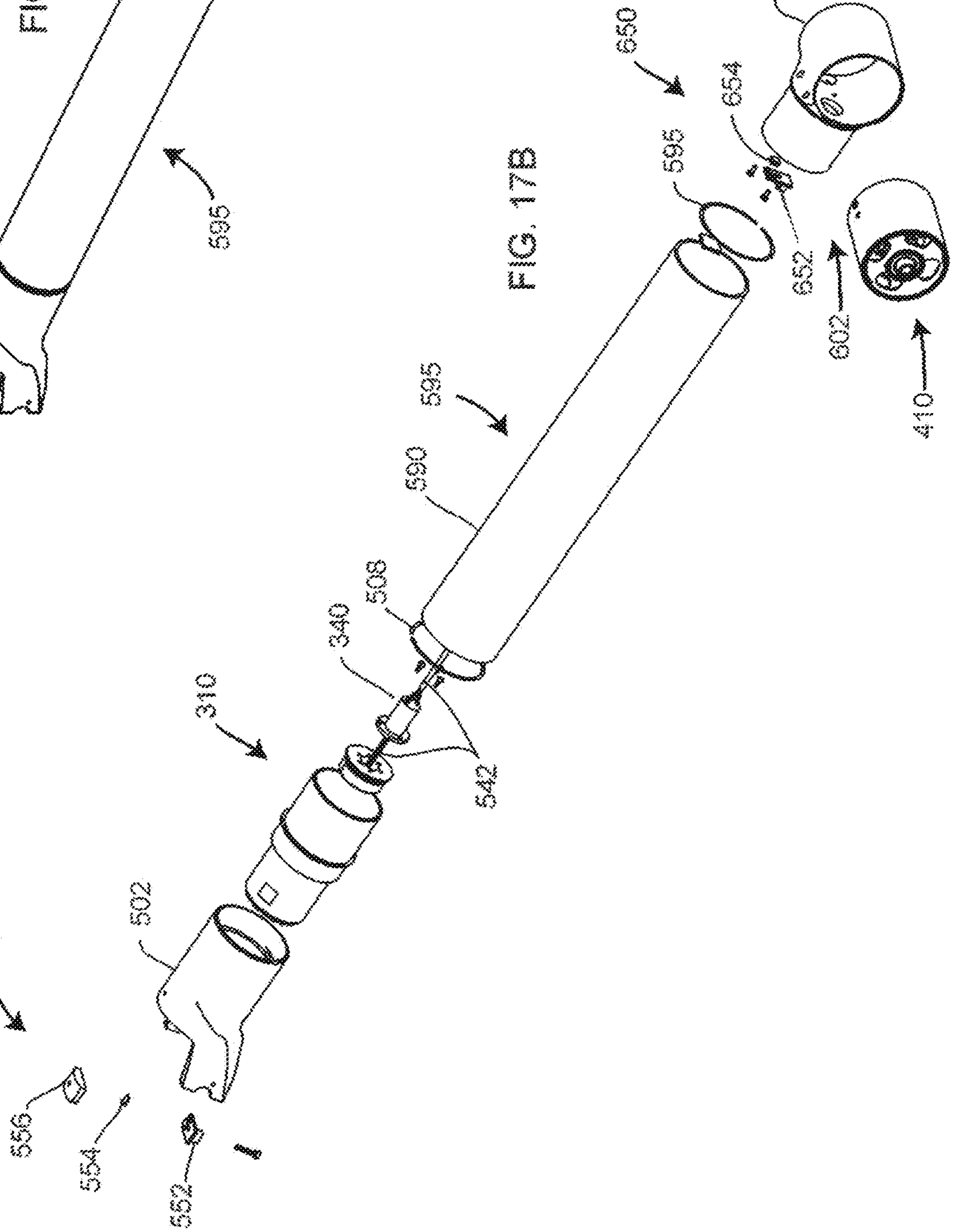
Figures 17C, 17D, 17E:
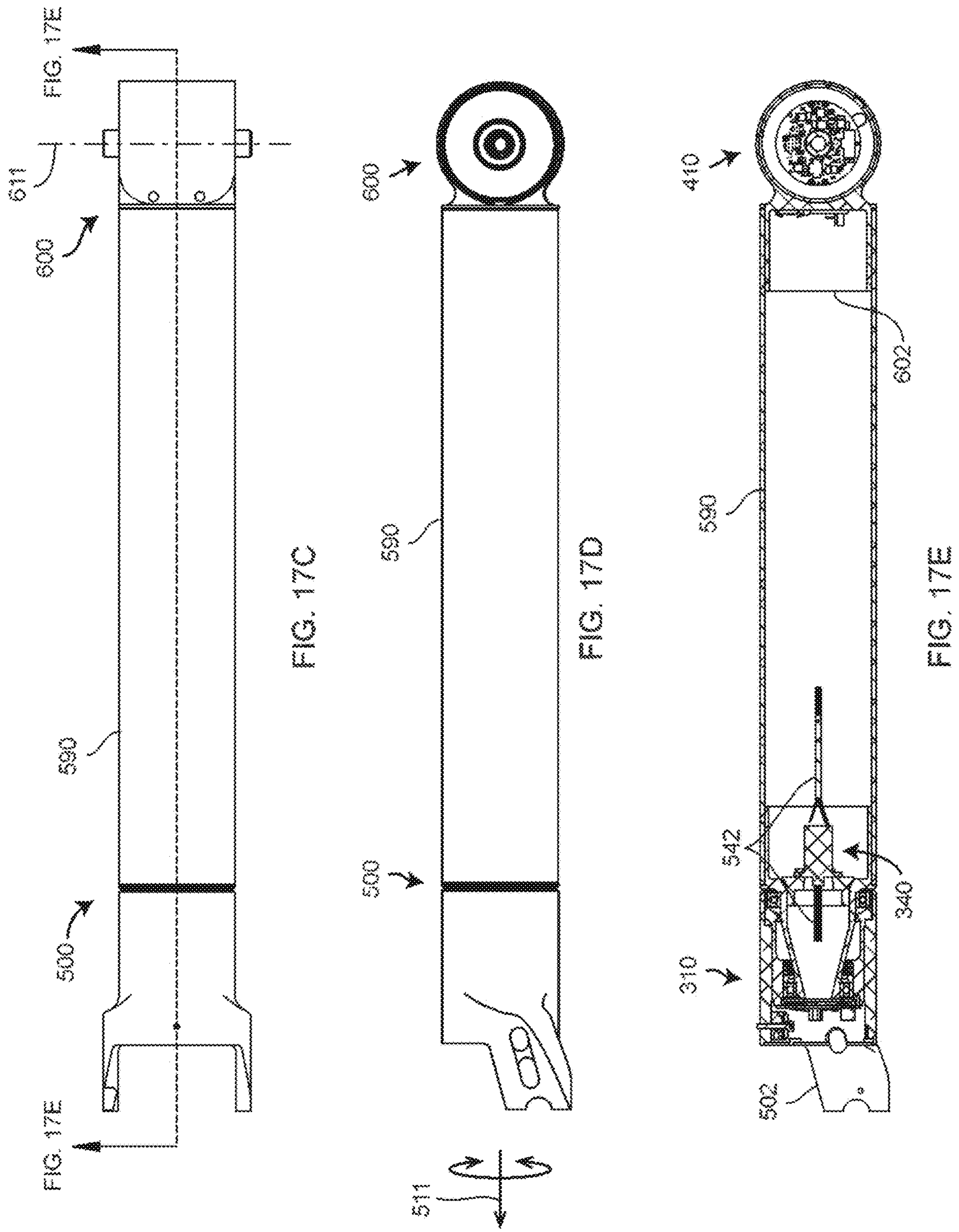

FIGS. 17A, 17B, 17C, 17D, 17E illustrate the fifth-axis assembly 500, the second segment 595, and the sixth-axis assembly 600. The fifth-axis assembly 500 includes a temperature-sensor assembly 550, a fifth-axis yoke/receptacle 502, a third/fifth-axis cartridge 310, and a conductive grounding ring 508. The second segment 595 includes a second-segment tube 590. The sixth-axis assembly includes a temperature-sensor assembly 650, a fourth/sixth-axis cartridge receptacle 606, and a cartridge adapter 602. As shown in FIGS. 17B, 17E, the third/fifth-axis cartridge 310 attaches to the inner portion of the second-segment tube 590, which in an embodiment is hollow. In an embodiment, another part of the third/fifth-axis cartridge 310 fits in the fifth-axis yoke/receptacle 502. In an embodiment, the temperature-sensor assembly 550 includes a temperature sensor 552, thermal putty 554, and a metal contact 556 that holds the temperature sensor 552 in place. In an embodiment, the third/fifth-axis cartridge 310 includes the elements described in FIGS. 15A, 15B, 15C, 15D, including the third/fifth-axis slip ring 340 and corresponding cables 542. The conductive grounding ring 508 provides electrical continuity between the cartridge 310 and the second-segment tube 590, which in an embodiment is made of carbon-fiber composite.

As shown in FIGS. 17B, 17E, the fourth/sixth-axis cartridge 410 fits inside the sixth-axis cartridge receptacle 606, which in turn attaches to the inside of the second-segment tube 590. In an embodiment, the temperature-sensor assembly 650 includes a temperature sensor 652 and thermal putty 654. In an embodiment, the fourth/sixth-axis cartridge 410 includes the elements described in FIGS. 16A, 16B, 16C, 16D. The conductive grounding ring 592 provides electrical continuity between the cartridge 310 and the second-segment tube 590. In an embodiment illustrated in FIG. 17D, the fifth-axis assembly 500 provides for swivel rotation about a fifth-axis 511. As illustrated in FIG. 17C, the sixth-axis assembly 600 provides for a hinge rotation of the fourth/sixth-axis shaft 418 (FIG. 16B) in the sixth-axis assembly 600 about the sixth-axis 611.

Figure 18A:
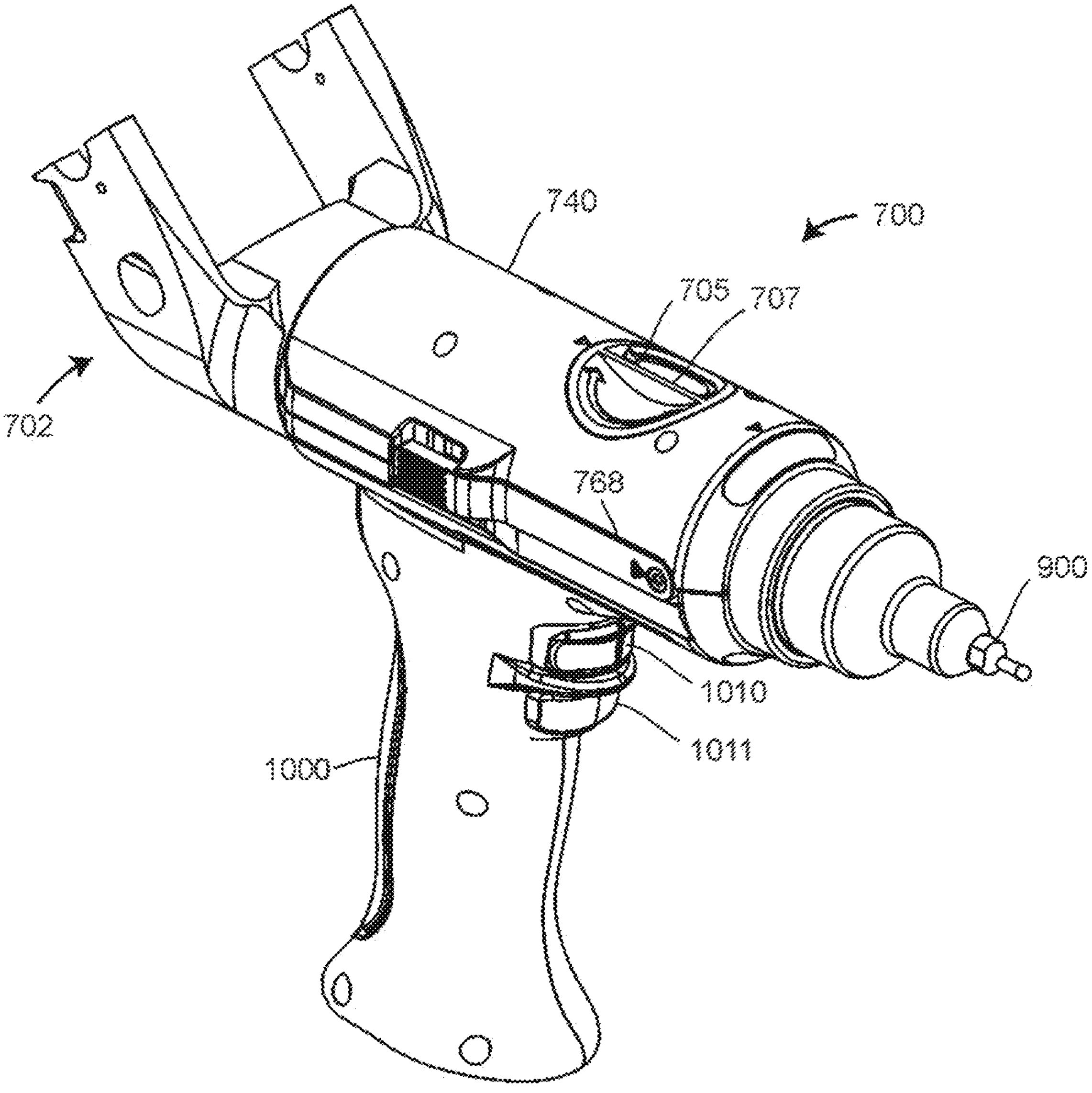
FIG. 18A is an isometric view of a seventh-axis assembly including a removable handle according to an embodiment.

In an embodiment, the AACMM 10 includes seven rotation axes, as illustrated beginning with FIG. 18A. In another embodiment, the AACMM 10 includes six rotation axes as is described in the aforementioned U.S. Pat. No. 10,663,274. It should be appreciated that while embodiments herein describe the end assembly as being seven-axis AACMM, this is for example purposes and the multiple accessory interface end assembly is also incorporated into a six-axis AACMM. In an embodiment illustrated in FIGS. 18A, 18B, 18C, 19A, 19B, 19C, 19D, 19E, 19F, 20A, the seventh-axis or end assembly 700 includes a seventh-axis housing/yoke 702, a shaft 750, a seventh-axis slip ring 710, a first accessory latch 768, a second accessory latch 769, upper end-effector buttons 2401, 2402 (on button plate 2400), a seventh-axis circuit board 820 (FIG. 19F), and a carrier 770. In an embodiment, the seventh-axis housing/yoke 702 attaches at one end to the fourth/sixth-axis shaft 418 (FIG. 16B) of the six-axis assembly 600. In this attachment, the seventh-axis housing/yoke 702 serves a yoke function. The seventh-axis housing/yoke 702 couples to outer races of a rear bearing 732 and to the outer races of a front bearing 736. The shaft 750 couples to inner races of the rear bearing 732 and the front bearing 736. In an embodiment, the shaft 750 rotates about a seventh axis 711 relative to the housing/yoke 702. In an embodiment, a wave washer 734 applies force to the outer race of the rear bearing 732. The inner race of the rear bearing 732 is press fit onto the shaft 750. This results in preload being applied to both the rear bearing 732 and the front bearing 736.

In an embodiment, the encoder disk 724 is bonded/glued to the shaft 750, centered, and allowed to cure. An encoder board with read heads 722 is attached to a read-head adapter 720, which in turn is attached to the housing/yoke 702. A seventh-axis slip ring 710 includes a slip-ring housing 712, a slip-ring shaft, a slip-ring flange, a front slip-ring cable 718, a rear slip-ring cable 717, bus connectors 719 attached to the rear slip-ring cable 717, and bus connectors 839 attached to the front slip-ring cable 718. In an embodiment, the slip-ring flange is attached to an adapter plate hat is coupled to the yoke/housing 702. The slip-ring shaft 714 rotates independently of the slip-ring housing 712 and turns in response to force applied by wires that twist as the shaft rotates about the seventh axis 711. The seventh-axis slip ring 710 maintains electrical continuity among corresponding wires in the front slip-ring cable 718 and the rear slip-ring cable 717 even as the slip-ring shaft 714 rotates relative to the slip-ring housing 712. In an embodiment, each of the rear slip-ring cable 717 and the front slip-ring cable 718 include wires of the first bus 2182 and the second bus 2184. A T-connector 2152 associated with a T-cable 2154 of the first bus 2182 attaches to a board connector 2174 of the encoder board with read heads 722.

The button plate 2400 is removably coupled to a seventh assembly housing 740. In the illustrated embodiment, that housing 740 includes an opening sized to receive the button plate 2400. In this embodiment, the button plate 2400 includes a lip 2404 that engages a front edge 741 of housing 740. The button plate 2400 further includes a movable/slidable latch member 2406 having a projection 2408. The latch member 2406 is biased, such as by a compression spring 2408 into an extended position. To couple the button plate 2400 to the housing 740, the operator retracts the latch member 2406, such as by applying a force (e.g. with their thumb) on the projection 2408. After placing the button plate 2400 in the opening of the housing 740, the latch member 2406 is released, allowing the latch member 2406 to slide under and engage a rear edge 744 of the housing 740 opening to couple the button plate 2400 to the housing 740.

A seventh-axis circuit board 820 is shown in FIGS. 19G, 19H. In an embodiment, the seventh-axis circuit board 820 includes a left circuit board 824, a pair of upper circuit boards 822A/822B, and a right circuit board 826. In an embodiment, first upper circuit board 822A is electrically and mechanically connected by a pair first flex connector 828A, 828B. The second upper circuit board 822B is electrically and mechanically connected by a pair of second flex connectors 830A/830B. In an embodiment illustrated in FIG. 20A, the seventh-axis circuit board 820 wraps around a shaft circuit-board support 752.

The button plate 2400 is removed and replaced with a handle 1000 (FIG. 18C) attached to the end assembly 700. The handle 1000 includes a latching mechanism 1001 that couples the handle 1000 to the housing 740 in a similar manner as the latch member 2406. In this embodiment, the latching mechanism 1001 includes a slidable actuator 1003 having a contact surface 1005, the actuator 1003 translates longitudinally within the handle 1000 in response to the operator pressing the contact surface 1005, such as with their thumb for example. The actuator 1003 is coupled to a latch member 1007 that moves from an extended position to a retracted position in response to the operator pressing the contact surface 1005. The latch member 1007 is biased towards the extended position, such as with the compression spring 1009 for example. To couple or uncouple the handle 1000 from the housing 740, the operator presses the contact surface 1005 causing the latch member 1007 to move to the retracted position. This movement engages/disengages the latch member 1007 from the edge 744.

The handle/button-plate connector 832 makes electrical connection with the handle-to-arm connector 1022 (FIG. 18E) of the handle 1000. In an embodiment, an arm-end processor 2220 (FIG. 5) is included on the seventh-axis circuit board 820. The hard-probe assembly 900 is one type of tactile probe. Other types of tactile probes are discussed herein below.

Figure 19A:
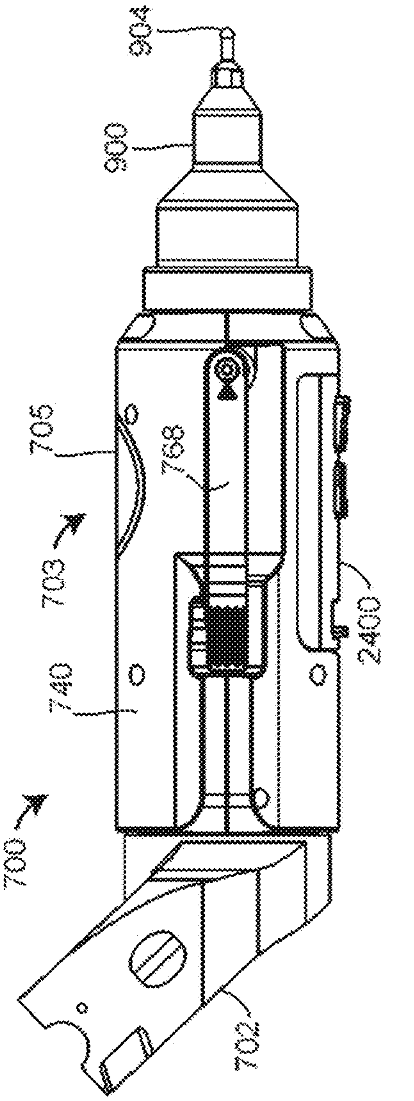
FIG. 19A and FIG. 19B are side views of a seventh-axis assembly having a tactile probe assembly latched in placed and detached, respectively, according to an embodiment.
Figure 19B:
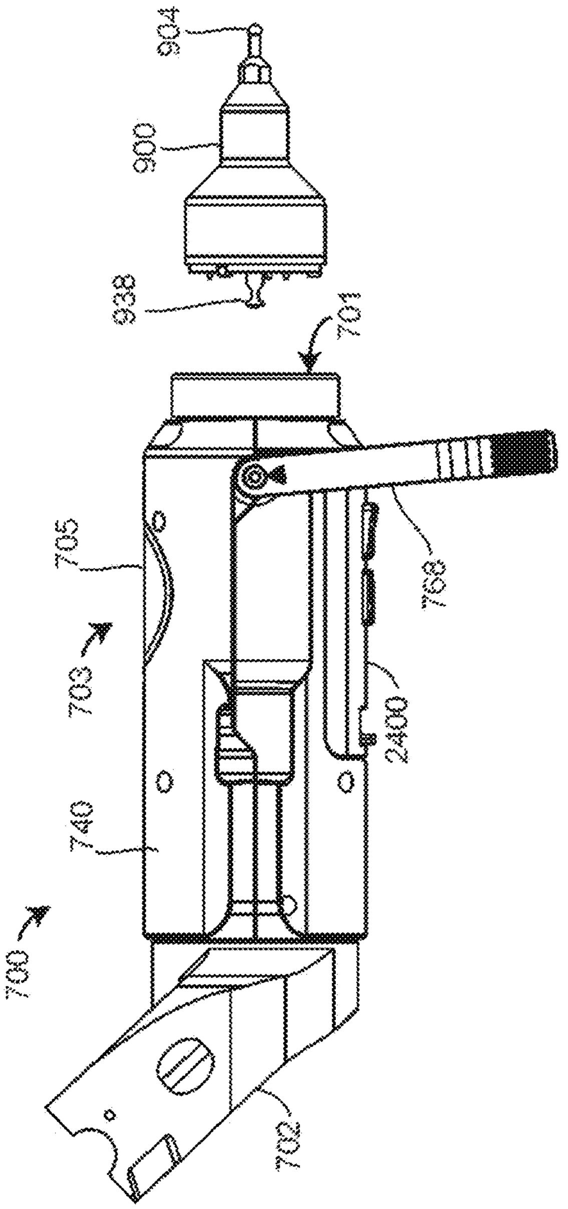
Figure 19C:
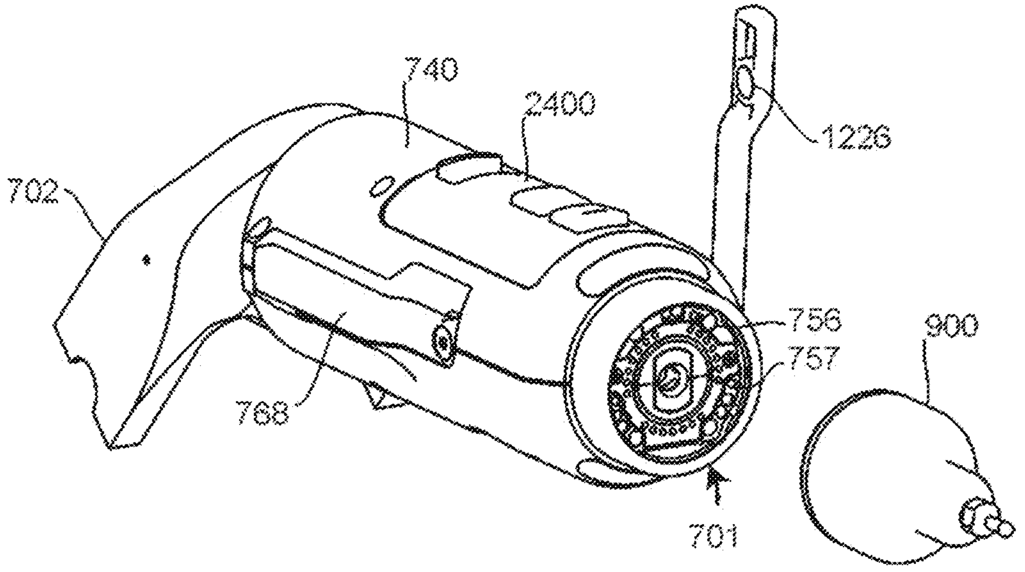
FIG. 19C and FIG. 19D are a first isometric view and a second isometric view, respectively, of a seventh-axis assembly and a detached tactile probe assembly according to an embodiment.

FIG. 19A shows a hard-probe assembly 900 coupled to the first accessory interface 701 of the end assembly 700. In the illustrated embodiment, the first interface 701 is positioned co-axially with the axis 711 on the end of the end assembly 700. As discussed in more detail herein, the hard-probe assembly 900 is further interchangeably coupled with the second accessory interface 703. FIG. 19B shows the hard-probe assembly 900 released from the first accessory interface 701. In an embodiment, the release is obtained by moving a first latch 768 to release an extension element, such as a pull stud 938, of the hard-probe assembly 900. It should be appreciated that when the hard-probe assembly 900 is coupled to the second accessory interface 703, the release is obtained by moving the second latch 769. The hard-probe assembly 900 includes a probe tip 904 that an operator holds in contact with an object to be measured. When a designated actuator, such as button 2401 or button 2402 for example, is pressed, the encoders in the seven-axis assemblies 100, 200, 300, 400, 500, 600, 700 send synchronized encoder readings to the base processor electronics 2040, the encoder readings being synchronized to the capture signal generated by the trigger and capture circuit 2058 of the base processor electronics 2040. These encoder readings are combined with other recorded characteristics of the AACMM 10 to calculate 3D coordinates corresponding to a center of the probe tip 904. By measuring a number of points on the surface of an object with the probe tip 904, and by knowing the radius of the probe tip, the 3D coordinates of the object surface can be determined.

Figure 19D:
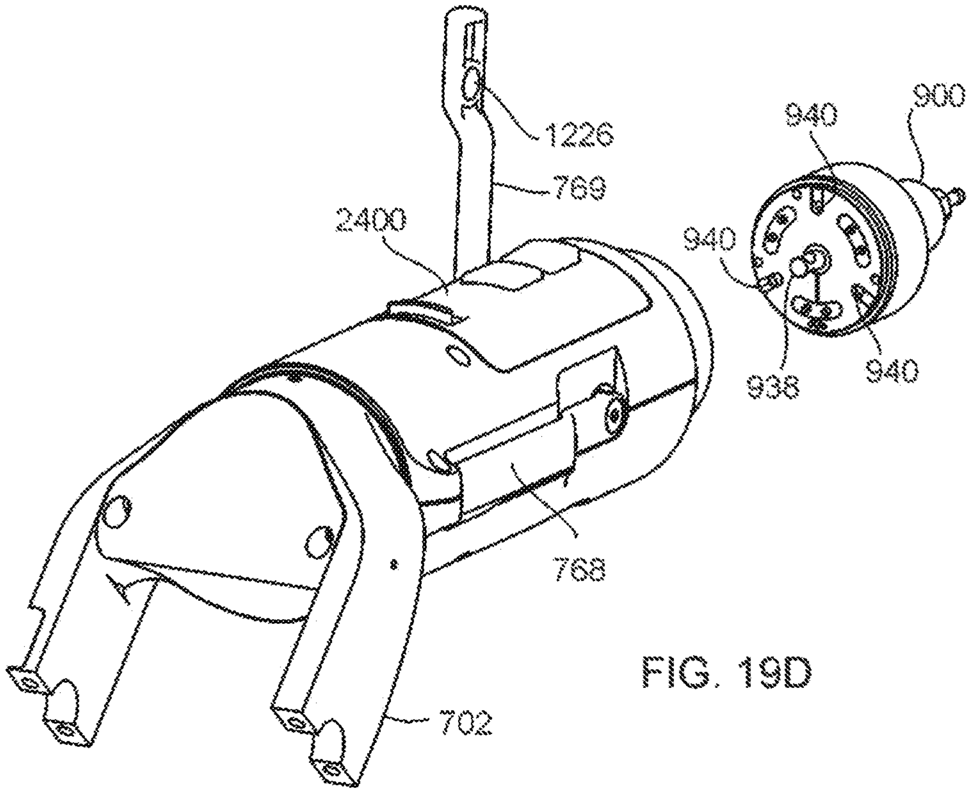
Figure 19E:
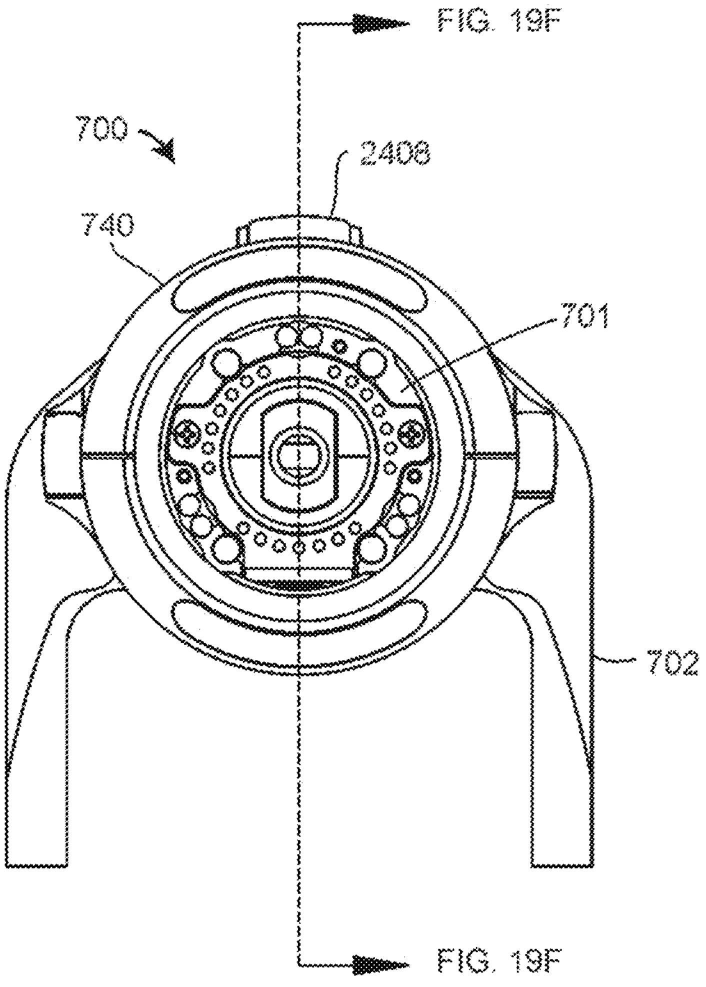
FIG. 19E and FIG. 19F are front and section views of a seventh-axis assembly according to an embodiment.

The first latch 768 and second latch 769 each includes a magnet 1226 near an end of the latch arm as shown in FIG. 19D. The magnet 1226 is attracted to the magnet embedded in the cover 740. The magnets 1226 hold the latches 768, 769 against the cover 740 unless moved/pulled away from the cover 740 by an operator. The latches 768, 769 each include coupling assemblies 777, 779 respectively that cooperate with the first accessory interface 701 and the second accessory interface 703 to couple accessories such as hard-probe 900 to the end assembly 700.

Figure 19F:
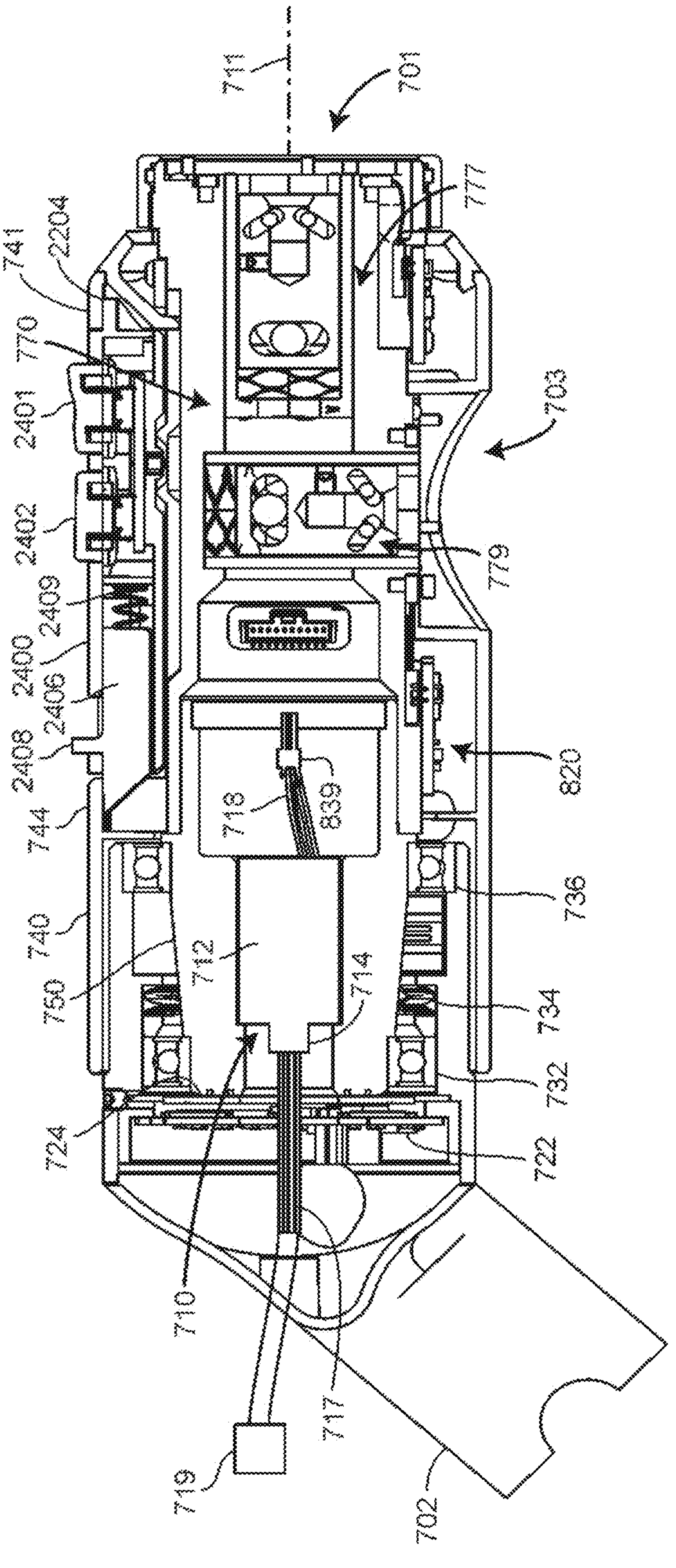
Figure 20A:
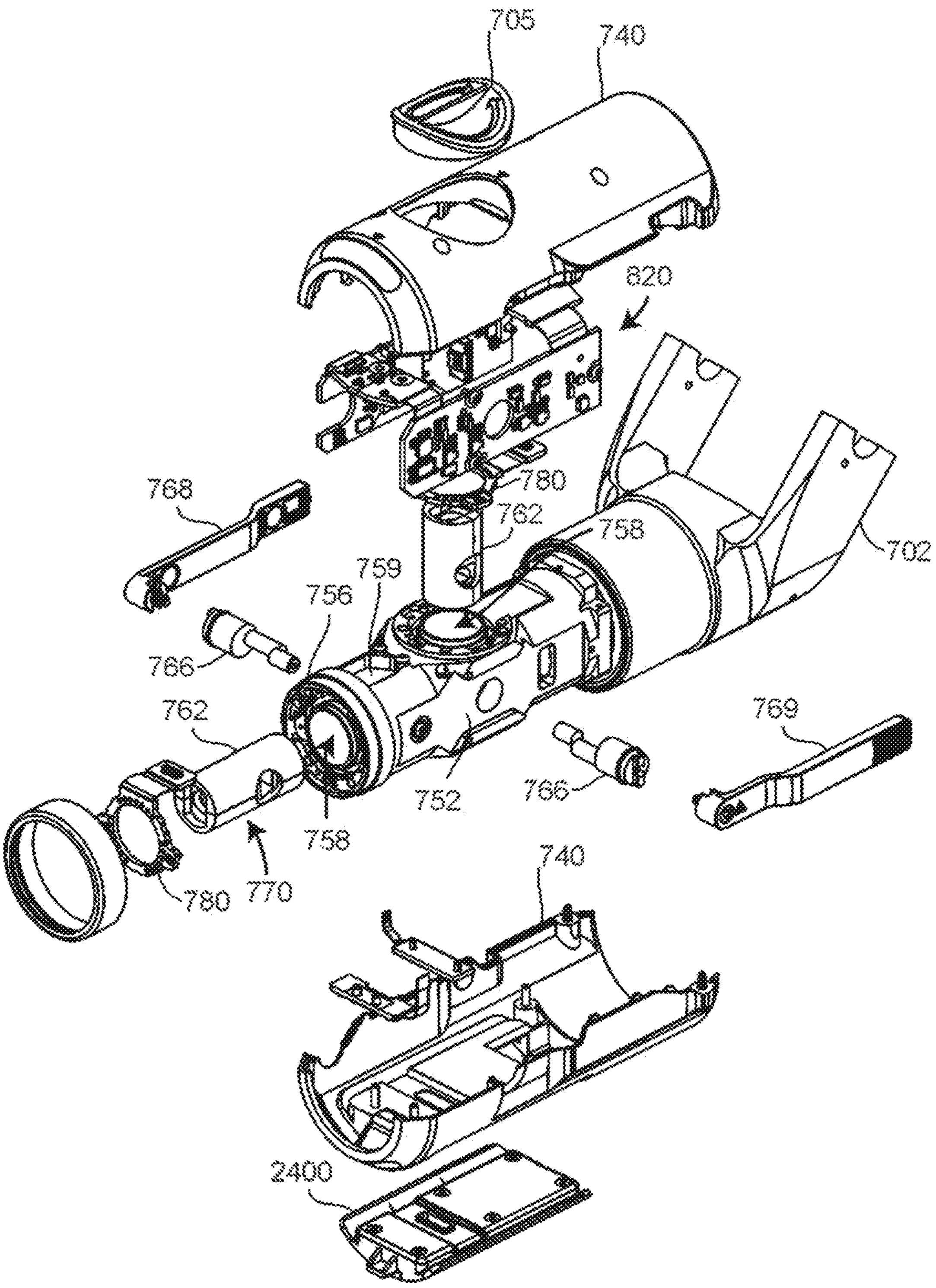
FIG. 20A is an exploded view of a seventh-axis assembly according to an embodiment.
Figure 20B:
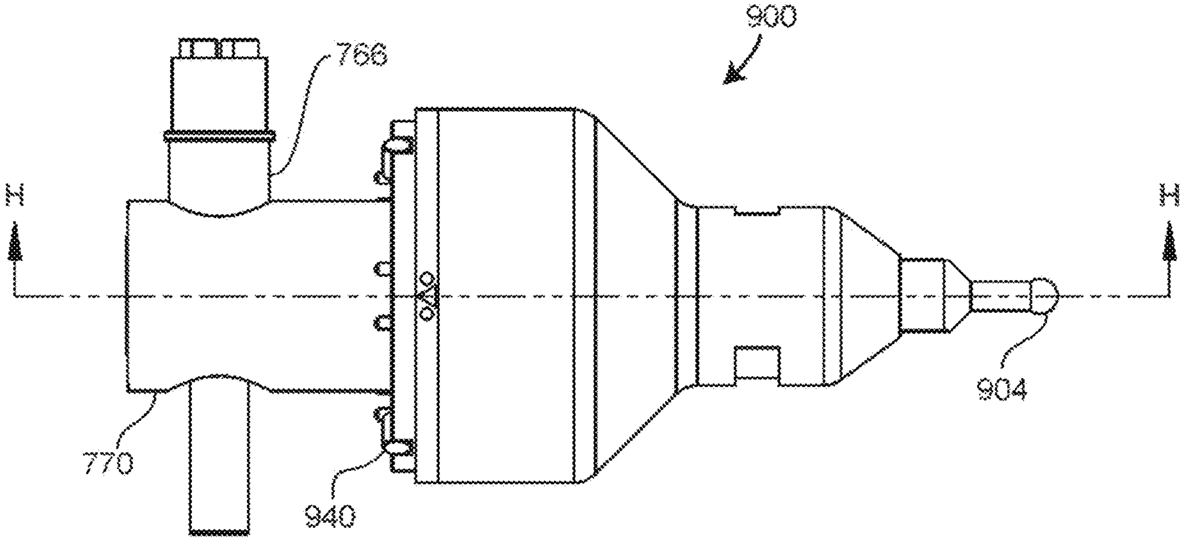
FIG. 20B and FIG. 20C are top and section views, respectively, of a tactile probe assembly and coupling elements in an open position according to an embodiment.
Figure 20C:
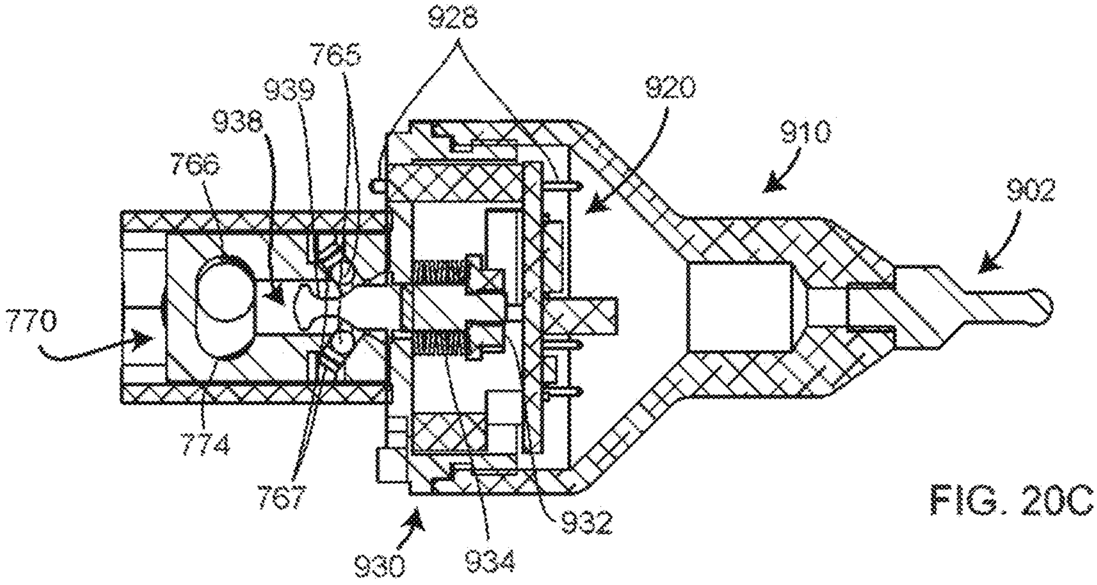
Figure 20D:
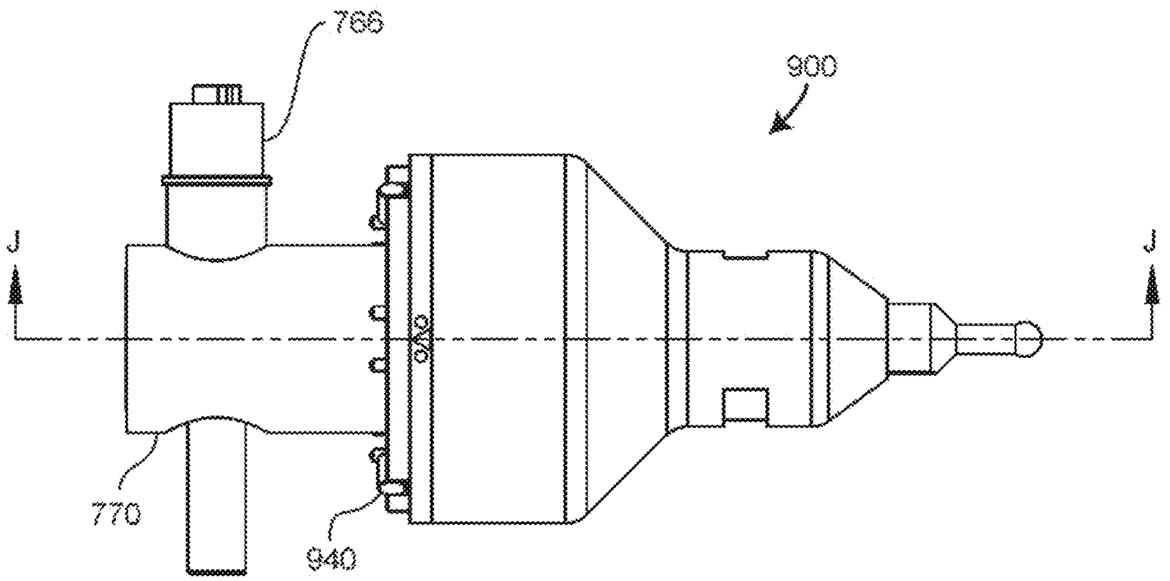
FIG. 20D and FIG. 20E are top and section views, respectively, of a tactile probe assembly and coupling elements in an closed position according to an embodiment.
Figure 20E:
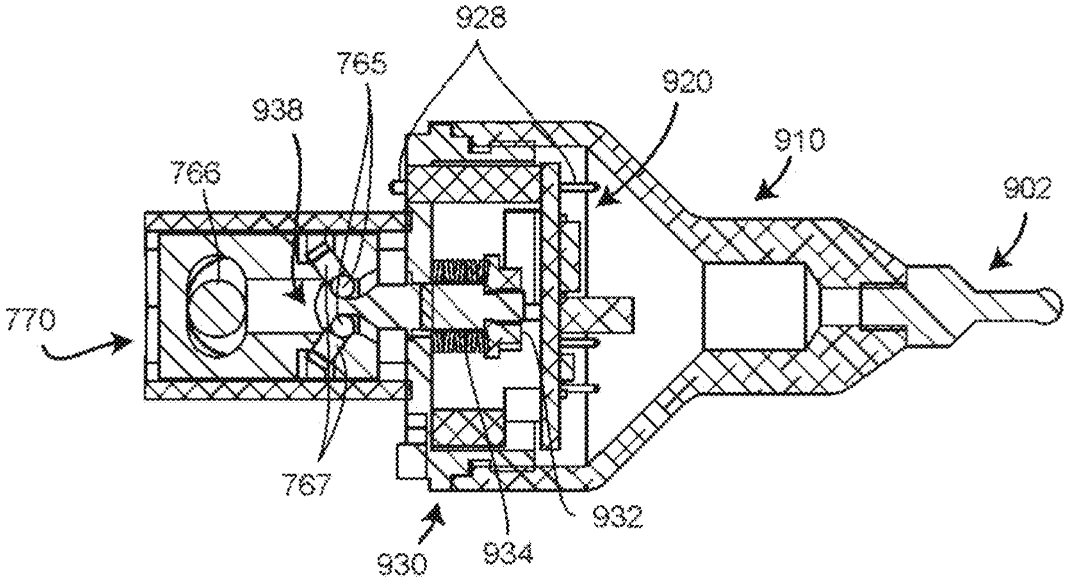
Figure 20F:
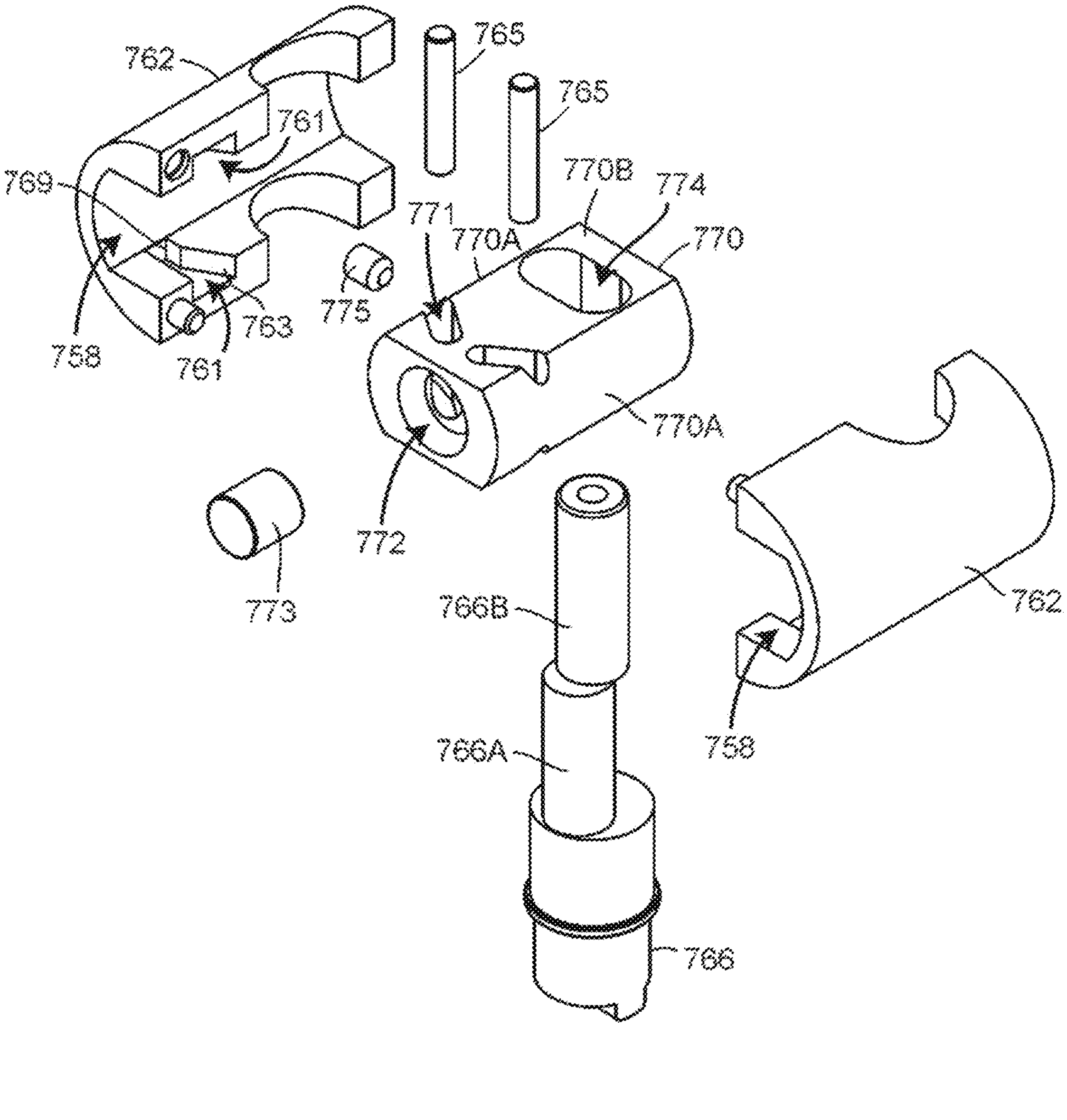
FIGS. 20F, 20G, and FIG. 20H are various views of a tactile probe assembly and coupling elements according to another embodiment.
Figure 21A:
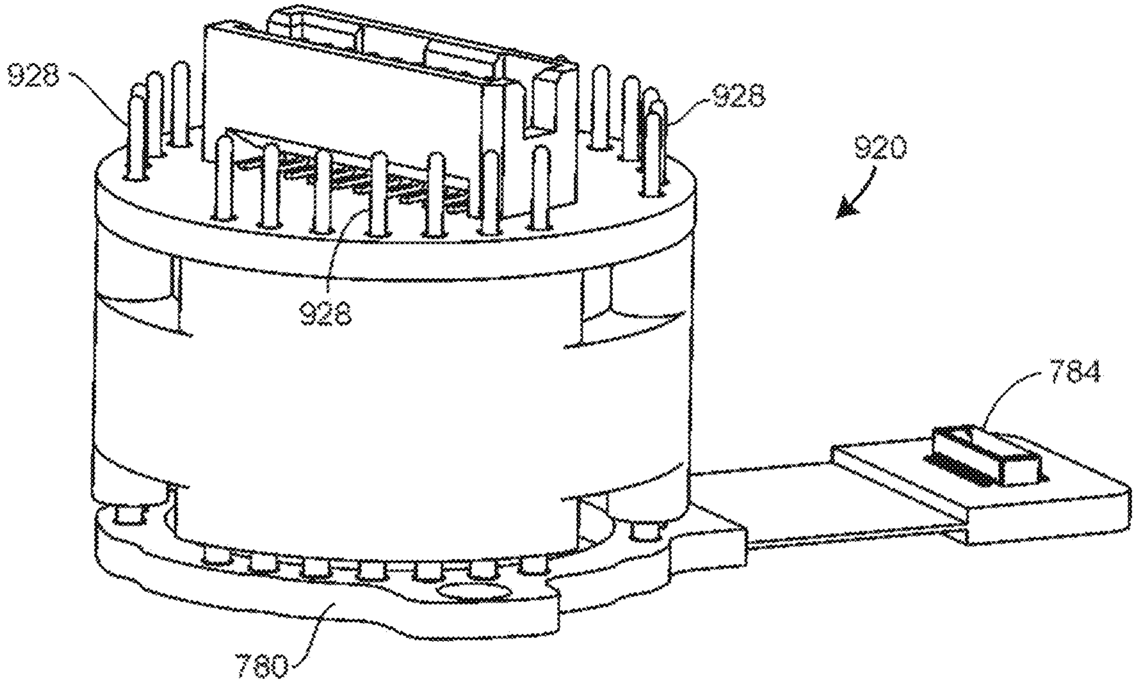
FIG. 21A is an isometric view of a probe electrical interface and an interface board according to an embodiment.
Figure 21B:
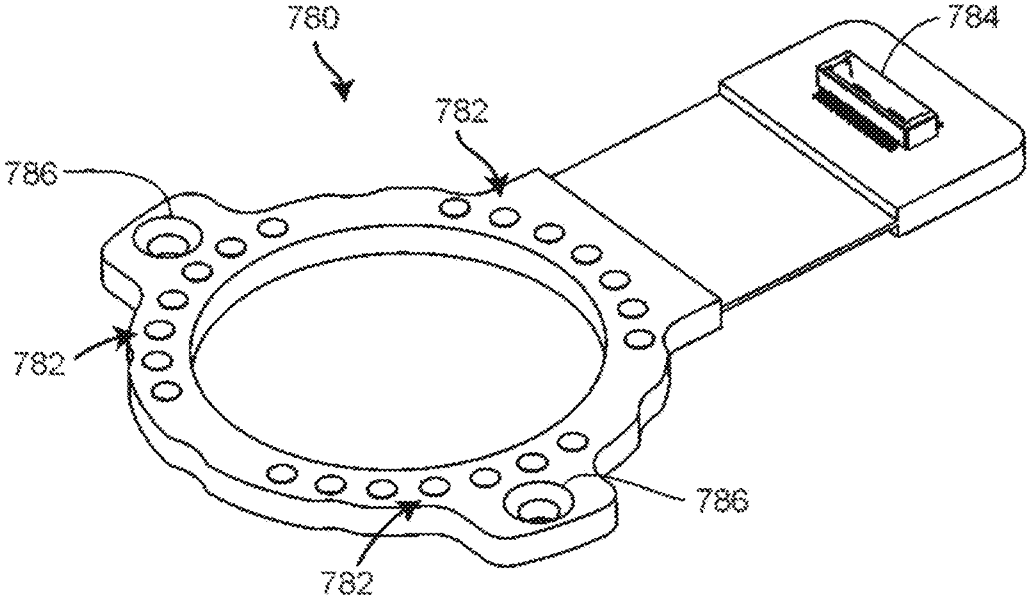
FIG. 21B is an isometric view of an interface board according to an embodiment.
Figure 22E:
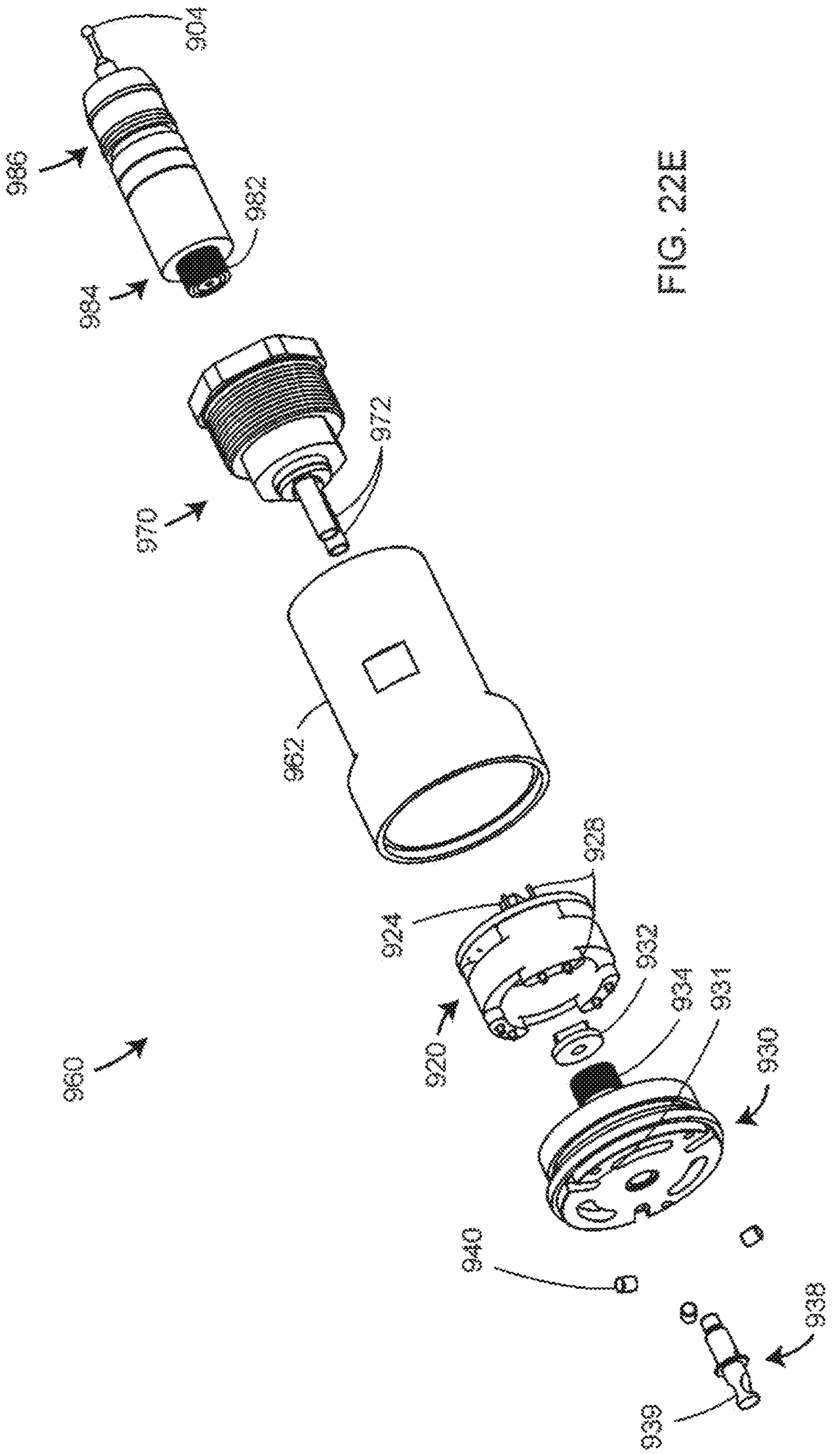

Referring now to FIGS. 19F, 20A, 20F an embodiment of the first coupling assembly 777 is shown and described. It should be appreciated that while only the first coupling assembly 777 and first accessory interface 701 are described herein, the second coupling assembly 779 and the second accessory interface 703 are configured the same. In an embodiment, the second coupling assembly 779 and the second accessory interface 703 are oriented 90 degrees relative to the first accessory interface 701. In the first coupling assembly 777, the ends of the latch 768 are attached to a camshaft 766 (FIG. 20A) by camshaft fasteners 765 (FIG. 20F). The camshaft 766 passes through a camshaft hole 774 of the carrier 770 as illustrated in FIGS. 19F, 20A. The carrier 770 is surrounded by two guides 762 that slide, together with the carrier 770, into a guide cavity 758 shown in FIGS. 20A, 20F. Outside the guide cavity 758, there are three pairs of kinematic balls 756 and three alignment pins 757. When the three pairs of kinematic balls 756 are brought into contact with three kinematic cylinders 940, the resulting contact between the kinematic cylinders 940 and the kinematic balls 756 provides that the hard probe 900 is removed and repositioned repeatably. The three kinematic cylinders 940 fit into kinematic cylinder sockets 931 as shown in FIG. 22E. The three alignment pins 757 are positioned to provide that each of the kinematic cylinders 940 is matched to the corresponding pair of kinematic balls 756. The alignment pins 757 fit loosely into alignment holes 941 (FIG. 22C) without touching the sides of the alignment holes 941. An interface board 780 shown in FIGS. 20A, 21B is attached by screw holes 786 to the front of the end assembly 700. The interface board 780 includes electrical contact pads 782 that make electrical contact with spring loaded pins 928 in the probe electrical interface 920 shown in FIG. 21A. Electrical signals and power are routed through the interface board 780 to a connector adapter 784 shown in FIGS. 19F, 21B. A space for the connector adapter 784 is provided in the connector cutout 759 of FIG. 20A.

In the carrier 770, an adapter hole 772 (FIG. 20A, 20F) is sized to accept the extension element or pull stud 938. When the latch 768 is lifted away from the cover 801, the pull stud 938 is released, enabling the hard-probe assembly 900 to be freely moved away from the end assembly 700. When the latch 768 is moved to contact the cover 801, the pull stud 938 is held firmly in place within the adapter hole 772. The open (released) and locked cases are illustrated in FIGS. 20B, 20C, 20D, 20E. FIGS. 20B, 20C illustrate a position of the components in which the hard-probe assembly 900 is not locked in place against the end assembly 700 in the first accessory interface 701. In this position, the camshaft 766 moves the carrier 770 toward the front of the end assembly 700. This causes leaf springs 767 to collapse, removing force from preload pins 765. In this state, the pull stud 938 is not constrained. FIGS. 20D, 20E illustrate a position of the components in which the hard-probe assembly 900 is locked in place with the hard-probe assembly 900 held firmly against the end assembly 700. In this position, the camshaft 766 moves the carrier 770 away from the front of the end assembly 700. This causes the leaf springs 767 to expand, pressing the preload pins 765 into a pull stud notch 939 of the pull stud 938.

Figure 20G:
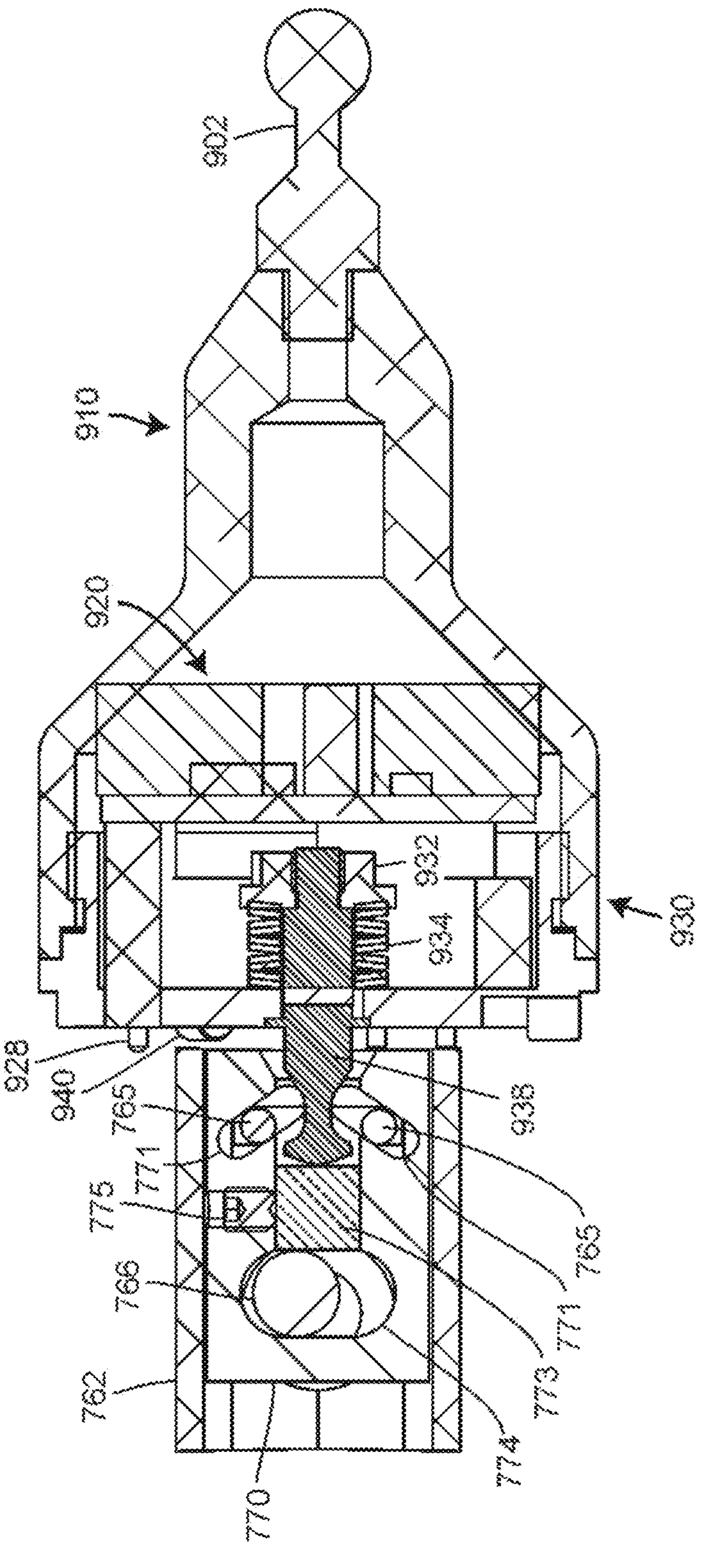
Figure 20H:
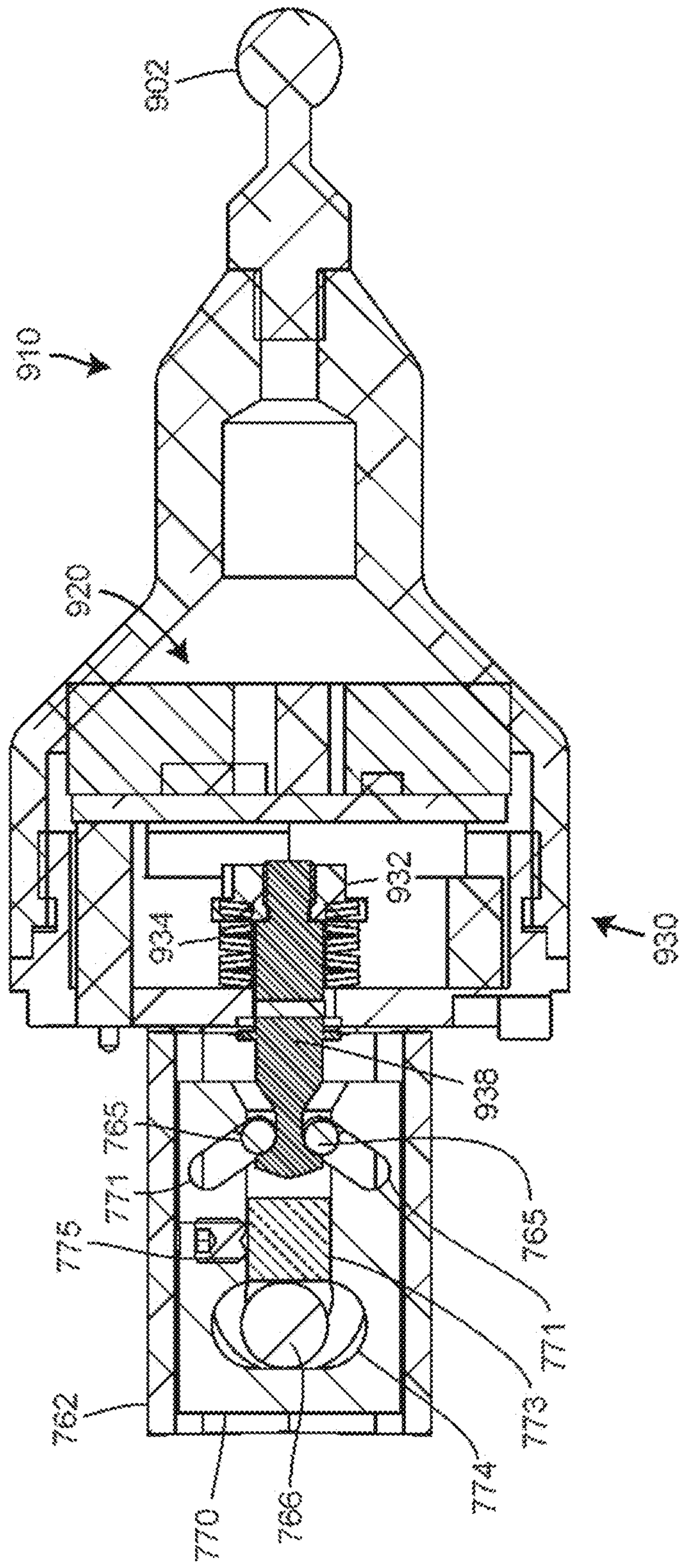

Referring now to FIGS. 20F, 20G, 20H, another embodiment is shown of an assembly for retaining the probe assembly 900 to the carrier 770. The guides 762 are coupled together to define a cavity 758. The cavity 758 is sized and shaped to receive the carrier member 770. In the illustrated embodiment, the carrier member 770 has a pair of opposing cylindrical surfaces 770A and a pair of opposing planar surfaces 770B. As discussed herein with reference to FIGS. 20A-20E, the carrier member 770 includes a slot or elongated hole 774 that receives cam lobes 766A, 766B. The carrier member 770 also includes a pair of opposing slots 771 that extend through the carrier member 770 and are sized to receive the preload pins 765. The preload pins 765 move within slots 761 of guides 762 that have an angled surface 763 and notch 769.

The carrier 770 further includes an adapter hole 772 having a pull stud notch 939 extending therefrom. The adapter hole 772 is sized to accept the pull stud 938. The adapter hole 772 is further sized to receive a magnet member 773. In an embodiment, the magnet member 773 is retained in the adapter hole 772 by a set screw 775. As discussed in more detail herein, the magnet member 773 holds the pull stud 938 (and thus the probe assembly 900) in place when the preload pins 765 are in an unlocked position.

As discussed herein with reference to FIGS. 20A-20E, when the latch 768 is moved from the unlocked to the locked position, the cam shaft 766 moves the carrier 770 within the cavity 758. As a result, the preload pins 765 move from an unlocked position (FIG. 20G) to a locked position (FIG. 20H). It should be appreciated that when in the locked position, the preload pins 765 engage the pull stud 938 to retain the probe assembly 900. Unlike the embodiment of FIGS. 20A-20E, there are no leaf springs to bias the preload pins 765. In this embodiment, when the latch 768 is in the unlocked position, the carrier member 770 is positioned to place the magnet member 773 in a position to magnetically engage the pull stud 938 with sufficient force to retain the probe assembly 900 (FIG. 20G). As the latch 768 is moved to the locked position, the carrier member 770 moves in a direction away from the probe assembly 900, causing the preload pins 765 to engage the pull stud 938.

It should be appreciated that the engagement of the pull stud 938 by the magnet member 773 allows the probe assembly 900 to be removably coupled to the carrier 770. It further provides advantages in allowing the probe assembly

900 to be retained until the latch 768 is engaged, thus reducing the risk of the probe assembly accidentally falling out or off of the carrier 770.

As discussed previously, the second accessory interface 703 is configured in the same manner as the first accessory interface 701 such that accessories are mounted to either interface 701, 703 or each interface 701, 703 includes an accessory simultaneously. The coupling or uncoupling of the accessory from the second accessory interface 703 is performed by moving/rotating the latch 769.

In an embodiment, the second accessory interface 703 is enclosed by a cover member 705 as shown in FIG. 18A, 23E, 23F, 23G, 23H when an accessory is not attached. In an embodiment, the cover member 705 has a contoured or curved shape to conform with the shape of the housing 740. The cover member 705 includes a rib or handle 707 such that when the operator twists or rotates the cover member 705, the outer edge of the cover member slides along the edge of the opening 709 of the housing 740 allowing the operator to remove the cover member 705. In an embodiment, the cover member 705 includes at least one magnet 713. The at least one magnet 713 cooperates with at least one magnet 715 of the second accessory interface 703 to retain the cover member 705 on the cover 740.

Figure 18B:
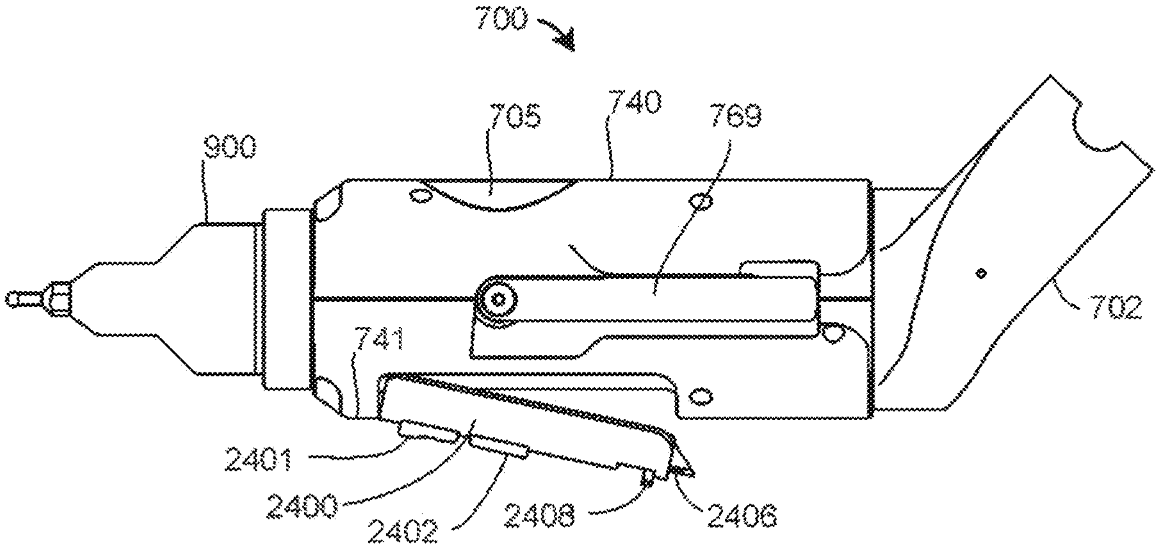
FIG. 18B is a side view of a seventh-axis assembly including a removable button-plate according to an embodiment.
Figure 18C:
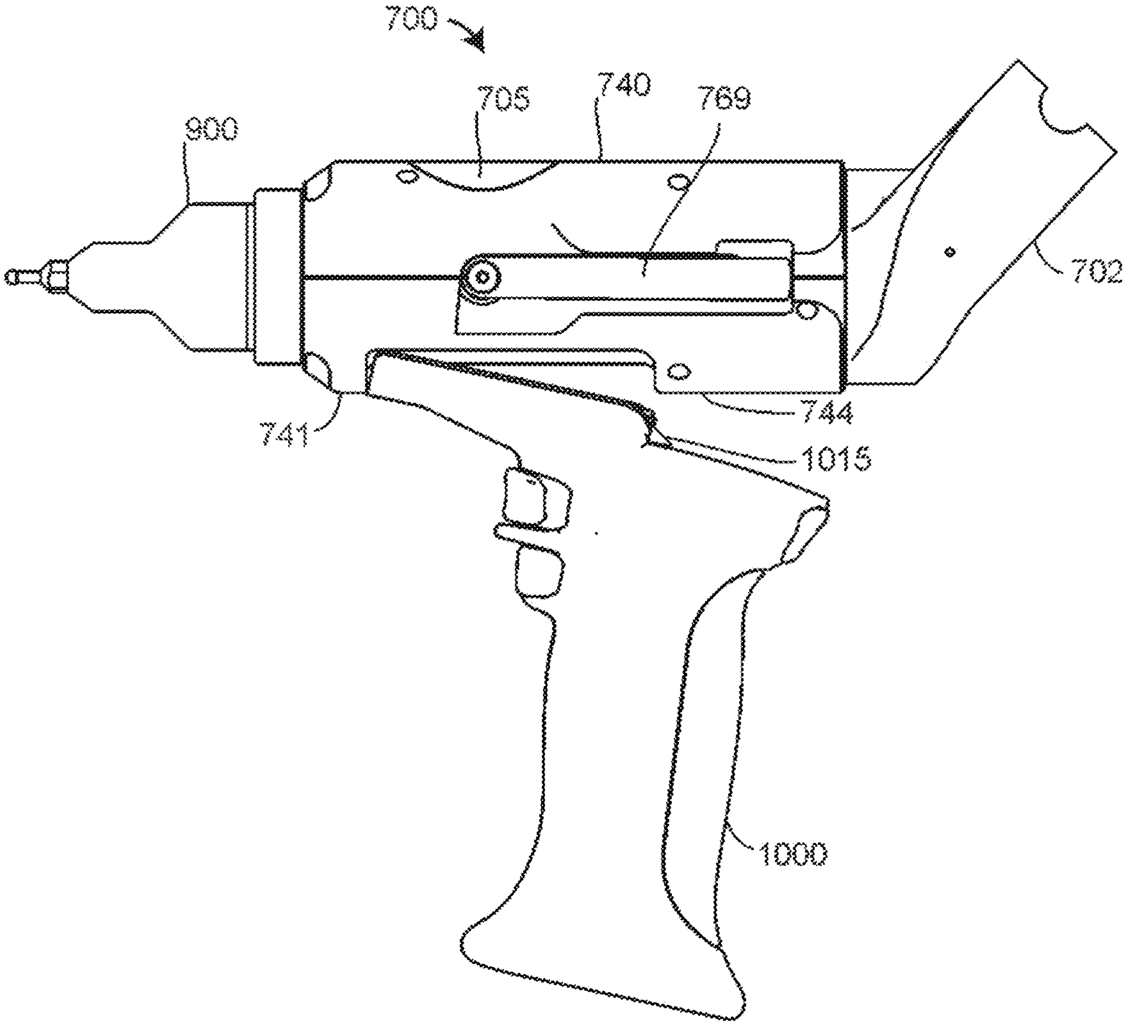
FIG. 18C is a side view of a seventh-axis assembly showing a removable handle being attached according to an embodiment.

FIGS. 18B, 18C illustrate an embodiment of a method in which button plate 2400 and handle 1000 are attached to the end assembly 700. In this embodiment, to couple the button-plate 2400, the operator engages the lip 2404 with the edge 741 of housing 740. The button-plate 2400 is then rotated to engage an angled surface 2406 of latch member 2406 into contact with the edge 744 of the housing 740. By pressing the button-plate 2400 towards the housing 740, the latch member slides towards a retracted position causing the spring 2408 to compress. When the edge of the angled surface 2406 moves past the edge 744 of housing 740, the spring 2408 biases the latch member 2406 to an extended position that engages the latch member 2406 against the inner surface of the housing 740 near edge 744. To remove the button-plate, the operator applies a force to projection 2408 to retract the latch member 2406 and disengage it from the housing 740. The button-plate includes a connector, similar to connector 1022, that engages connector 832 (FIG. 5) to allow the buttons 2401, 2402 to transmit electrical signals to the arm-end processor 2220.

Figure 18D:
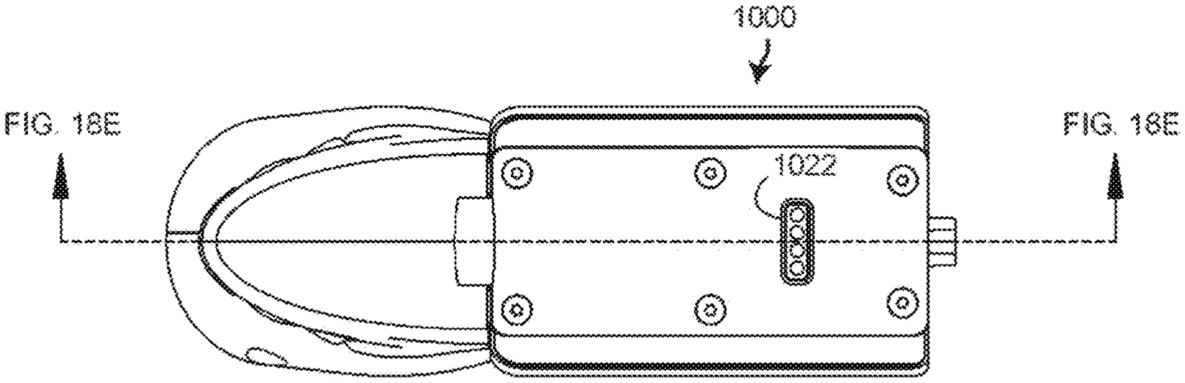
FIG. 18D and FIG. 18E are a top view and a section view, respectively, of a removable handle according to an embodiment.
Figure 18E:
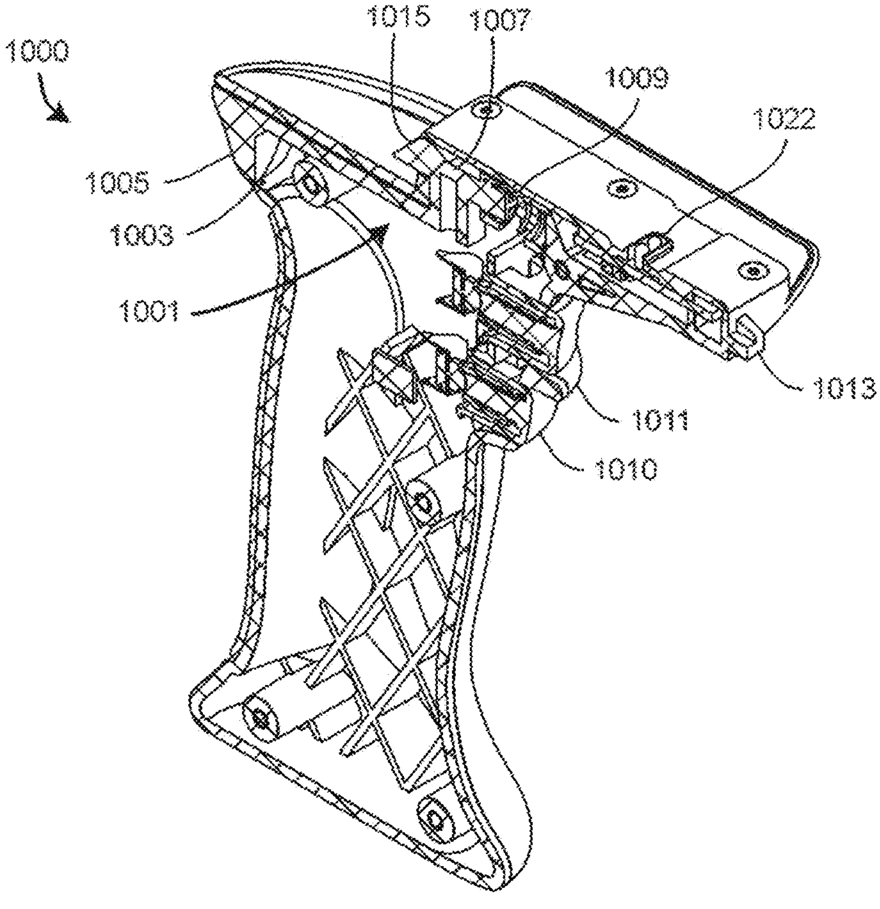

The handle 1000 couples to the housing in a similar manner as shown in FIG. 18C, 18D, 18E. The handle 1000 includes a latching mechanism 1001 that couples the handle 1000 to the housing 740 in a similar manner as the latch member 2406. In this embodiment, the latching mechanism 1001 includes a slidable actuator 1003 having a contact surface 1005, the actuator 1003 translates longitudinally within the handle 1000 in response to the operator pressing the contact surface 1005, such as with their thumb for example. The actuator 1003 is coupled to a latch member 1007 that moves from an extended position to a retracted position in response to the operator pressing the contact surface 1005. The latch member 1007 is biased towards the extended position, such as with the compression spring 1009 for example.

To couple the handle 1000 from the housing 740, the operator inserts a lip 1013 into the opening in the housing 740 (FIG. 18C) to engage the inner surface of the edge 741. As the handle 1000 is rotated towards the housing 740, an angled surface 1015 engages the edge 744 causing the latch member 1007 to compress the spring 1009. When the latch member 1007 clears the edge 744, the spring 1009 moves the latch member 1007 in the opposite direction to engage the inner surface of edge 744. To remove the handle 1000, the operator presses the contact surface 1005 causing the latch member 1007 to move to the retracted position. This movement engages/disengages the latch member 1007 from the edge 744.

In an embodiment illustrated in the handle buttons 1010, 1011 send electrical signals through the handle-to-arm connector 1022 to the arm-to-handle connector 832 to the seven-axis arm-end electronics 2210 shown in FIG. 5.

Referring now to FIGS. 23A, 23B, 23C, 23D an embodiment is shown of a line scanner or laser line probe (LLP) 1100. In an embodiment, the LLP 1100 includes an interface 1020 that provides mechanical and electrical connection to the first accessory interface 701 or the second accessory interface 703. In an embodiment, the interface 1020 includes a pull stud 1024, and an interface 1020. In the illustrated embodiment, the pull stud 1024 and interface 1020 connect with the first accessory interface 701 and second accessory interface in the same manner as is described herein, such as in reference to FIGS. 20A-20H and FIG. 21A and FIG. 21B.

In an embodiment, the LLP 1100 includes a projector 1110 and a camera 1120 separated by a baseline distance and operable to perform a triangulation measurement to determine 3D coordinates of points illuminated by a line of laser light or a pattern of light, which might be laser light or another type of light. In an embodiment, the LLP 1100 further includes a marker light source 1125 that projects a beam of light that intersects a projected line of light in a spot, thereby indicating to a user a recommended position for locating an object to be measured. In an embodiment, the LLP 1100 includes a color camera 1121 that further enhances measured 3D coordinates with color. The camera 1120 and projector 1110 are included in a camera-projector portion 1106 that further includes an outer shell 1108. In an embodiment, the elements of the LLP 1100, including the camera 1120 and the projector 1110 are supported by electronics, including a controller 1040. In an embodiment, some electronics that support processing of collected LLP data is included in the seventh axis circuit board 1104.

In an embodiment, the outer shell 1108 includes an inlet 1115 (FIG. 23J) opening on a rear wall 1112 that is in fluid communication with a channel 1114. In an embodiment, the channel 1114 extends along the length of the rear wall 1112 and has an outlet on an end opposite the inlet 1115. A fan (not shown) is operably disposed in the channel 1114 to move air from the inlet 1115 to the outlet. The channel 1114 is at least partially defined between the rear wall 1112 and an inner wall 1116. In an embodiment, the inner wall 1116 is in direct thermal communication with the controller 1040. In an embodiment, a side of the inner wall 1116 opposite the channel 1114 includes a heat sink.

Referring now to FIGS. 20B, 20C, 20D, 20E, 21A, 21B another accessory shown, sometimes referred to as a hard-probe 900. Elements of the hard-probe assembly 900 include a probe stylus assembly 902, a probe body 910, a probe electrical interface 920, a lock nut 932, a spring stack 934, a probe cap 930, a pull stud 938, and kinematic cylinders 940. In an embodiment, the probe stylus assembly 902 is threaded to screw into the probe body 910. In an embodiment, the probe stylus assembly 902 includes a spherical probe tip 904. In an embodiment, the probe body 910 includes a hollow portion sized to accept the probe electrical interface 920. In an embodiment, the probe electrical interface 920 includes a probe electrical interface circuit board 922, a probe interface body 926, and spring-loaded pins 928 that pass through the probe interface body 926. In an embodiment, the probe electrical interface board 922 includes a processor 923, a memory 925, and a touch-probe connector adapter 924. In an embodiment, the hard-probe assembly 900 further includes a lock nut 932, a spring stack 934, a probe cap 930, a pull stud 938 and kinematic cylinders 940. The lock nut 932 and spring stack 934 hold the pull stud 938 against the probe cap 930. The kinematic cylinders 940 are affixed to the probe cap 930.

The hard-probe assembly 900 discussed above is an example of a tactile probe, so named because a tactile probe includes an element (such as the probe tip 904) that makes physical contact with an object under test. Besides the hard-probe assembly 900, another type of tactile probe accessory is a touch-trigger probe assembly 960 illustrated in FIGS. 22A, 22B, 22C, 22D, 22E. Unlike the hard-probe assembly 900 that returns electrical signals from encoders in each of the axis assemblies 100, 200, 300, 400, 500, 600, 700 in synchrony with the capture signal produced by the base processor electronics 2040, the touch-trigger probe assembly 960 generates a trigger signal in response to the probe tip 904 lightly touching an object under test. The trigger signal is sent from the touch-trigger probe assembly 960 to each of the encoders, which respond by immediately measuring an angle. Afterwards, the encoders return the measured values over the first bus 2182 (FIG. 2). Touch-trigger probes are popular to use on Cartesian coordinate measuring machines (CMMs), which often include a probe stylus that is relatively long and thin. Such a stylus is susceptible to bending when pressed against an object, which results in a relatively large error in measured 3D values. By generating a trigger signal when the probe tip first lightly touches the object, the bending of the stylus is minimized. In most cases, the stylus on a tactile probe of an AACMM 10 is relatively short and thick, resulting in relatively small bending errors. However, in some cases, bending of a stylus is an important consideration when making AACMM measurements. In these cases, the touch-trigger probe assembly 960 is advantageously used.

In an embodiment, a touch-trigger probe assembly 960 includes a touch-trigger probe module 986, a touch-trigger probe body 984, a touch-trigger probe adapter 970, a probe body 962, a probe electrical interface 920, a lock nut 932, a spring stack 934, a probe cap 930, and a pull stud 938. In an embodiment, the touch-trigger probe module 986 includes a probe tip 904. Touch-trigger probe modules are commercially available from many manufacturers. In an embodiment, the touch-trigger probe body 984 is selected to have a desired length. The touch-trigger probe body 984 includes a screw connector mount 982 that screws into the touch-trigger probe adapter 970. The touch-trigger probe adapter 970 sends electrical signals, including trigger signals, down interface wires 972 to a touch-probe connector adapter 924, which is part of a probe electrical interface 920. The touch-trigger probe adapter 970 and the probe electrical interface 920 fit in a probe body 962. The remaining elements of the touch-trigger probe assembly 960 are the same as for the hard-probe assembly 900 and were described herein above with respect to FIGS. 20A, 20B, 20C, 20D, 20E, 21A, 21B.

It should be appreciated that configurations of the accessories and the types of accessories shown in FIGS. 23A-23K are not intended to be limiting and other accessories or other combinations of accessories, including but not limited to the touch-trigger probe assembly 960, is coupled to the end assembly 700.

Figure 24:
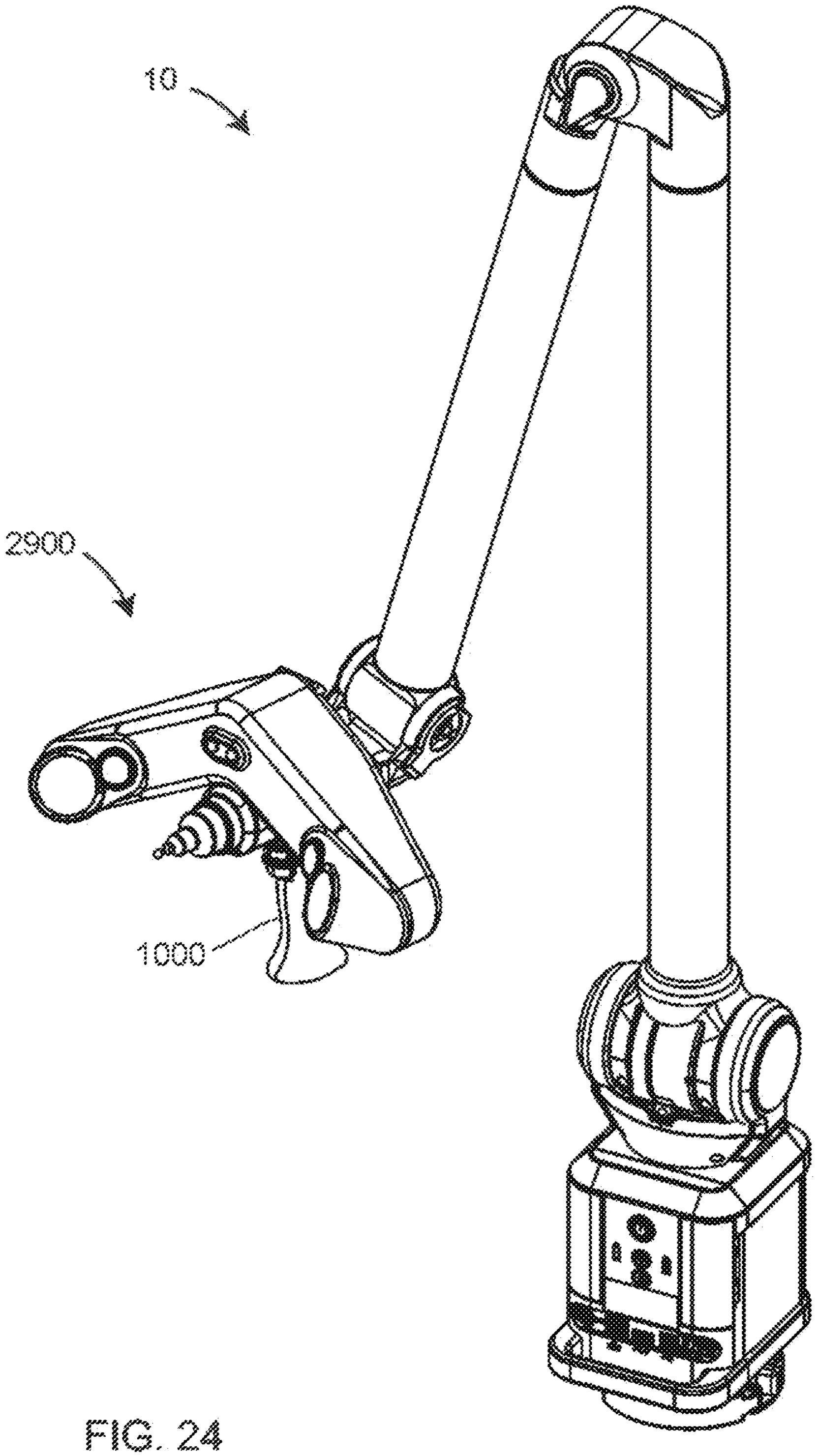
FIG. 24 is an isometric view of an accessory noncontact 3D measuring device coupled to an AACMM according to an embodiment.
Figure 25:
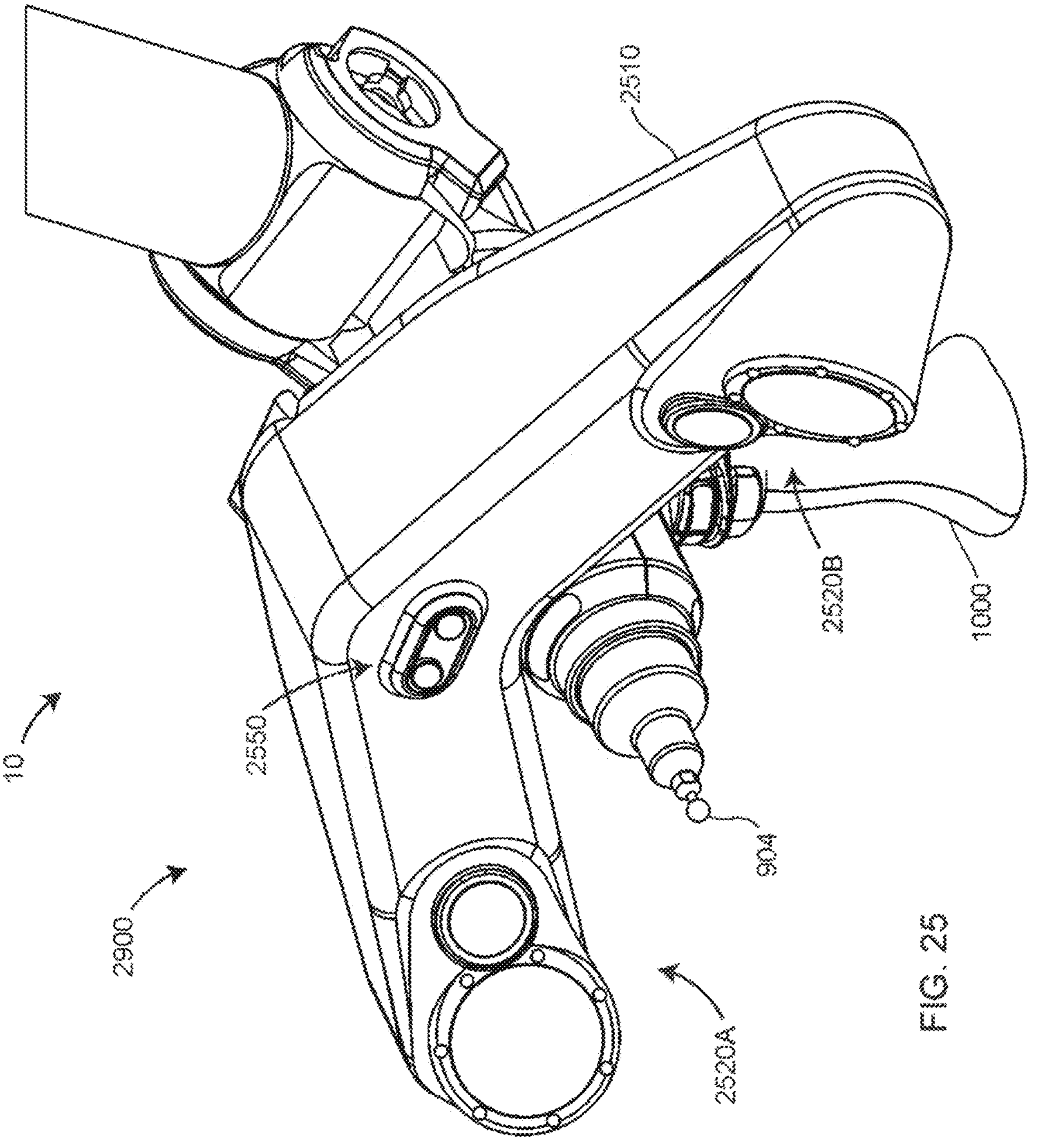
FIG. 25 is an isometric view of an accessory noncontact 3D measuring device coupled to an AACMM 10 according to an embodiment.
Figure 26:
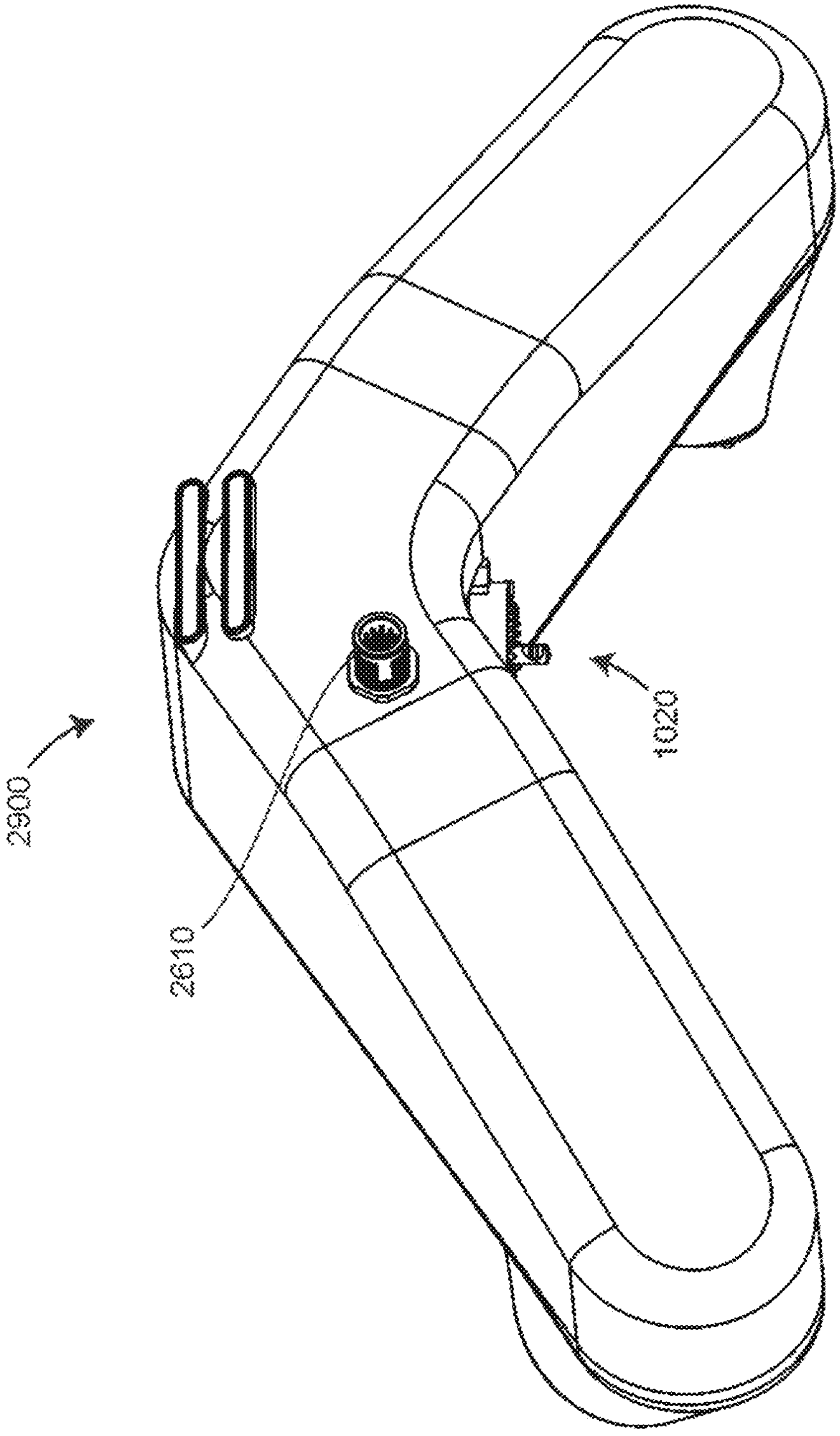
FIG. 26 is an isometric view of an accessory noncontact 3D measuring device according to an embodiment.
Figure 27:
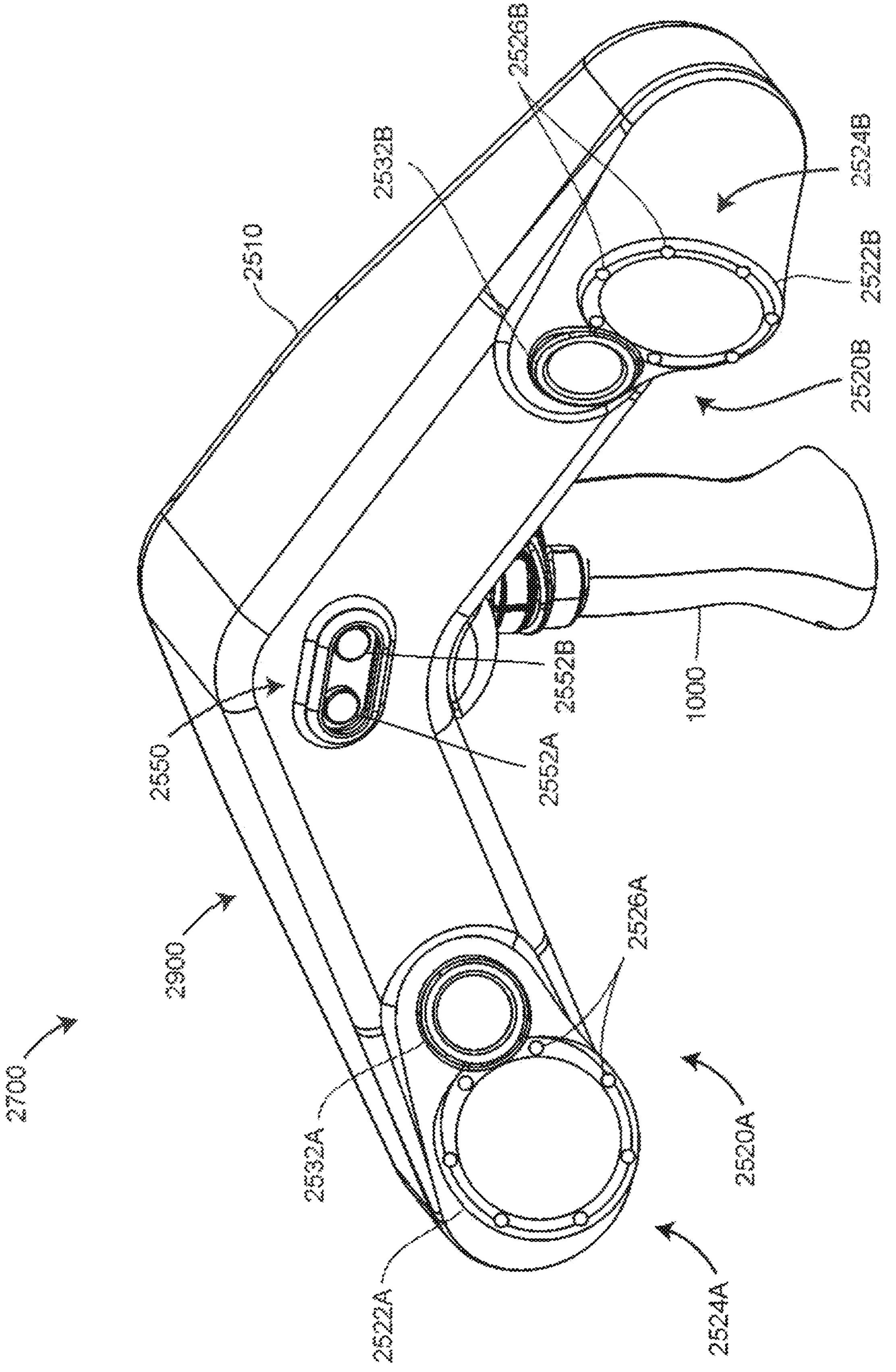
FIG. 27 is an isometric view of a handheld 3D scanner according to an embodiment.
Figure 28:
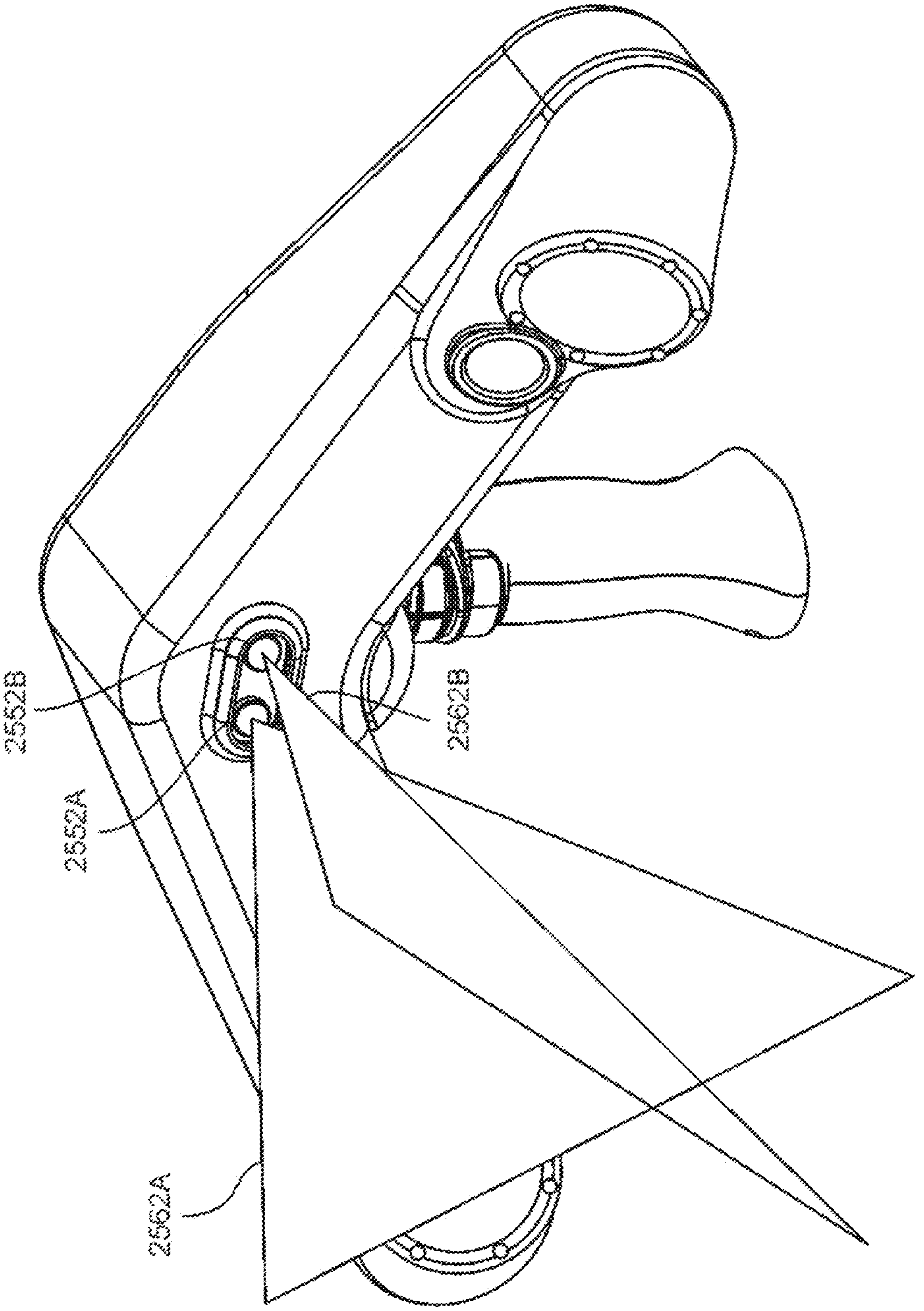
FIG. 28 is an isometric view of an isometric view of a handheld 3D scanner projecting two patterns of light according to an embodiment.

In an embodiment, an accessory noncontact 3D measuring device 2900 is attached to an AACMM 10 as illustrated in FIGS. 24, 25 or detached from the AACMM as illustrated in FIGS. 26, 27, 28. In FIG. 24, the noncontact 3D measuring device 2900 is attached to the AACMM 10, which further includes a probe tip 904 for contact 3D measurement. In an embodiment, the device 2900 is attached to the second accessory interface 703, which is shown, for example, in FIG. 23I. FIG. 25 shows a close up of elements in the device 2900, including device body 2510, first camera 2520A, second camera 2520B, and projector assembly 2550. In an embodiment, the device 2900 is attached to the AACMM 10 through an interface 1020 shown previously in FIG. 23J, for example. In an embodiment, the interface 1020 sends high-speed electrical data over gigabit Ethernet from the LLP 1100 or the device 2900 through the Ethernet PHY 2052 (FIG. 2C) to the base processor 2042 for further processing.

FIG. 26 shows the noncontact 3D measuring device 2900 detached from the AACMM 10. The interface 1020 is shown on the bottom of the device 2900. In an embodiment, connector 2610 is a gigabit Ethernet connector. In some embodiments, the noncontact 3D measuring device 2900 is connected to a device that moves independently of an operator. For example, the device 2900 is coupled to a robot or to machine. In this case, high speed data is transmitted to a processor system through the interface 1020 or through the gigabit Ethernet connector 2610.

FIG. 27 is a perspective view of a handheld 3D scanner 2700 that includes the noncontact 3D measuring device 2900 affixed to the handle 1000. The handheld 3D scanner 2700 is obtained by detaching the handle 1000 from the AACMM 10 and reattaching it to the 3D measuring device 2900. The interface 1020 provides a solid, kinematically repeatable connection of the device 2900 to the handle 1000. In an embodiment illustrated in FIGS. 33A, 33B, 33C, high speed electrical signals are routed through a cable 3301 to a mobile unit/computing-device 3500, also referred to as a mobile personal computer (PC) 3500. In an embodiment, a connector 3302 on the cable 3301 mates to a connector 3516 on the computing device 3500. The handheld 3D scanner 2700 includes the mobile PC 3500 and coupled display device 3330, as further described herein below.

FIG. 27 shows a close-up view of elements in the device 2900, including device body 2510, first camera 2520A, second camera 2520B, and projector assembly 2550. The first camera 2520A includes first wide-angle lens assembly 2522A, first illuminator 2524A, and first narrow-angle lens assembly 2532A. In an embodiment, the first illuminator 2524A includes a plurality of light sources 2526A. In an embodiment, the light sources emit over a plurality of wavelengths. In an embodiment, some of the light sources 2526A are LED light sources that emit in the near infrared (IR) wavelength range, for example, at a wavelength of 730 nm, just beyond visible wavelengths. In an embodiment, some of the LEDs 2526A further emit light covering a broader range of visible wavelengths. For example, white light LEDs emit light over a range of visible wavelengths. The second camera 2520B includes second wide-angle lens assembly 2522B, second illuminator 2524B, and second narrow-angle lens assembly 2532B. In an embodiment, the second illuminator 2524B includes the light sources 2526B, which are operated like the light sources 2526A.

The projector assembly 2550 includes a first projector 2552A and a second projector 2552B. In an embodiment illustrated in FIG. 28, the first projector 2552A projects a first pattern of light 2562A and the second projector 2552B projects a second pattern of light 2562B. In an embodiment, the first pattern of light 2562A includes a first plane of light at a first wavelength and the second pattern of light 2562B includes a second plane of light at a second wavelength different than the first wavelength. In an embodiment, the first wavelength is within the blue portion of the spectrum, and the second wavelength is at different wavelength also within the blue portion of the spectrum or within the blue-green portion of the spectrum. In other embodiments, the first pattern of light 2562A and the second pattern of light 2564A have the same wavelength. In some embodiments, the first and second patterns of light 2562A, 2562B include pattern elements in addition to the planes of light.

Figure 29A:
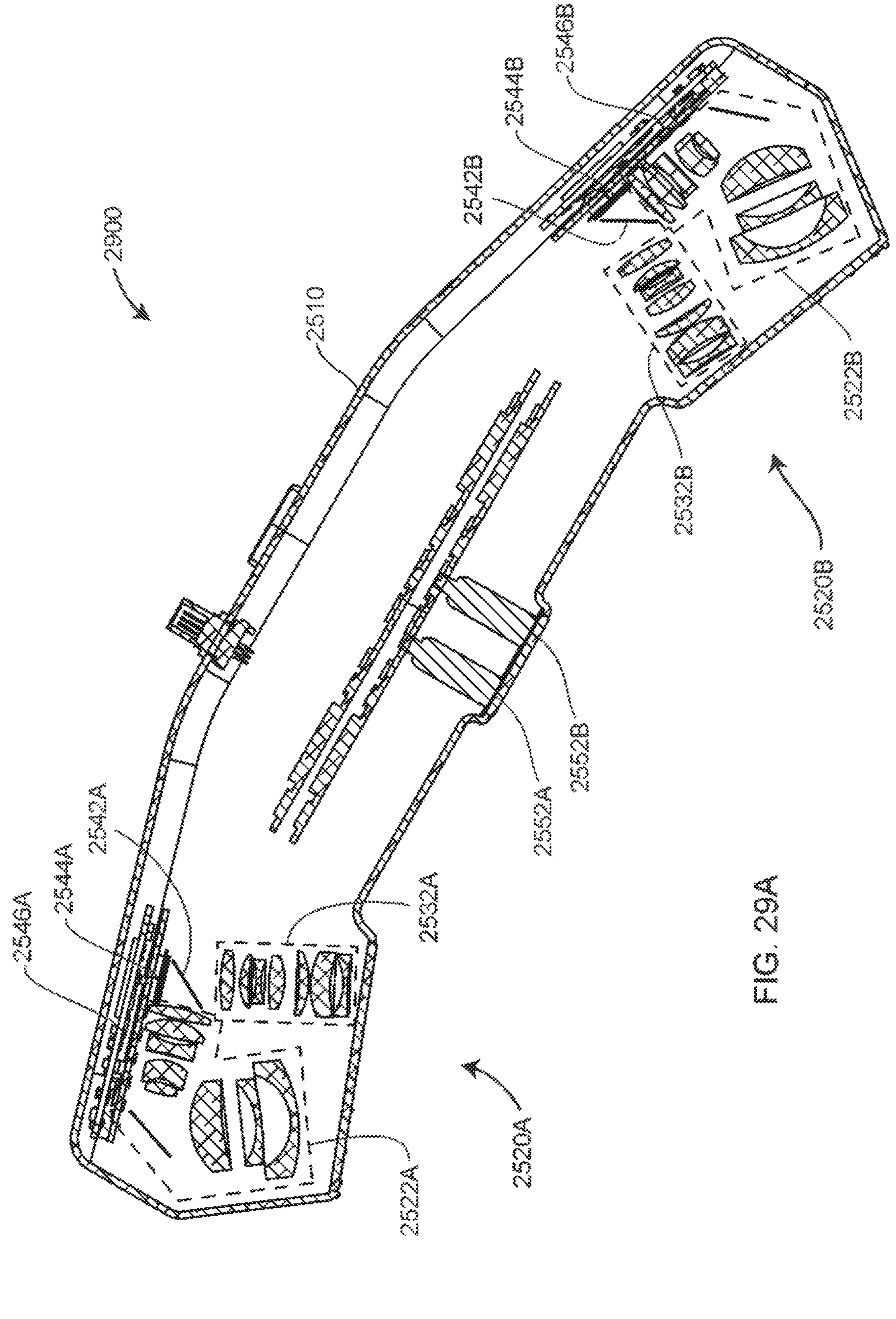
FIG. 29A is a simplified cross-sectional view of an accessory noncontact 3D measuring device according to an embodiment.

FIG. 29A is a simplified cross-sectional view of optical elements within the device 2900 according to an embodiment. The first camera 2520A includes the first wide-angle lens assembly 2522A, the first narrow-angle lens assembly 2532A, the beam splitter 2542A, the image sensor 2544A, and electronics 2546A. In an embodiment, the lens assembly 2522A is a relatively wide-angle lens system that captures images of an environment over a relatively wide field of view (FOV). In an embodiment, the lens assembly 2532A is a relatively narrow-angle lens assembly that captures images of the environment over a relatively narrow FOV. In an embodiment the beam splitter is a pellicle beam splitter that reflects light from the wide-angle lens assembly 2522A onto the image sensor 2544A and passes (transmits) light from the narrow-angle lens assembly 2532A onto the image sensor 2544A. In other embodiments, a non-pellicle beam splitter is used. In an embodiment the projector 2552A projects a pattern of light received by the narrow-angle lens assembly 2532A. In an embodiment, the projector 2552A emits light having a first wavelength, and the narrow-angle lens assembly 2532A includes a relatively narrow band-pass filter that passes wavelengths near the first wavelength, but blocks wavelengths emitted by the second narrow-angle lens assembly 2532B, the first illuminator 2524A, and the second illuminator 2524B. In an embodiment, the first illuminator 2524A projects light over a relatively wide FOV. In one mode of operation, the LEDs 2526 emit light that illuminates markers, such as adhesive markers, placed on an object. In this mode of operation, the emitted light is LED light at 730 nm or at any other convenient wavelength. In an embodiment, the wide-angle lens assembly 2522A includes a filter that blocks wavelengths emitted by the projectors 2552A, 2552B. Hence the wide-angle lens 2522 captures on the image sensor 2544A an image of the illuminated markers on the object, while the narrow-angle lens assembly 2532A captures on the image sensor the pattern of light projected by the projector 2552A. In other words, the markers captured over a wide FOV are superimposed with the projected pattern captured over a narrow FOV.

Figure 32B:
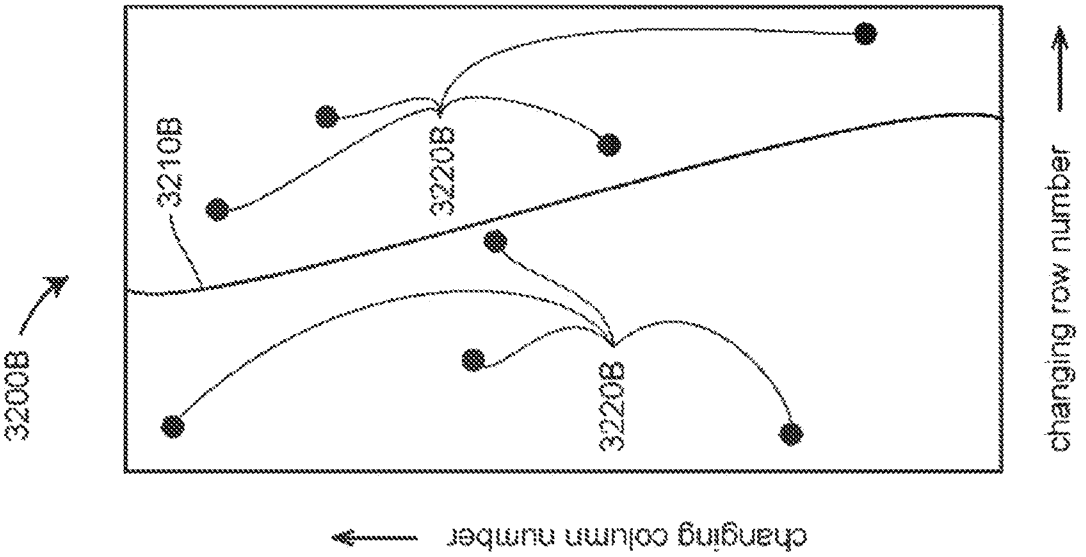
FIG. 32A and FIG. 32B represent images captured by of projected lines of light and illuminated markers according to an embodiment.
Figure 32A:
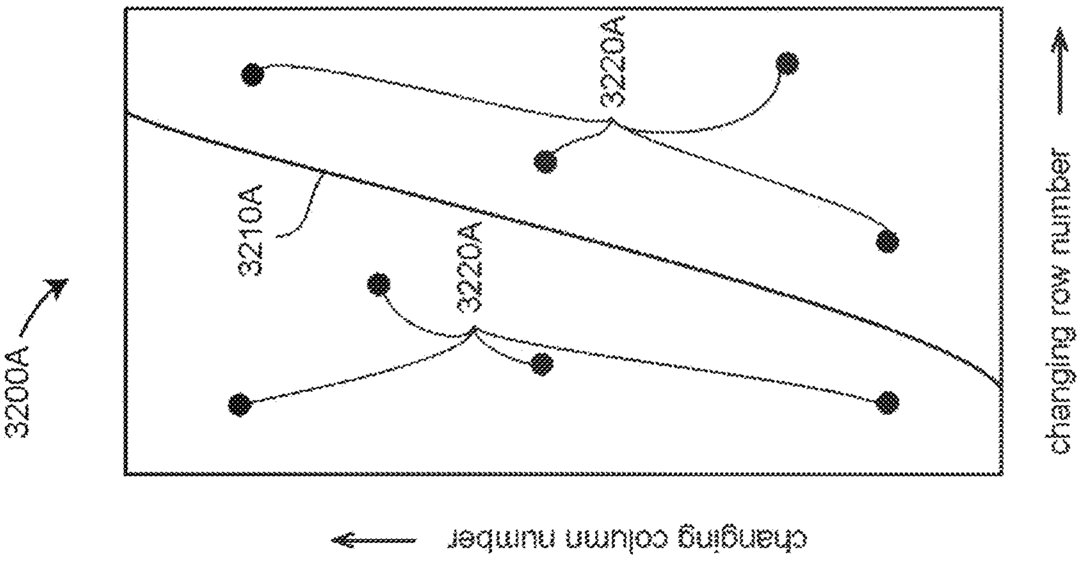
Figure 37:
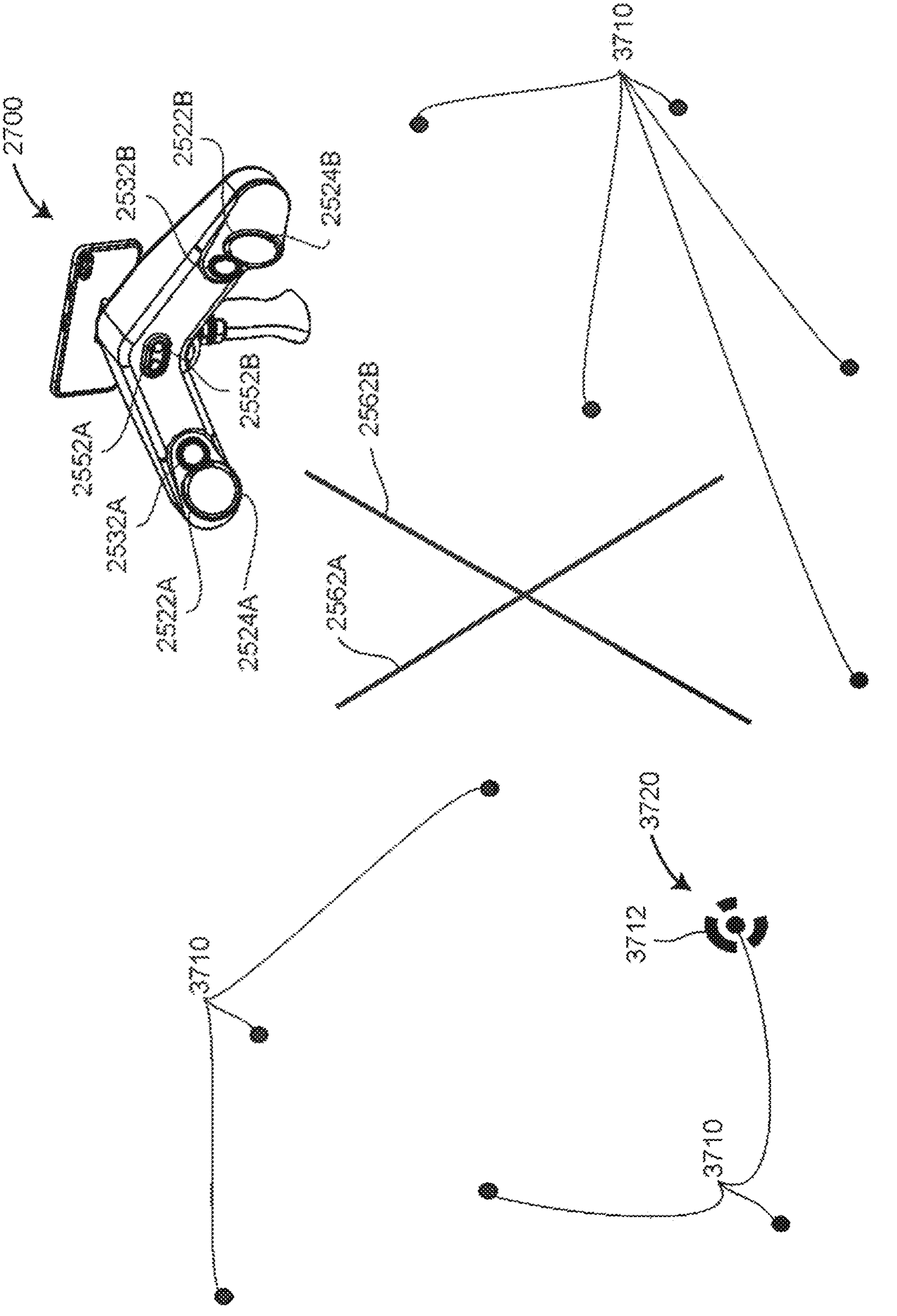
FIG. 37 is a schematic representation of a handheld 3D measuring device projecting and measuring two lines of light onto an object while also measuring markers on the object according to an embodiment.

FIG. 37 illustrates a situation in which a handheld 3D scanner 2700 projects the first pattern of light 2562A and the second pattern of light 2562B onto an object. In FIG. 37, the first pattern of light 2562A is a laser light having the first wavelength and taking the shape of a line when seen on the flat surface of the object it intersects. Note that the projected light 2562A is described as a plane of light 2562A if viewed from a 3D perspective as in FIG. 28 or as a line of light 2562A if viewed from the perspective of the illuminated object as in FIG. 37. Hence it is common to refer to a device that projects a plane of laser light as a laser line scanner or laser line probe (LLP), even though it is equally well considered to project a plane of light or a line of light. It is also the case that a projected plane of light will produce a curved line of light rather than a straight line of light as illustrated in FIG. 37 for the case of an object not having a flat surface. Hence the term "line" should be understood in this context to refer to any line of light, either curved, straight, or appearing in segments. FIG. 32A and FIG. 32B illustrate images 3200A, 3200B, respectively, seen on the first image sensor 2544A and the second image sensor 2544B, respectively. In FIG. 37, the first line of light 2562A projected onto the object by the projector 2552A has the first wavelength, and the second line of light 2562B has the second wavelength. The first line of light 2562A on the object passes through the first narrow-angle lens assembly 2532A, appearing as a first imaged line 3210A in the image 3200A of the image sensor 2544A. The first line of light 2562A does not pass through the second narrow-angle lens assembly 2532B, the first wide-angle lens assembly 2522A, or the second wide-angle lens assembly 2522B, none of which have optical filters that pass light at the first wavelength. Likewise, the second line of light 2562B on the object passes through the second narrow-angle lens assembly 2532B, appearing as a second imaged line 3210B in the image 3200B of the image sensor 2544B. The second line of light 2562B does not pass through the first narrow-angle lens assembly 2532A, the first wide-angle lens assembly 2522A, or the second wide-angle lens assembly 2522B, none of which have optical filters that pass light at the second wavelength.

In FIG. 37, illuminators 2524A, 2524B project light over a relative wide FOV to illuminate markers 3710. The markers 3710 are reflective markers. Sometimes such markers are referred to as "retroreflective markers," which usually indicates that the amount of reflected light is larger than might be the case with another type of reflective marker. This type of retroreflector does not reflect as much light or return light as well collimated as does a spherically mounted retroreflector (SMR) discussed herein below in reference to FIG. 39C and FIG. 40. Light from the light sources 2526A surrounding the wide-angle lens assembly 2522A illuminates the markers 3710. The incident light is reflected back to the wide-angle lens assembly 2522A, imaging the markers 3710 as image spots 3220A on the image 3200A of the first image sensor 2544A as shown in FIG. 32A. Likewise, light from the light sources 2526B surrounding the wide-angle lens assembly 2522B illuminates the markers 3710. The incident light is reflected back to the wide-angle lens assembly 2522B, imaging the markers 3710 as image spots 3220B on the image 3200B of the second image sensor 2544B as shown in FIG. 32B. Some markers 3710 further include a coded region 3712 to form a coded marker 3720. In an embodiment, such coded markers 3720 are used to assist in identifying markers 3710 in images obtained from the wide-angle lens assemblies 2522A, 2522B.

In an embodiment, the image sensor 2544A (FIG. 29A) is oriented within the body 2510 so that the row of the line (i.e., the horizontal axis of the image 3200A in FIG. 32A) at a given point on the line corresponds to a depth of that point from the projector to the object. The column number of the line (i.e., the vertical axis of the image 3200A) at a given point on the line corresponds to an angle of that point from the projector to the object. In a similar way, the image sensor 2544B is oriented so that the row of the line (i.e., the horizontal axis of the image 3200B) at a given point on the line corresponds to a depth of that point from the projector to the object. The column number of the line (i.e., the vertical axis of the image 3200B) at a given point on the line corresponds to an angle of that point from the projector to the object.

Because the image spots 3220A are captured by the wide-angle camera assembly 2522A, the image spots 3220A occupy a FOV corresponding to the FOV of the wide-angle camera assembly 2522A. Likewise, because the image spots 3220B are imaged by the wide-angle camera assembly 2522B, the image spots 3220B occupy a FOV corresponding to the FOV of the wide-angle camera assembly 2522B. In an embodiment, the image spots 3220A, 3220B are captured at the same time by the wide-angle camera assemblies 2522A, 2522B, respectively. Because the relative pose between the first wide-angle camera assembly 2522A and the second wide-angle camera assembly 2522B is known, triangulation is used to determine 3D coordinates of the image spots 3220A, 3220B. In other words, the wide-angle camera assemblies 2522A, 2522B comprise a stereo camera, enabling 3D coordinates of the markers seen by both cameras to be determined within a frame of reference of the handheld 3D scanner 2700. If the 3D coordinates of markers are known in a global frame of reference, then multiple of the camera images 3200A, 3200B is registered together within a common frame of reference.

In an embodiment, the patterns of light 3210A, 3210B are projected on an object and captured with the cameras 2520A, 2520B synchronously with the markers in the images 3200A, 3200B. In this case, 3D coordinates obtained for the two patterns of light 3210A, 3210B are registered in a common frame of reference based at least in part on the captured image spots 3220A, 3220B. Furthermore, by registering the image spots 3220A, 3220B over multiple captures while the handheld 3D scanner 2700 captures a sequence of images 3200A, 3200B, 3D coordinates of an object surface are determined over a large area.

Figures 29B, 29C:
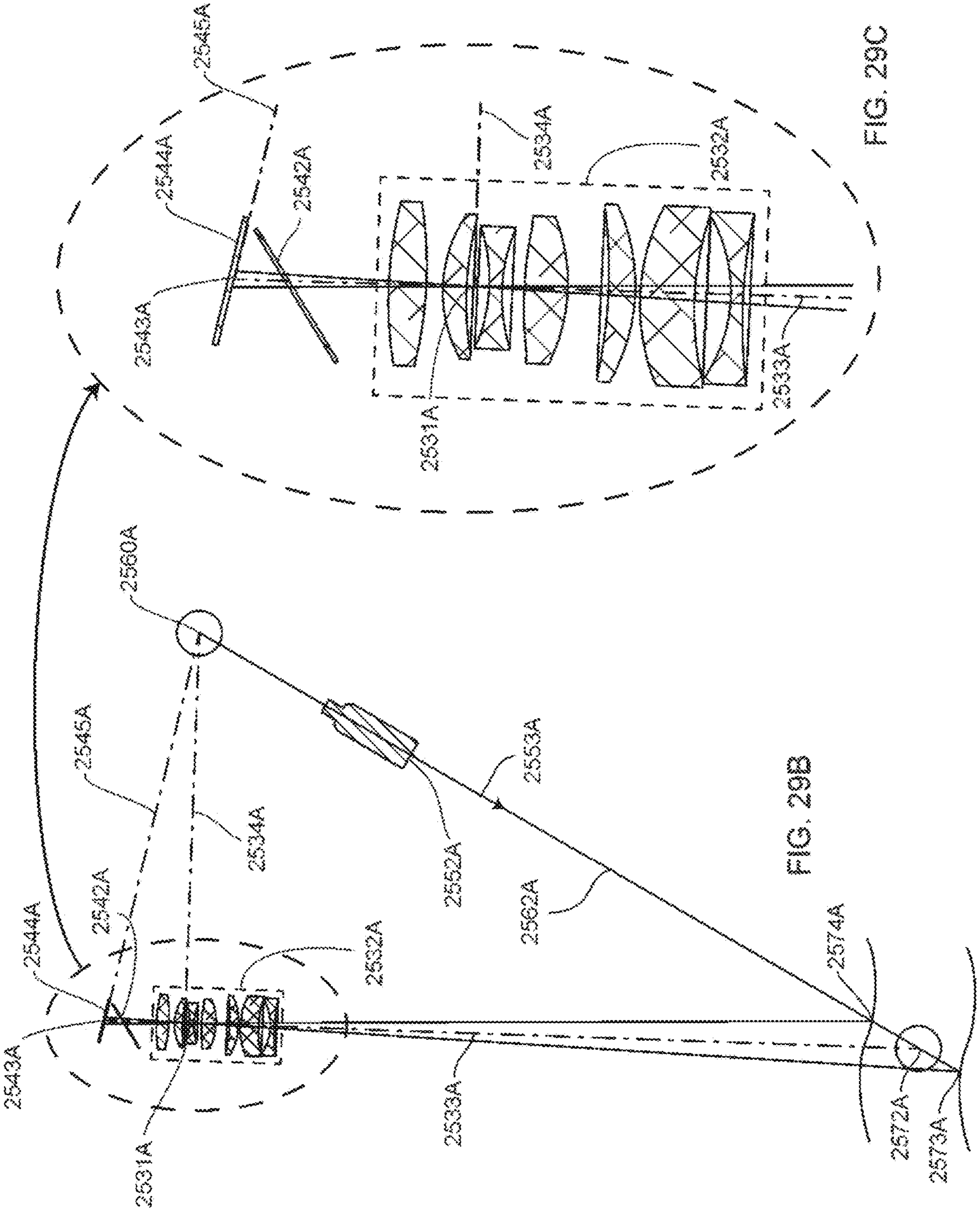
FIG. 29B and FIG. 29C are schematic representations showing a narrow-angle lens assembly arranged to satisfy a Scheimpflug condition according to an embodiment.

In an embodiment, the narrow-angle lens assembly 2532A is arranged to satisfy the Scheimpflug condition as illustrated in FIGS. 29B, 29C for the narrow-angle camera assembly 2532A. This condition is satisfied when the image plane, the lens plane, and the projected plane of light come together in a common line. FIG. 29B shows a view of the narrow-angle lens assembly 2532A, the image sensor 2544A, and the first projector 2552A. The first projector 2552A projects the first plane of light 2562A lying on a first projector optical axis 2553A. The first narrow-angle lens system 2532A has an optical axis 2533A and a lens plane 2534A. The lens plane 2534A is perpendicular to the optical axis 2533A and passes through the perspective center 2531A of the narrow-angle lens 2532A. The perspective center 2531A lies on the optical axis 2533A and represents the center through which rays of light are considered to pass in traveling through the image sensor 2544A. The surface of the image sensor 2544A is projected in an image plane 2545A. As shown in FIG. 29B, the image plane 2545A, the lens plane 2534A, and the projected plane of light 2562A come together in an intersection line 2560A, thereby satisfying the Scheimpflug condition.

As shown in FIG. 29B, the lens optical axis 2533A and the projector optical axis 2562A intersect in a point 2572A, and the lens optical axis intersects the image plane 2544A in the point 2543A. In general, the ray of light that travels along the projector optical axis 2553A will not intersect an object at the point 2572A because the object is farther from the lens system 2532A or nearer to the lens system 2532A than the point 2572A. For an intersection of the projected light along the projector optical axis 2553A with an object farther away from the lens system 2532A than the point 2572A, for example, at the point 2573A, the reflected light will pass through the perspective center 2531A, arriving at the image plane 2545A to the right of the point 2543A, as shown in FIG. 29B. Conversely, for an intersection of the projected light with an object nearer to the lens system 2532A than the point 2572A, for example, at the point 2574A, the reflected light will pass through the perspective center 2531A, arriving at the image plane 2545A to the left of the point 2543A. However, when the Scheimpflug condition is satisfied as in FIG. 29B, the image of the projected plane of light 2562A on the object will remain in focus. This means that a projected line of light 2562A will remain in focus even as the depth from the projector to the object is changed. Away from the projected plane of light 2562A, imaged points of light will not be in focus on the image sensor 2544A, resulting in imaged points of light that are not in focus but instead are expanded in size and fuzzy. A projected line of light not in focus on an image sensor is wider than a line of light that is kept in focus by satisfying the Scheimpflug condition. It is possible to get good results in determining 3D coordinates even when the Scheimpflug condition is not satisfied, but the projected line in this case will be wider on the image plane than it is for the Scheimpflug condition and width depends on distance from the projector to the object. In this case, more processing time is required to determine a center of the projected light.

Figure 29D:
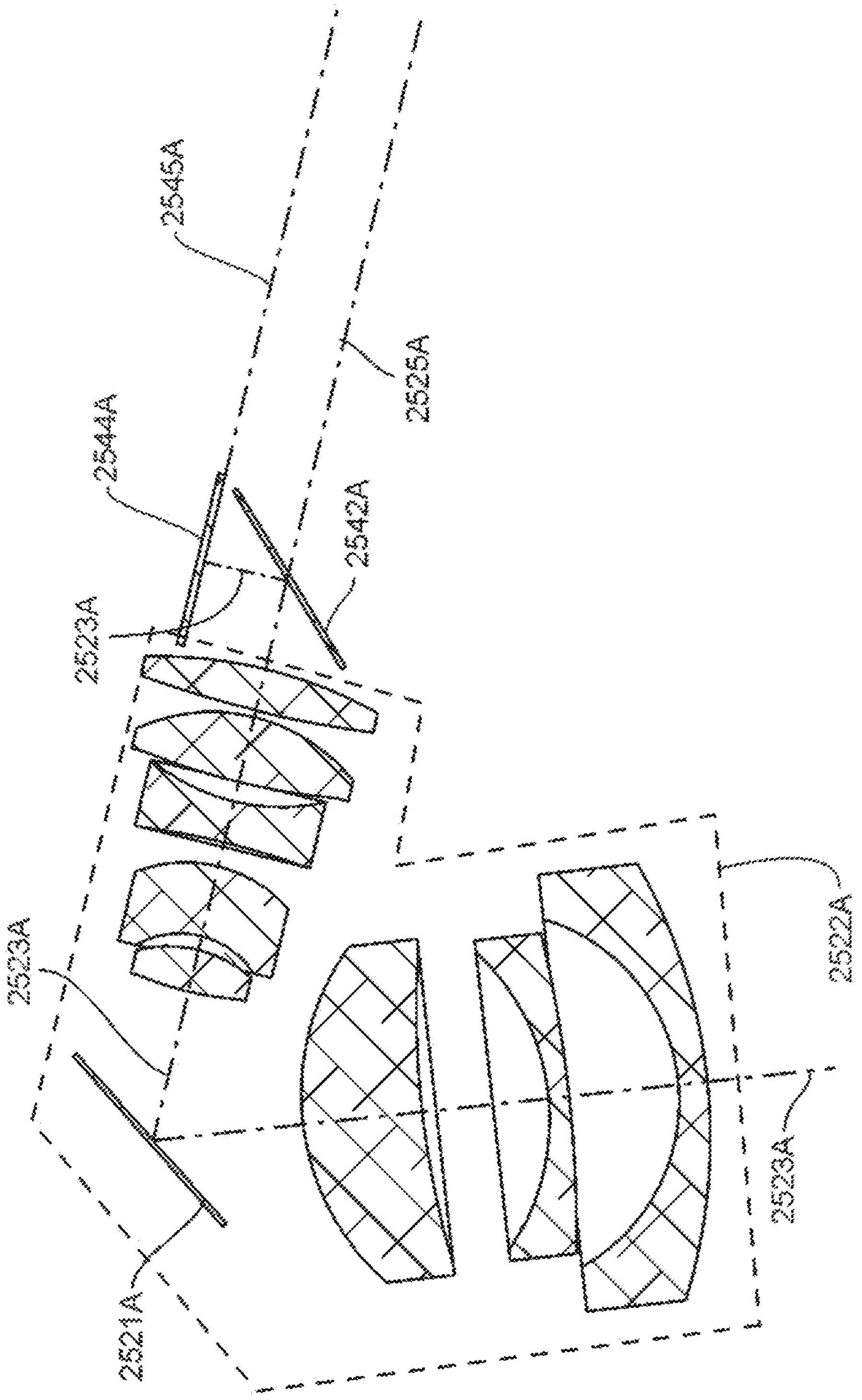
FIG. 29D is a schematic representation showing a wide-angle lens assembly arranged in a way that does not satisfy the Scheimpflug condition according to an embodiment.

For the case of the wide-angle lens assembly 2522A, shown in FIG. 29D, the optical axis 2523A is folded about the mirror 2521A and folded again about the beam splitter 2542A. The extension line 2525A of the optical axis 2523A is perpendicular to the optical axis 2523A and hence has the same direction as the lens plane for the lens assembly 2522A. It can be seen from FIG. 29D that the direction of the lens plane along 2525A is parallel to the image plane 2545A. This means that the Scheimpflug condition is not satisfied for the wide-angle lens assembly 2522A since the lens plane and image plane never intersect. For the wide-angle lens assembly 2522A, the optimal lens design is obtained by minimizing lens aberrations to keep imaged markers in focus as well as possible over a relatively large depth of field.

Figures 29E, 29F:
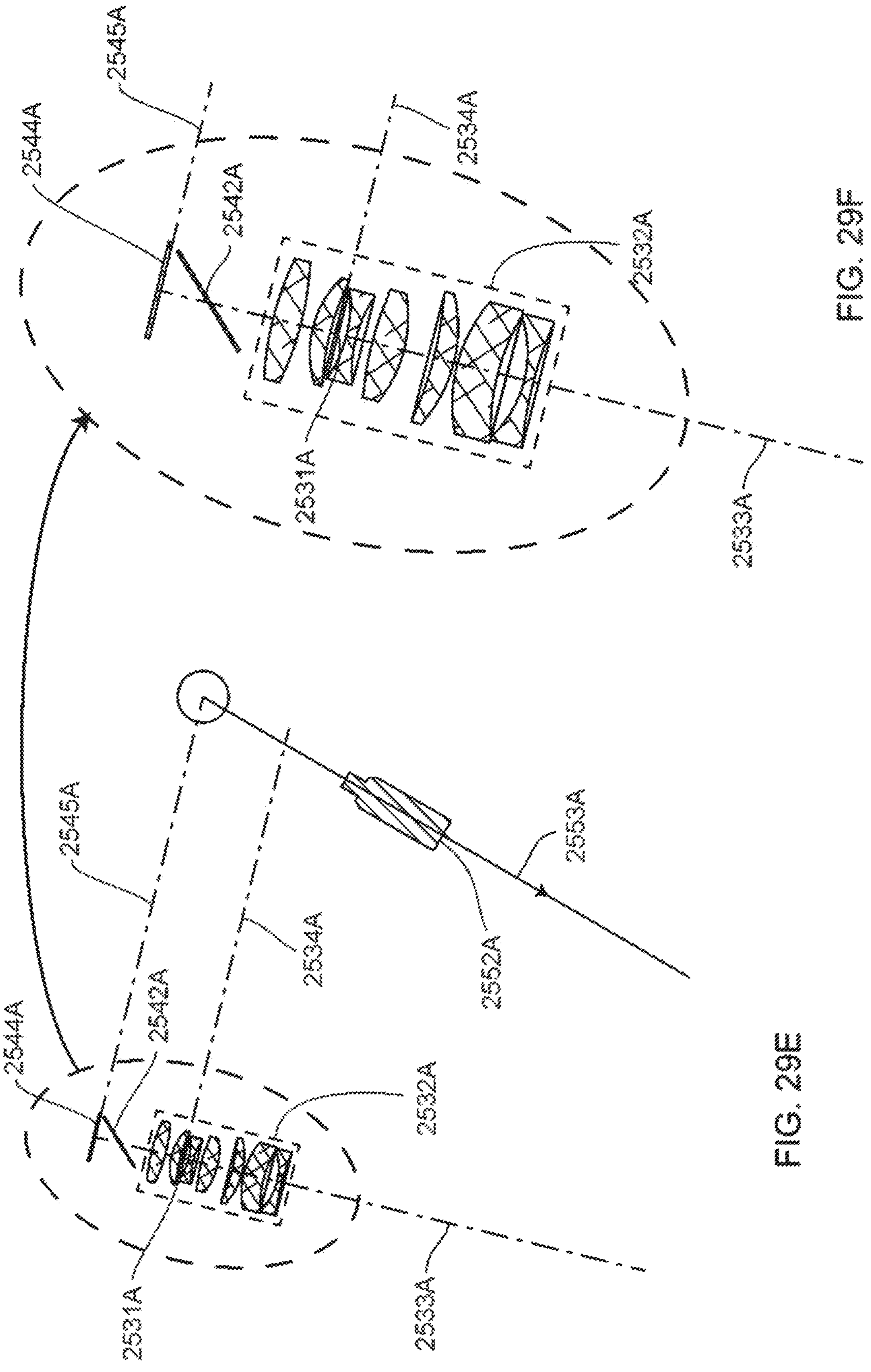
FIG. 29E and FIG. 29F are schematic representations showing a narrow-angle lens assembly arranged in a way that does not satisfy the Scheimpflug condition according to an embodiment.

In another embodiment illustrated in FIGS. 29E, 29F, the narrow-angle lens assembly 2532A is oriented so that it does not satisfy the Scheimpflug condition. This was accomplished by rotating the lens assembly to make the lens plane 2534A parallel to the image plane 2545A. The orientation of the narrow-angle lens assembly 2534A as shown in FIG. 29E enables relatively sharp imaging of a pattern of light that includes points of light off the projected plane of light 2562A. The imaging of such a pattern of light across the entire image sensor, although not perfectly focused along the projected plane of light 2562A, are imaged to an acceptable level of quality across the entire area of the image sensor 2544A.

Figure 29I:
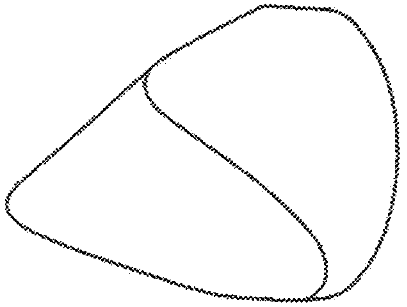
FIGS. 29G, 29H, and FIG. 29I are front, side, isometric views of a Powell lens according to an embodiment.
Figure 29H:
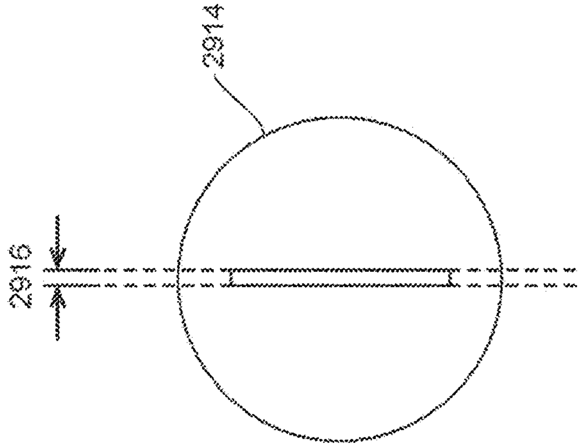
Figure 29G:
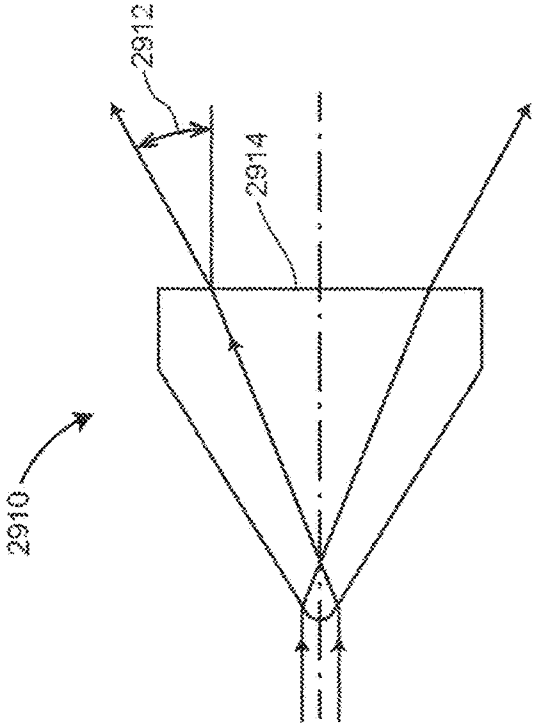

FIG. 29G, FIG. 29H, and FIG. 29I show front, side, and isometric views, respectively, of a Powell lens 2910, which is a type of lens used to generate a laser line. The Powell lens 2910 generates a relatively narrow laser line that diverges over a fan angle 2912 that is selected according to the geometry of the Powell lens design. At the exit surface 2914 of the Powell lens, the emerging light has a width 2916. The Powell lens produces a line having a relatively uniform optical irradiance over the projected line. An alternative to the Powell lens for generating a narrow laser line is a cylinder lens, although the cylinder lens does not produce such a uniform irradiance as the Powell lens. In an embodiment, an optical element such as a Powell lens or cylinder lens is used when the desired first pattern of light 2562A or the desired second pattern of light 2562B. In an embodiment, the pattern of light 2562A, 2562B is a single plane of light as illustrated in FIG. 28.

Figure 29J:
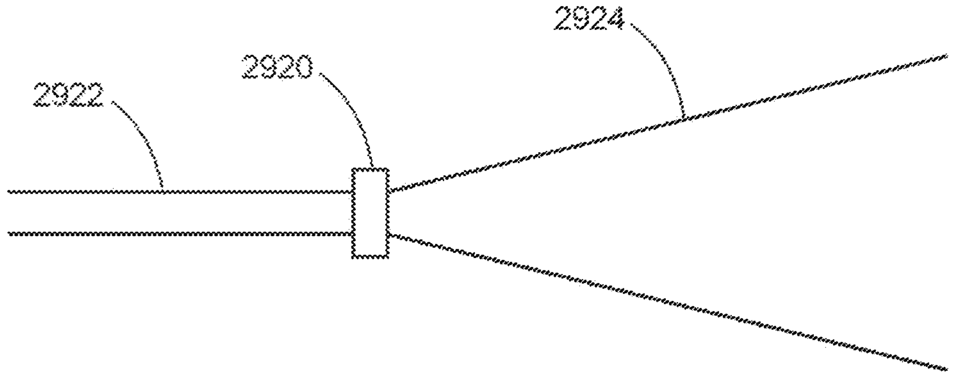
FIG. 29J is a schematic representation of a collimated beam of light being sent through a diffractive optical element (DOE) according to an embodiment.
Figure 29K:
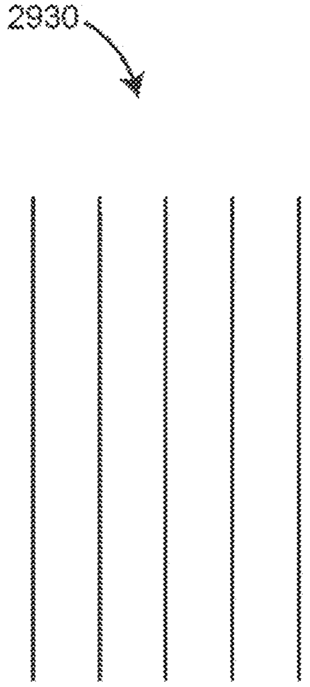
FIG. 29K and FIG. 29L show two possible patterns that are produced by a DOE according to an embodiment.
Figure 29L:
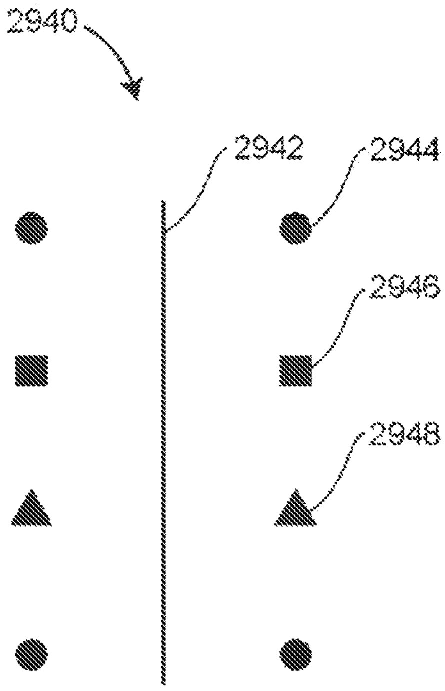

FIG. 29J is a schematic representation of a diffractive optical element (DOE) 2920 being used to project a pattern of light. Collimated light 2922 enters the DOE from the left to produce an expanding pattern of light 2924. A DOE is designed to project a wide variety of patterns. In the example of FIG. 29K, the DOE 2920 projects a collection of parallel lines 2930. In the example of FIG. 29J, the DOE 2920 projects a pattern 2940 including a single line of light 2942 surrounded by pattern elements including circles 2944, squares 2946, and triangles 2948. When a single line of light 2562A is projected onto an object, a one-to-one correspondence among projected points of light and imaged points of light are determined. For the case in which additional light elements are projected off the line of light, a way is needed to make a one-to-one correspondence among projected elements and imaged elements. There are various ways of doing this depending on the configuration being considered, but correspondence is relatively simple to determine when elements are readily recognizable, for example, as circles, squares, or triangles.

Figure 30:
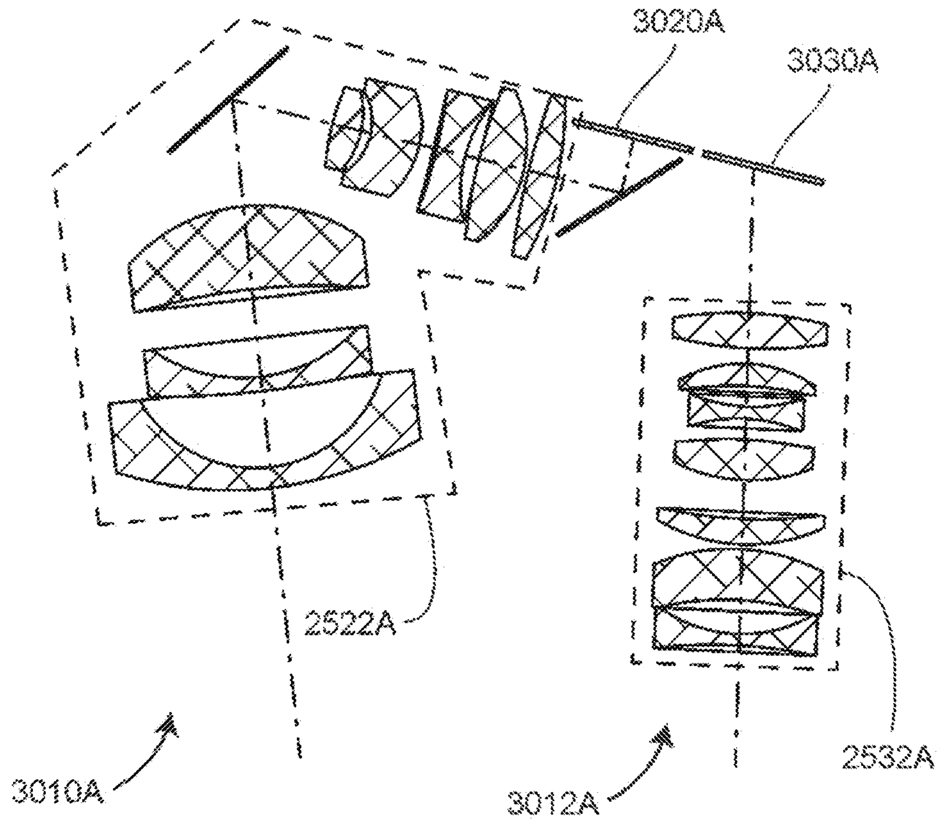
FIG. 30 is a schematic representation of a wide-angle lens and a narrow-angle lens, each sending light to a different image sensor.

FIG. 30 illustrates an embodiment in which the wide-angle lens assembly 2522A passes light to a first image sensor 3020A, and the narrow-angle lens assembly 2532A passes light to a second image sensor 3030A. Because there are now two image sensors, 3020A and 3030A, there are two corresponding cameras, 3010A and 3012A, respectively. In an embodiment, the narrow-angle lens system 2532A continues to pass only light having a first wavelength in the camera 3012A as was the case for the camera 2520A. The single camera system 2520A has potential advantages over the two-camera system in reduced weight in the noncontact 3D measuring device 2900 and reduced time to read out the single image sensor 2544A rather to read out the two image sensors 3020A, 3030A. On the other hand, the double image sensor 3020A, 3030A has a potential advantage in eliminating interference among overlapping elements in captured images.

Figure 31B:
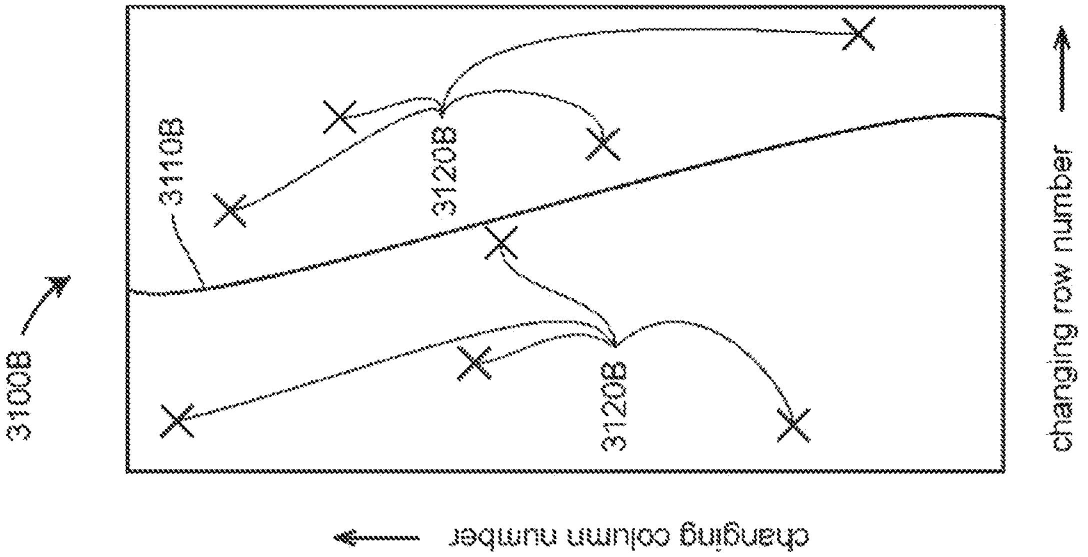
FIG. 31A and FIG. 31B represent images of projected lines of light and natural features according to an embodiment.
Figure 31A:
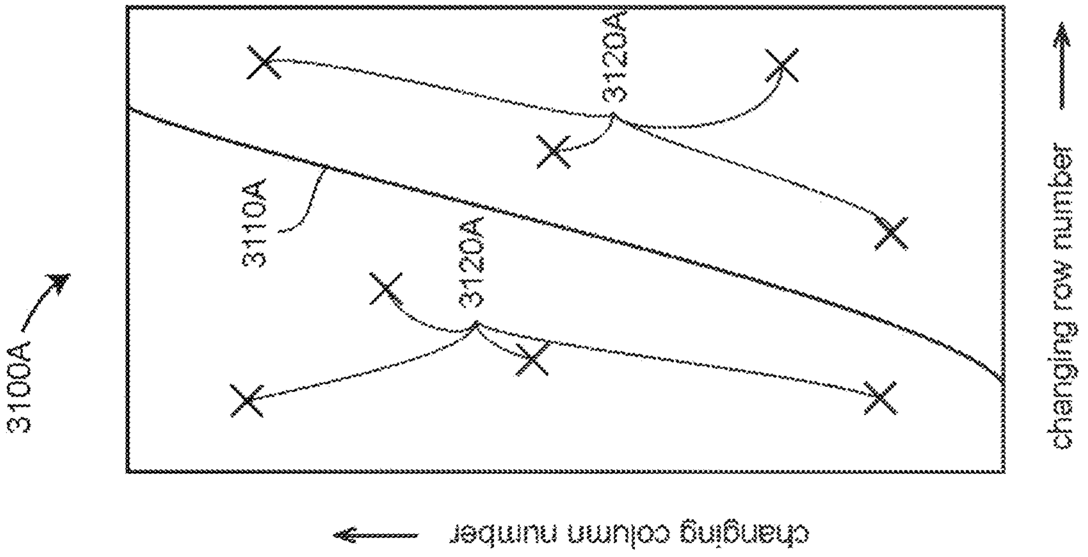

FIG. 31A and FIG. 31B show images 3100A, 3100B captured by the image sensors 2944A, 2944B, respectively, in the noncontact 3D measuring device 2900 for the case in which there are no markers 3710 on the object. Instead, natural features are detected in the images 3100A, 3100B captured by the image sensors 2944A, 2944B. As discussed herein above in reference to FIG. 27, illuminators 2524A, 2524B include more than one type of light source 2526A, 2526B, wherein the different light sources have different wavelengths. For example, the light sources 2526A, 2526B each include alternating IR light sources such as 730 nm LEDs and visible light sources such as white-light LEDs. When markers are not present, the visible light sources are illuminated, causing natural features 3120A, 3120B to be captured in the images on the image sensors 2944A, 2944B. Such natural features are identified using feature extraction methods such as the Harris corner detector, the Harris-Laplace detector, multi-scale-oriented patches, scale-invariant feature transform (SIFT), speeded-up robust features (SURF) method, features from accelerated segment test (FAST), binary robust invariant scalable keypoints (BRISK), and oriented fast and rotated BRIEF (ORB). The identified visible features can be matched in the images 3100A, 3100B, thereby enabling registration of the images 3100A and 3100B. In this way, natural features can serve the same registration function as markers affixed to objects. In FIG. 31A and FIG. 31B, the identified natural features are indicated with an "X."

When identifying natural features, it is advantageous to illuminate the object by a range of visible or IR wavelengths, for example, using LED illuminators. In an embodiment, the range of illuminated wavelengths does not include the first wavelength or the second wavelength. In this way, natural features are distinguished from the projected patterns 2562A, 2562B in the captured images 3120A, 3120B.

In an embodiment, the first illuminator 2524A includes a plurality of light sources 2526A. In an embodiment, the light sources emit over a plurality of wavelengths. In an embodiment, some of the light sources 2526A are LED light sources that emit in the near infrared (IR) wavelength range, for example, at a wavelength of 730 nm, just beyond visible wavelengths. In an embodiment, some of the LEDs 2526A further emit light covering a broader range of visible wavelengths. For example, white light LEDs emit light over a range of visible wavelengths. The second camera 2520B includes second wide-angle lens assembly 2522B, second illuminator 2524B, and second narrow-angle lens assembly 2532B. In an embodiment, the second illuminator 2524B includes the light sources 2526B, which are operated like the light sources 2526A.

Figure 35A:
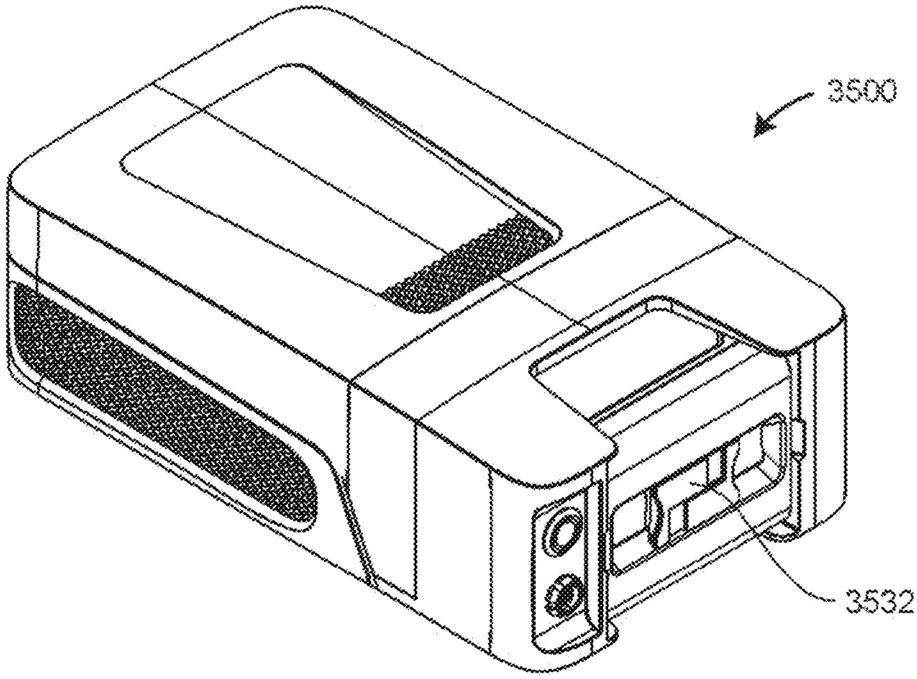
FIGS. 35A, 35B, and FIG. 35C are isometric assembled, isometric unassembled, and isometric rear views of a mobile personal computer (PC) according to an embodiment.
Figure 35B:
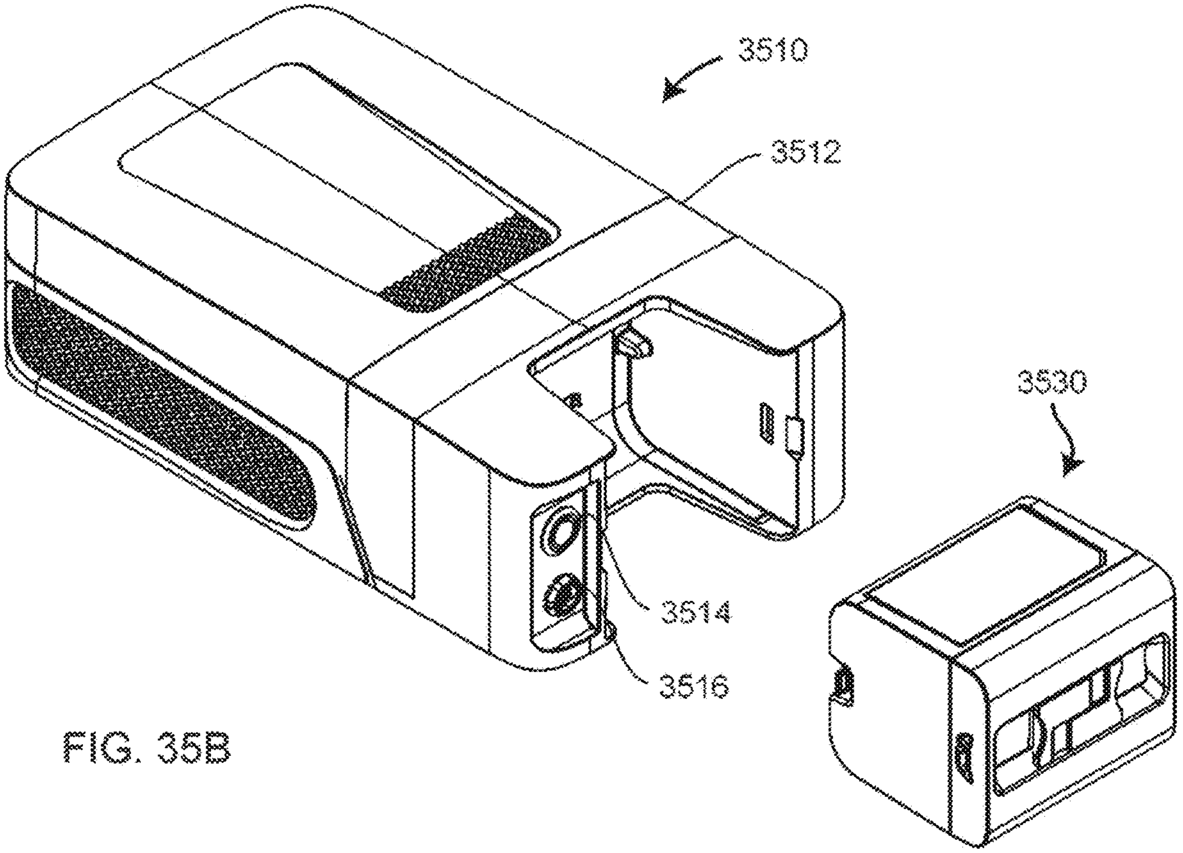
Figure 35C:
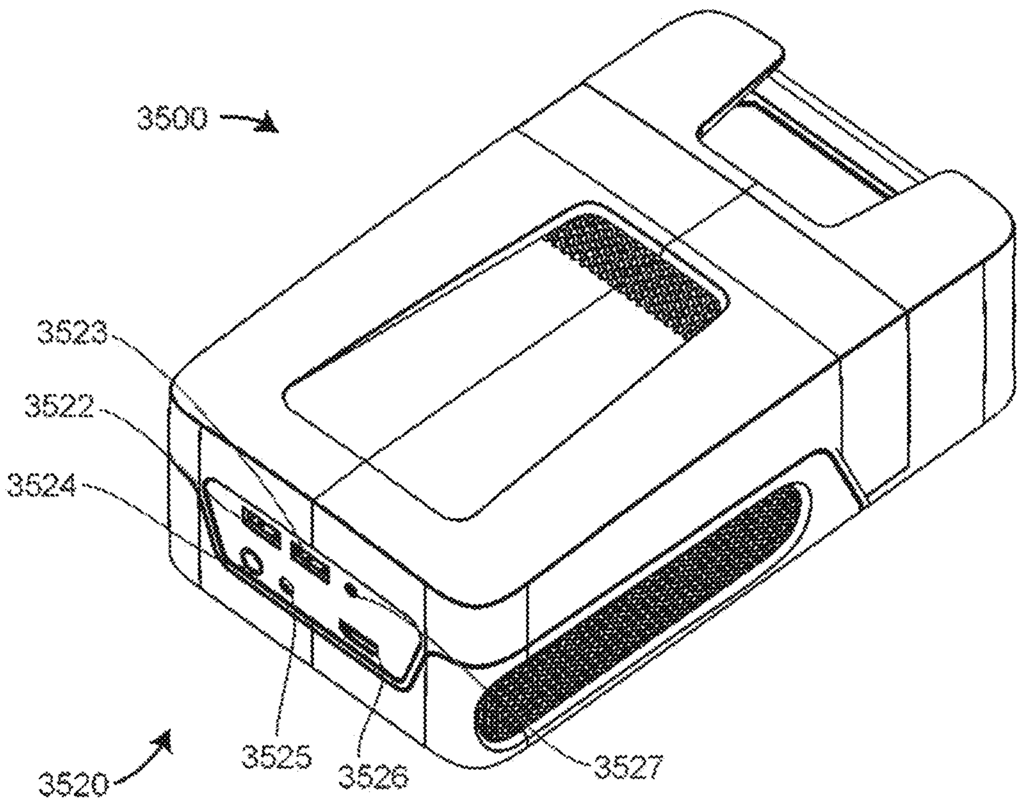

FIGS. 35A, 35B, 35C are isometric views of the mobile computer (PC) 3500 in a front isometric view, a front exploded isometric view, and a rear isometric view, respectively. In an embodiment, the mobile PC 3500 includes a computing unit 3510 and a battery 3530. In an embodiment, the computing unit 3510 includes a body 3512, a power on-off button 3514, and connector 3516 that accepts the Ethernet cable 3302. Ethernet is a family of computer networking technologies. It was first standardized in 1985 as IEEE 802.3. In an embodiment, the female Ethernet port 1104 supports 1 gigabit per second, often referred to as Gigabit Ethernet. In an embodiment, the battery 3530 includes a lock mechanism 3532 that is squeezed inward to remove the battery from the body 3512. FIG. 35C shows a rear panel 3520 of the mobile PC 3500. In an embodiment, the rear panel 3520 includes a first USB port 3522, a second USB port 3523, a connector 3524 that accepts a cable from a battery-charger device, an LED 3525, a high-definition multimedia interface (HDMI) port 3526, and an audio jack 3527. HDMI is an implementation of the EIA/CEA-861 standards.

In an embodiment, an optional display for the scanner system is provided by a mobile phone such as a smart phone. In embodiments illustrated in FIGS. 33A, 33B, 33C, 34A, 34B, the display 3330, also referred to as a smart phone 3330 or mobile phone 3330, is magnetically attached to the rear of the body 2510 of the handheld 3D scanner 2700. The display 3330 obtains image data from the electronics 1470 of the mobile PC 3310 in several ways, four of which are illustrated herein below.

Figure 33A:
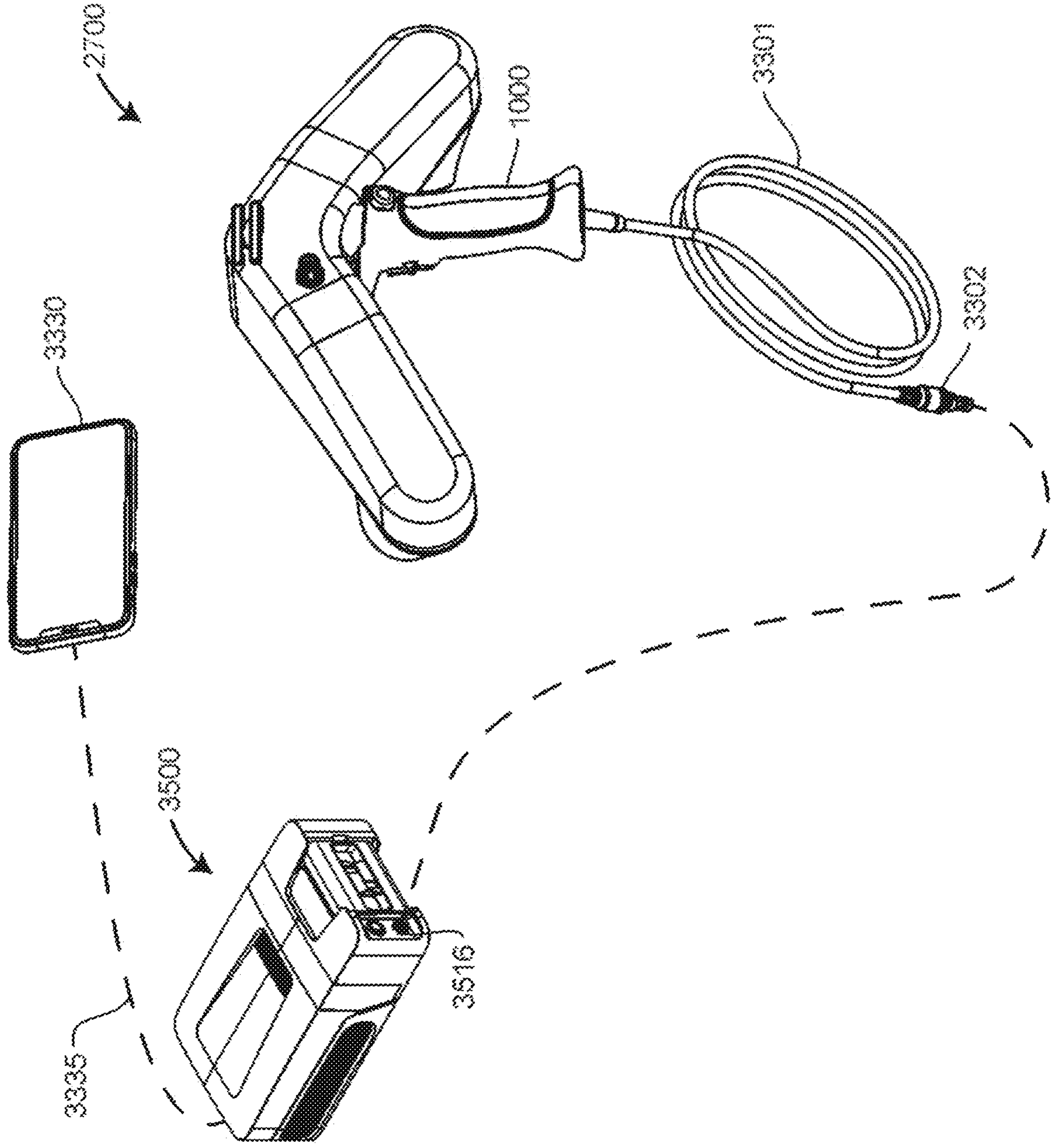
FIGS. 33A, 33B, and FIG. 33C illustrate different ways of configuring a handheld 3D measuring device for use with a mobile PC and a mobile phone display according to an embodiment.
Figure 34A:
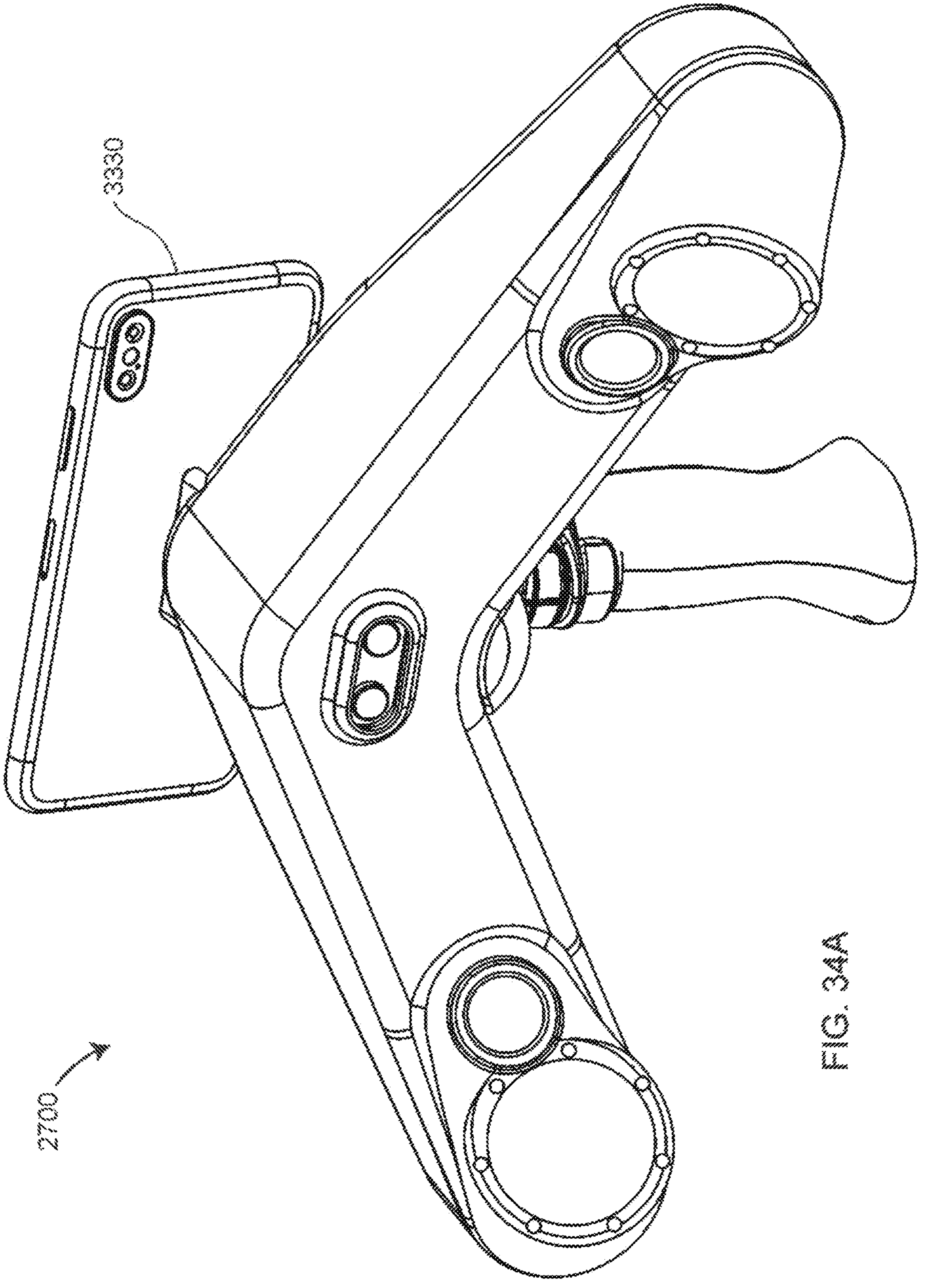
FIG. 34A is an isometric view of a handheld 3D measuring device coupled to a mobile phone display according to an embodiment.

In a first way illustrated schematically in FIG. 33A, communication between the display device 3330 and the mobile PC 3500 is by an HDMI cable 3335. In an embodiment, the measurement results and user interface (UI) are viewed in a web browser on the display 3330 connected to the mobile PC 3500 by the HDMI port 3526. In an embodiment, the mobile PC 3500 is carried by an operator as a "belt computer," enabling the mobile PC to move with the operator in a hands-free mode. If desired, the display device 3330 is magnetically attached to the body 2510 of the handheld 3D scanner 2700 as illustrated in FIG. 34A.

Figure 33B:
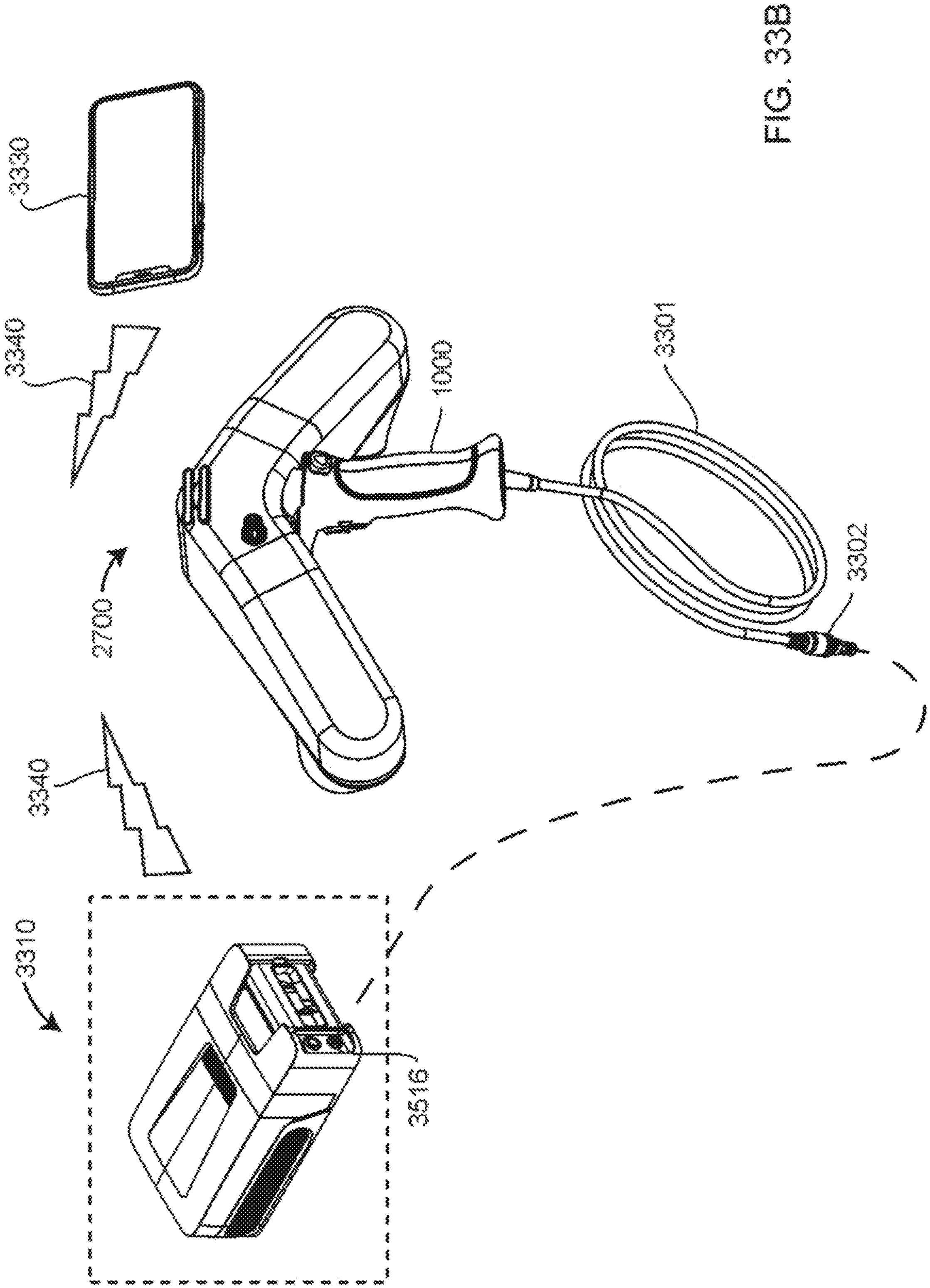

In a second way illustrated schematically in FIG. 33B, communication between the display device 3330 and the mobile PC 3500 is by wireless communication 3340 such as by Wi-Fi 802.11 ac. Wi-Fi 802.11 ac is a wireless networking standard in the IEEE 802.11 family developed in the IEEE Standards Association and marketed under the brand name Wi-Fi, a trademark of the Wi-Fi Alliance. Wi-Fi 802.11 ac provides high throughput in wireless local area networks (WLANS) on the 5 GHz band. It provides at least 1 gigabit per second of multi-station throughput and at least 500 megabits per second of single-link throughput. In an embodiment, the mobile PC 3500 is a Wi-Fi access point (AP) to which the mobile phone connects. Data is transferred from the mobile PC 3500 to the mobile phone 3330 or from the mobile phone 3300 to the mobile PC 3500 through the Wi-Fi connection.

Figure 33C:
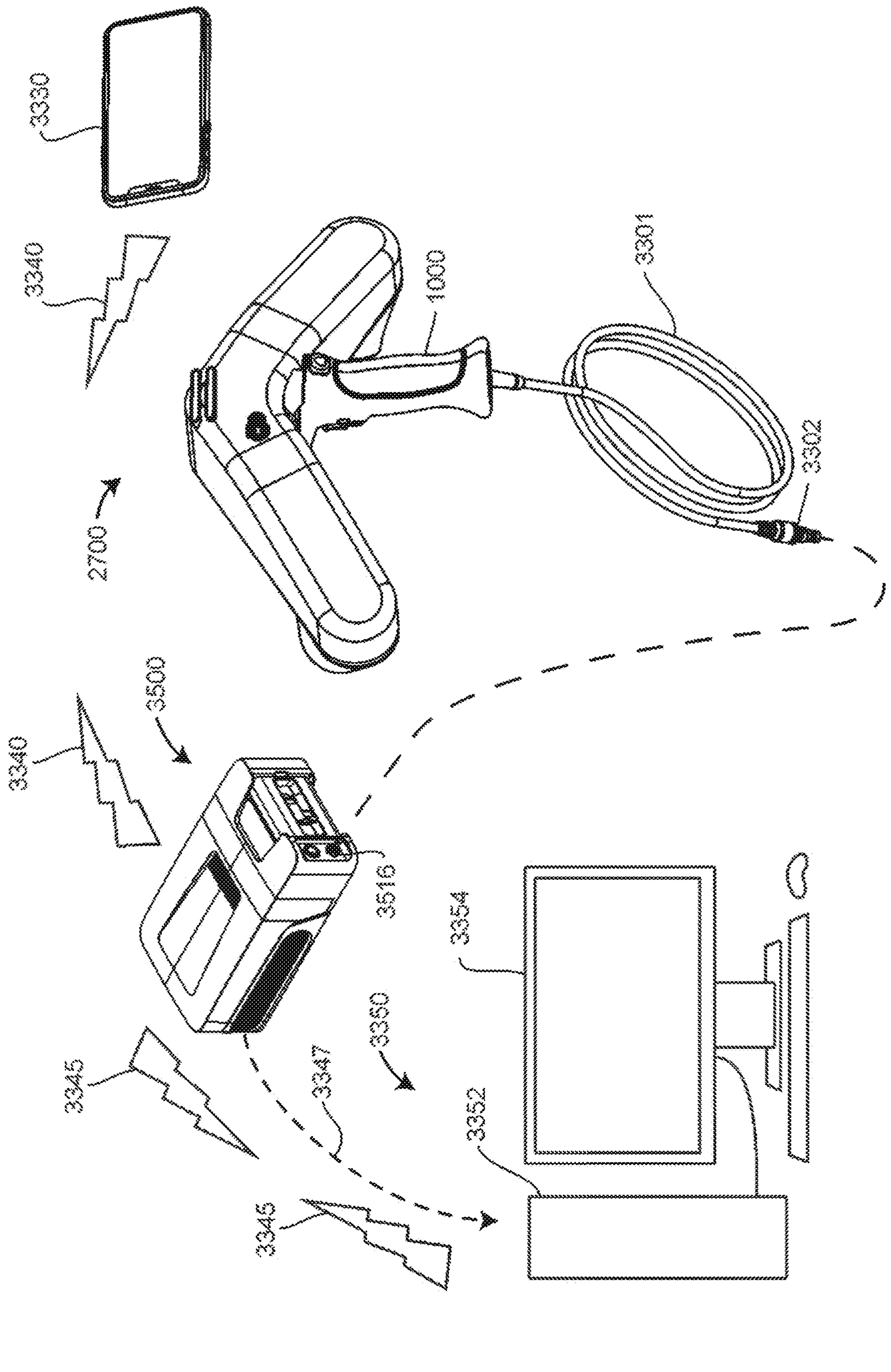

In a third way illustrated schematically in FIG. 33C, communication between the display device 3330 and the mobile PC 3500 is still by wireless communication 3340 as in FIG. 33C, but now there is provided a further system 3350 having at least one of a computing device 3352 and a display 3354. Communication between the mobile PC 3500 and the system 3350 is wireless communication 3345 or wired communication 3347 or both.

Figure 33D:
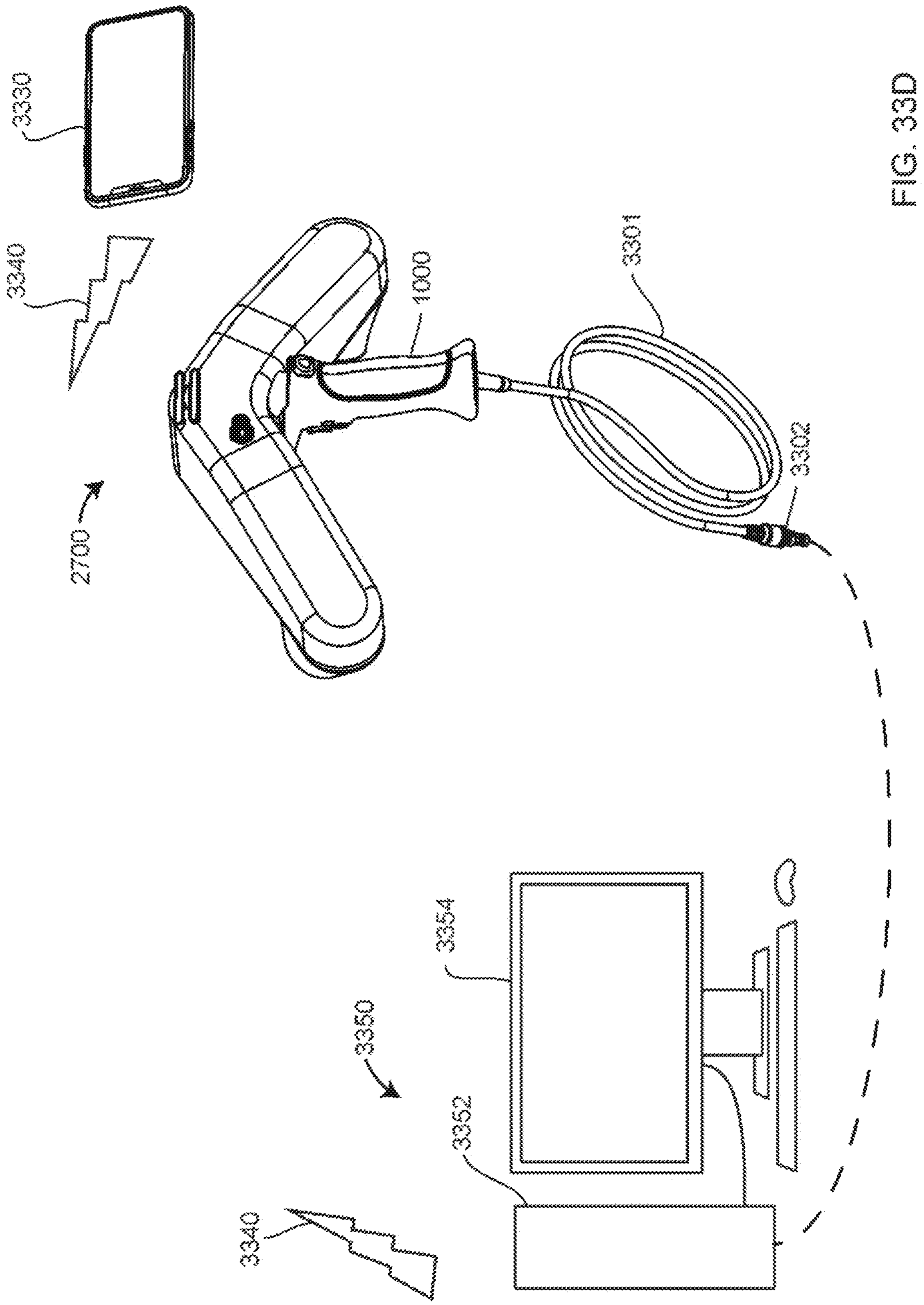
FIG. 33D illustrates a way of using a handheld 3D measuring device with an external computer and a mobile phone display according to an embodiment.

In a fourth way illustrated schematically in FIG. 33D, communication between the display device 3300 and an external computing device 3352 is by wired communication over a cable 3301. In an embodiment, the external computing device 3352 includes a battery or is attached to electrical power. In an embodiment, the external computing device 3352 is a laptop or a touch pad computer. In an embodiment, the display 3354 is integrated into the external computing device 3352. In another embodiment, the display 3354 is a stand-alone display. In an embodiment, the computing device 3352 communicates with the mobile phone 3330 through a wireless communication channel 3340.

Figure 34B:
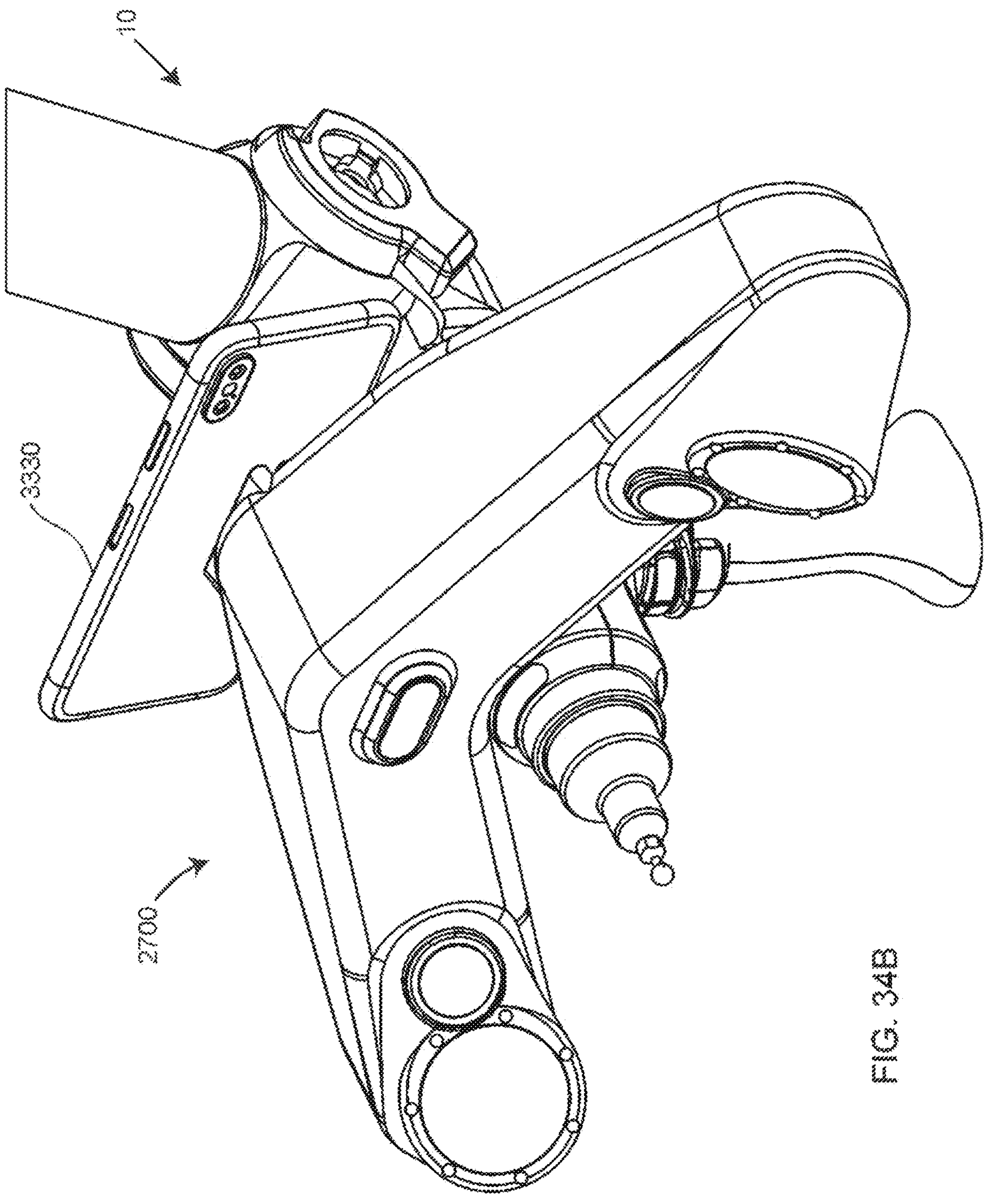
FIG. 34B is an isometric view of an accessory noncontact 3D measuring device coupled to a mobile phone display and an AACMM according to an embodiment.

FIG. 34A is a perspective view of the noncontact 3D scanner 2700 to which a mobile phone 3330 has been magnetically affixed. FIG. 34B is a perspective view of a noncontact 3D measuring device 2900 affixed to an AACMM 10. A mobile phone 3330 is magnetically affixed to the body 2510 of the noncontact 3D measuring device 2900.

Figure 36A:
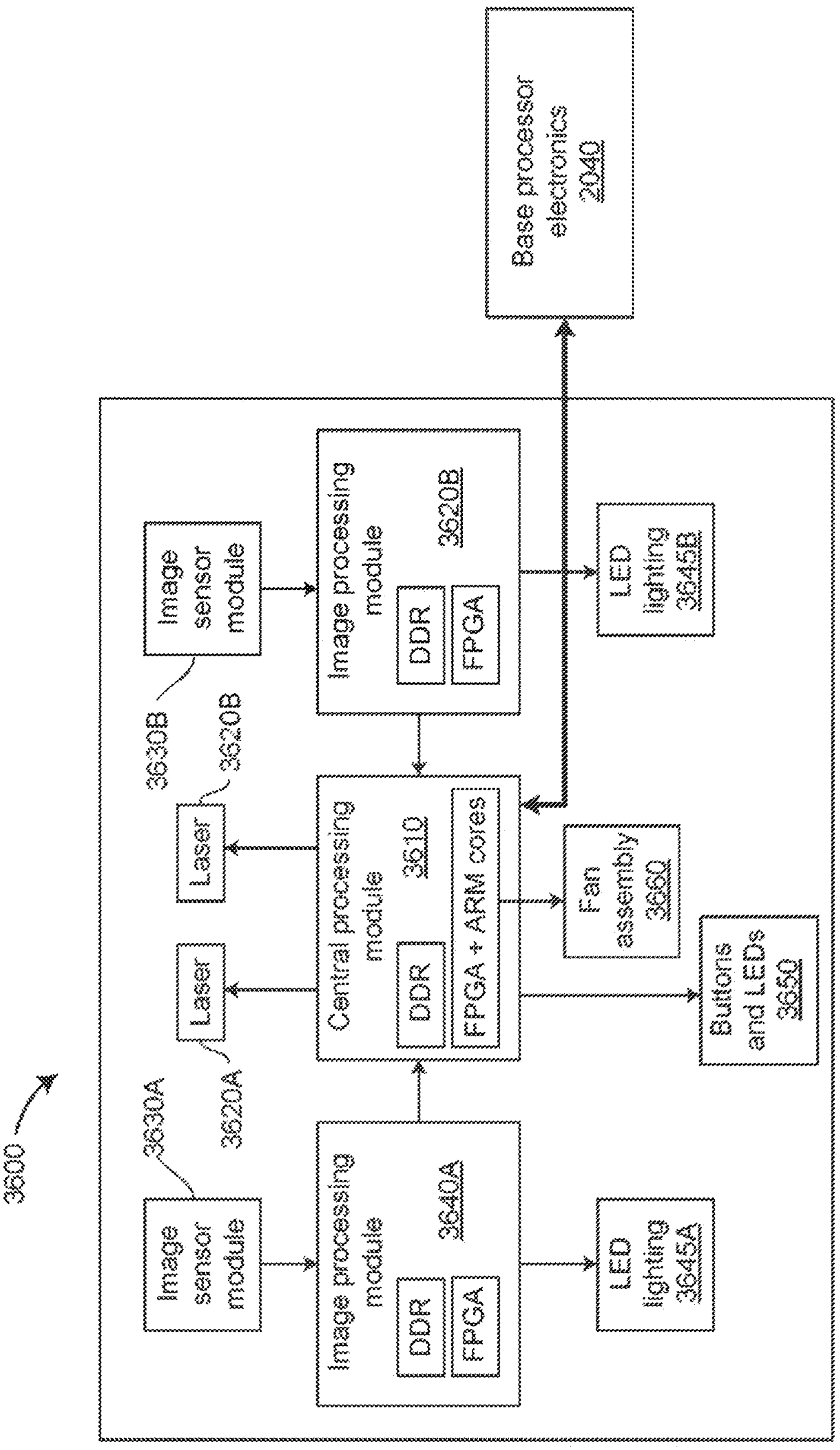
FIG. 36A is a block diagram of electronics within an accessory noncontact 3D measuring device used in combination with AACMM base processor electronics according to an embodiment.

FIG. 36A is a block diagram showing electronics 3600 within the accessory noncontact 3D measuring device 2900. When the noncontact 3D measuring device 2900 is coupled to the AACMM 10 as shown in FIG. 24, a central processing module within the electronics 3600 is coupled to base processor electronics 2040, shown in FIG. 2C. The electronics 3600 includes a central processing module 3610 having a double data rate synchronous dynamic random-access memory (DDR) and field-programmable gate array (FPGA) and advanced RISC machines (ARM) cores. The central processing module activates lasers through electronics 3620A, 3620B. The light from the lasers illuminate the object, the image of which is captured by image sensor modules 3630A, 3630B. The digital images from the digital sensor modules 3630A, 3630B is processed by image processing modules 3640A, 3640B, respectively. The image processing modules 3640A, 3640B each include DDR and FPGA electronics. The image processing modules 3640A, 3640B further activate LEDs 3645A, 3645B for lighting of markers or natural features, as discussed herein above. In an embodiment, the LEDs are illuminated synchronously with the image capture by the image sensor modules 3630A, 3630B. The central processor module 3610 further includes electronics 3650 that activates buttons and LEDs for operation of the hardware in the AACMM 10 affixed to the noncontact 3D measuring device 2900. The central processing module 3610 also activates the fan assembly for cooling of the noncontact 3D measuring device 2900.

Figure 36B:
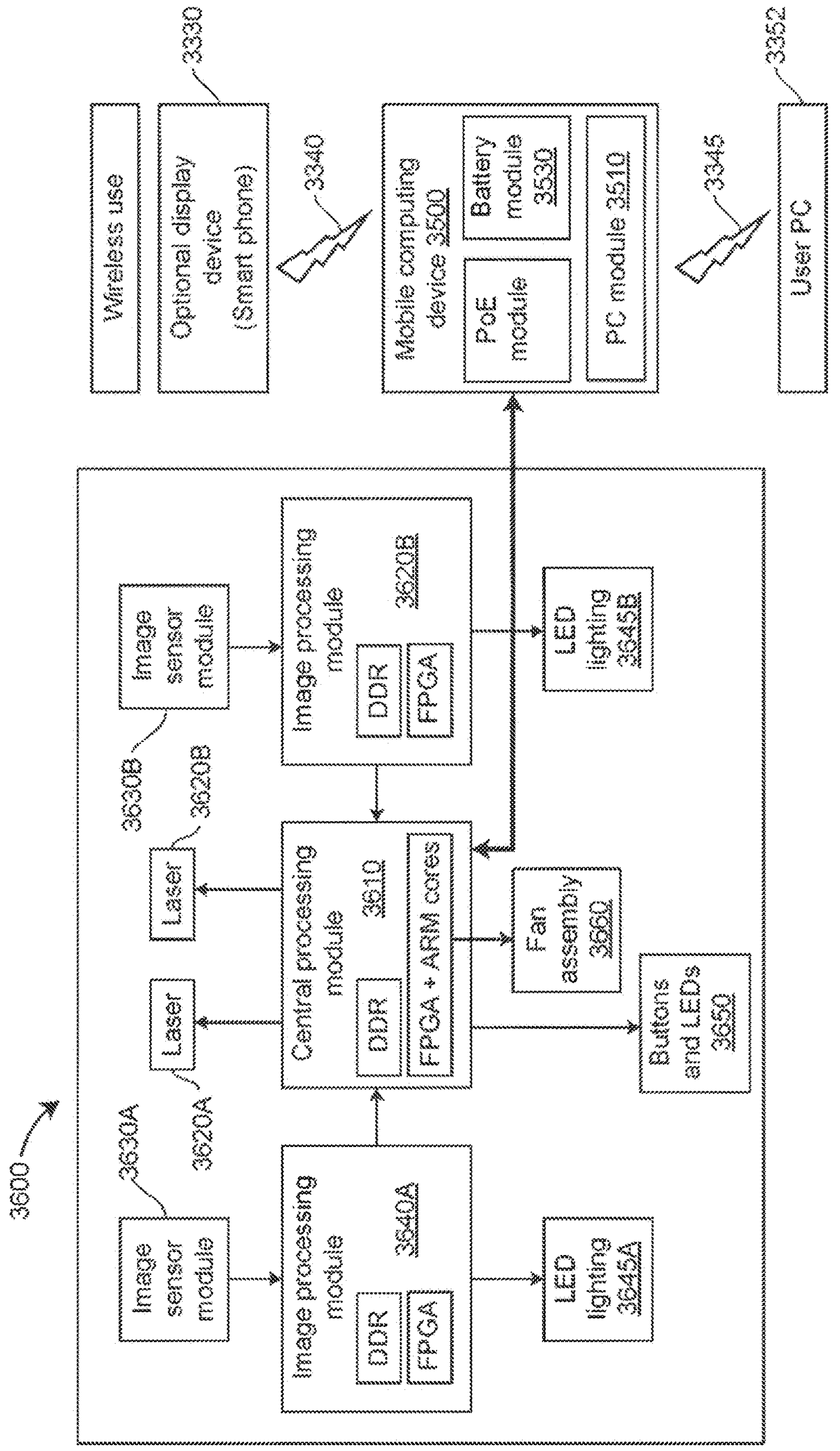
FIG. 36B is a block diagram of electronics within an accessory noncontact 3D measuring device used in combination with a mobile PC, a user PC, and an optional display according to an embodiment.

FIG. 36B is a block diagram that again shows the electronics 3600 within the accessory noncontact 3D measuring device 2900, but now adds the electronics of the mobile computing device 3500, which includes the PC module 3510, the battery module 3530, and the Power Over the Ethernet (POE) function. In the embodiment illustrated in FIG. 36B, the mobile computing device 3500 is further connected wirelessly to a user PC such as the PC 3352 in FIG. 33C. In the embodiment illustrated in FIG. 36B, the user PC 3352 and the smart phone 3330 are coupled wirelessly to the mobile PC 3500.

Figure 36C:
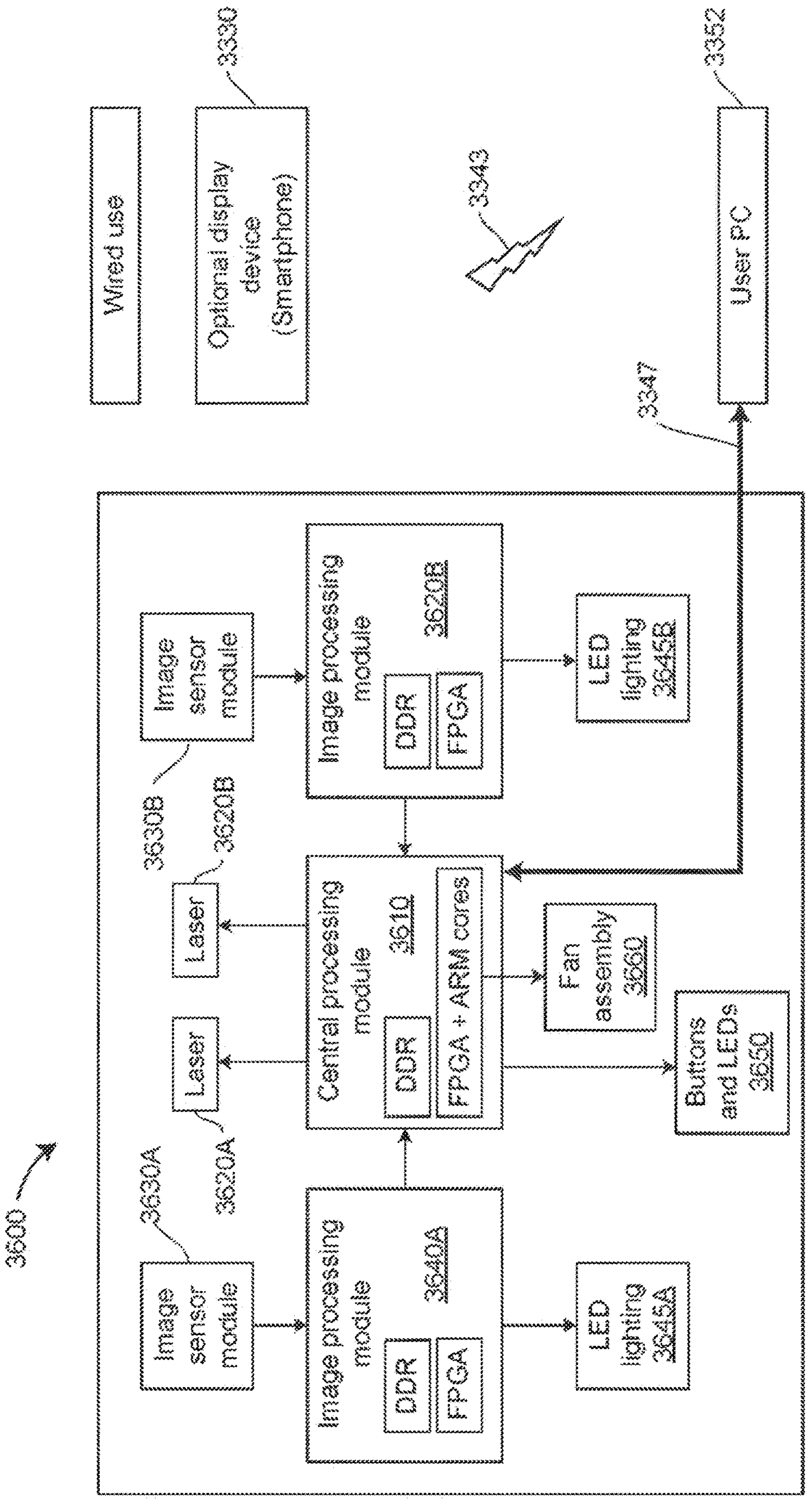
FIG. 36C is a block diagram of electronics with an accessory noncontact 3D measuring device used in combination with a user PC and an optional display according to an embodiment.

FIG. 36C is a block diagram that again shows the electronics 3600 within the accessory noncontact 3D measuring device 2900, but now the mobile PC 3500 has been eliminated. The user PC 3352 is now in wired communication with the user PC 3352, and the smart phone, if present, communicates through bi-directional wireless communication. There are many possibilities for wired and wireless communication based on the electronics within the noncontact 3D measuring device 2900. The electrical components and connections of FIGS. 33A, 33B, 33C, 36A, 36B, 36C are intended to be exemplary rather than limiting in scope.

The electronics 3600 within the noncontact 3D measuring device 2900 cooperates with the AACMM base processor electronics 2040 in FIG. 2A if the accessory noncontact 3D measuring device 2900 is coupled to the AACMM 10. In this case, information provided by the angular encoders of the AACMM 10 supplement the information provided by the image sensors 2520A, 2520B to establish the 3D coordinates of the projected laser lines 2652A, 2652B on an object. In contrast, if the accessory noncontact 3D measuring device 2900 is detached from the AACMM 10, then the image sensors 2520A, 2520B provide image information not only on the projected laser lines 2652A, 2652B but also on imaged markers or imaged natural features to determine 3D coordinates within a global frame of reference. When the AACMM 10 is fixed in place, the pose of the AACMM 10 is fixed until it is moved to a new location. The AACMM 10 can, in this case, be considered to establish a global frame of reference. In contrast, for the handheld laser scanner 2700, the markers or natural features must be matched for each pose of the handheld laser scanner 2700 to place the 3D coordinates captured in each of the different poses in a common frame of reference, which is referred to as a global frame of reference.

For the case in which the noncontact 3D measuring device is detached from the AACMM, the following three processing steps are performed to capture 3D points on an object within a common frame of reference. In a first step, the electronics 3600 uses the captured image to determine a two-dimensional (2D) depth map, also referred to as an X-Z map, for the projected laser lines 2562A, 2562B. As explained herein above in reference to FIG. 32A, the row (i.e., the horizontal axis of the image 3200A in FIG. 32A) of the laser line captured by the image sensor 2544A at a given point on the line corresponds to a depth of that point from the projector to the object. The column number on the line (i.e., the vertical axis of the image 3200A) at a given point on the line corresponds to an angle of that point from the projector to the object. This explains why the captured image can be considered to determine the 2D depth map, or X-Z map. The X-Z map can also be considered to provide 3D coordinates for the projected laser line within the frame of reference of the accessory noncontact 3D measuring device 2900. The third "Y" dimension is effectively added to the X-Z coordinates of the depth map because the direction of the projected laser line (plane) is known relative to the accessory noncontact 3D measuring device 2900.

In a second step, for the case in which markers are affixed to the object, the electronics 3600 uses the images of markers 3220A obtained by the first image sensor 2544A and the images of markers 3220B obtained by the second image sensor 2544B to determine 3D coordinates of the markers within the frame of reference of the handheld laser scanner 2700.

In a third step, the electronics 3600 sends to an external processor the determined 2D depth map for the two projected laser lines 2652A, 2652B, and it also sends the determined 3D coordinates of the markers within the frame of reference of the handheld laser scanner 2700. For example, in an embodiment, the external processor is the mobile computing device 3500 of FIG. 36B, possibly used in combination with a user PC. In another embodiment, the data are sent directly to a user PC 3352. The external processor, wherever located, uses the data sent from the electronics 3600 to determine 3D coordinates of the points on the object within a global frame of reference.

The calculated 2D depth map and 3D marker coordinates provided by the noncontact 3D measuring device 2900 to the external processor enables rapid determination by the external processor of 3D coordinates of object points within a global frame of reference. Because the laser lines 2652A, 2652B are provided over a relatively narrow FOV, the handheld laser scanner 2700 provides high resolution 3D images at high speed. In most cases, such 3D images require no post-processing and can provide real-time feedback to the operator. Furthermore, the simultaneous capture of the two lines of light 2652A, 2652B, each at a different angle, provides a relatively high object coverage without sacrificing detail. For example, the handheld scanner 2700 would be expected to rapidly capture fine 3D details of a coin over which pass the beams of light 2562A, 2652B from the scanner.

Considered now are methods for obtaining 3D coordinates over regions of various sizes. As discussed herein above, markers are often placed on objects to assist in registration of projected lines of light. For the case in which markers cover a relatively small area, for example, as illustrated in the situation of FIG. 37, measurement with a 3D measuring device such as the handheld 3D scanner 2700 is likely accurate without taking additional steps, especially if a surface being measured has relatively little curvature. For medium or large areas, especially in regions with high curvature, supplementary methods are needed to obtain desired accuracies.

Figure 38:
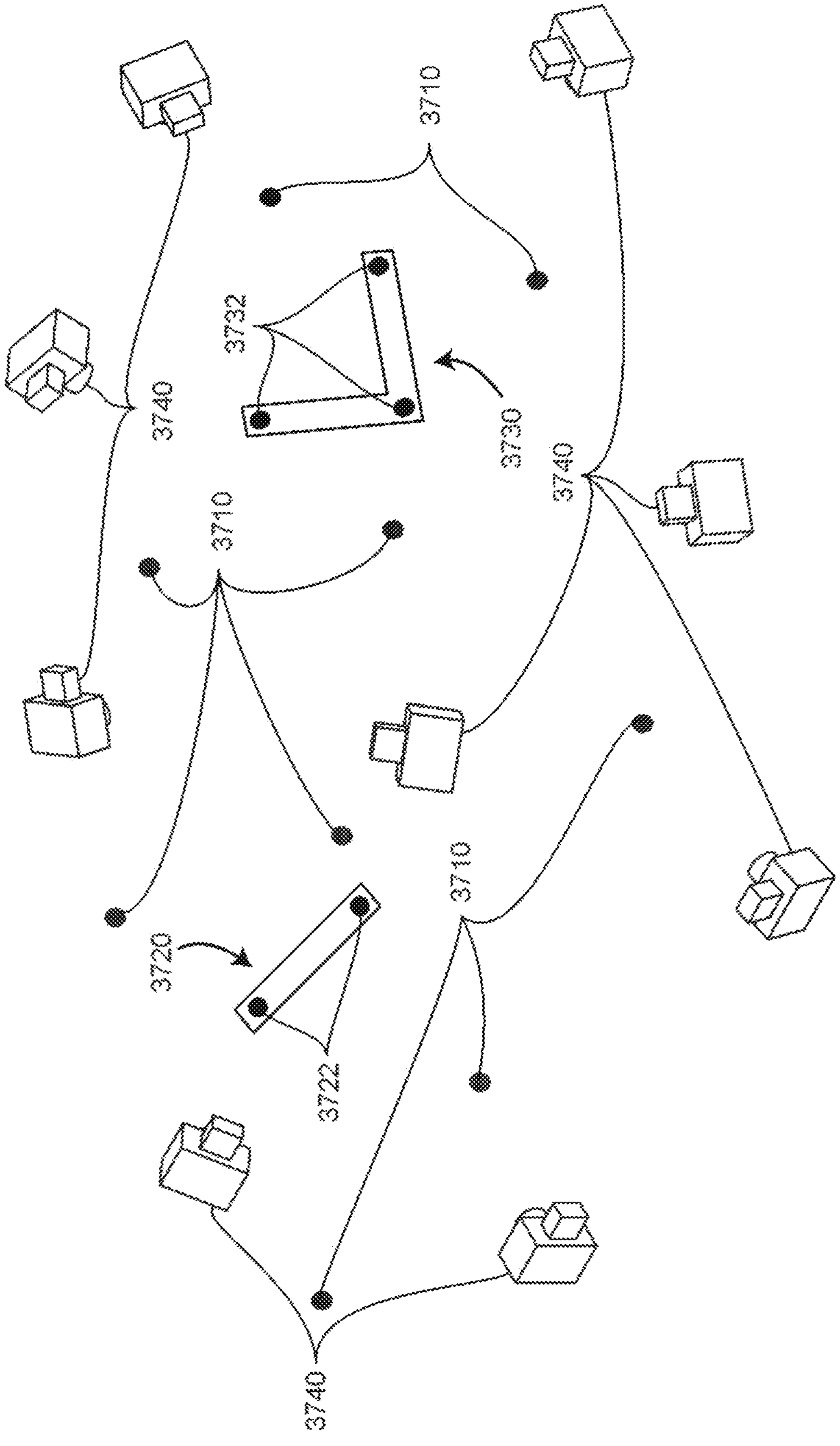
FIG. 38 is a schematic representation of a camera used to measure markers and reference lengths to determine 3D coordinates of the markers according to an embodiment.

A supplementary method that is used to improve accuracies is to determine 3D coordinates for each of the markers 3710 in a common frame of reference within a given measurement volume. The 3D coordinates determined by scanned patterns of light 2562A, 2562B on object surface can be fit into the common frame of reference determined by the markers. A common way to establish 3D coordinates for such markers is with photogrammetry, as illustrated schematically in FIG. 38. FIG. 38 includes a collection of markers 3710 which are placed on the object to be scanned. In addition, one of more reference objects such as the objects 3720 and 3730 are placed in the background so that they are captured by one or more photogrammetry cameras 3740 moved to many different poses. Each of the reference objects includes reference lengths between reference markers that are also imaged by the photogrammetry camera 3740. For example, the reference object 3720 includes a calibrated reference length between the markers 3722. The reference object 3730 includes two calibrated distances between the markers 3732. In most cases, if a single photogrammetry camera 3740 is used, the photogrammetry camera 3740 is moved, not only to different positions, by it is also rotated to different orientations. In most cases, the aberration parameters used to correct images in the photogrammetry camera by removing distortions and other aberrations are determined each time a new photogrammetry measurement is made based on all the measurements collected at the different poses. When a number of such measurements are made at different poses and the results solved to find 3D coordinates of the markers 3730, the calculation that is performed to determine the 3D coordinates of the markers 3710 is said to be a "bundle adjustment." In most cases, the measurement performed is a least squared measurement in which the 3D coordinates are selected to minimize the sum of squared deviations in the observed values relative to the calculated values. As a part of part of the bundle adjustments, the camera parameters are also adjusted. Without the presence of reference lengths in some of the camera images, it is possible to determine a rigid structure in which the 3D coordinates of the markers 3710 are determined self-consistently but in which the scale of the rigid structure is unknown and is arbitrarily selected. The availability of the reference lengths in at least some of the images obtained by the camera(s) 3740 provides a scale for the resulting rigid structure. In most cases, photogrammetry cameras are used with flash attachments so that the positions of markers are quickly obtained, minimizing jitter in a handheld camera.

Figure 39A:
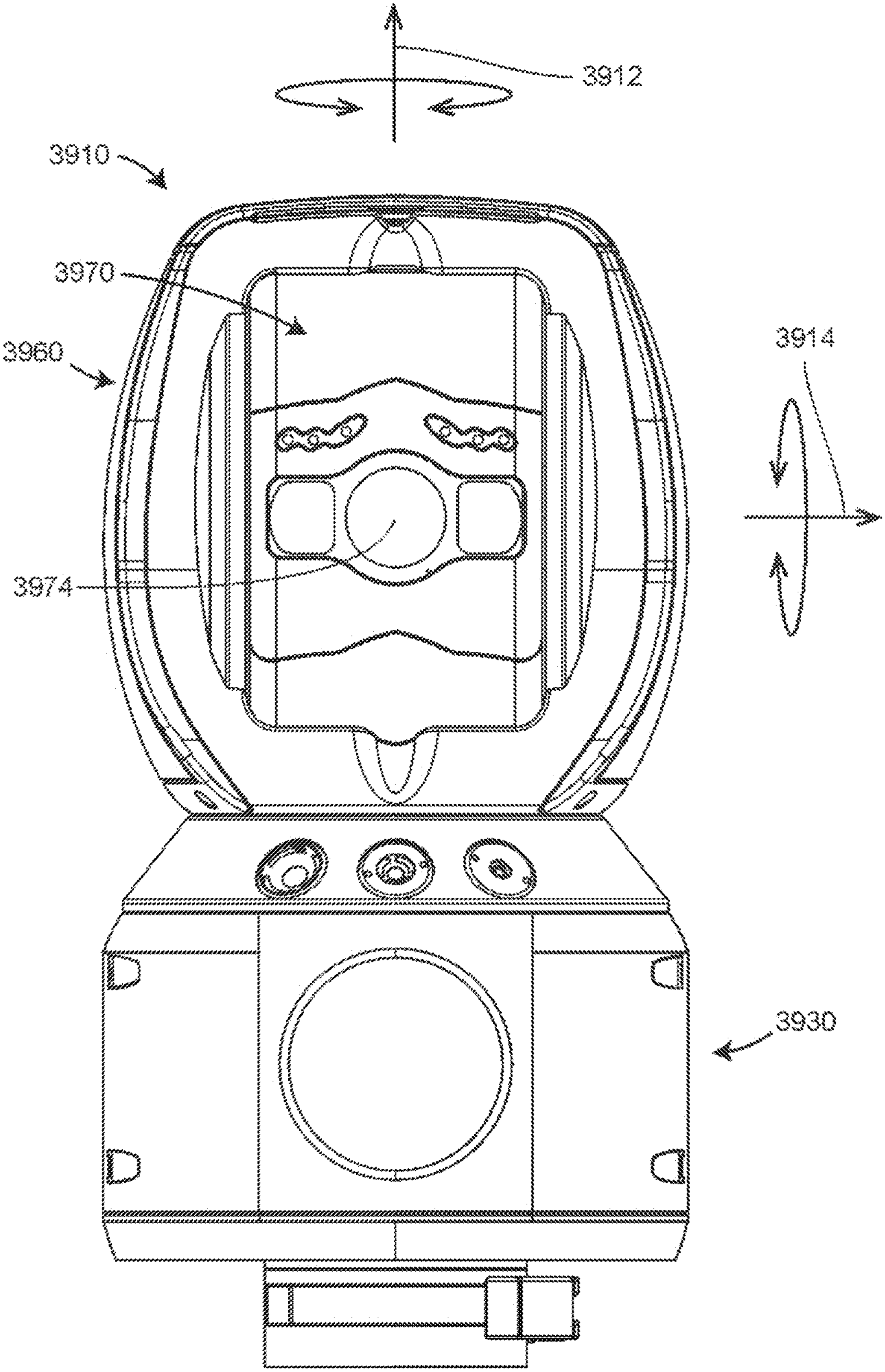
FIG. 39A is a front view of a laser tracker according to an embodiment.

In an embodiment, an alternative method for determining the positions of reference markers that has many advantages over the use of reference objects such as 3720, 3722 is to establish reference lengths by measuring with a laser tracker reference lengths between kinematic nests. FIG. 39A shows a front view of a laser tracker 3910. Although device 3910 is referred to as a laser tracker, it is more generally referred to as a 3D coordinate measuring device. As explained in the introduction, the term laser tracker is here used to refer to laser tracker in a general sense and includes a total station or other related device. Despite its name, a laser tracker does not necessarily launch light from a laser but instead launches light from a superluminescent diode, a light emitting diode (LED), or other light source.

The laser tracker 3910 belongs to a class of instruments that measure the 3D coordinates of a target point by sending a beam of light to the point. The beam of light impinges directly on the point or on a retroreflector target in contact with the point. In either case, the instrument determines the coordinates of the target point by measuring a distance and two angles to the target. The distance is measured with a distance-measuring device such as an absolute distance meter or an interferometer. The angles are measured with an angle-measuring device such as an angular encoder. The beam is steered with a gimbaled mechanism, a galvanometer mechanism, or other mechanism.

Figure 40:
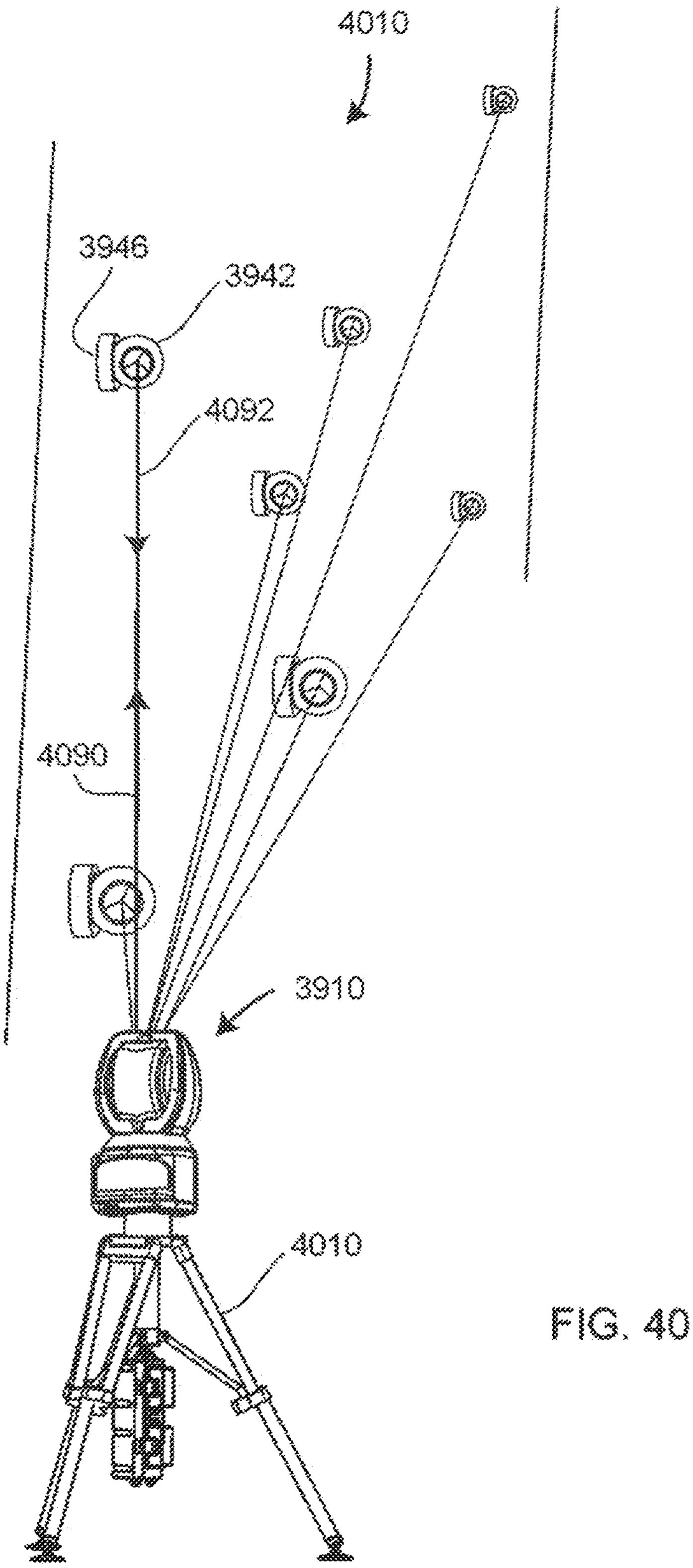
FIG. 40 is a perspective image of a laser tracker measuring 3D coordinates of an SMR placed in each of a collection of mounted kinematic nests according to an embodiment.

The base assembly 3930 is ordinarily stationary with respect to a work area, for example, being mounted on an instrument stand or an industrial tripod such as the industrial tripod 4010 in FIG. 40. The yoke assembly 3960 rotates about an azimuth axis 3912, sometimes referred to as a standing axis or a vertical axis, although it should be appreciated that the laser tracker 3910 is, in general, positioned upside down or be rotated to an arbitrary angle with respect to a floor. The payload assembly 3970 rotates about a zenith axis 3914, sometimes referred to as a transit axis or a horizontal axis. The laser tracker 3910 sends outgoing light 4090 (FIG. 40) through an exit aperture 3974 to a retroreflector, which in an embodiment is a spherically mounted retroreflector (SMR) 3942. The SMR 3942 returns the light along a parallel path as returning light 4092, which passes a second time through the exit aperture 3974.

The SMRs 3942 in FIG. 40 sit on kinematic nests 3946. For this application, a convenient diameter for the SMR is 0.5 inch, with the kinematic nests 3946 sized to match the 0.5-inch SMR. When placed in the kinematic nest 3946, the SMR 3942 rotates about the center of the spherical surface of the SMR 3942. Hence, an SMR 3942 placed in a kinematic nest 3946 returns the light 4092 along the same line as the outgoing light 4090 but in the opposite direction. It is common practice to temporarily attach kinematic nests 3946 with hot glue. Hot glue is rapidly applied and easily removed and provides high mechanical stability in the attachment.

Figure 39B:
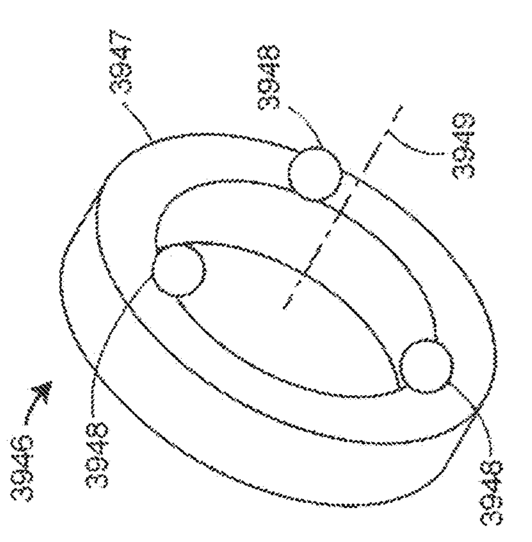
Figure 39C:
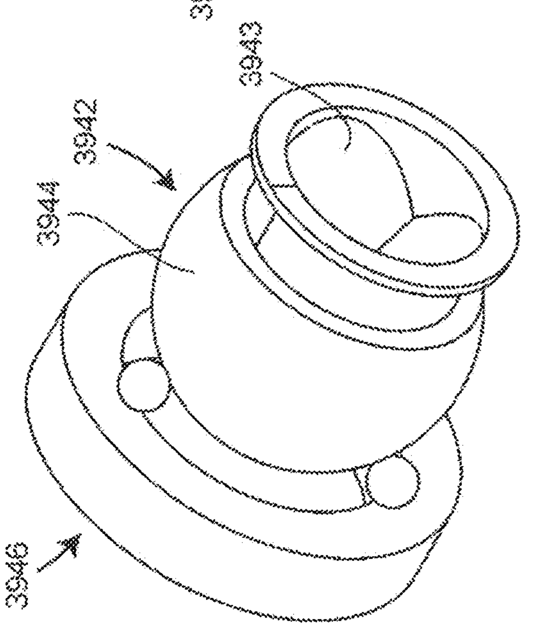
Figure 39D:
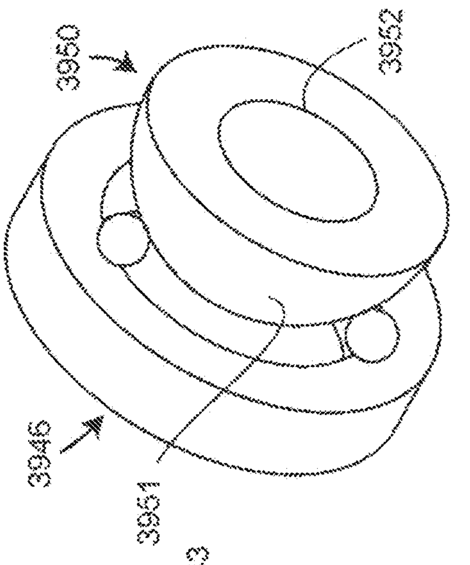

FIG. 39B illustrates a simple type of kinematic nest 3946. It includes three spherical balls 3948 mounted in place on a frame 3947. When a spherical surface such as the surface 3944 of the SMR 3942 is placed in contact with the three spheres 3948, tilting or rotating of the SMR 3942 while maintaining contact between the spherical surface 3944 and the spheres 3948 causes the SMR 3942 to remain centered at a fixed point located along the axis 3949. The retroreflector element 3943 includes three mutually perpendicular planar reflectors, which intersect at a vertex positioned at the sphere center. Another element that is used with a kinematic nest 3946 is a kinematic reflector 3950 shown in FIG. 39D. In an embodiment, the kinematic reflector 3950 includes a hemisphere with a reflective element 3952 centered on a top surface of the hemisphere. In an embodiment, the kinematic reflector 3950 has the same radius and the same center as the SMR 3942. As the kinematic reflector 3950 is rotated about its sphere center, the center of the reflective element 3952 remains at fixed in place.

Figure 39E:
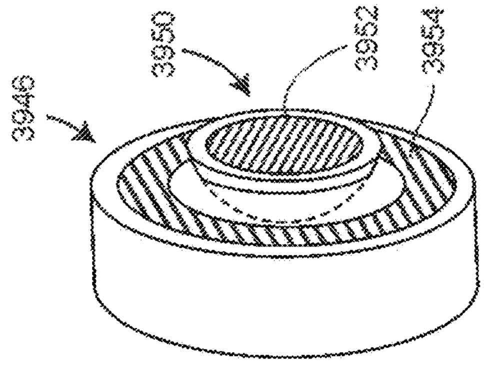

In an embodiment, the kinematic adapter 3946 and kinematic reflector 3950 take an alternative form shown in FIG. 39E. The kinematic reflector 3950 is in contact with three contact points (not shown) in the kinematic nest 3946. As in FIG. 39D, the center of the reflective element 3952 remains fixed in place as the kinematic reflector 3950 is rotated within the kinematic nest 3946. In an embodiment, the kinematic nest 3946 includes a further marking 3954. The purpose of the marking 3954 is to help distinguish a kinematic reflector 3950 from an ordinary reflective marker 3710. In an embodiment, the marking 3954 is placed on the edges of the kinematic nest 3946 in addition to, or instead of, the front surface of the kinematic nest 3946.

Figure 39F:
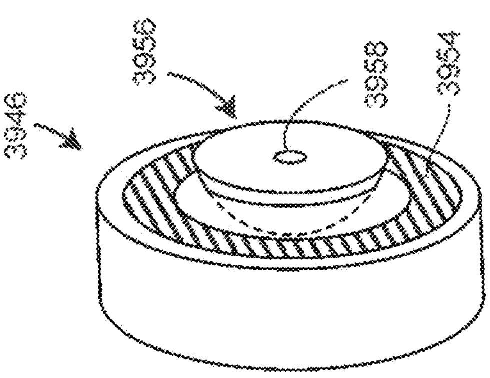
Figure 39G:
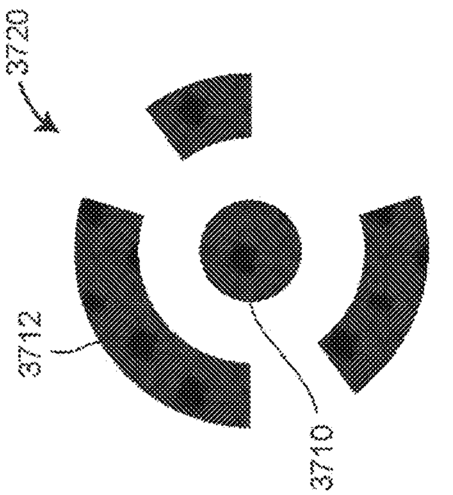
FIG. 39G is a representation of a marker surrounded by a coded pattern according to an embodiment.

FIG. 39F is an isometric view of a kinematic nest 3946 onto which is mounted a kinematic adapter 3956 having a spherical seat 3958. As before, the kinematic nest 3946 has a spherical surface and a sphere center. The seat 3958 is sized to accept the a probe tip 904 (FIGS. 20B, 22E, 25) of an AACMM 10. As the AACMM 10 is rotated to different orientations, the probe tip 904 will remain centered in the seat 3958 and in the kinematic adapter 3956. Furthermore, the center of the probe tip 904 in the kinematic nest 3946 has the same 3D coordinates as the center of an SMR 3942 placed in the same kinematic nest 3946. FIG. 39G is an expanded view of the coded marker 3720, shown previously in FIG. 37. The coded marker 3720 includes the marker 3710 and the coded region 3712. The coded markers 3720 are used to help identify individual markers 3710 from among a large collection of markers 3710. In an alternative embodiment, the probe tip 904 on the AACMM has the same diameter as the SMR 3942, for example, 0.5 inch in the example given above. In this case, the probe tip is placed directly into the kinematic nest 3946 without the need for the kinematic adapter 3956 having the spherical seat 3958.

In an embodiment illustrated in FIG. 40, the laser tracker 3910 measures the 3D coordinates of the centers of a collection of SMRs 3942 placed in kinematic nests 3946 on an object 4010, which in this case is a wall. The laser tracker 3910 measures the 3D coordinates of the SMRs 3942 to relatively high accuracy. The collection of measured 3D coordinates forms a complex reference object having reference distances given by the distances between each two of the SMRs 3942. In this way, the reference lengths established by the SMRs 3942 in FIG. 40 take the place of the lengths between markers on the reference objects such as the reference objects 3720, 3730.

Figure 41:
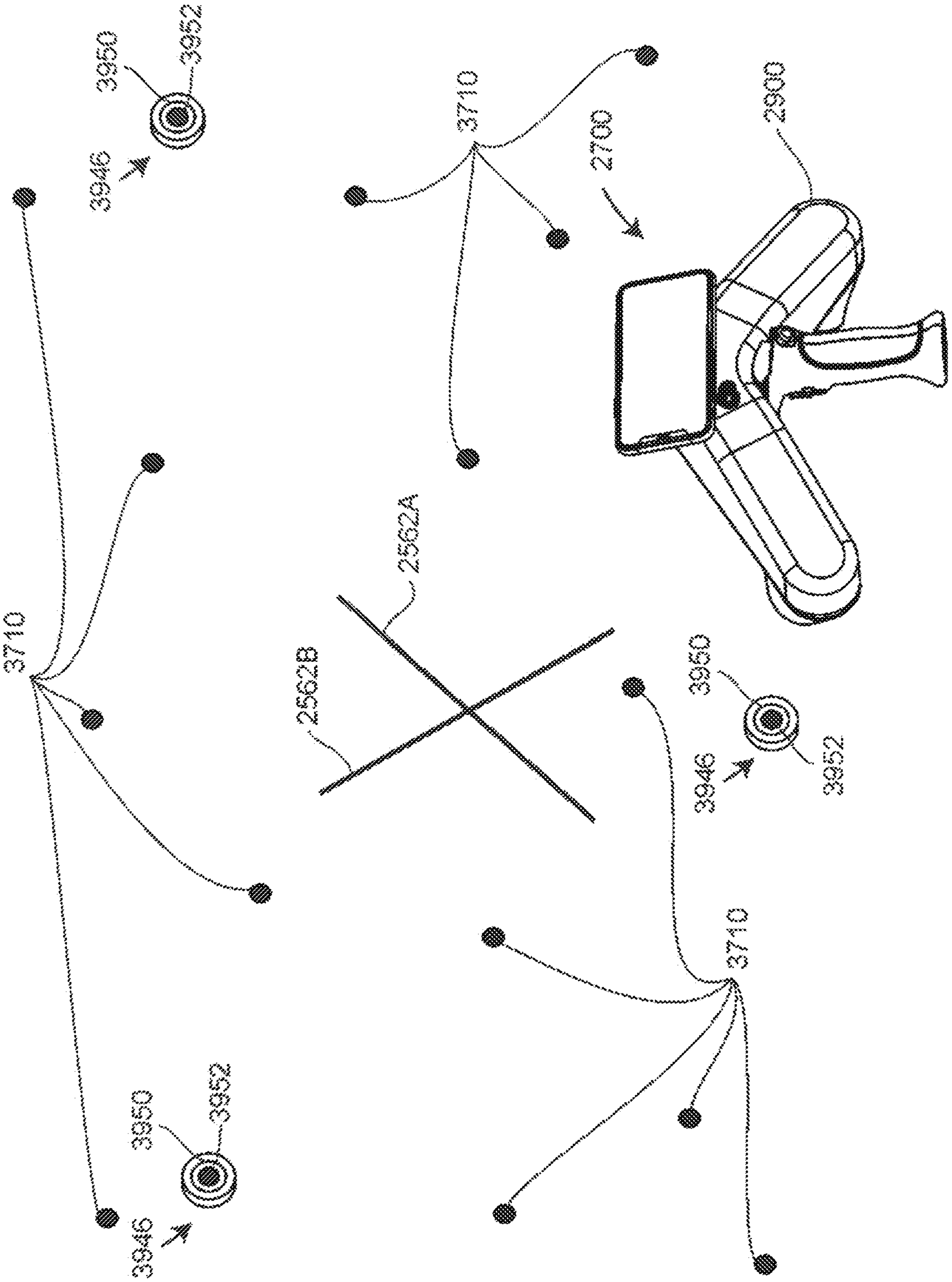
FIG. 41 is a schematic representation of a handheld 3D measuring device that measures kinematic reflectors in kinematic nests and in addition measures markers and projected lines of light according to an embodiment.

FIG. 41 shows the handheld 3D scanner 2700 projecting lines of light 2562A, 2562B onto an object. The handheld 3D scanner 2700 measures the projected lines 2562A, 2562B as well as a collection of markers 3710 placed on the object. In addition, the handheld 3D scanner 2700 measures the positions of the reflector adapters 3950 having reflective elements 3952. Because the radius of the SMR 3942 is the same as the radius of the reflector adapter 3950, the SMR 3D center coordinates 3942 measured by the laser tracker 3910 are the same 3D center coordinates of the reflective elements 3952. The handheld scanner 2700 includes the noncontact 3D measuring device 2900, which in another embodiment is removed from the handheld scanner and attached to a robotic device such as a mobile cart, for example. The 3D measuring device 2900 operating in this mode is used in the methods described in FIGS. 42A, 42B.

Although most photogrammetry cameras are individual cameras such as the cameras 3740 in FIG. 38, there are advantages in using the stereo camera comprising the cameras 2520A, 2520B to measure the reflective markers 3910 and 3952. Because the relative pose of the cameras 2520A, 2520B is known, triangulation calculations can be used to determine the 3D coordinates of each reflector 3910, 3952 within the frame of reference of the noncontact 3D measuring device 2900. This is in contrast to the angle-only information obtained from the measurements made by the cameras 3740 in FIG. 38. This provides greater speed and accuracy in determining the 3D coordinates of the markers 3710 and the reflector adapters 3950 within the frame of reference of the handheld 3D scanner 2700.

Using the known positions of the reflective elements 3952 based on the tracker measurements of the SMRs 3942, it is possible to perform the photogrammetry measurement with the handheld 3D scanner 2700 to determine the 3D coordinates of the reflective elements collected over a large volume. FIG. 42 is a flow chart of a method for determining the 3D coordinates of the reflective elements 3952 according to an embodiment.

Figure 42A:
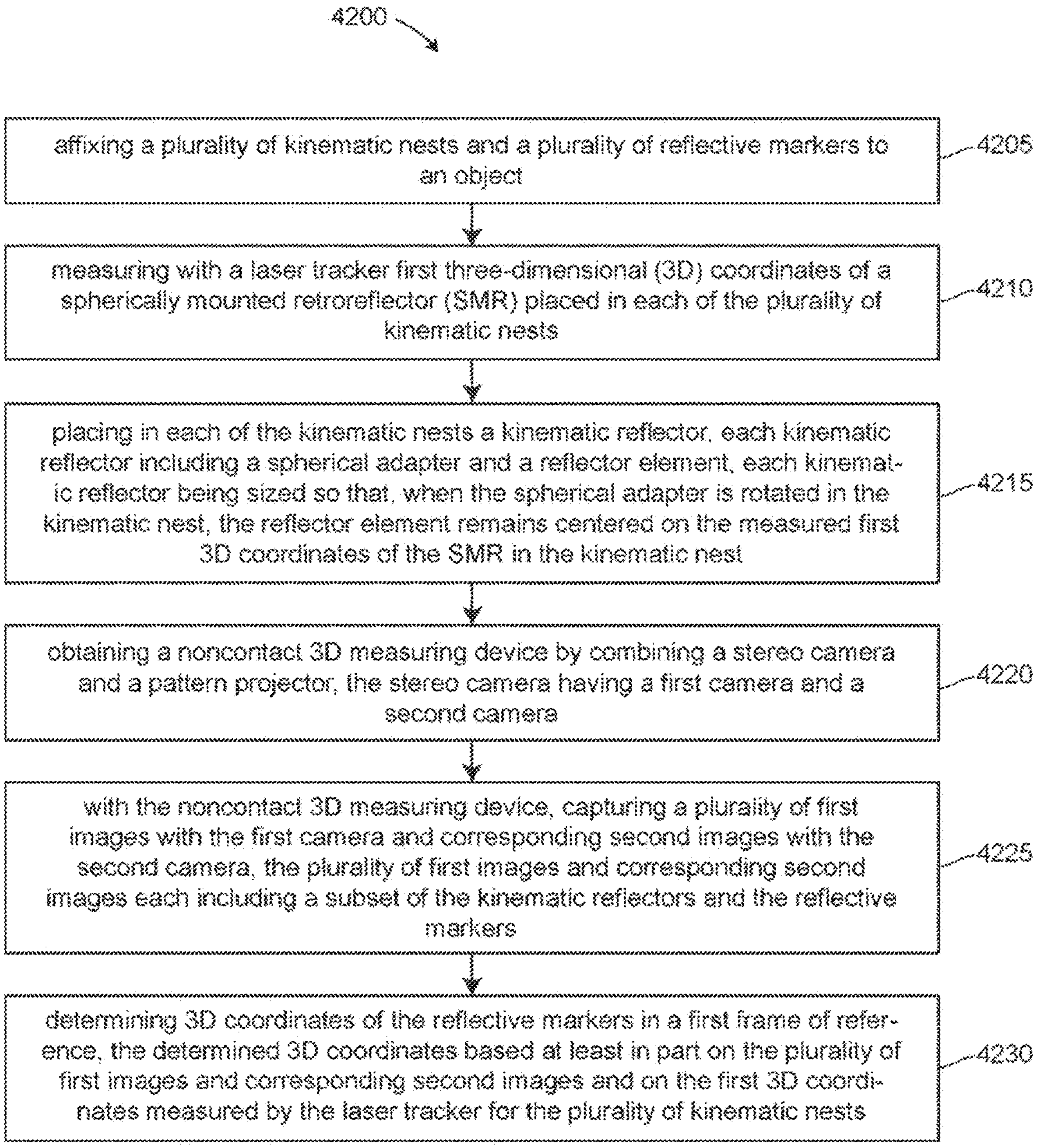
FIG. 42A and FIG. 42B are block diagrams showing elements of methods according to embodiments.
Figure 42B:
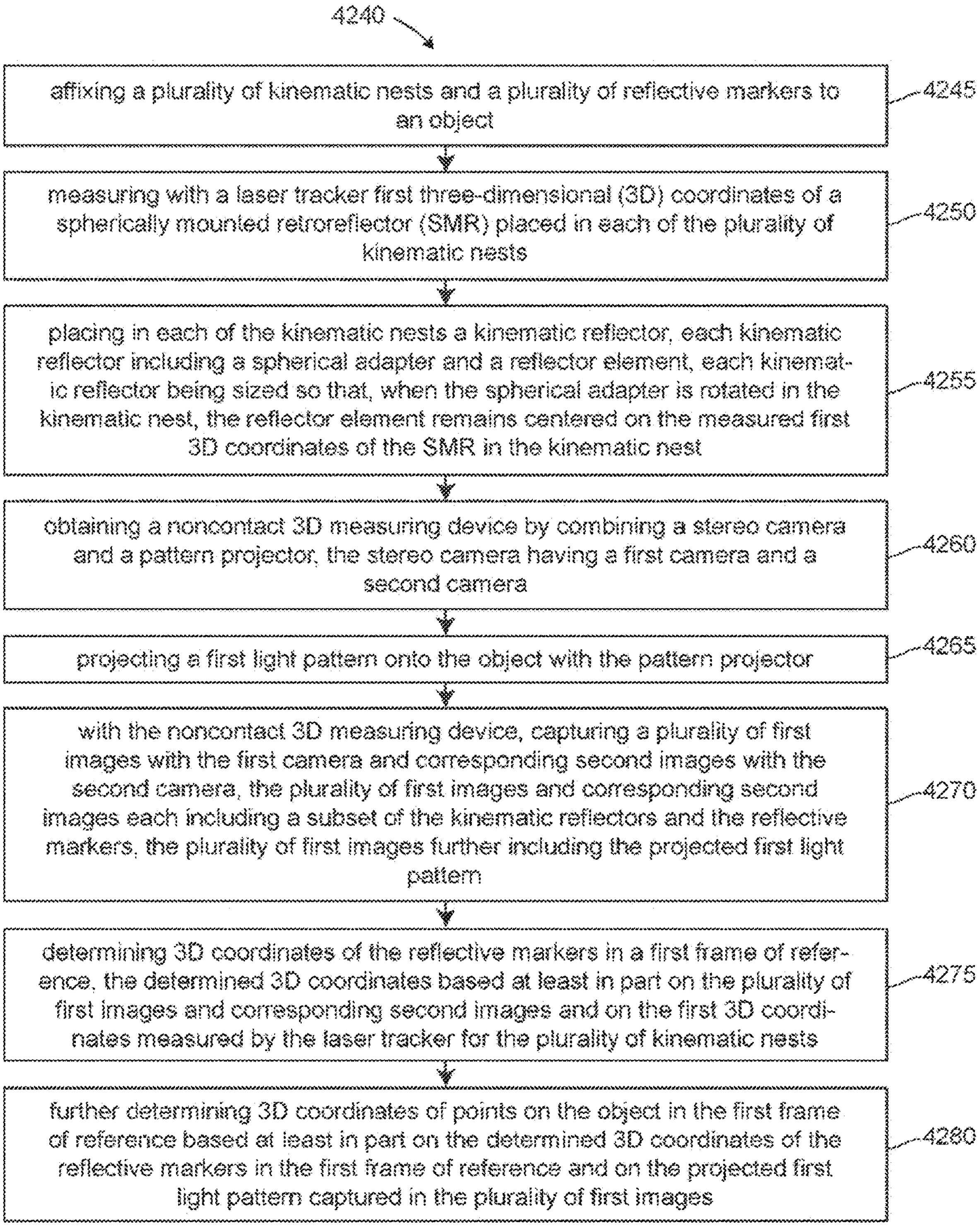

FIG. 42A shows elements in a method 4200 for determining 3D coordinates of markers common frame of reference based on measurements made with a device such as a handheld 3D scanner 2700. An element 4205 includes affixing a plurality of kinematic nests to an object. Examples of kinematic nests are the nests 3946 illustrated in FIGS. 39B, 39C, 39D, 39E, 39F. It is understood that the term "object' as used herein refers to all elements within an environment, even elements on a periphery of the region being measured, so that within the context of the claims all the kinematic nests and markers lie on the object. In an embodiment, the kinematic nests are attached to the object with hot glue, a material that is easily applied and removed and has good mechanical stability.

An element 4210 includes measuring, with a laser tracker, three-dimensional (3D) coordinates of a spherically mounted retroreflector (SMR) placed in each of the kinematic nests. Examples of such SMRs are the elements 3942 in FIGS. 39D, 40.

An element 4215 includes placing in each of the kinematic nests a kinematic reflector, each kinematic reflector including a spherical adapter and a reflector element, each kinematic reflector being sized so that, when the spherical adapter is rotated in the kinematic nest, the reflector element remains centered on the measured first 3D coordinates of the SMR in the kinematic nest. An example of the reflector element is the element 3962 placed on the top surface of the adapter 3950 in FIGS. 39D, 39E.

An element 4220 includes obtaining a noncontact 3D measuring device by combining a stereo camera and a pattern projector, the stereo camera having a first camera and a second camera. An example of such a stereo camera is the combination of the two cameras 2520A, 2520B in the noncontact 3D measuring device 2900 of FIG. 29A.

An element 4225 includes, with the noncontact 3D measuring device, capturing a plurality of first images with the first camera and corresponding second images with the second camera, the plurality of first images and corresponding second images each including a subset of the kinematic reflectors and the reflective markers. In an embodiment, the first camera 2520A captures a plurality of first images like those illustrated in FIG. 32A, and the second camera 2520B captures a corresponding plurality of second images like those illustrated in FIG. 32B.

An element 4230 includes determining 3D coordinates of the reflective markers in a first frame of reference, the determined 3D coordinates based at least in part on the plurality of first images and corresponding second images and on the first 3D coordinates measured by the laser tracker for the plurality of kinematic nests. In an embodiment, exemplary first images are the images 3200A in FIG. 32A and exemplary second images are the images 3200B in FIG. 32B.

The method 4200 described in reference to FIG. 42A uses a laser tracker 3910 and a noncontact 3D measuring device 2900 to quickly establish an accurate network of reference lengths based on reflective markers 3952. Such a procedure is used instead of traditional photogrammetry methods to determine reference lengths such as the lengths 3722, 3732 in FIG. 38. In a method 4240 described in FIG. 41A, measurements of reflective markers 3952 are further integrated with 3D measurements of object points by projecting of one or more light patterns such as the projected light patterns 2562A, 2562B onto the object. In this way, the reflective markers 3952 and the one or more light patterns such as 2562A do not need to be performed sequentially but are instead performed simultaneously, thereby saving time.

An element 4245 of the method 4240 includes affixing a plurality of kinematic nests to an object. Examples of kinematic nests are the nests 3946 illustrated in FIGS. 39B, 39C, 39D, 39E, 39F.

An element 4250 includes measuring, with a laser tracker, three-dimensional (3D) coordinates of a spherically mounted retroreflector (SMR) placed in each of the kinematic nests. Examples of such SMRs are the elements 3942 in FIGS. 39D, 40.

An element 4255 includes placing in each of the kinematic nests a kinematic reflector, each kinematic reflector including a spherical adapter and a reflector element, each kinematic reflector being sized so that, when the spherical adapter is rotated in the kinematic nest, the reflector element remains centered on the measured first 3D coordinates of the SMR in the kinematic nest. An example of the reflector element is the element 3962 placed on the top surface of the adapter 3950 in FIGS. 39D, 39E.

An element 4260 includes obtaining a noncontact 3D measuring device by combining a stereo camera and a pattern projector, the stereo camera having a first camera and a second camera. An example of such a stereo camera is the combination of the two cameras 2520A, 2520B in the noncontact 3D measuring device 2900 of FIG. 29A.

An element 4265 includes projecting a first light pattern onto the object with the pattern projector. In an embodiment this includes one of the projected light patterns 2562A, 2562B in FIG. 28.

An element 4270 includes, with the noncontact 3D measuring device, capturing a plurality of first images with the first camera and corresponding second images with the second camera, the plurality of first images and corresponding second images each including a subset of the kinematic reflectors and the reflective markers, the plurality of first images further including the projected first light pattern. In an embodiment, the pattern captured in the first and second images correspond to the images 3200A, 3200B of FIG. 32A, 32B, respectively.

An element 4275 includes, determining 3D coordinates of the reflective markers in a first frame of reference, the determined 3D coordinates based at least in part on the plurality of first images and corresponding second images and on the first 3D coordinates measured by the laser tracker for the plurality of kinematic nests.

An element 4280 includes further determining 3D coordinates of points on the object in the first frame of reference based at least in part on the determined 3D coordinates of the reflective markers in the first frame of reference and on the projected first light pattern captured in the plurality of first images.

Since the 3D coordinates of the marker coordinates are determined in the element 4250, the 3D coordinates of the markers are determined as the noncontact 3D measuring device 2900 is moved along in front of the object. In this case, it is possible to determine the 3D coordinates of the markers 3710 to relatively high accuracy during the real-time measurement by the noncontact 3D measuring device 2900. Final 3D coordinates of the projected light on the object surface are adjusted slightly after all the markers 2710 and the projected first light pattern (2562A or 2562B or both) have been measured. Alternatively, all the 3D coordinates of the markers 3710 are determined prior to the projection of the laser lines, as described in method 4200.

Figures 43A, 43B:
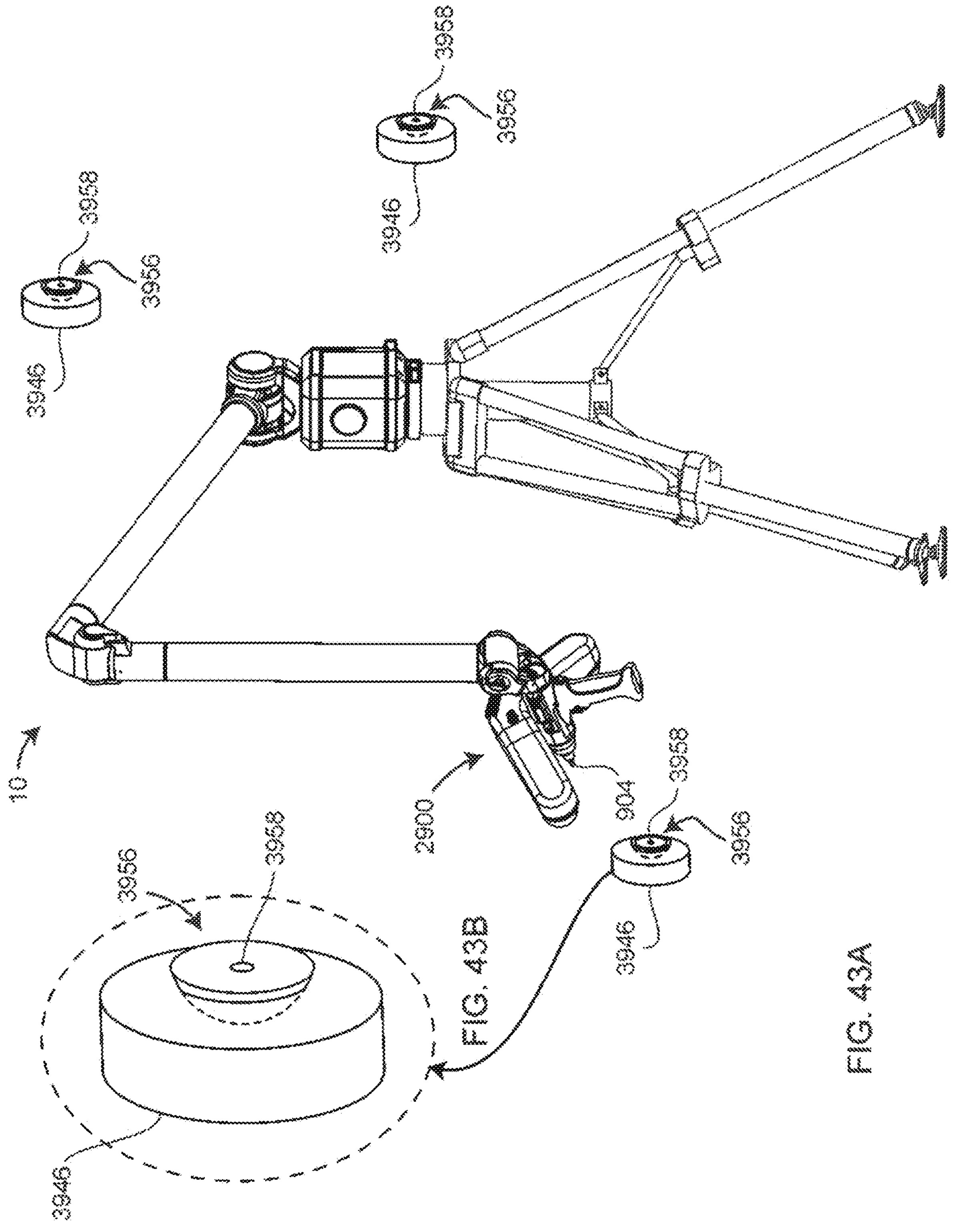
FIG. 43A and FIG. 43B are an isometric view of an AACMM being used to measure seats within kinematic nests according to an embodiment.
Figure 44A:
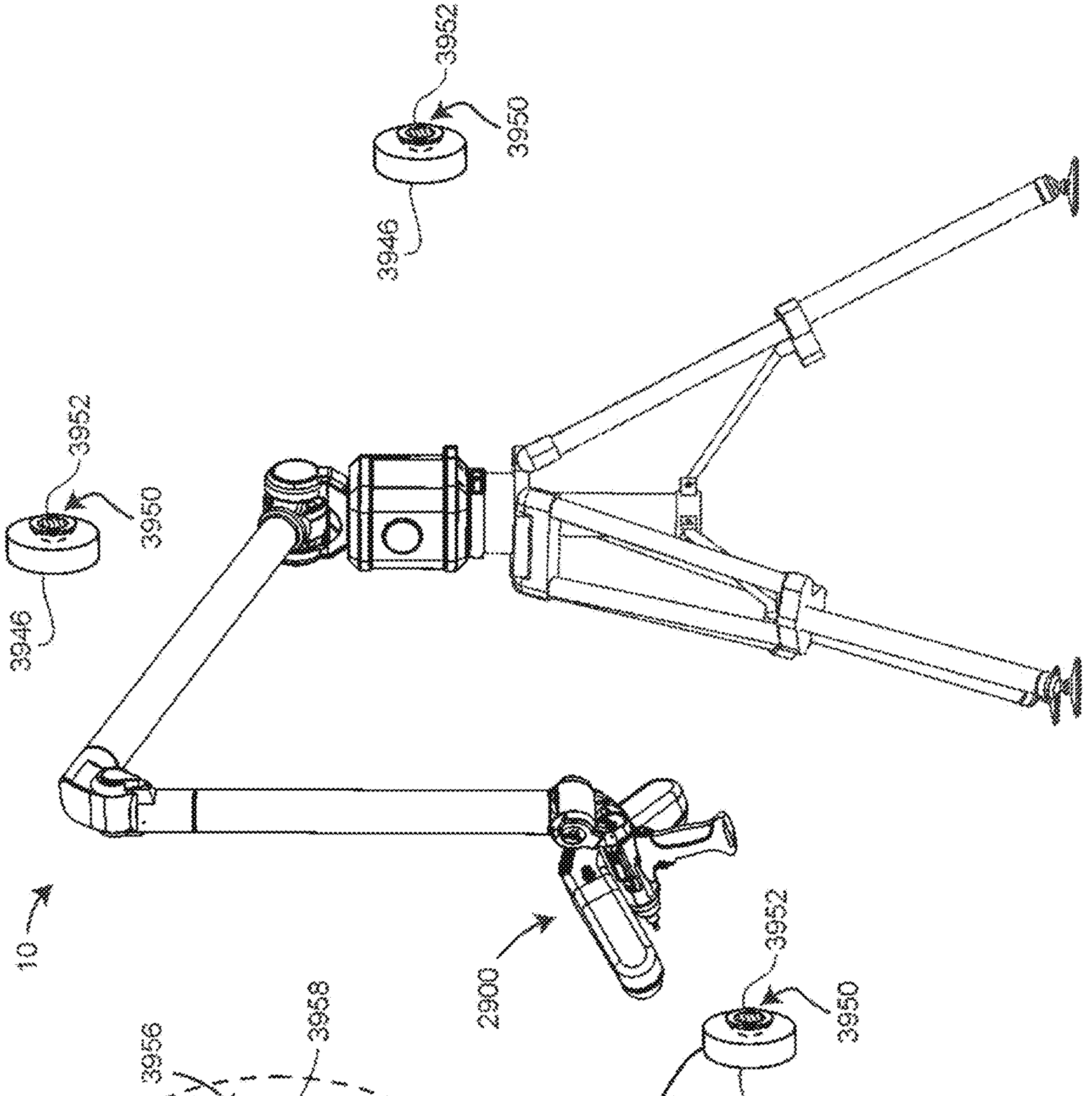
FIG. 44A and FIG. 44B are an isometric view of an AACMM and an accessory noncontact 3D measuring device measuring kinematic reflectors according to an embodiment.
Figure 44B:
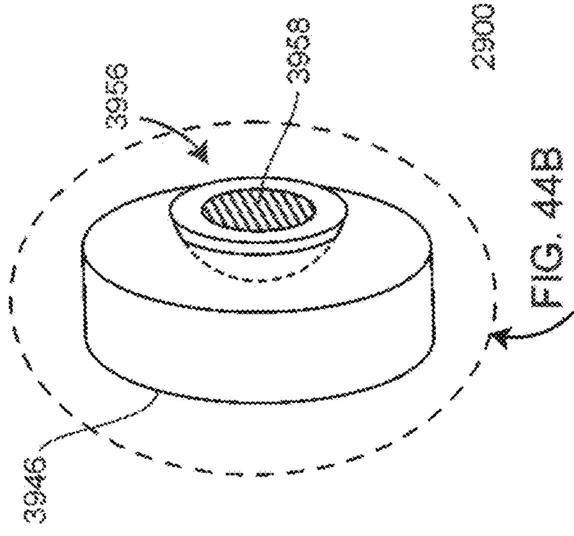
Figure 45A:
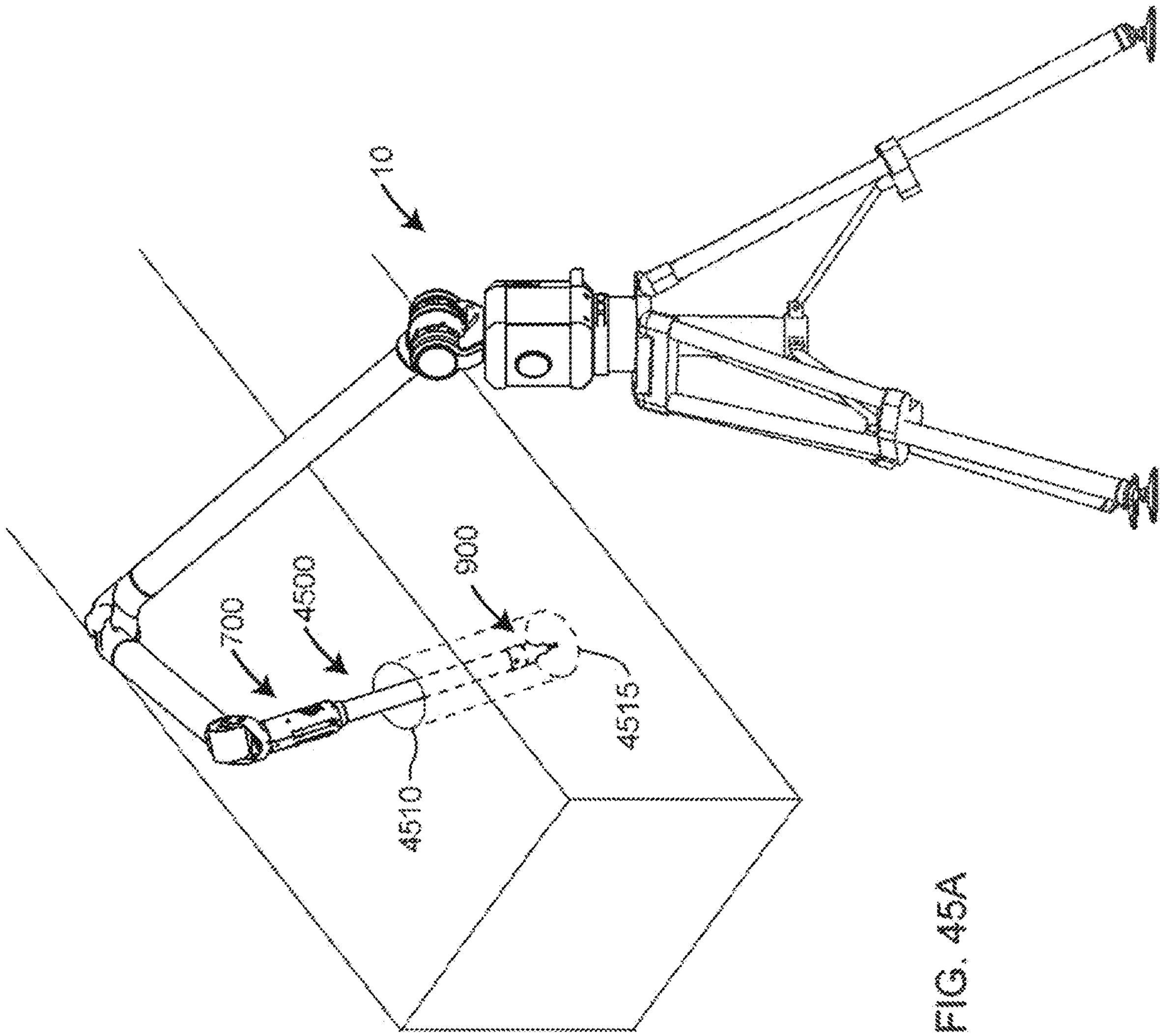
FIG. 45A is an isometric view of a AACMM and extension adapter being used to measure a deep hole according to an embodiment.
Figure 45B:
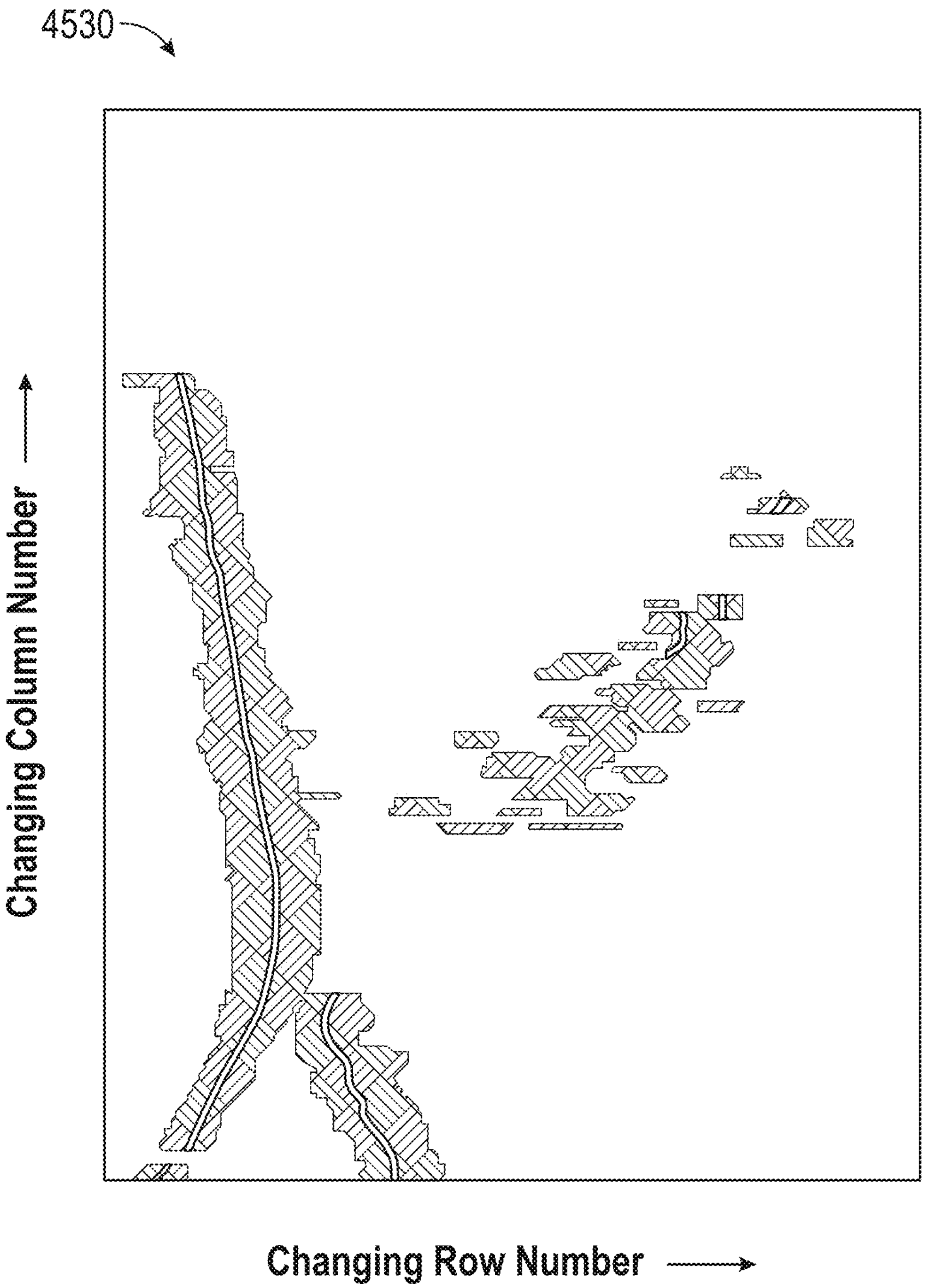
FIG. 45B illustrates an instance of multipath interference in a scan taken by a laser line probe (LLP) according to an embodiment.
Figure 45D:
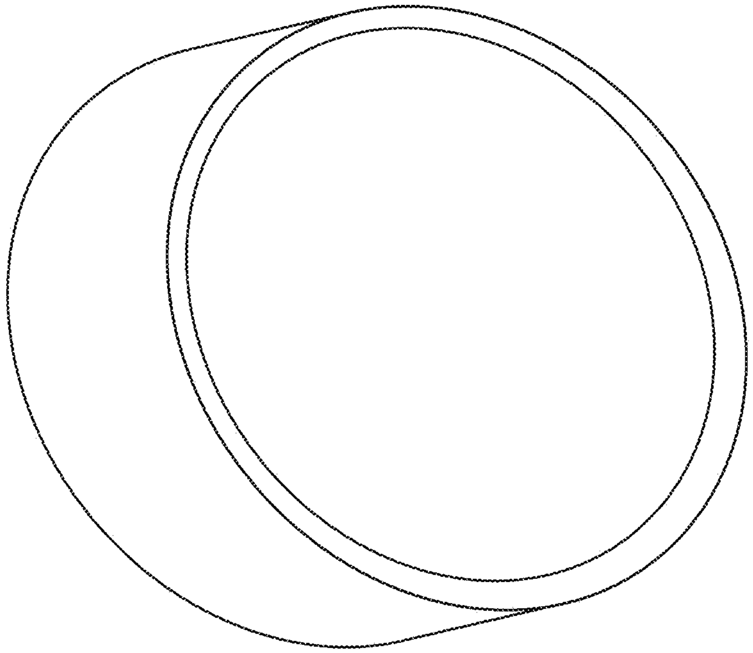
FIG. 45C and FIG. 45D illustrate 3D data points with and without errors, respectively, resulting from multipath interference according to an embodiment.
Figure 45C:
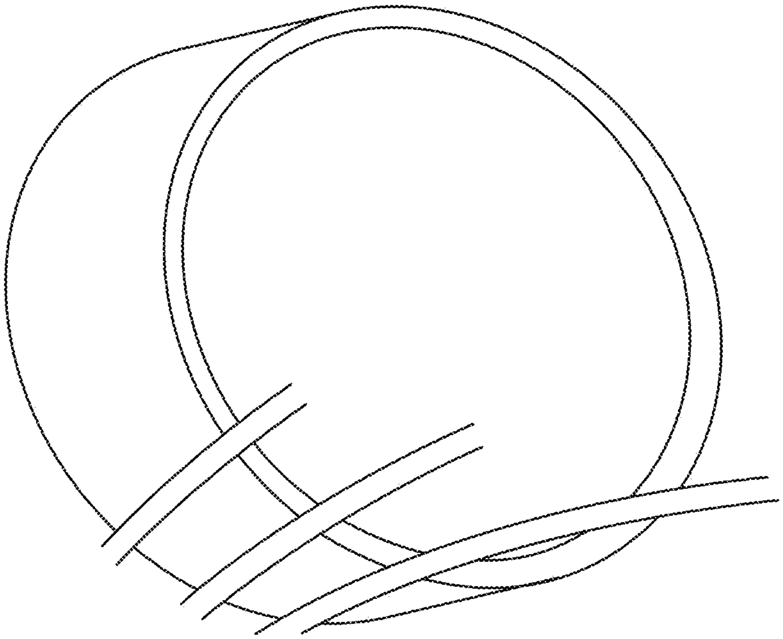

In an embodiment illustrated in FIG. 43A the noncontact 3D measuring device 2900 is attached to the AACMM 10, which further includes a probe tip 904 for contact 3D measurement, as described herein above in reference to FIGS. 24, 25. In many cases, it is desirable to obtain measurement data collected with a tactile probe tip 904 as well as a scanner such as the noncontact 3D measuring device 2900 or the LLP 1100 in FIG. 23A. Consider for example, the situation in FIG. 45A in which there is a need to measure the bottom 4515 or edges of a deep hole 4510. In an embodiment, the probe extension 4500 is attached to the seventh-axis assembly 700 of the AACMM 10 to measure 3D coordinates associated with the deep hole. Such a measurement would be difficult or impossible to measure with a scanner such as the scanner 2900 or the LLP 1100. As another example of a situation in which measurement with a tactile probe is advantageous, consider the situation shown in FIGS. 45B, 45C, 45D. FIG. 45B shows a scan 4530 of an object made with an LLP 1100. FIG. 45B shows an image obtained by a camera in an LLP 1100 or a handheld 3D scanner 2700. The vertical axis of the image represents an angle to the a point on the projected laser line, while the horizontal axis of the image represents depth to the object. As can be seen in FIG. 45B, at some column pixel values, image points are captured at more than one row number, which would indicate that more that there is more than one possibility for the distance to the imaged point. Such a situation can occur when the geometry of the measured object is such that more than one reflection off the object can arrive in the same row of the camera array. After processing, it is often possible to distinguish between valid points in an image such as the image 4530, but when this is not possible the LLP will report that no 3D coordinates are available for that scanned point. It often happens that scanning from a different direction can resolve the problem, but this is not always possible. As another example of the potential problems caused by multipath interference, consider a scanned image that has been processed using algorithms capable of separating valid 3D coordinates in FIG. 45D and invalid coordinates in FIG. 45C. In general, although it is possible in some cases to distinguish between valid and invalid points, it is sometimes more convenient or reliable to measure with a hard probe. In addition, in some cases, 3D coordinates are desired for only a relatively small number of discrete points. In this case, it is faster to measure with a tactile probe having a probe tip such as 904 rather than measure with an LLP or similar scanner.

Figure 46:
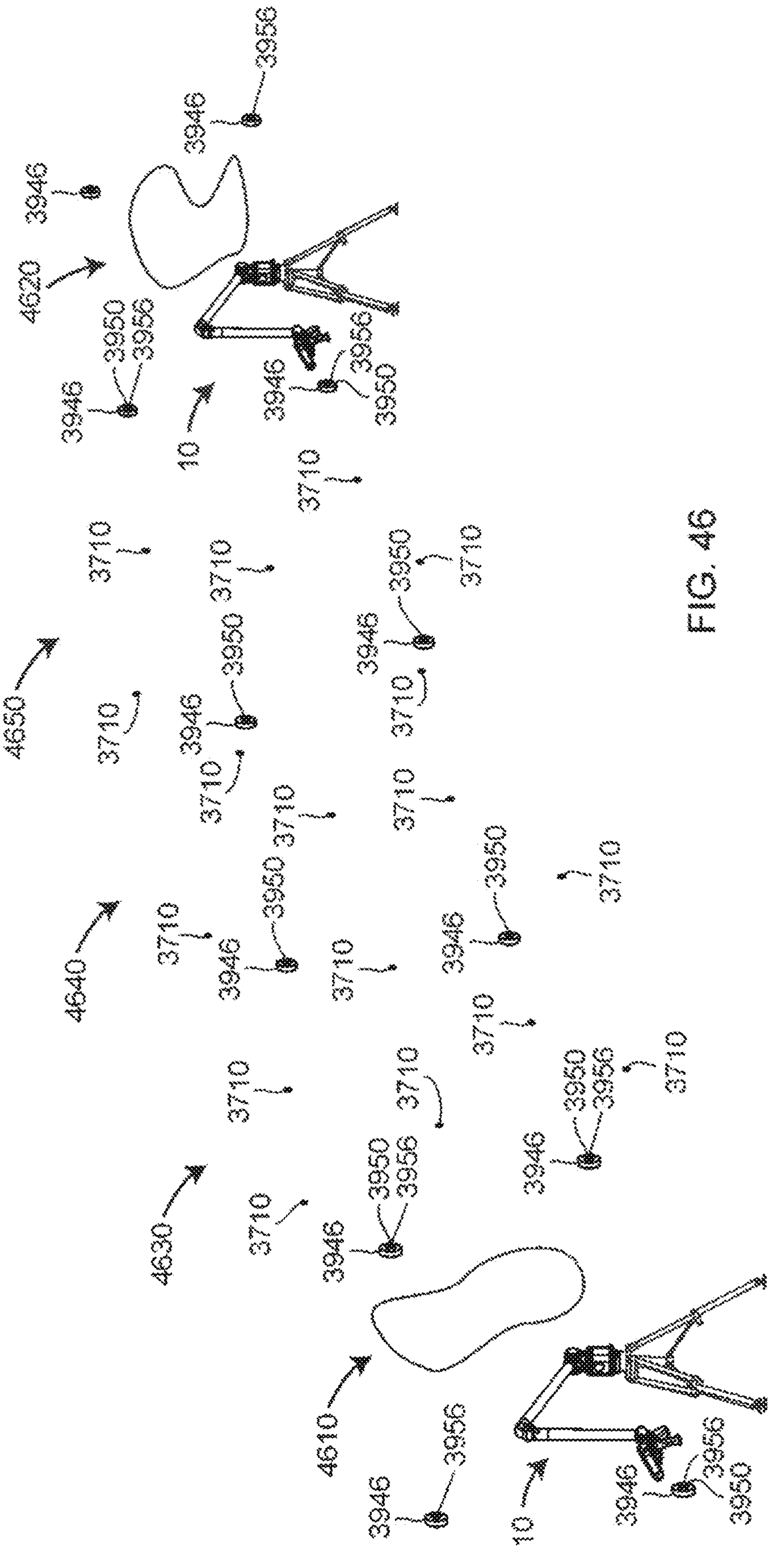
FIG. 46 is a schematic representation in which two different methods are used to measure 3D coordinates of an object according to an embodiment.

FIG. 46 illustrates a situation in which tactile measurements are required in regions 4610, 4620 separated by a large distance. In an embodiment, relocation of the AACMM 10 to the regions 4610, 4620 is carried out without placing kinematic nests 3746 near the regions 4610, 4620. In this case, an alternative method is used to relocate the AACMM 10 without placing or removing markers 3710. Points on the object in other regions 4630, 4640, 4650 are measured without relocating the AACMM 10 if desired. In this case, kinematic reflectors 3960 are placed in kinematic nests previously measured in 3D by a laser tracker 3910. In an embodiment, the markers are measured using photogrammetry with the stereo cameras 2520A, 2520B as described herein above. As the handheld 3D scanner 2700 is moved in front of the kinematic reflectors 3960 and the markers 3710, first lines of light 2562A and second lines of light 2562B are at the same time projected and measured in 3D if desired. Alternatively, the locations of each of the markers 3710 are determined in a first step and the locations of the projected first lines of light 2562A and second lines of light 2562B determined in a later step.

According to an embodiment, a system comprises: a first projector operable to project a first line of light onto an object, the first line of light having a first wavelength; a second projector operable to project a second line of light onto the object, the second line of light having a second wavelength; a first camera having a first lens and a first image sensor, the first lens operable to pass the first wavelength and block the second wavelength, the first image sensor operable to capture an image of the first line of light; a second camera having a second lens and a second image sensor, the second lens operable to pass the second wavelength and block the first wavelength, the second image sensor operable to capture an image of the second line of light; and one or more processors operable to determine three-dimensional (3D) coordinates of object points on the object based at least in part on the captured image of the first line of light and the captured image of the second line of light.

According to an embodiment, a system comprises: a first enclosure coupled to a first projector, a first illuminator, and a first camera, wherein the first enclosure is sized for handheld operation; a wearable unit having a computing unit and a battery, the wearable unit including a second enclosure physically separated from the first enclosure but electrically connected to first enclosure by a wired or wireless connection; a first projector operable to project a first line of light onto an object; a first illuminator operable to illuminate markers on or near the object; a first camera operable to capture a first image at a first time and a second image at a second time, each of the first image and the second image including the first line of light and some of the illuminated markers; and one or more processors included within some combination of the first enclosure, the wearable unit, and external computers, the one or more processors operable to determine in a global frame of reference three-dimensional (3D) coordinates of points on the object based at least in part on the first image and the second image.

In a further embodiment, a system comprising: a first projector operable to project a first line of light onto an object, the first line of light having first wavelengths; a first illuminator operable to project third light onto the object, the third light being a subset of third wavelengths, the third light operable to illuminate markers on or near the object; a first lens operable to pass the first wavelengths and block the third wavelengths; a third lens operable to pass the third wavelengths and block the first wavelengths; a first camera having the first lens, the third lens, and a first image sensor, the first image sensor operable to receive light passed through the first lens and the third lens; and one or more processors operable to determine a plurality of three-dimensional (3D) coordinates on the object based at least in part on a first image received by the first image sensor.

While the invention has been described in detail in connection with only a limited number of embodiments, it should be readily understood that the invention is not limited to such disclosed embodiments. Rather, the invention can be modified to incorporate any number of variations, alterations, substitutions, or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but only limited by the scope of the appended claims.

The invention claimed is:

1. A system comprising:

a first projector for projecting a first line of light at a first wavelength on a stationary object;

a second projector for projecting a second line of light at a second wavelength on the object;

a first camera having a first illuminator that illuminates the object and markers disposed at least one of on or near the object with light comprising a first range of wavelengths separate from the first wavelength and the second wavelength;

a second camera having a second illuminator that illuminates the object with light comprising a second range of wavelengths separate from the first wavelength and the second wavelength;

the first camera further having a first lens for passing the first wavelength and blocking the first range of wavelengths, further having a second lens for passing the first range of wavelengths and blocking the first wavelength and the second wavelength, and further having a first image sensor for capturing a first image of the first line of light through the first lens and second lens;

the second camera further having a third lens for passing the second wavelength and blocking the first wavelength, the first range of wavelengths and the second wavelength, further having a fourth lens that passes the second range of wavelengths and blocks the first wavelength and the second wavelength, and further having a second image sensor for capturing a second image of the second line of light through the third and fourth lens; and a wearable unit having an enclosure and a processor positioned within the enclosure, the processor determining three-dimensional (3D) coordinates of reflected points on the object based on the first image and the second image.

2. The system of claim 1, wherein:

the first illuminator projects third light in at least the first wavelength;

the second illuminator projects fourth light in at least the second wavelength;

the first camera captures a third image of a reflective marker placed on the object and illuminated by the third light;

the second camera captures a fourth image of the reflective marker illuminated by the fourth light; and the processor determines 3D coordinates of the reflective marker based on the third image and the fourth image.

3. The system of claim 2, the processor further combining, in a common frame of reference, 3D coordinates of reflected points of the object captured at a first time and reflected points of the object captured at a second time, based at least in part on first 3D coordinates of the marker determined at the first time and second 3D coordinates of the marker determined at the second time.

4. The system of claim 2, wherein the third light comprises a plurality of wavelengths including the first wavelength, the fourth light comprises a plurality of wavelengths including the second wavelength, and the first wavelength is different than the second wavelength.

5. The system of claim 1, further comprising:

the first illuminator projects third light in at least the first wavelength;

the second illuminator projects fourth light in at least the second wavelength;

the first camera captures a third image including a reflective marker placed near the object and illuminated by the third light;

the second camera capture a fourth image of the reflective marker illuminated by the fourth light; and the processor determines 3D coordinates of the reflective marker based at least in part on the third image and the fourth image.

6. The system of claim 5, the processor further combines, in a common frame of reference, 3D coordinates of reflected points of the object captured at a first time and reflected points of the object captured at a second time, based at least in part on first 3D coordinates of the marker determined at the first time and second 3D coordinates of the marker determined at the second time.

7. A system comprising:

a first enclosure configured for handheld use that includes:

a first projector that projects a first line of light at a first wavelength on an object;

a second projector for projecting a second line of light at a second wavelength on the object;

a first illuminator that illuminates a marker disposed within a same field of view as the object with light comprising a first range of wavelengths separate from the first wavelength and the second wavelength;

a second illuminator that illuminates the object and the marker with light comprising a second range of wavelengths separate from the first wavelength and the second wavelength;

a first lens that passes the first wavelength and blocks the first range of wavelengths;

a second lens that passes the first range of wavelengths and blocks the first wavelength;

a third lens that passes the second wavelength and blocks the first wavelength, the first range of wavelengths and the second range of wavelengths;

a fourth lens that passes the second range of wavelengths and blocks the first wavelength and the second wavelength;

a first camera that captures a first image of the object at a first time through the first lens and the second lens and a second camera that captures a second image of the object at a second time through the third lens and the fourth lens, each of the first image and the second image including at least one of the first line of light, the second line of light, and the marker; and a wearable unit including a second enclosure that is physically separate from the first enclosure, the second enclosure enclosing a processor in communication with the camera by at least one of a wired connection and a wireless connection, the processor for determining three-dimensional (3D) coordinates of points on the object based at least in part on the first image and the second image.

8. The system of claim 7, further comprising a mounting device on the first enclosure for mounting and releasing a mobile computing device that includes a display having a user interface (UI) that presents at least one of the first image, the second image, and data sent from the processor.

9. The system of claim 8, wherein the mobile computing device is a smart phone and the mounting device includes a magnet.

10. The system of claim 7, the first range of wavelengths and the second range of wavelengths comprising substantially the same ranges of wavelengths of light.

11. The system of claim 7, the first range of wavelengths and the second range of wavelengths comprising substantially separate ranges of wavelengths of light.

12. A system comprising:

a first projector that projects on an object a line of light having a first wavelength;

a first illuminator that illuminates the object and markers disposed at least one of on and near the object with light comprising a first range of wavelengths separate from the first wavelength;

a first lens that passes the first wavelength and blocks the first range of wavelengths;

a second lens that passes the first range of wavelengths and blocks the first wavelength;

a second projector that projects on the object a second line of light having a second wavelength;

a second illuminator that illuminates the object and the markers with light comprising a second range of wavelengths separate from the first wavelength and the second wavelength;

a third lens that passes the second wavelength and blocks the first wavelength, the first range of wavelengths and the second range of wavelengths;

a fourth lens that passes the second range of wavelengths and blocks the first wavelength and the second wavelength;

a first image sensor that receives reflected light from the object through the first lens and the second lens to generate a first image;

a second image sensor that generates a second image from reflected light received from the object through the third lens and the fourth lens; and a processor that determines a plurality of three-dimensional (3D) coordinates on the object based at least in part on the images generated by the image sensors from the reflected light.

13. The system of claim 12, wherein the first lens has a narrower field of view (FOV) than the second lens.

14. The system of claim 12, wherein the first lens is oriented with respect to the image sensor to satisfy a Scheimpflug condition.

15. The system of claim 12, further comprising a mechanism for attaching the system to an articulated arm coordinate measuring machine (AACMM).

16. The system of claim 12, wherein the first range of wavelengths and the second range of wavelengths are substantially the same.

* * * * *